United States Patent

Funada et al.

[11] Patent Number: 5,832,112
[45] Date of Patent: Nov. 3, 1998

[54] IMAGE PROCESSING APPARATUS CAPABLE OF DETECTING SPECIFIC ORIGINALS

[75] Inventors: Masahiro Funada; Katsuyoshi Maeshima, both of Yokohama; Masanori Yamada, Inagi; Yasumichi Suzuki; Yoichi Takaragi, both of Yokohama; Takeshi Aoyagi, Tokyo; Koichi Ishimoto, Yokohama, all of Japan

[73] Assignee: Canon Kabushiki Kaisha, Tokyo, Japan

[21] Appl. No.: 358,144

[22] Filed: Dec. 16, 1994

[30] Foreign Application Priority Data

Dec. 24, 1993 [JP] Japan .................................. 5-328031
Dec. 27, 1993 [JP] Japan .................................. 5-330442
Dec. 27, 1993 [JP] Japan .................................. 5-348460

[51] Int. Cl.⁶ ........................................................ G06K 9/00
[52] U.S. Cl. ............................................. 382/181; 382/299
[58] Field of Search .................................... 382/199, 162, 382/165, 167, 190, 191, 192, 195, 266, 269, 264, 299, 163, 100, 101, 112, 113, 135, 137, 138, 170, 180, 181, 203, 209, 217, 220, 224, 225, 226, 227, 228, 254, 255, 260, 261, 263, 270; 358/518, 500, 448, 462, 529

[56] References Cited

U.S. PATENT DOCUMENTS

| | | | |
|---|---|---|---|
| 4,873,570 | 10/1989 | Suzuki et al. | 358/80 |
| 4,937,662 | 6/1990 | Matsunawa et al. | 358/75 |
| 4,996,591 | 2/1991 | Kadowaki et al. | 358/80 |
| 5,113,248 | 5/1992 | Hibi et al. | 358/75 |
| 5,132,786 | 7/1992 | Ishiwata | 358/75 |
| 5,134,667 | 7/1992 | Suzuki | 382/199 |
| 5,166,810 | 11/1992 | Sorimachi et al. | 358/462 |
| 5,189,528 | 2/1993 | Takashima et al. | 358/448 |
| 5,194,945 | 3/1993 | Kadowaki et al. | 358/75 |
| 5,227,871 | 7/1993 | Funada et al. | 358/75 |
| 5,251,023 | 10/1993 | Arimoto et al. | 358/529 |
| 5,293,432 | 3/1994 | Gonser et al. | 382/299 |
| 5,297,219 | 3/1994 | Weldy | 382/299 |
| 5,313,312 | 5/1994 | Yamada | 358/505 |
| 5,331,407 | 7/1994 | Doi et al. | 382/299 |
| 5,361,309 | 11/1994 | Sugiyama | 382/299 |
| 5,384,648 | 1/1995 | Seidner et al. | 382/299 |
| 5,467,404 | 11/1995 | Vuylsteke et al. | 382/299 |
| 5,546,473 | 8/1996 | Buytaert et al. | 382/299 |
| 5,579,412 | 11/1996 | Ando | 382/299 |
| 5,579,445 | 11/1996 | Loce et al. | 382/299 |
| 5,585,944 | 12/1996 | Rodriguez | 382/162 |
| 5,621,816 | 4/1997 | Ruppert | 382/163 |
| 5,712,924 | 1/1998 | Fujimoto et al. | 382/165 |

FOREIGN PATENT DOCUMENTS

| | | | |
|---|---|---|---|
| 3-160384 | 7/1991 | Japan | H04N 1/40 |
| 4-282528 | 9/1992 | Japan | H04N 1/40 |
| 4-282529 | 9/1992 | Japan | H04N 1/40 |

*Primary Examiner*—Leo H. Boudreau
*Assistant Examiner*—Bijan Tadayon
*Attorney, Agent, or Firm*—Fitzpatrick, Cella, Harper & Scinto

[57] ABSTRACT

A color image processing apparatus that prevents counterfeiting by detecting specific originals with high precision. Although general banknotes have graphic patterns drawn on uniform density portions, the tonality percepted by human eye is the mixture of the tonality of a graphic portion and the tonality of a uniform density portion. In consideration of the mixed tonality sensed by human eye, the apparatus smoothes a read image signal to generate mixed tonality for judgment, thus improves judgment precision. The total judgment of existence/absence of specific original is made by performing m judgments on m (m>n) judging conditions using the tonality data of pre-registered n (n: positive integer) specific originals.

23 Claims, 91 Drawing Sheets

F I G. 22
| $X_{i-2,j-2}$ | $X_{i-2,j-1}$ | $X_{i-2,j}$ | $X_{i-2,j+1}$ | $X_{i-2,j+2}$ |
|---|---|---|---|---|
| $X_{i-1,j-2}$ | $X_{i-1,j-1}$ | $X_{i-1,j}$ | $X_{i-1,j+1}$ | $X_{i-1,j+2}$ |
| $X_{i,j-2}$ | $X_{i,j-1}$ | $X_{i,j}$ | $X_{i,j+1}$ | $X_{i,j+2}$ |
| $X_{i+1,j-2}$ | $X_{i+1,j-1}$ | $X_{i+1,j}$ | $X_{i+1,j+1}$ | $X_{i+1,j+2}$ |
| $X_{i+2,j-2}$ | $X_{i+2,j-1}$ | $X_{i+2,j}$ | $X_{i+2,j+1}$ | $X_{i+2,j+2}$ |
F I G. 23
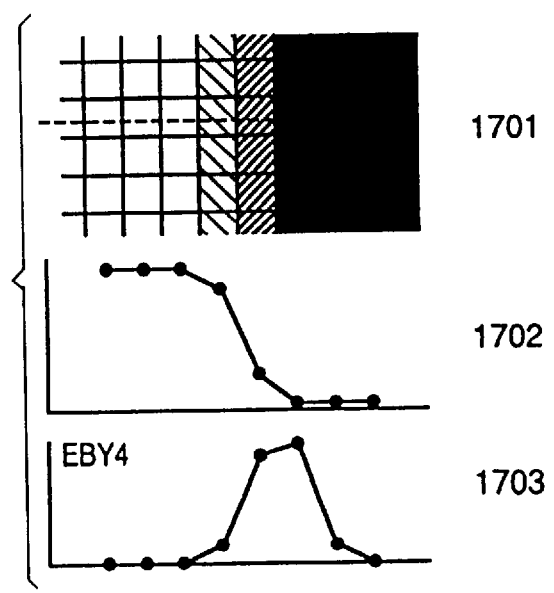
1701
1702
EBY4          1703

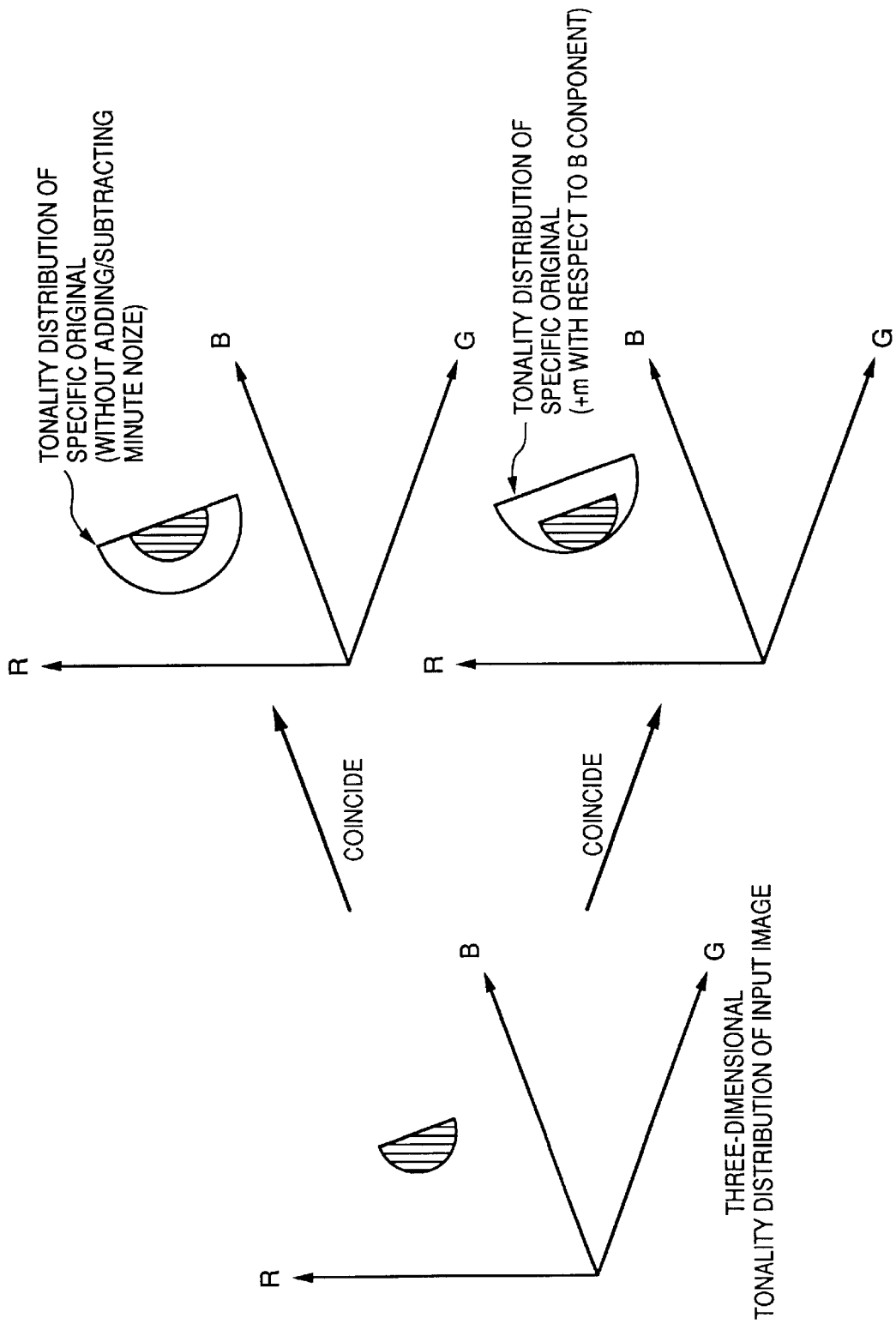

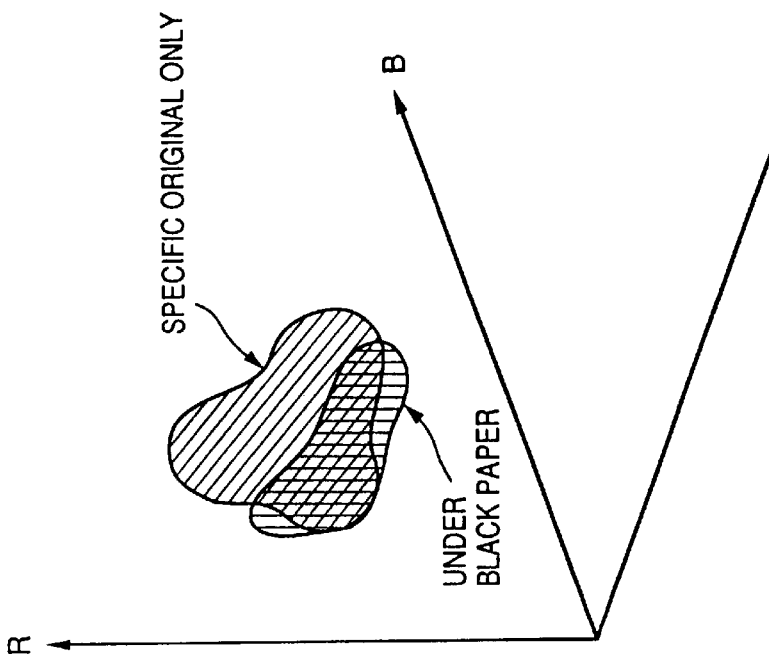
FIG. 86b TONALITY DISTRIBUTION OF SPECIFIC ORIGINAL PLACED UNDER BLACK PAPER
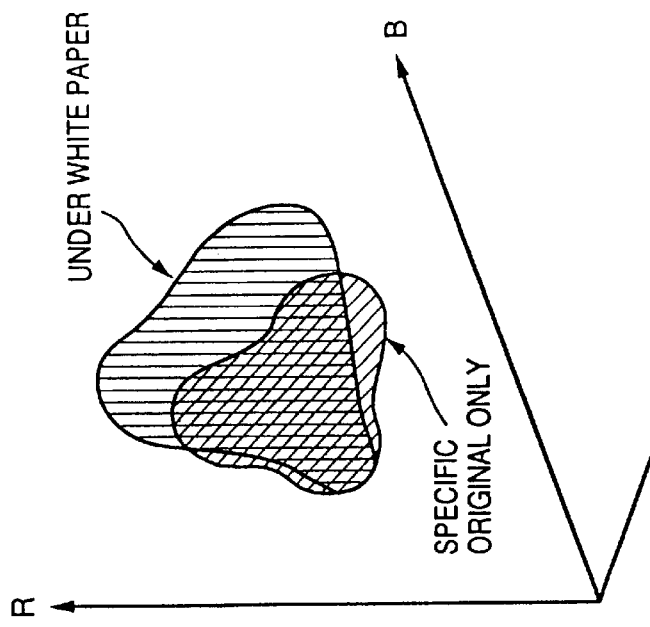
FIG. 86a TONALITY DISTRIBUTIN OF SPECIFIC ORIGINAL PLACED UNDER WHITE PAPER

IMAGE PROCESSING APPARATUS CAPABLE OF DETECTING SPECIFIC ORIGINALS

BACKGROUND OF THE INVENTION

Present invention relates to a color image processing apparatus and the image processing method and, more particularly to a color image processing apparatus and the image processing method capable of detecting specific original such as banknotes and securities.

Recently, image forming apparatuses such as color copying machine and color printers having multicolor processing function have been developed to have high image quality. Accompaniment with this development is a fear of forgery by illegally copying specific originals, i.e., bank notes, securities and the like.

For this reason, an image processing apparatus e.g. a copying machine that identifies such specific original in order to prevent forgery has been proposed. Japanese Patent Application Nos. 4-282528 and 4-282529 disclose a copying machine which prestores feature data of plural types of specific originals, compares the features of an image signal inputted from a document reader with the stored feature data, to determine whether or not at least one of the specific originals exists, thus preventing counterfeiting.

In this prior art, existence/absence of specific original is determined by (1) sampling a read image signal, (2) detecting a graphic portion and a uniform density portion from the sampled image signal, and (3) comparing the tonality of the graphic portion and that of the uniform density portion with the tonality of those portions of the pre-registered specific originals.

In addition, Japanese Patent Application No. 3-160384 has proposed a forgery-preventing technique including (1) pre-registering color distribution information in color space of a specific original, and (2) comparing color distribution of input image data with the registered color distribution information to judge whether or not the input image data is of a specific original.

Next, the construction of a typical color copying machine according to the above prior art will be described below.

FIG. 87 is a block diagram showing the construction of a conventionally well-known color copying machine. Note that in FIG. 87, the mechanism of the scanning unit for mechanically scanning an original which is placed on a platen and the platen are omitted.

In FIG. 87, reference numeral C101 denotes a CCD color sensor; C102, analog amplifiers; C103, an A/D converter; C104, a shading corrector for correcting the unevenness of brightness in an image signal due to difference among reading positions; and C105, a print signal generator for converting input R (red), G (green) and B (blue) signals into Y (yellow), M (magenta), C (cyan) and Bk(black) signals. The print signal generator C105 has a delay circuit for compensating time required for specific original judgment. Print signals outputted from this circuit are modulated by a real-time correction signal f.

Numeral C106 denotes a color-space matching judgment circuit for calculating the similarity between three-dimensional color-space distribution of a specific original (bank notes, securities etc.) and that of read image data; C107, a real-time correction signal generator for generating the real-time correction signal f; and C108, a read synchronizing signal generator for generating a read synchronizing signal. The read synchronizing signal generator C108 generates a scanning period signal (HS) C109, a pixel reading reference clock (CLK) C110 and an period signal (VS) C112 indicative of effective area in reading the original in a subscanning direction. Numeral C113 denotes a color printer for print-outputting based on the input original image data.

Note that as the shading corrector C104 corrects the unevenness of brightness and variation of tonality due to reading positions, the similarity judgment in color space can be accurately made using the shading-corrected color signals, regardless of the position of the original. The shading corrector is a well-known circuit in this art and the detailed description of this circuit will be omitted.

FIG. 88 is a block diagram showing the detailed construction of the color-space matching judgment circuit C106. In FIG. 88, numeral C1201 denotes an upper 5-bit signal of an 8-bit R signal outputted from the shading corrector C104; C1202, an upper 5-bit signal of an 8-bit G signal outputted from the shading corrector C104; and C1203, an upper 5-bit signal of an 8-bit B signal outputted from the shading corrector C104. Further, numeral C1205 denotes a timing signal generator for generating various timing signals to be describe later; C1209, a SRAM; and C1270, an address generator for sequentially generating all the addresses of the SRAM 1209.

Numeral C1204 denotes a ROM for storing information on tonality of plural types of specific originals. When 5-bit R, G and B signals are inputted into its address (A0 to A14), judgment signals (X0 to X7), indicative of whether or not the input R, G and B signals correspond with the respective tonalities of the plural types of specific originals, are outputted from data output terminals (D0 to D7).

Numerals C1220 to C1227 denote smoothing circuits for realtimely smoothing operation based on the judgment signals (X0 to X7) outputted from the ROM 1204; C1240 to C1247, color-space judgment circuits for judging the similarity between the specific original data and input color signals in RGB space and outputting color-space similarity judgment signals (MK0 to Mk7).

Numerals C1271 to C1272 denote selectors for zero-clearing the SRAM C1209 in accordance with an address signal generated by the address generator C1270, when the subscanning interval signal (VS) 112 is "0 (low)".

FIG. 89 conceptually illustrates the specific original color-tone information stored in the ROM C1204. The specific original color-tone information is represented by a three-dimensional color space having the respective R, G and B color components as the coordinate axes. In FIG. 89, the hatched area in the three-dimensional space corresponds to the tonality of the specific original. Whether or not the input R, G and B signals correspond to the tonality area is judged using the combinations of the R, G and B coordinate values corresponding to the input R, G and B signals. If the input RGB signal corresponds to the specific original tonality, an output value from the ROM C1204 is "1". On the other hand, if the input RGB signal does not match with the specific original tonality, the output value is "1". In other words, the ROM 1204 has a table with "0" and "1" output values corresponding to the value of input RGB signals. Note that the ROM 1204 has eight data output terminals (D0 to D7) because tonality information on eight types of specific originals is stored in the ROM C1204. The data output terminals respectively correspond to the eight specific originals.

FIG. 90 shows the relation between input data and output data regarding similarity judgment using the tonality data of the plurality of specific originals stored in the ROM C1204.

Among the input addresses (A0 to A14), 5-bit B signals are inputted into the addresses A0 to A4; 5-bit G signals, into the addresses A6 to A9; and 5-bit R signals, into the addresses A10 to A14. These input signals define the input address values and then define the output values corresponding to the tonality of the eight types of specific originals. Then, with respect to the 5-bit RGB data of input each pixel, the judgment signals (X0 to X7) resulted from similarity judgment between the input RGB data and the tonality of the eight types of specific originals are outputted in parallel from the data output terminals (D0 to D7).

FIG. 91 is a block diagram showing the construction of the smoothing circuits C1220 to C1227. In FIG. 91, numerals C1601 and C1602 denote multipliers; C1603, an adder; C1604, a latch circuit; and C1605, a comparator. Continuity shown in FIG. 92 can be taken into consideration for judgment, since the combination of the multipliers 1601 and 1602 and the adder 1603 calculates the weighted mean between the input data and previous data.

FIG. 92 shows the relation between an input value (Xi) to the smoothing circuit and a calculated smoothing value (Yi). In the construction as shown in FIG. 91, if the input value (Xi) is continuously "1", as shown in FIG. 92, the calculated smoothing value (Yi) increases. Accordingly, in a case where an input RGB signal corresponds to the tonality of the specific original, the output signal (C0 to C7) from the smoothing circuit becomes "1". This enables accurate judgment without suffering from e.g. noise.

FIG. 93 is a block diagram showing the construction of the color-space judgment circuits C1240 to C1247 which, in RGB space as shown in FIG. 94, make real-time judgment of the similarity between the specific image data and input color signals, and output color-space similarity judgment signals (MK0 to MK7).

The color-space judgment circuit as shown in FIG. 93 performs logical OR from data (Di: i=1,8) read out of the SRAM C1209 and an output signal (Ci: i=1,8) from the smoothing circuit, and writes the result into the SRAM C1209 again. Only when the data (Di) changes from "0" to "1", the count value of a counter C1301 is incremented. The counter 1301 is cleared at the rising edge of the subscanning period signal (VS) C112. A comparator C1302 compares an output value (Zi) from the counter C1301 with a constant δi of a register C1303. If Zi>δ1, Mki=1, and if Zi≦δi, Mki=0. As shown in FIG. 94, δi value is set to be 1 % of $U_{ORG}$ (e.g., l=90) as follows:

$$\delta i = (l/100) \times U_{ORG}$$

$U_{ID}$ is a numerical value representing the total number of cubes, each of which is defined in RGB coordinate space. The side of the cube is a length obtained from dividing the respective coordinate axes with a predetermined unit length, into 32, taking a possible value of the input 5-bit RGB data into consideration. On the other hand, $U_{ORG}$ is a volume of the three-dimensional area formed in the RGB coordinate space by the data representing the tonality of the registered specific original.

When the shape of the observed image data i.e. the input color data becomes approximately the same as that of the specific image data in the RGB color space, the color-space similarity judgment signal (MK0 to MK7) becomes "1".

<Timing Chart of Control Signal (FIG. 95)>

FIG. 95 is a timing chart showing a timing signal generated by the timing signal generator C1205. FIG. 95 shows the subscanning period signal VS, the reference clock CLK, a clock CLK4, obtained from dividing the reference clock (CLK) by four, a control signal OE, applied to the output-enable (OE) terminal of the SRAM C1209 through a signal line C1208, for controlling output from the SRAM C1209, and a control signal WE, applied to the write-enable (WE) terminal of the SRAM C1209 through a signal line 1207, for controlling writing into the SRAM C1209. Signals Ci, Ci', Di'', ENB, Di and Di' respectively denote correlation among the control signals and input and output signals shown in FIG. 93.

<Construction of Real-Time Correction Signal Generator (FIG. 96)>

FIG. 96 is a block diagram showing the construction of the real-time correction signal generator C107. As shown in FIG. 96, this circuit comprises latch circuits, an OR circuit and AND circuits. When it is judged by the real-time correction signal generator C107 that input data corresponds with at least one of the registered plural specific originals, the real-time correction signal f becomes "1 (high)".

<Construction of Print Signal Generator (FIG. 97)>

FIG. 97 is a block diagram showing the construction of the print signal generator C105.

Normally, a masking-UCR calculator C2101 generates respective Y, M, C and Bk color component density signals based on input R, G and B signals. In a case where it is determined that the input color signal corresponds with the specific original, another masking-UCR calculator C2102 changes the tonality of the input color signal (e.g., deepens the tone of red) and generates the respective Y, M, C and Bk density signals. Then, a selector C2103 selects one of output signals from the masking-UCR calculators C2101 and C2102 in accordance with the real-time correction signal f and outputs the selected signal.

This enables changing the tonality of only the area judged as corresponding with the specific original and print-outputting the input image. Further, when it is judged that input image data is similar to the specific original, a reproduced image outputted from the printer may be blackened, otherwise, the power may be turned off, thus avoiding normal image formation.

Note that in FIG. 97, numeral C2104 denotes a LOG converter for converting brightness R, G and B signals into density Y, M and C signals.

However, in the above conventional image processing apparatus, judging capability of specific-original (e.g. bank notes) is insufficient, and misrecognition that a non-specific original is determined as the specific original occurs. Especially, such misrecognition is caused by erroneously detecting dot portions and character edge portions which are usually included in ordinary originals as graphic portions, due to low graphic detection capability.

Originals having a large area and various tonality are also misrecognized as a specific original. Further, specific originals include bank notes of various designs from various countries, especially, a bank note containing no graphic portion and no uniform density portion, and a bank note containing a graphic portion and a uniform density portion where the conventional judgment using graphic portion and uniform density portion is not helpful.

In the above conventional image processing apparatus, the judgment is made on only one judging condition with respect to one type of specific original. More specifically, when judgment is for detecting a plurality of specific original, the number of judging conditions is the same as the number of specific originals. This may cause difficulty in discriminating non-specific originals from the specific originals and seriously affect appropriate processing on the specific originals.

Furthermore, in the above conventional image processing apparatus, as the input characteristic of an image input unit (hereinafter referred to as "scanner") slightly differs among the apparatuses, the resulted read signal slightly differs between scanners. Accordingly, if only input image data simply read by one scanner is used to generate color distribution information for specific-original judgment, a proper judgment using input image data read by another scanner cannot be assured.

There are some banknotes, from all over the world, in which the tonality greatly varies from one piece to another piece. For this reason, in judgment of bank notes, even if they are of the same type, one bank note may be recognized as a specific original while another may not be recognized as the specific original.

Further, if some trick, e.g., placing white paper on a specific original, is used to change a read signal by a minute amount without greatly influencing a copy output image, the specific-original judgment cannot be performed.

Accordingly, in consideration of these drawbacks of the above image processing apparatuses, it is desirable to provide specific-original judgment based on color distribution information having some judgment margins, but which are appropriately set with sensitive balance of color distribution in order to avoid misjudging non-specific original as a specific original.

SUMMARY OF THE INVENTION

Accordingly, it is an object of the present invention to provide an image processing method capable of detecting a specific original with high precision and controlling an image processing apparatus in accordance with the detection.

It is another object of the present invention to provide a color image processing apparatus which can detect a specific original with high precision and control image processing in accordance with the detection.

It is still another object of the present invention to provide an image processing apparatus capable of detecting the feature of the tonality of an original with high precision.

It is still another object of the present invention to provide an image processing apparatus capable of detecting a graphic portion of an original with high precision.

It is still another object of the present invention to provide an image processing apparatus capable of performing image processing at high-speed.

It is still another object of the present invention to provide an image processing apparatus capable of prohibiting copying a specific original.

It is still another object of the present invention to provide a copying machine capable of preventing forgery.

In accordance with the present invention, whether or not an image represented based on input color image information is a predetermined image is judged, based on the discrimination results which are from input color image information and smoothed color image information.

In accordance with the other invention, whether or not an image represented based on input color image information is a predetermined image is judged, based on the discrimination results which are from color image information, each having a different resolution.

In accordance with the other invention, whether or not an image represented based on input color image information is a predetermined image is judged, based on the discrimination result, using color image information from which a screen component has been removed away.

The present invention is advantageous since judgment as to whether or not an image from input color image information is a predetermined image is made with high precision, using a plurality of discrimination approaches.

Furthermore, the judgment is made with high precision since an image from which a screen component is removed away is used for a discrimination.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 22 is a matrix diagram illustrating a 5×5 pixel window used for feature extraction;

FIG. 23 is an explanatory view showing a simple edge portion;

FIGS. 84 and 85 are explanatory views of tonality judgment on the input image where the noise has been added;

FIG. 86 is an explanatory view of color distribution change when white/black paper is placed on a specific original;

DETAILED DESCRIPTION OF THE PREFERRED EMBODIMENTS

Preferred embodiments of the present invention will be described in detail in accordance with the accompanying drawings.

First Embodiment
<General Construction of Apparatus>

Figure 1:
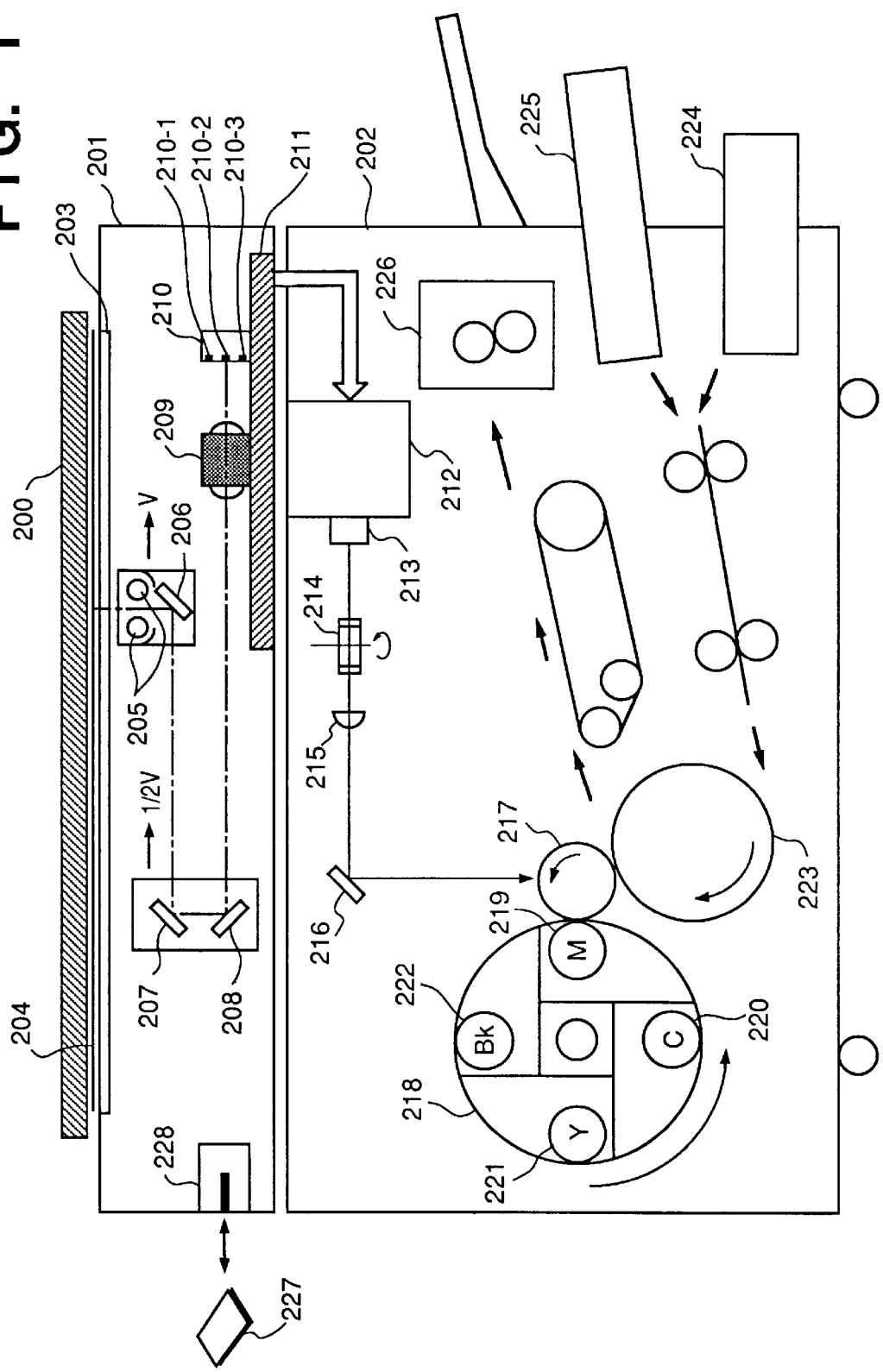
FIG. 1 is a cross-sectional view showing the general construction of a color copying machine according to a first embodiment of the present invention.

FIG. 1 is a cross-sectional view showing the general construction of a color copying machine according to a first embodiment of the present invention. In FIG. 1, numeral 201 denotes an image scanner for reading an original and performing signal-digitizing; and 202, a printer for print-outputting an image corresponding to the original image read by the image scanner 201 in full-color on a recording sheet.

In the image scanner 201, numeral 200 denotes a cover plate. A lamp 205 irradiates an original 204 on an original glass platen (hereinafter referred to as "platen") 203, and mirrors 206 to 208 reflect the light from the original 204 to a lens 209, which forms an image on a three-line solid-state image sensor (hereinafter referred to as "CCD (charge-coupled device)") 210. Then, red (R), green (G) and blue (B) image signals as full-color information are supplied to a signal processor 211. Note that the CCD 210 comprises CCD sensors 210-1, 210-2 and 210-3 respectively having red (R), green (G) and blue (B) color sensitivities.

The lamp 205 and the mirror 206 mechanically moves at speed v, and the mirrors 207 and 208 also mechanically move at speed ½v, in a direction vertical to a line-sensor arrangement direction (main-scanning direction), thus scanning (subscanning) the whole original image. The original 204 is read at 400 dpi (dots per inch) resolution in both main-scanning and subscanning.

The signal processor 211 electrically processes the image signal read by the CCD 210 into respective magenta (M), cyan (C), yellow (Y) and black (Bk) components, and transfers the color components to the printer 202. At one scanning by the image scanner 201, one of the M, C, Y and Bk components is outputted to the printer 202. That is, one print-out operation is completed by four scannings by the image scanner 201.

The image scanner 201 outputs the respective M, C, Y and Bk image signals to a laser driver 212. The laser driver 212 modulates the laser light of a semiconductor laser 213 in accordance with the input signals. The laser light from the semiconductor laser 213 scans on an electrostatic drum 217 via a polygon mirror 214, an f-θ lens 215 and a mirror 216. Similar to the read image, a latent image is formed at 400 dpi resolution in both main-scanning and subscanning directions on the electrostatic drum 217.

A rotating developer 218 comprises a magenta developer 219, a cyan developer 220, a yellow developer 221 and a black developer 222, which contact the electrostatic drum 217 by turns, to develop the latent images formed on the electrostatic drum 217.

A transfer drum 223 transfers the developed images on the electrostatic drum 217 to a recording sheet supplied from a paper cassette 224 or 225 and attached around the transfer drum 223.

The recording sheet on which the m, C, Y and Bk colors have been sequentially transferred is passed through a fixing unit 226, where the four color toners are fixed to the recording sheet, and discharged.

Numeral 227 denotes an IC card. The information held in this card can be transferred to the apparatus by inserting the card into a card reader 228 incorporated in the image scanner 201

<Image Scanner>

Figure 2:
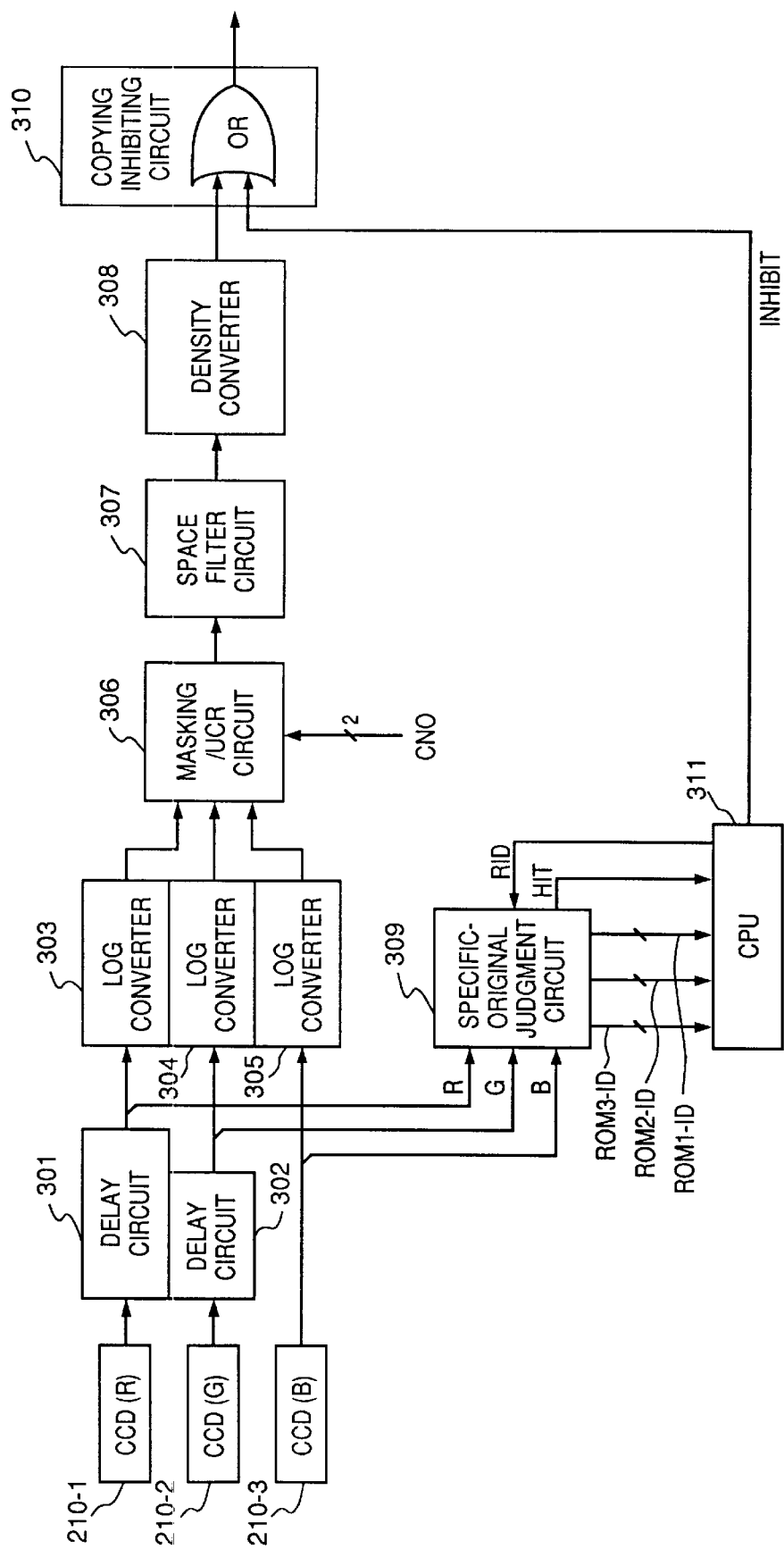
FIG. 2 is a block diagram showing the flow of image processing by an image scanner 201 in FIG. 1.

FIG. 2 is a block diagram showing the flow of image processing by the image scanner 201.

FIG. 2 shows the CCD sensors (solid-state image sensors) 210-1 to 210-3 respectively having red (R), green (G) and blue (B) color sensitivities. The CCD sensors 210-1 to 210-3 respectively output 8-bit output (0–255 levels) signals.

As these CCD sensors are arranged at predetermined distances, delay circuits 301 and 302 correct the spatial shift among the sensors, thereafter, respective R, G and B image signals are outputted.

Numerals 303 to 305 denote LOG converters comprising a look-up table ROM or a RAM, for converting brightness signals into density signals. Numeral 306 denotes a well-known masking-UCR (under color removal) circuit for, though the detailed explanation will be omitted, frame-sequentially outputting magenta (M), cyan (C), yellow (Y) and black (Bk) output signals of a predetermined bit length, e.g., 8-bits, in accordance with the input three signals from the LOG converters.

Note that a 2-bit CNO signal is a control signal for changing the operation condition of the masking-UCR circuit 306 to control the reading order of the four output signals as shown in Table 1:

TABLE 1

| CNO signal | Print Output |
|---|---|
| 0 | magenta (M) |
| 1 | cyan (C) |
| 2 | yellow (Y) |
| 3 | black (Bk) |

Numeral 307 denotes a well-known space filter circuit for correcting the space frequency of output signals; 308, a density converter for correcting the density characteristic of the printer 202. The density converter 308 comprises a ROM or a RAM similar to that of the LOG converters 303 to 305.

On the other hand, numeral 309 denotes a specific-original judgment circuit for performing specific-original judgment on thirty-two judging conditions and outputting a 32-bit HIT signal as a judgment result. That is, with respect to all the thirty-two judging conditions, if the condition is satisfied, generates the HIT signal of value "1", while if not satisfied, generates the HIT signal of value "0".

Numeral 311 denotes a microprocessor (hereinafter referred to as "CPU") for controlling the overall apparatus of the present embodiment. The CPU 311 controls the judgment circuit 309, and if it is judged that at least one of pre-registered plurality of specific originals exists, based on the HIT signal resulted from the judgment on the plurality of judging conditions, outputs a copying inhibiting signal INHIBIT. Further, the CPU 311 identifies the identifier (ID) unique to the ROM of the judgment circuit 309, with a control signal RID, read ID signals ROM1-ID to ROM3-ID.

Numeral 310 denotes a copying inhibiting circuit, which is an OR gate to prevent copying a plurality of specific originals. The copying inhibiting circuit 310 takes a logical OR between the 8-bit output V from the density converter 308 and the output signal INHIBIT from the CPU 311 and outputs a signal V'.

As a result, when INHIBIT="1", i.e., if it is determined that a specific original is being read, the output from the copying inhibiting circuit 310 is V'=FF (hexadecimal representation) or "255" (decimal representation) regardless of the value of the input signal V. On the other hand, when INHIBIT="0", i.e., if it is determined that a non-specific original is being read, the value of the input signal V is outputted as the output signal V'.

<Synchronizing Signal Timing Chart>

Figure 3:
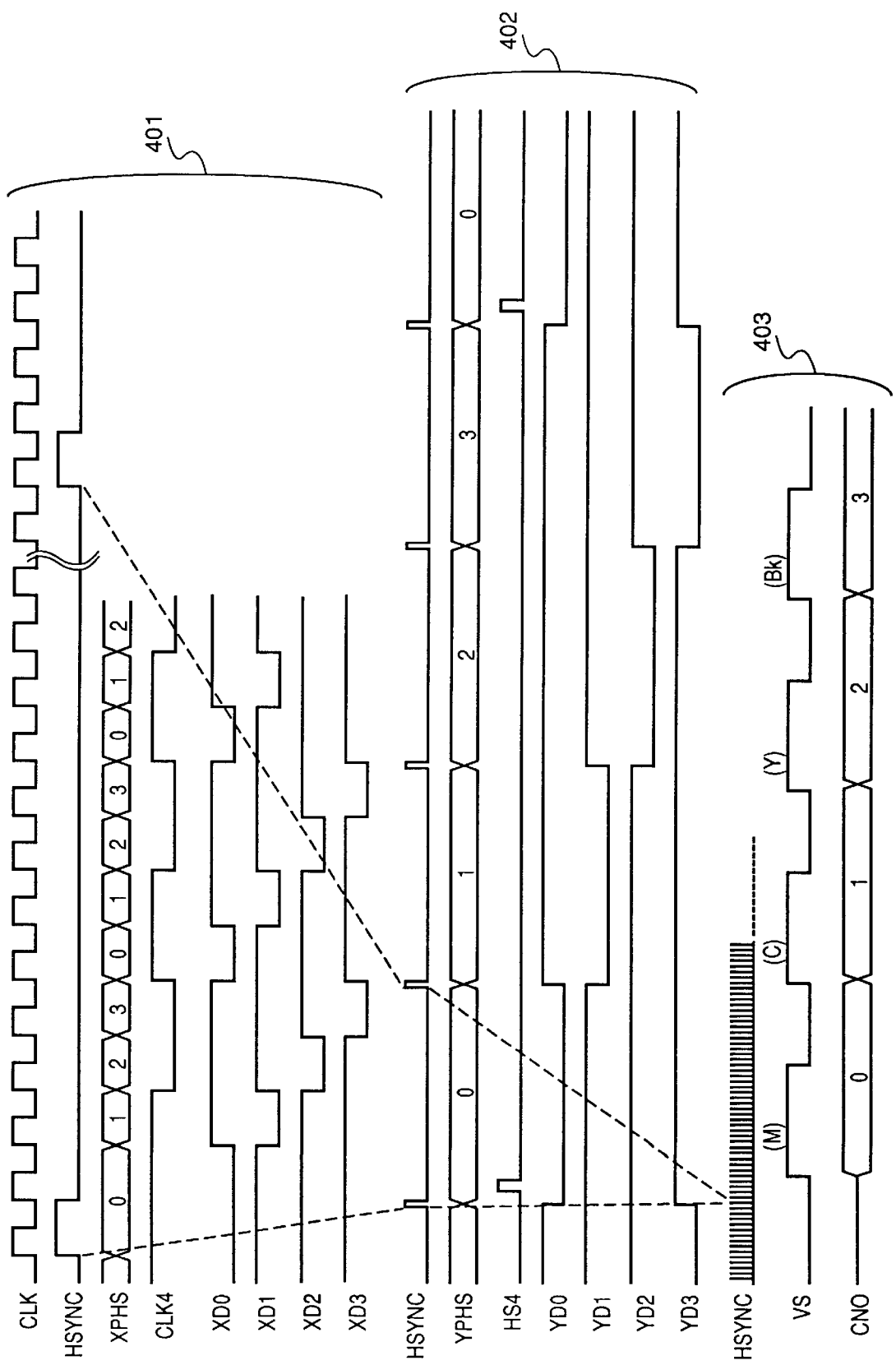
FIG. 3 is a timing chart showing a synchronizing signal of the color copying machine of the first embodiment.

FIG. 3 is a timing chart showing a synchronizing signal of the color copying machine of the present embodiment. In FIG. 3, numeral 401 is a timing chart of the main-scanning timing signals; 402, a timing chart of short-period subscanning timing signals; and 403, a timing chart of long-period subscanning timing signals.

In the main-scanning timing chart 401, image processing is performed in one-pixel units in synchronization with the rising edge of the reference clock signal CLK. The main-scanning is started in synchronization with the rising edge of HSYNC signal which is a main-scanning synchronizing signal. The CLK4 signal is a clock signal obtained by dividing the CLK signal by four, used with the CLK signal for synchronization of the basic operation of the specific-original judgment circuit 309 shown in FIG. 2. A main-scanning phase signal XPHS has values "0" to "3" repeated in accordance with the CLK4 signal.

Signals XD0 to XD3 have values "0" and "1". When the value of the XPHS signal is "0", the value of XD0 signal is "0", while when the XPHS signal value is other than "0", the XD0 signal value is "1"; when the value of the XPHS signal is "1", the value of XD1 signal is "0", while when the XPHS signal value is other than "1", the XD1 signal value is "1"; when the value of the XPHS signal is "2", the value of XD2 signal is "0", while when the XPHS signal value is other than "2", the XD2 signal value is "1"; and when the value of the XPHS signal is "3", the value of XD3 signal is "0", while when the XPHS signal value is other than "3", the XD3 signal value is "1".

In the short-period subscanning timing chart 402, a subscanning phase signal YPHS signal has values "0" to "3" repeated in synchronization with the rising edge of the HSYNC signal. Signal HS4 is obtained by dividing the HSYNC signal by four, and its value is "1" for one period of the CLK4 signal.

Signals YD0 to YD3 have values "0" and "1". When the value of the YPHS signal is "0", the value of YD0 signal is "0", while when the YPHS signal value is other than "0", the YD0 signal value is "1"; when the value of the YPHS signal is "1", the value of YD1 signal is "0", while when the YPHS signal value is other than "1", the YD1 signal value is "1"; when the value of the YPHS signal is "2", the value of YD2 signal is "0", while when the YPHS signal value is other than "2", the YD2 signal value is "1"; and when the value of the YPHS signal is "3", the value of YD3 signal is "0", while when the YPHS signal value is other than "3", the YD3 signal value is "1".

In the long-period subscanning timing chart 403, magenta (M), cyan (C), yellow (Y) and black (Bk) images are formed at period "1" of the subscanning-enable signal VS. The frame-sequential output signal CNO has values "0" to "3", and the value changes in synchronization with the rising edge of the VS signal.

<Judging Unit>

Figure 4:
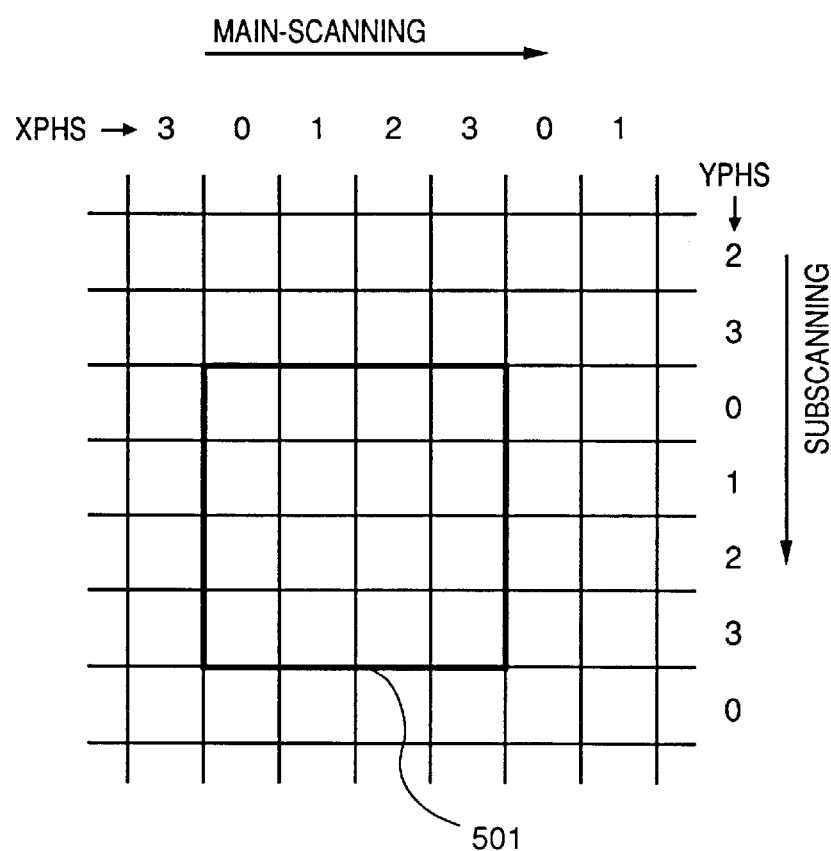
FIG. 4 is an explanatory view of specific-original judgment in 4×4 pixel block units by a specific-original judgment circuit 309 in FIG. 2.

The specific-original judgment circuit 309 shown in FIG. 2 performs judgment in 4×4 pixel block units. FIG. 4 shows that 4×4 pixel block. The judgment processing is performed in 4×4 pixel block as represented by 501 in FIG. 4, and in synchronization with the 4×4 pixel block, the aforementioned XPHS signal value repeatedly changes from "0"0 to "3" in the main-scanning direction, on the other hand, the YPHS signal value repeatedly changes from "0" to "3" in the subscanning direction.

In this embodiment, judgment is time-divisionally performed with respect to each of the YPHS values "0" to "3" on eight judging conditions from thirty-two conditions.

<Specific-original Judgment Circuit 309>

Figure 5:
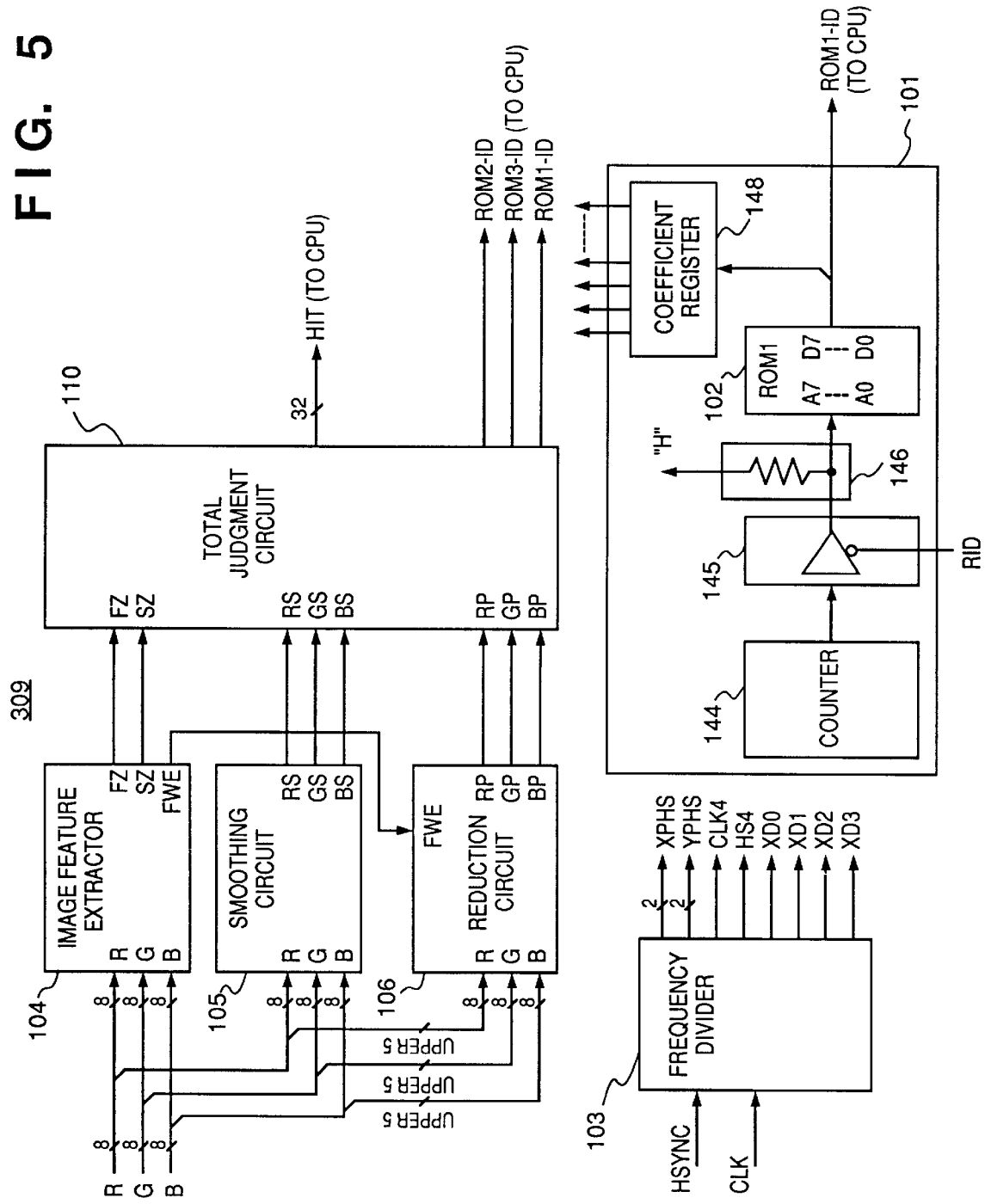
FIG. 5 is a block diagram showing the detailed construction of a specific-original judgment circuit 309.

FIG. 5 is a block diagram showing the detailed construction of the specific-original judgment circuit 309. In FIG. 5, digital R, G and B image signals are inputted in synchronization with the CLK and HSYNC signals, and the HIT signal is outputted as a judgment signal to the CPU 311.

Numeral 101 denotes a coefficient setting circuit for holding various coefficients to operate the specific-original judgment circuit 309; 102, a coefficient ROM (ROM1), in which coefficients to be set at the coefficient setting circuit 101 are pre-stored. The coefficients stored in the ROM1 are accessed at addresses generated by a counter 144, and the read coefficients are sequentially set at a coefficient register 148.

Numeral 103 denotes a frequency divider for dividing the CLK and HSYNC signals; 104, an image feature extractor for detecting image feature included in an original being read; 105, a smoothing circuit for smoothing a read image signal; 106, a reduction circuit for reducing the 400 dpi input image signal to 100 dpi image data; and 110, a total judgment circuit for making total judgment of the existence/ absence of the specific original, based on the outputs from the smoothing circuit 105 and the reduction circuit 106.

<Frequency Divider 103>

Figure 6:
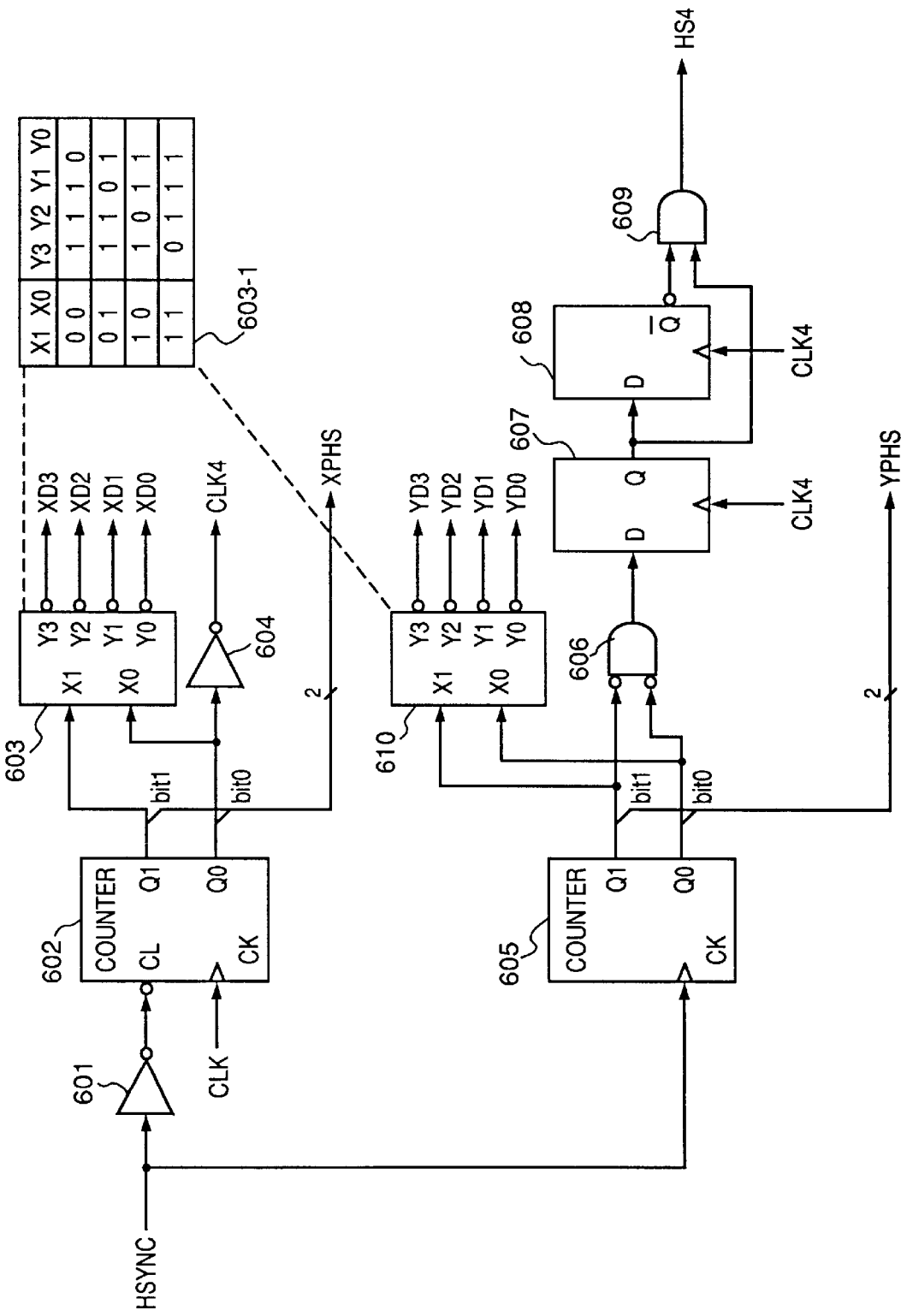
FIG. 6 is a block diagram showing the detailed construction of a frequency divider 103 in FIG. 5.

FIG. 6 is a block diagram showing the detailed construction of a frequency divider 103 in FIG. 5. In FIG. 6, numeral 601 denotes an inverter; 602, a 2-bit counter which outputs the above-mentioned XPHS signal. The XPHS signal value repeatedly changes from "0" to "3" in synchronization with the rising edge of the CLK signal. Note that the XPHS signal is initialized to be "0" when the HSYNC signal is "0" (at the reference position for the main scanning). Numeral 603 denotes a 2to4 decoder which operates in accordance with the calculation logic as 603-1. The decoder 603 inputs the lower bit (bit0) and the upper bit (bit1) of the XPHS signal, and outputs the respective XD0 to XD3 signals. Numeral 604 denotes an inverter for obtaining the CLK4 by inverting the lower bit (bit0) of the XPHS signal.

This construction obtains the respective control signals as shown in the flowchart 401 of FIG. 3.

Numeral 605 denotes a 2-bit counter which outputs the YPHS signal. As described above, the value of the YPHS signal repeatedly changes from "0" to "3" in synchronization with the rising edge of the HSYNC signal. Numeral 606 denotes a NOR gate which inputs the lower bit (bit0) and the upper bit (bit1) of the YPHS signal, and only when the YPHS signal value is "0", the output of the NOR gate 606 is "1". Numerals 607 and 608 denote flip-flops which operate in synchronization with the CLK4.

The positive logical output from the flip-flop 607 and the negative logical output from the flip-flop 608 are inputted into an AND gate 609, and the output from the AND gate 609 is the HS4 signal which is a pulse signal for one clock of the CLK4 signal synchronized with the rising edge of the output from the NOR gate 606. Numeral 610 denotes a 2to4 decoder similar to the decoder 603, and the calculation logic of the decoder 610 is the same as that of the decoder 603. The decoder 610 inputs the lower bit (bit0) and the upper bit (bit1) of the YPHS signal, and outputs the respective YD0 to YD3 signals.

This construction obtains the control signals as shown in the flowchart 402 of FIG. 3.

<Image Feature Extractor 104>

Figure 7:
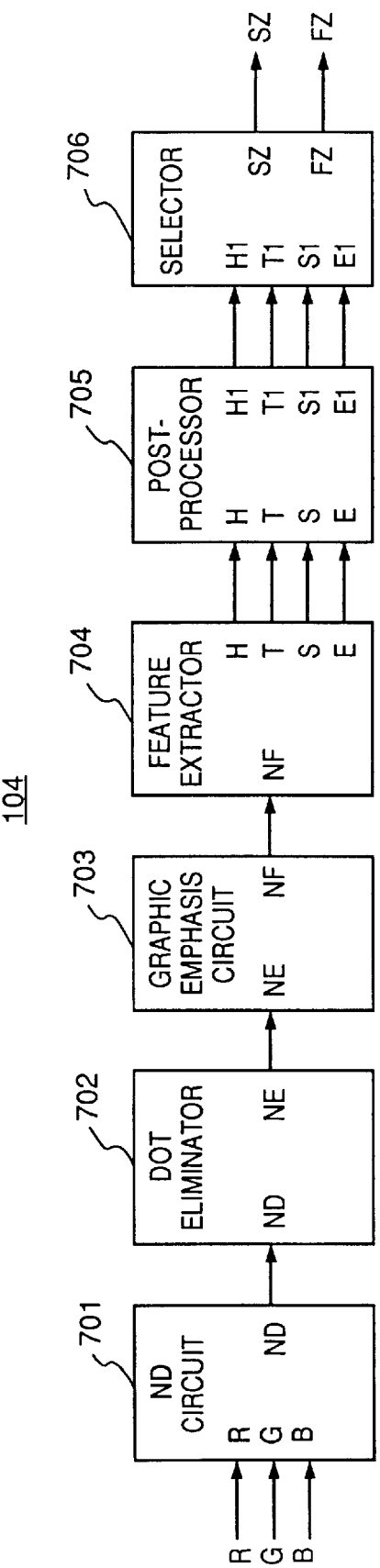
FIG. 7 is a block diagram showing the detailed construction of an image feature extractor 104 in FIG. 5.

FIG. 7 is a block diagram showing the detailed construction of the image feature extractor 104 in FIG. 5. In FIG. 7, numeral 701 denotes a ND circuit (the detailed construction of this circuit is shown in FIG. 8) for obtaining black-andwhite brightness signal ND signal from R, G and B three primary color signals; 702, a dot eliminator for eliminating a dot component in an original being read; 703, a graphic emphasis circuit for emphasizing a graphic component in the original being read; and 704, a feature extractor for extracting four features (uniform density component, density discontinuation component, graphic component and edge component) from the original being read.

Numeral 705 denotes a post-processor for eliminating noise of a feature signal extracted by the feature extractor 704; and 706, a selector for selecting necessary one of the detected four features (uniform density component, density discontinuation component, graphic component and edge component). The selection by the selector 706 is made in accordance with the type of a specific original such that one feature most useful in judgment of the corresponding specific original can be selected.

<ND Circuit 701>

Figure 8:
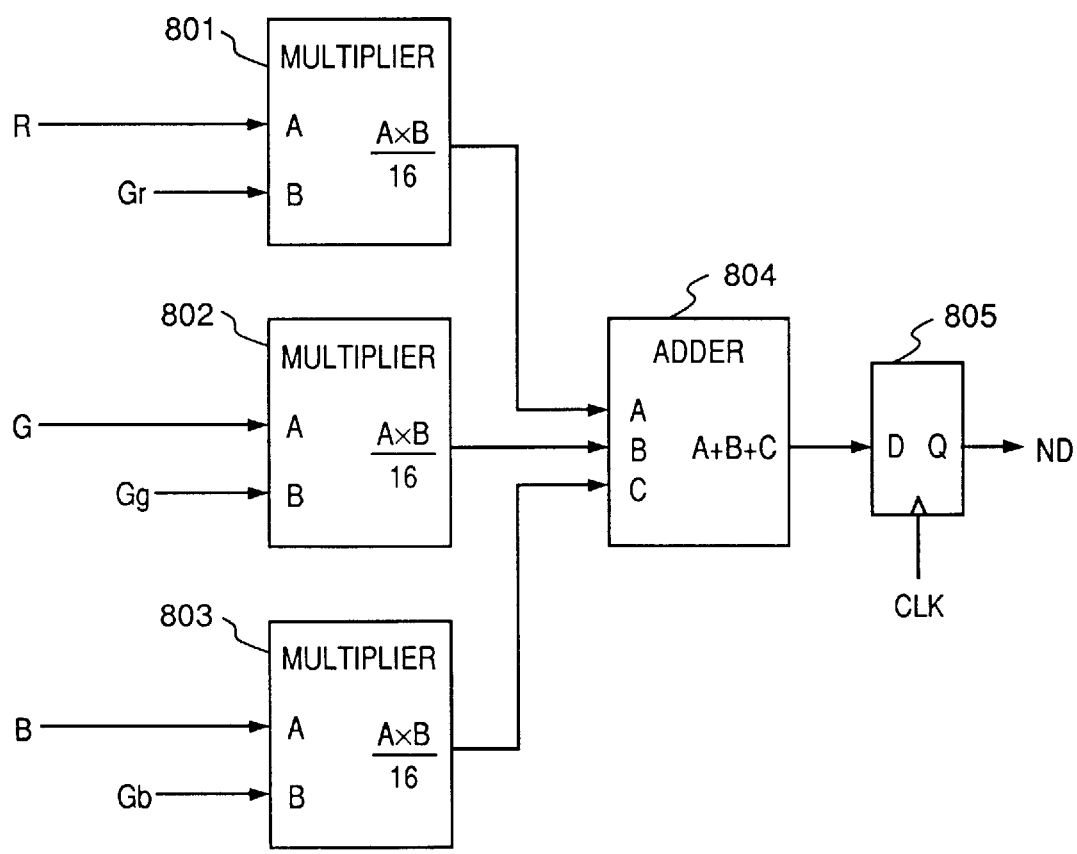
FIG. 8 is a block diagram showing the detailed construction of an ND circuit 701 in FIG. 7.

FIG. 8 is a block diagram showing the detailed construction of the ND circuit 701 in FIG. 7. As shown in FIG. 8, the ND circuit 701 obtains the black-and-white brightness ND signal from the R, G and B three primary color signals. Numerals 801 to 803 denote multipliers respectively for calculating $(A \times {}^{B}\!/_{16})$ with respect to respective A and B inputs; 804, an adder which outputs (A+B+C) with respect to A, B and C inputs; and 805, a flip-flop for synchronization by the CLK signal. On the other hand, values Gr, Gg and Gb are predetermined values to be set by the coefficient setting circuit 101. This construction generates the ND signal indicative of black-and-white brightness with respect to the input R, G and B signals in accordance with the following equation:

$$ND = R \times \frac{Gr}{16} + G \times \frac{Gg}{16} + B \times \frac{Gb}{16} \quad (1)$$

<Dot Eliminator 702>

Figure 9:
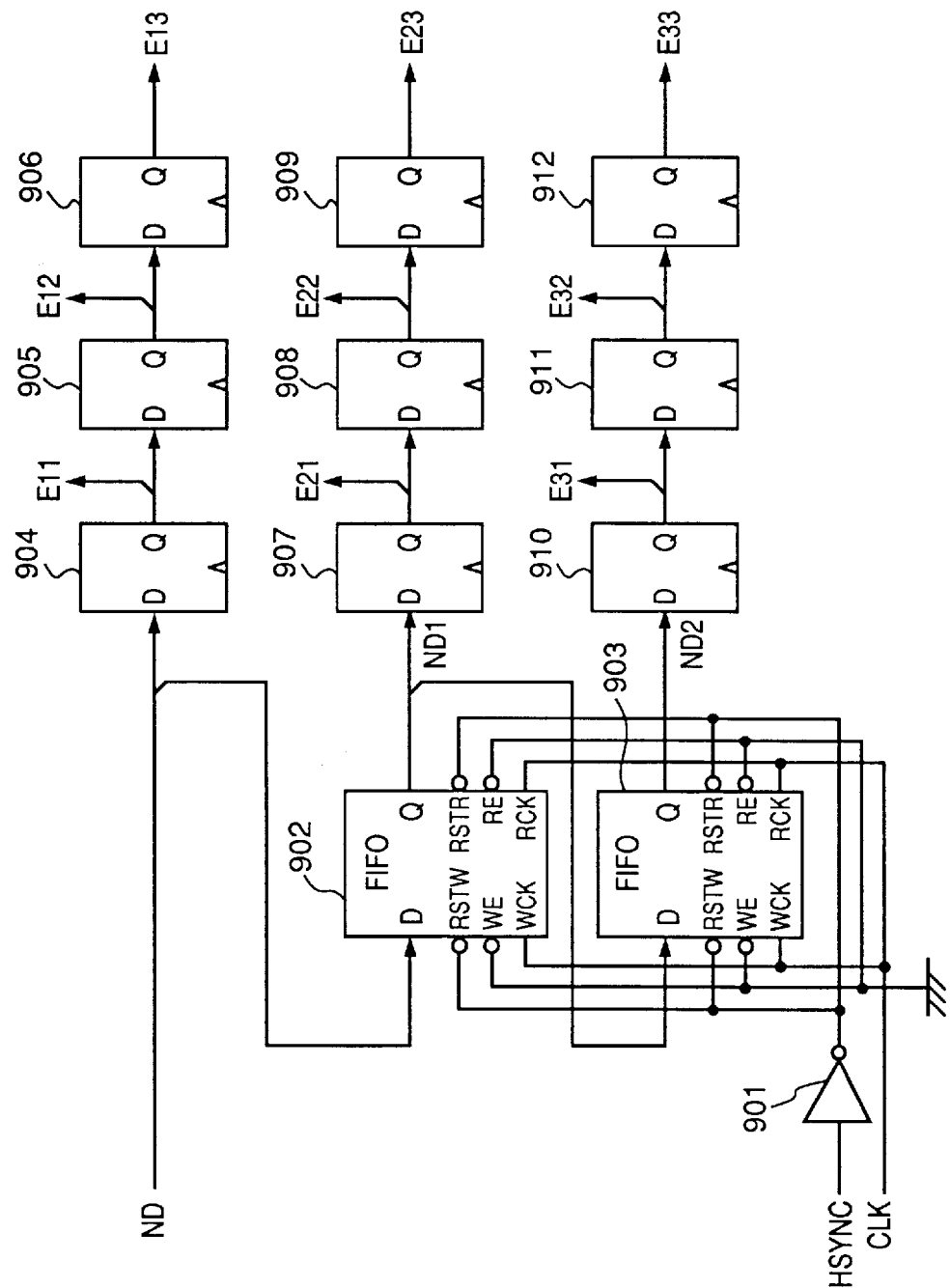
FIGS. 9 and 10 are block diagrams showing the detailed construction of a dot eliminator 702 in FIG. 7.
Figure 10:
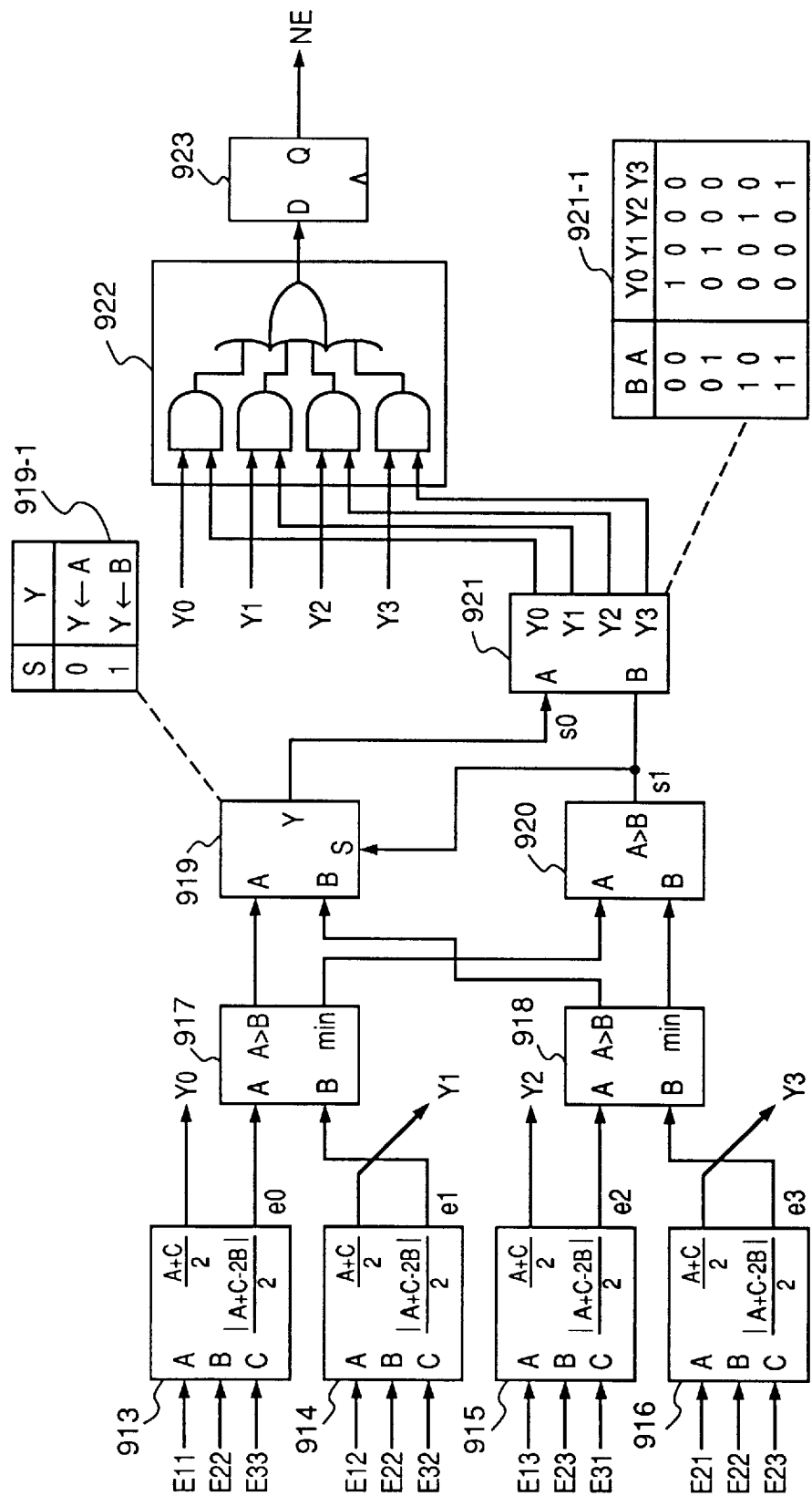

FIGS. 9 and 10 are block diagrams showing the detailed construction of the dot eliminator 702 in FIG. 7. The purpose of the dot eliminator 702 is to eliminate only the dot component in the original being read and to improve the precision of graphic judgment to be described later.

In FIG. 9, numeral 901 denotes an inverter; and 902 and 903, FIFO (first-in-first-out) memories for one-line delay, comprising, e.g., M66251 memory manufactured by Mitsubishi Electric Corporation. The inverter 901 logically inverts the HSYNC signal and inputs the inverted signal into the reset terminal (RSTW) of the FIFO memories 902 and 903, to initialize (reset) the FIFO memories 902 and 903 by one line.

The ND signal is inputted into the FIFO memory 902 which outputs the signal as ND1 signal after one-line delay. The ND1 signal is outputted as ND2 signal from the FIFO memory 903 after one-line delay.

Figure 11:
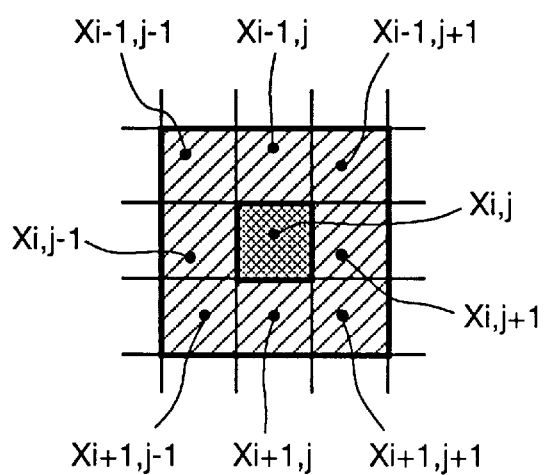
FIG. 11 is a matrix diagram illustrating a 3×3 pixel window.

Further, the ND signal is delayed by flip-flops 904 to 906 by one pixel to be E11 to E13 signals; the ND1 signal is delayed by flip-flops 907 to 909 by one pixel to be E21 to E23 signals; and the ND2 signal is delayed by flip-flops 910 to 912 by one pixel to be E31 to E33 signals. These nine signals form a 3×3 pixel window as shown in FIG. 11.

Specifically, the window is comprises a pixel of interest ($X_{i,j}$) and its neighboring pixels ($X_{i-1, j-1}$), ($X_{i-1,j}$), ($X_{i-1, j+1}$), ($X_{i,j-1}$), ($X_{i,j+1}$), ($X_{i+1,j-1}$) ($X_{i+1,j}$) and ($X_{i+1,j+1}$).

These nine signals outputted from the dot eliminator 702 shown in FIG. 9 are transferred to the calculators 913 to 916 shown in FIG. 10. The calculators 913 to 916 respectively calculate $$\frac{(A+C)}{2}$$

and $$\frac{|A+C-2B|}{2}$$

with respect to the A, B and C inputs.

Accordingly, the calculator 913 outputs $$Y0 = \frac{(E11 + E33)}{2} \text{ and}$$

$$e0 = \frac{|E11 + E33 - 2 \times E22|}{2}$$

Y0 is a value smoothed with respect to an upper-left to lower-right direction in the 3×3 pixel window shown in FIG. 11. e0 is the absolute value of the derivative of second order with respect to the upper-left to lower-right direction and is indicative of the edge contrast in the same direction.

The calculator 914 outputs $$Y1 = \frac{(E12 + E32)}{2} \text{ and}$$

$$e1 = \frac{|E12 + E32 - 2 \times E22|}{2}$$

Y1 is a value smoothed with respect to the up-and-down direction in the 3×3 pixel window shown in FIG. 11. e1 is the absolute value of the derivative of second order with respect to the up-and-down direction and is and is indicative of the edge contrast in the same direction.

The calculator 915 outputs $$Y2 = \frac{(E13 + E31)}{2} \text{ and}$$

$$e2 = \frac{|E13 + E31 - 2 \times E22|}{2}$$

Y2 is a value smoothed with respect to the lower-left to upper-right direction in the 3×3 pixel window shown in FIG. 11. e2 is the absolute value of the derivative of second order in the lower-left to upper-right direction and is indicative of the edge contrast in the same direction.

The calculator 916 outputs $$Y3 = \frac{(E21 + E23)}{2} \text{ and}$$

$$e3 = \frac{|E21 + E23 - 2 \times E22|}{2}$$

Y3 is a value smoothed with respect to the left-and-right direction in the 3×3 pixel window shown in FIG. 11. e3 is the absolute value of the derivative of second order with respect to the left-and-right direction and is indicative of the edge contrast in the same direction.

Numerals 917, 918 and 920 denote comparators; and 919, a 2to1 selector. The calculation logic of the selector 919 is as shown by 919-1. Output s0 from the selector 919 and output s1 from the comparator 920 become the following values based on the relation among the values e0 to e3:

(1) If e0 is the minimum value of e0 to e3, s0=0, s1=0
(2) If e1 is the minimum value among e0 to e3, s0=1, s1=0

(3) If e2 is the minimum value among e0 to e3, s0=0, s1=1
(4) If e3 is the minimum value among e0 to e3, s0=1, s1=1

Numeral 921 denotes a 2to4 decoder. The calculation logic of the decoder 921 is as shown by 921-1. Numeral 922 denotes a 4to1 multiplexer. As shown in FIG. 10, the decoder 921 inputs the value s0 and s1 from the selectors 919 and 920, and the multiplexer 922 inputs the four outputs from the decoder 921 and the signals Y0 to Y3 from the calculators 913 to 916.

As a result, (1) if the value e0 is the minimum value among the values e0 to e3, the multiplexer 922 outputs Y0;(2) if the value e1 is the minimum value among the values e0 to e3, the multiplexer 922 outputs Y1; (3) if the value e2 is the minimum value among the values e0 to e3, the multiplexer 922 outputs Y2; and (4) if the value e3 is the minimum value among the values e0 to e3, the multiplexer outputs Y3.

That is, the derivatives of second order with respect to the above-mentioned four directions are obtained in connection with a pixel of interest $X_{i,j}$ as the central pixel, then smoothing is performed with respect to a direction of the minimum value of the four derivatives of second order, and an NE signal is outputted by the flip-flop 923 in synchronization with the rising edge of the CLK signal.

Figure 12:
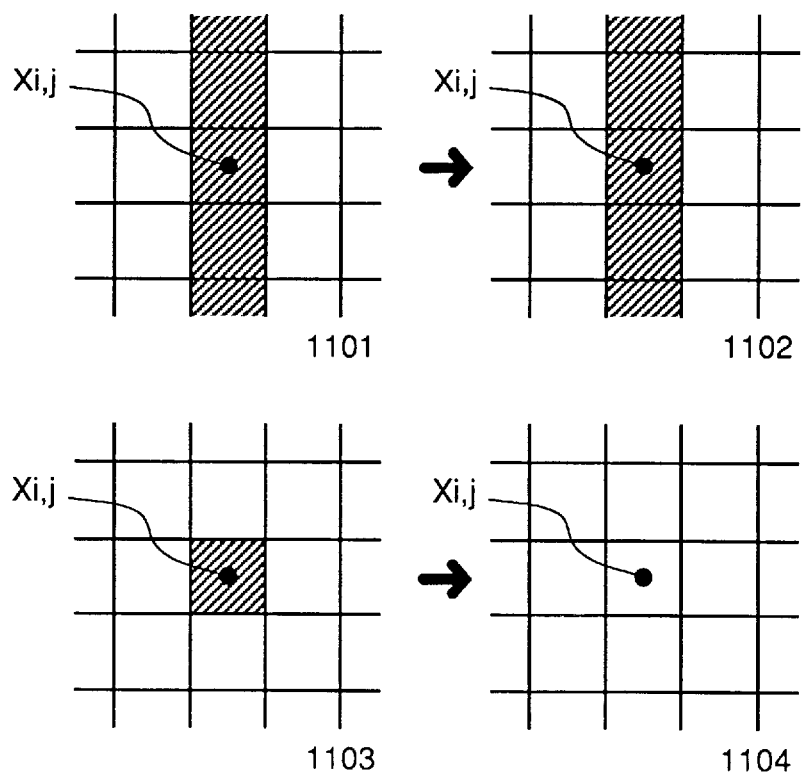
FIG. 12 is an explanatory view showing a smoothing processing effect.

FIG. 12 shows the effect of the above processing. For example, in a graphic pattern 1101, the derivative of second order with respect to the up-and-down direction (e1 in FIG. 10) takes the minimum value among the values of the derivative of second order in the four directions. In this case, smoothing in the up-and-down direction (Y1 in FIG. 10) is weighted, however, the graphic pattern is maintained as a pattern 1102. Similarly, graphic patterns in the other directions (left-and-right, upper-left to lower-right, lower-left to upper-right) are maintained. On the other hand, a dot pattern 1103 is eliminated as shown in a pattern 1104 of FIG. 12. Thus, a dot component can be eliminated without eliminating a graphic component.

<Graphic Emphasis Circuit 703>

Figure 13:
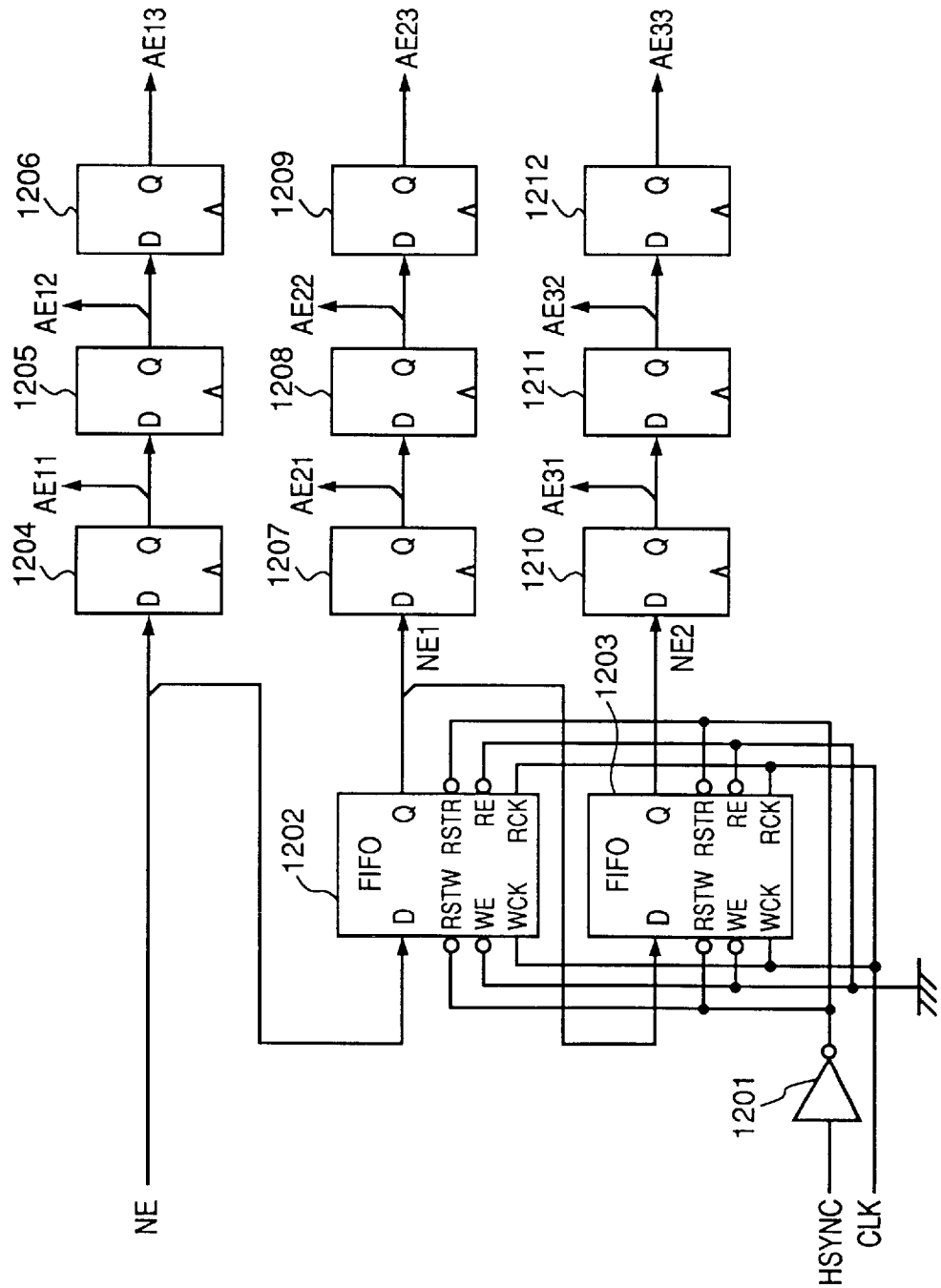
FIGS. 13 and 14 are block diagrams showing the detailed construction of the graphic emphasis circuit 703.
Figure 14:
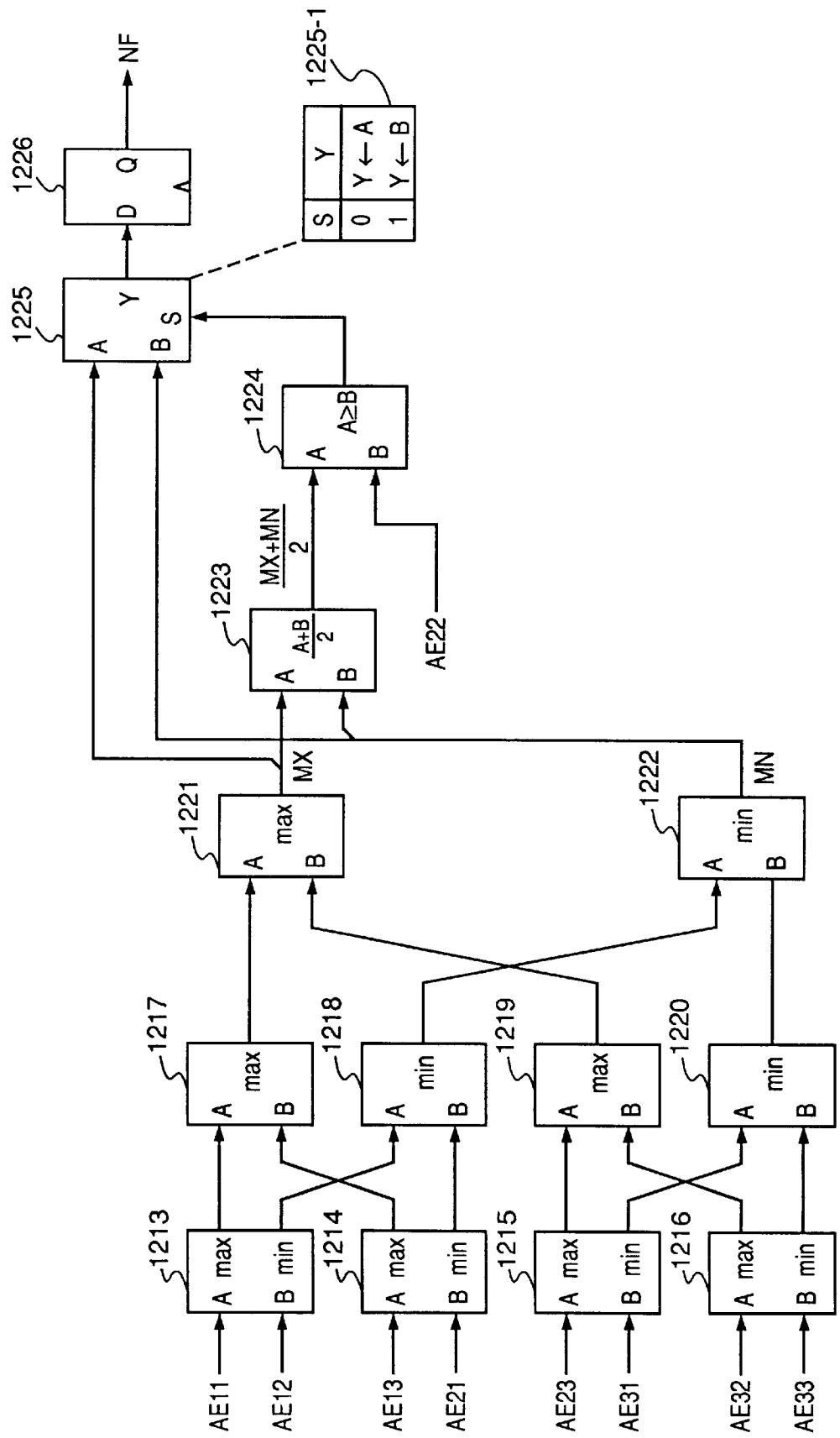

The graphic emphasis circuit 703 shown in FIG. 7 receives the NE signal outputted from the dot eliminator 702 and emphasis a graphic component. FIGS. 13 and 14 are block diagrams showing the detailed construction of the graphic emphasis circuit 703.

In FIG. 13, numeral 1201 denotes an inverter; and 1202 and 1203, FIFO memories for one-line delay. The inverter 1201 logically inverts the HSYNC signal and inputs the signal into the reset terminal (RSTW) of the FIFO memories 1202 and 1203, thus initialize (reset) the FIFO memories 1202 and 1203 by one line. The NE signal is inputted into the FIFO memory 1202, and is outputted as NE1 signal after one-line delay. The NE1 signal is outputted from the FIFO memory 1203 as NE2 signal after one-line delay.

Flip-flops 1204 to 1206 sequentially delay the NE signal by one pixel, and output signals AE11 to AE13. Flip-flops 1207 to 1209 sequentially delay the NE1 signal by one pixel, and output signals AE21 to AE23. Flip-flops 1210 to 1212 sequentially delay the NE2 signal by one pixel, and output signals AE31 to AE33. These nine signals form the 3×3 pixel window as shown in FIG. 11.

Among the nine signals shown in FIG. 13, the signals AE11 to AE 13, AE21, AE23 and AE32 to AE33, corresponding to eight pixels $(X_{i-1,j-1})$, $(X_{i-1,j})$, $(X_{i-1,j+1})$, $(X_{i, j-1})$, $(X_{i, j+1})$, $(X_{i+1,j-1})$, $(X_{i+1,j})$, $(X_{i+1,j+1})$ surrounding the pixel of interest $(X_{i,j})$, are transferred to maximum/minimum value detectors 1213 to 1216 as shown in FIG. 14.

The maximum/minimum value detectors 1213 to 1216 respectively output a maximum value (max) and a minimum value (min) with respect to the A and B inputs. Numerals 1217, 1219 and 1221 respectively denote maximum value detectors, and output a maximum value (max) with respect to the A and B inputs. Also, numerals 1218, 1220 and 1222 respectively denote minimum value detectors, and output a minimum value (min) with respect to the A and B inputs. Thus, the maximum value of the signals AE11, AE12, AE13, AE21 to AE 23, and AE31 to AE33 corresponding to eight neighboring pixels are selected as output MX signal of the maximum value detector 1221, while the minimum values of the signals AE11 to AE13, AE21 to AE 23, and AE31 to AE33 corresponding to eight neighboring pixels are selected as output MN signal of the minimum value detector 1222.

Numeral 1223 denotes an adder which adds the MX signal and the MN signal and outputs an average value $$\frac{(MX + MN)}{2}$$

between the MX signal and the MN signal; 1224, a comparator which compares the value of $$\frac{(MX + MN)}{2}$$

from the adder 1223 with the value of the signal AE22 corresponding to the pixel of interest $(X_{i,j})$; and 1225, a 2to1 selector which performs selection based on calculation logic 1225-1.

If $AE22 > \frac{(MX + MN)}{2}$ (i.e., $AE22 - MN > MX - AE22$), the output from the selector 1225 is MX, while if AE22 $\leq$ $$\frac{(MX + MN)}{2}$$

(i.e., AE22−MN$\leq$MX−AE22), the selector 1225 output is MN. The selector 1225 output is outputted as an NF signal via a flip-flop 1226.

The above construction can replace the value of a pixel of interest with one of the maximum value MX and the minimum value MN among neighboring pixel values, which is closer to the value of the pixel of interest.

Figure 15:
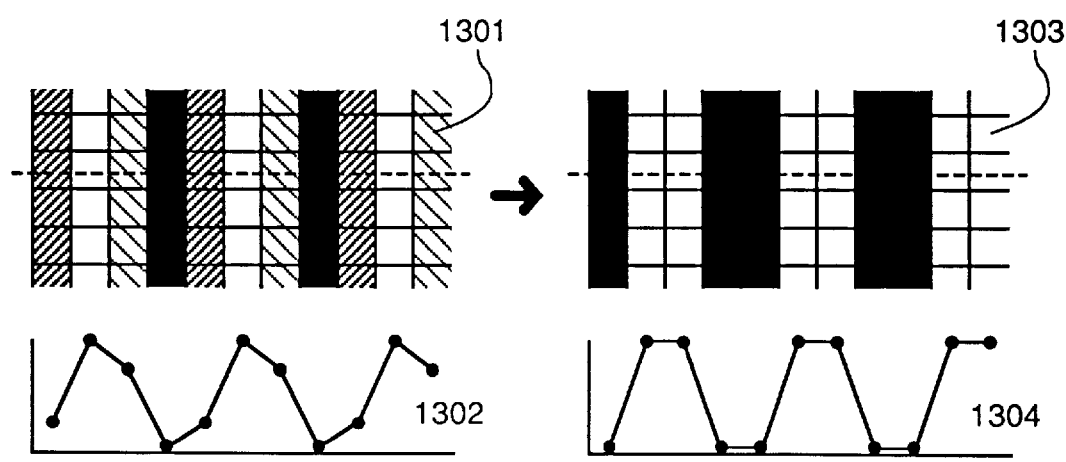
FIG. 15 is a diagram illustrating the effect of graphic emphasizing.

FIG. 15 shows the effect of the above operation. That is, in a pattern 1301 with a graph 1302 showing density change of a cross-section along the broken line, a density transient point is replaced with the maximum or minimum value of neighboring pixels, which is closer to the density change point, accordingly, the pattern 1302 is converted to a pattern 1303 with a density change graph 1304 also showing density change of a cross-section along the broken line. As a result, the distortion of signal due to the characteristic of a reading device is eliminated, and consequently, the pattern of graphic portion is emphasized.

<Feature Extractor 704>

Next, the detailed construction of the feature extractor 704 in FIG. 7 will be described with reference to FIGS. 16 to 21. The feature extractor 704 receives the NF signal outputted from the graphic emphasis circuit 703, and extracts four features of a pixel of interest, i.e., a graphic portion, a uniform density portion, an edge portion and a density discontinuation portion from a read image signal.

Figure 16:
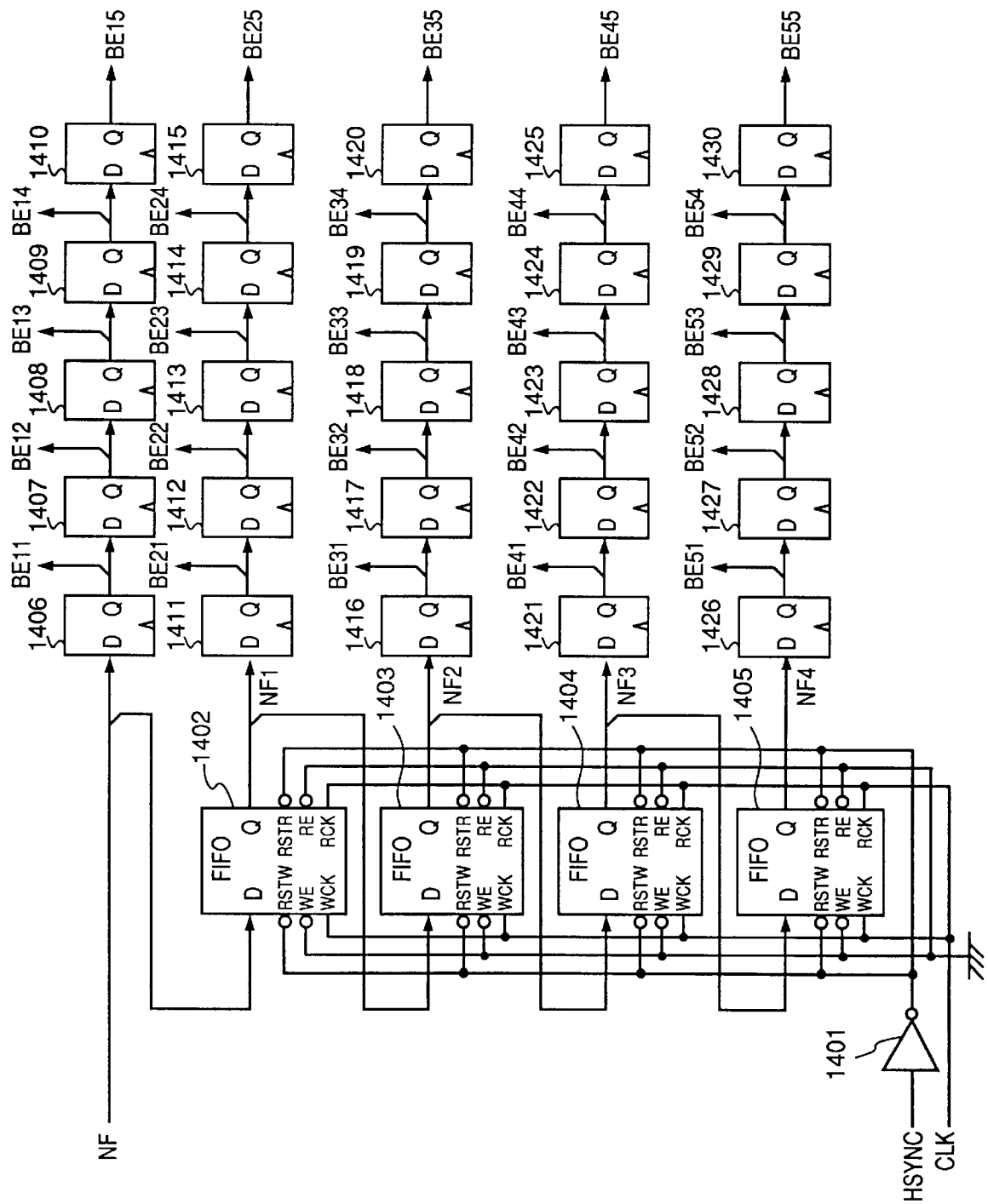
FIGS. 16 to 21 are block diagrams showing the detailed construction of a feature extractor in FIG. 7.

In FIG. 16, numeral 1401 denotes an inverter; and 1402 to 1405, FIFO memories for one-line delay. The inverter 1401 logically inverts the HSYNC signal and inputs the reset terminal (RSTW) of the FIFO memories 1402 to 1405, thus initializes (resets) the FIFO memories 1402 to 1405 by one line.

The NF signal is inputted into the FIFO memory 1402, and outputted as an NF1 signal after one-line delay. The NF1 signal is outputted from the FIFO memory 1403 as an NF2 signal after one-line delay. Similarly, the NF2 signal is outputted from the FIFO memory 1404 as n NF3 signal after one-line delay. The NF3 signal is outputted from the FIFO memory 1405 after one-line delay as an NF4 signal.

Flip-flops 1406 to 1410 sequentially delay the NE signal by one pixel and output signals BE11 to BE15. Flip-flops 1411 to 1415 sequentially delay the NE1 signal by one pixel and output signals BE21 to BE25. Flip-flops 1416 to 1420 sequentially delay the NE2 signal by one pixel and output signals BE31 to BE35. Flip-flops 1421 to 1425 sequentially delay the NE3 signal by one pixel and output signals BE41 to BE45. Flip-flops 1426 to 1430 sequentially delay the NE4 signal by one pixel and output signals BE51 to BE55.

These twenty-five signals form a 5×5 pixel window as shown in FIG. 22. The window has 5×5 pixels including a pixel of interest ($X_{i,j}$) with neighboring pixels as central pixels, and upper/lower and left/right±two pixels around the central pixels.

Hereinbelow, a uniform density judgment circuit for extracting a uniform density portion as one of the four features will be described with reference to FIGS. 17 and 18.

Figure 17:
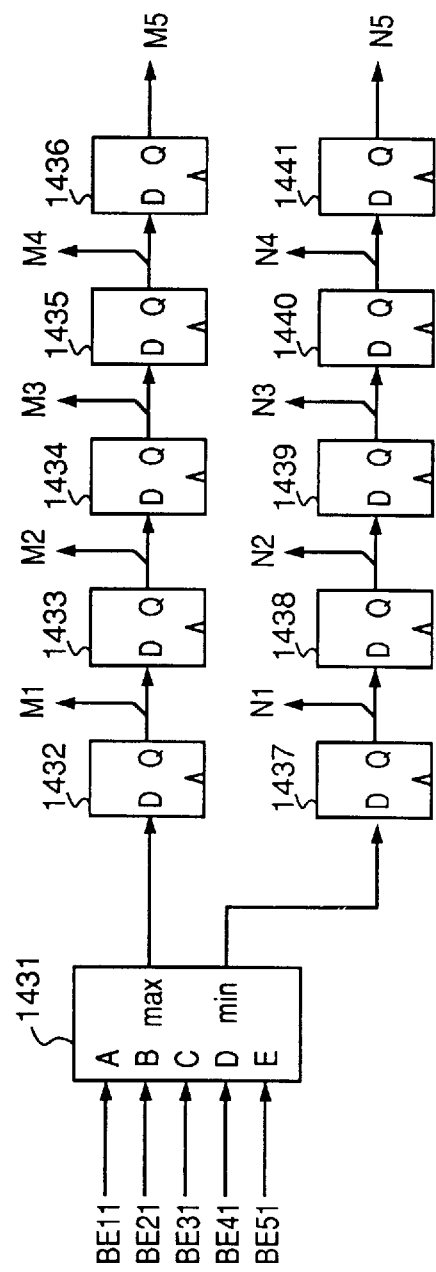

In FIG. 17, numeral 1431 denotes a maximum/minimum value detector which inputs five values A, B, C, D and E, and outputs a maximum value: max (A, B, C, D and E) and a minimum value: min (A, B, C, D and E). The maximum/minimum value detector 1431 inputs the signals BE11, BE21, BE31, BE41 and BE51 corresponding to pixels delayed by one line at the same position in a main-scanning direction, and outputs the maximum and minimum values. In other words, the maximum value and the minimum value among the values of pixels ($X_{i-2, j-2}$), ($X_{i-1, j-2}$), ($X_{i, j-2}$), ($X_{i+1, j-2}$) and ($X_{i+2, j-2}$) in FIG. 22 are calculated.

Flip-flops 1432 to 1435 sequentially delay the obtained maximum value in pixel units and output values M1 to M5. Flip-flops 1437 to 1441 sequentially delay the obtained minimum value in pixel units and output value N1 to N5.

Figure 18:
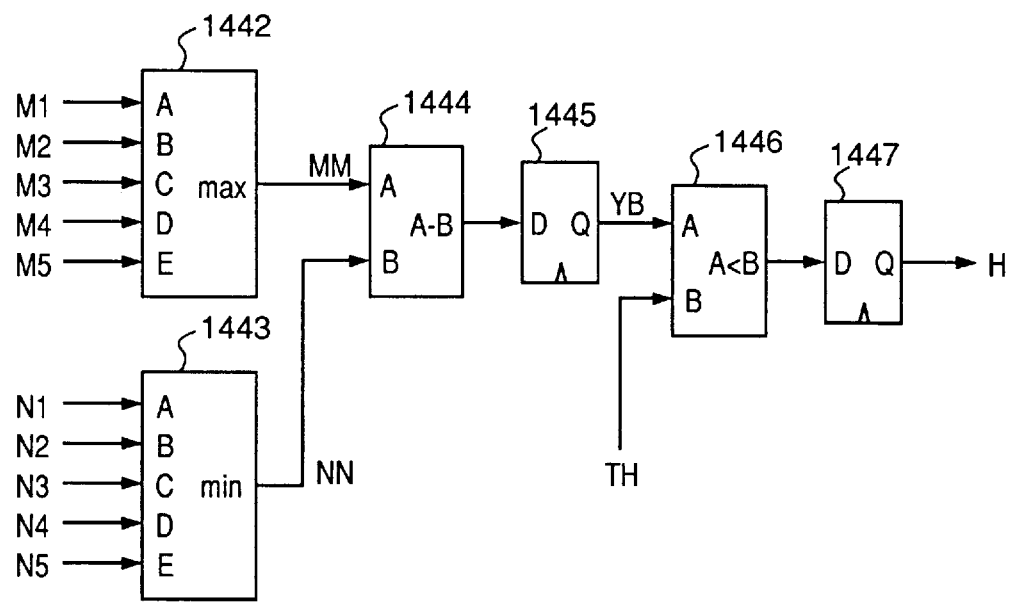

Further, a maximum value detector 1442 shown in FIG. 18 inputs the values M1 to M5, calculates the maximum value among these values, and outputs the obtained value as an MM signal. On the other hand, a minimum value detector 1443 shown in FIG. 18 inputs the values N1 to N5, calculates the minimum value among these values, and outputs the obtained value as an NN signal.

As a result, the MM signal indicates the maximum value within the 5×5 pixel window shown in FIG. 22, while the NN signal indicates the minimum value within the window. In FIG. 18, numeral 1444 denotes a subtractor which outputs a value obtained from MM−NN. A flip-flop 1445 outputs the value from the subtractor 1444 as a YB signal in synchronization with the CLK signal.

Numeral 1446 denotes a comparator which compares a value TH pre-set by the coefficient setting circuit 101 with the YB signal from the flip-flop 1445. A flip-flop 1447 outputs the result of the comparison by the comparator 1446 as an H signal. That is, if YB<TH, the value of the H signal is "1", and if YB≧TH, the value of the H signal is "0".

More specifically, in FIG. 22, if an adjacent portion around the pixel of interest ($X_{i,j}$) is a uniform density portion, the values within the 5×5 window are close to each other, then the difference between the maximum and minimum values is small, as a result, the value of the H signal becomes "1". On the other hand, if the adjacent portion is not a uniform density portion, the pixel values within the 5×5 pixel window vary, and the difference between the maximum and minimum values is large. As a result, the value of the H signal becomes "0". That is, if the portion around the pixel of interest ($X_{i,j}$) is a uniform density portion, the signal H value is "1", while if the portion is not a uniform density portion, the signal H value is "0". In this manner, the H signal from the flip-flop 1447 serves as a uniform density judgment signal.

Figure 19:
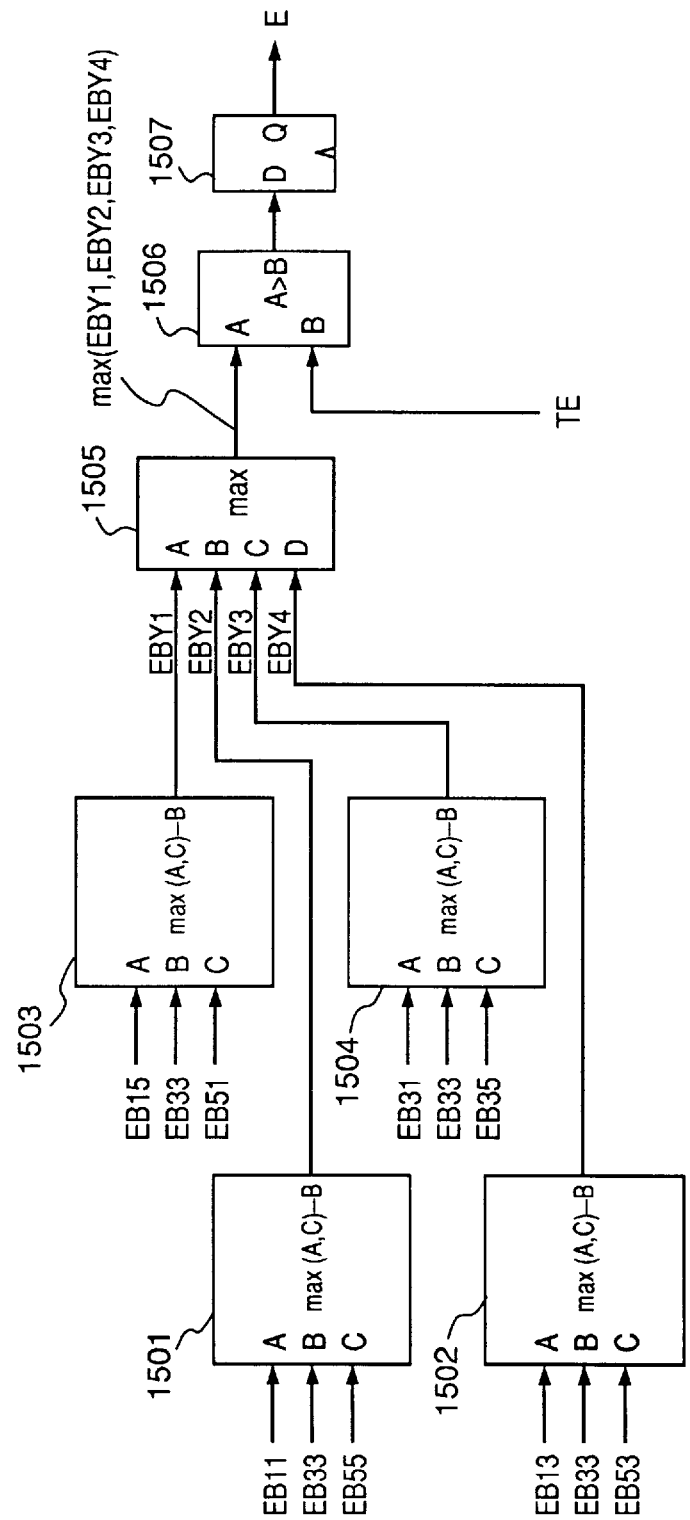
Figure 20:
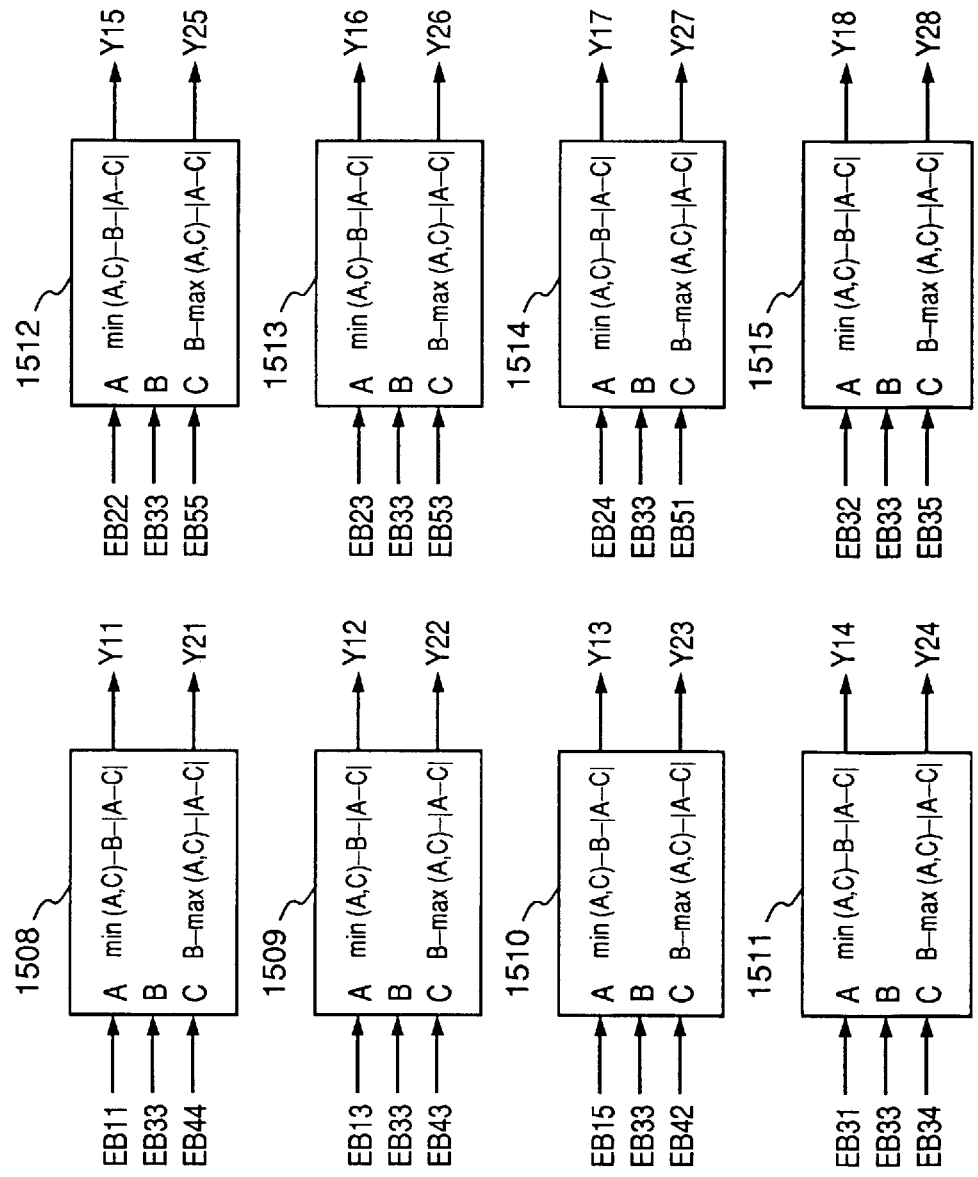

Next, in the feature extractor 704, circuits for extracting the features other than the uniform density portion, i.e., an edge judgment circuit for extracting an edge portion, a graphic judgment circuit for extracting a graphic portion and a density discontinuation judgment circuit for extracting a density discontinuation portion will be described with reference to FIGS. 19 to 21. FIG. 19 shows the construction of the edge judgment circuit; FIG. 20, the construction of the graphic judgment circuit; and FIG. 21, the construction of the density discontinuation judgment.

As shown in FIG. 19, the edge judgment circuit comprises calculators 1501 to 1504, a maximum value detector 1505, a comparator 1506 and a flip-flop 1507.

The calculators 1501 to 1504 inputs three values A, B and C, and outputs a maximum value max(A, C)−B.

The calculator 1501 inputs the values of the signals EB11, EB33 and EB55, corresponding to three pixels ($X_{i+2,j+2}$), ($X_{i,j}$) and ($X_{i-2,j-2}$) shown in FIG. 22 (Note: the three pixels are alternately taken in the lower-right to upper-left direction) from the feature extractor 704 in FIG. 16, and outputs EBY1=max(EB11, EB55)−EB33. The calculator 1502 inputs the values of the signals EB13, EB33 and EB53, corresponding to three pixels ($X_{i,j+2}$), ($X_{i,j}$), ($X_{i,j-2}$) in FIG. 22 (Note: the three pixels alternately are taken in the central left-and-right direction) from the feature extractor 704 in FIG. 16, and outputs EBY2=max(EB13, EB53)−EB33.

The calculator 1503 inputs values of the signals EB15, EB33 and EB51, corresponding to three pixels ($X_{i+2,j-2}$), ($X_{i,j}$) and ($X_{i-2,j+2}$) in FIG. 22 (pixels alternately are taken in the lower-left to upper-right direction) from the feature extractor 704 in FIG. 16, and outputs EBY3=max(EB15, EB51)−EB33. The calculator 1504 inputs the values of the signals EB31, EB33 and EB35, corresponding to three pixels ($X_{i+2,j}$), ($X_{i,j}$) and ($X_{i-2,j}$) in FIG. 22 (Note: the three pixels alternately are taken in the central up-and-down direction) from the feature extractor 704 in FIG. 16, and outputs EBY4=max(EB31, EB35)−EB33.

The principle of edge detection by the above construction will be described with reference to FIG. 23.

FIG. 23 shows a pattern 1701 with a graph 1702 showing the density change along with a broken line in the pattern 1701 and a graph 1703 showing the value change of EBY4 along with a broken line in the pattern 1701. Though the detailed explanation will be omitted here, at the edge portion where the density greatly changes in the horizontal direction, the EBY4 value becomes large.

Similarly, at the edge portion where the density greatly changes in the vertical direction, the EBY2 value becomes large; at the edge portion where the density greatly changes in the lower-right to upper-left direction, the EBY1 value becomes large; and at the edge portion where the density greatly changes in the lower-left to upper-right direction, the EBY3 value becomes large. The maximum value detector 1505 outputs the maximum value among these four values max(EBY1, EBY2, EBY3 and EBY4). This value becomes large when an edge component exists in any of the four directions (horizontal, vertical, diagonally right-upward and diagonally left-upward directions). The comparator 1506 shown in FIG. 19 compares the maximum value with the value TE pre-set by the coefficient setting circuit 101, and outputs the comparison result via the flip-flop 1507 as an E signal.

That is, if max(EBY1, EBY2, EBY3, EBY4)>TE holds, the value of the E signal is "1", while if max(EBY1, EBY2, EBY3, EBY4)≦TE holds, the E signal value is "0". In other words, in FIG. 22, if the pixel of interest ($X_{i,j}$) belongs to an edge portion, the signal E value is "1", while if the pixel of interest does not belong to an edge portion, the signal E value is "0". In this manner, the E signal serves as an edge judgment signal.

Next, the graphic judgment circuit and the density discontinuation judgment circuit will be described with reference to FIGS. 20 and 21.

In FIG. 20, numerals 1508 to 1515 denote calculators which respectively input three values A, B and C, and performs calculation:

$$\min(A, C) - B - |A - C|,$$

and $$B - \max(A, C) - |A - C|$$

Figure 21:
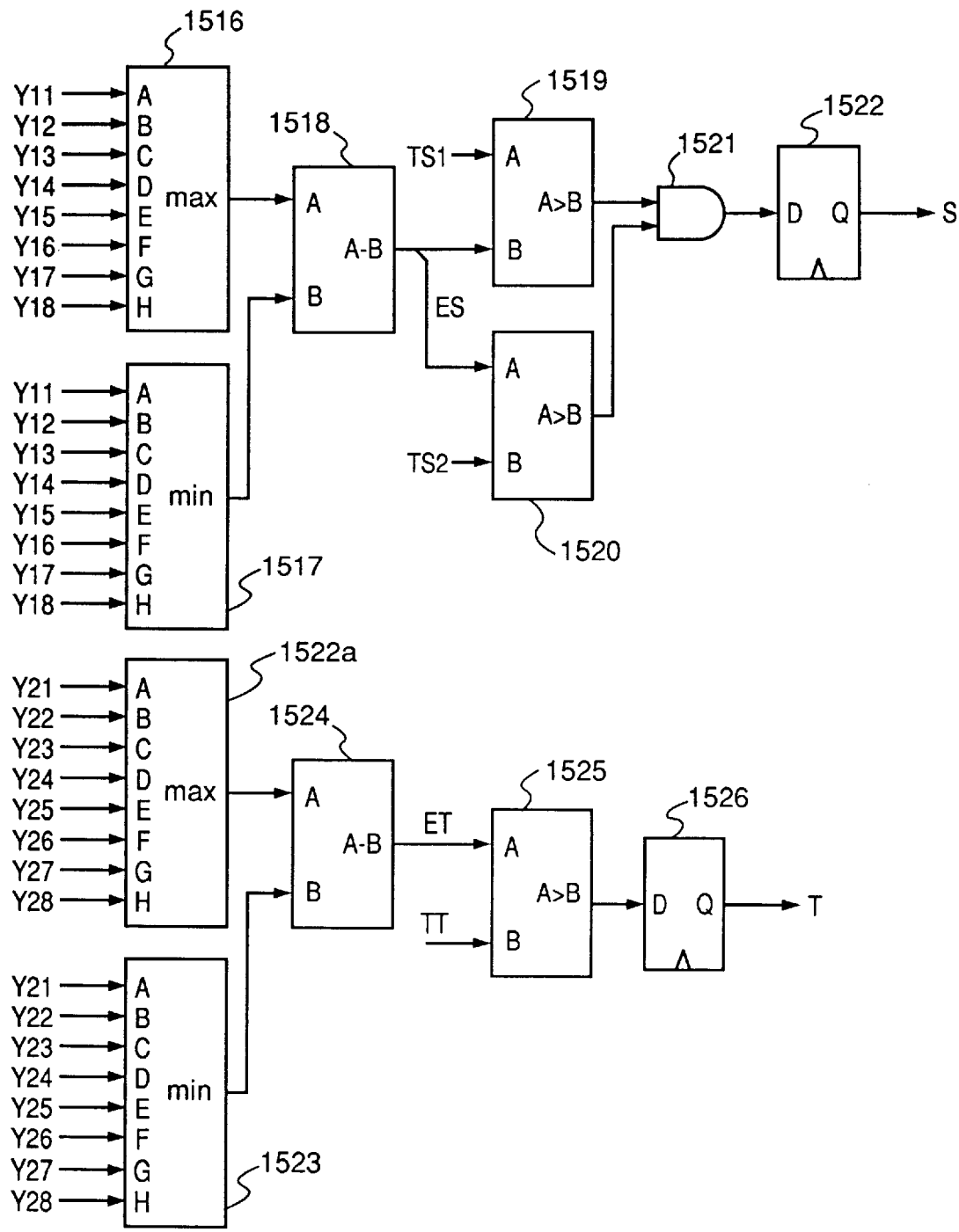

In FIG. 21, numeral 1516 denotes a maximum value detector; 1517, a minimum value detector; 1518, a subtractor; 1519 and 1520, comparators; 1521, an AND gate; 1522, a flip-flop; 1522a, a maximum value detector; 1523, a minimum value detector; 1524, a subtractor; 1525, a comparator; and 1526, a flip-flop.

The calculator 1508 inputs the values of the signals EB11, EB33 and EB44, corresponding to three pixels ($X_{i+2,j+2}$), ($X_{i,j}$) and ($X_{i-1,j-1}$) shown in FIG. 22 (Note: the three pixels are taken along with the diagonally left-upward direction), from the feature extractor 704 shown in FIG. 16, and outputs the values of Y11=min(EB11, EB44)−EB33−|EB11−EB44|, Y21=EB33−max(EB11, EB44)−|EB11−EB44|.

The calculator 1509 inputs the values of the signals EB13, EB33 and EB43, corresponding to three pixels ($X_{i,j+2}$), ($X_{i,j}$) and ($X_{i,j-i}$) in FIG. 22 (Note: the three pixels are taken along with the central up-and-down direction), from a portion of the feature extractor 704 in FIG. 16, and outputs the values of Y12=min(EB13, EB43)−EB33−|EB13−EB43|, Y22=EB33−max(EB13, EB43)−|EB13−EB43|.

The calculator 1510 inputs the values of the signals EB15, EB33 and EB42, corresponding to three pixels ($X_{i+2,j-2}$), ($X_{i,j}$) and ($X_{i-1,j+1}$) in FIG. 22 (Note: the three pixels are taken along with the diagonally right-upward direction), from the feature extractor 704 shown in FIG. 16, and outputs the values of Y13=min(EB15, EB42)−EB33−|EB15−EB42|, Y23=EB33 max(EB15, EB42)−|EB15−EB42|.

The calculator 1511 inputs the values of the signals EB31, EB33 and EB34, corresponding to three pixels ($X_{i,j+2}$), ($X_{i,j}$) and ($X_{i,j-1}$) in FIG. 22 (Note: the three pixels are taken along with the central right-and-left direction), from the feature extractor 704 in FIG. 16, and outputs the values of Y14= min(EB31, EB34)−EB33−|EB31−EB34|, Y24=EB33−max (EB31, EB34)−|EB31−EB34|.

The calculator 1512 inputs the values of the signals EB22, EB33 and EB55, corresponding to three pixels ($X_{i+1,j+1}$), ($X_{i,j}$) and ($X_{i-2,j-2}$) in FIG. 22 (Note: the three pixels are taken along with the diagonally left-upward direction), from the feature extractor 704 n FIG. 16, and outputs the values of Y15=min(EB22, EB55)−EB33−|EB22−EB55|, Y25= EB33−max(EB22, EB55)−|EB22−EB55|.

The calculator 1513 inputs the values of the signals EB23, EB33 and EB53, corresponding to three pixels ($X_{i,j+1}$), ($X_{i,j}$) and ($X_{i,j-2}$) in FIG. 22 (Note: the three pixels are taken along with the central up-and-down direction), from the feature extractor 704 in FIG. 16, and outputs the values of Y16= min(EB23, EB53)−EB33−|EB23−EB53|, Y26=EB33−max (EB23, EB53)−|EB23−EB53|.

The calculator 1514 inputs the values of the signals EB24, EB33 and EB51, corresponding to three pixels ($X_{i+1,j-1}$), ($X_{i,j}$) and ($X_{i-2,j+2}$) in FIG. 22 (Note: the three pixels are taken along with the diagonally right-upward direction), from a portion of the feature extractor 704 in FIG. 16, and outputs the values of Y17=min(EB24, EB51)−EB33−|EB24−EB51|, Y27=EB33−max(EB24, EB51)−|EB24−EB51|.

Finally, the calculator 1515 inputs the values of the signals EB32, EB33 and EB35, corresponding to three pixels ($X_{i,j-1}$), ($X_{i,j}$) and ($X_{i,j+2}$) in FIG. 22 (Note: the three pixels are taken along with in the central right-and-left direction), from the feature extractor 704 in FIG. 16, and outputs the values of Y18=min(EB32, EB35)−EB33−|EB32−EB35|, Y28=EB33−max(EB32, EB35)−|EB32−EB35|.

Figure 24:
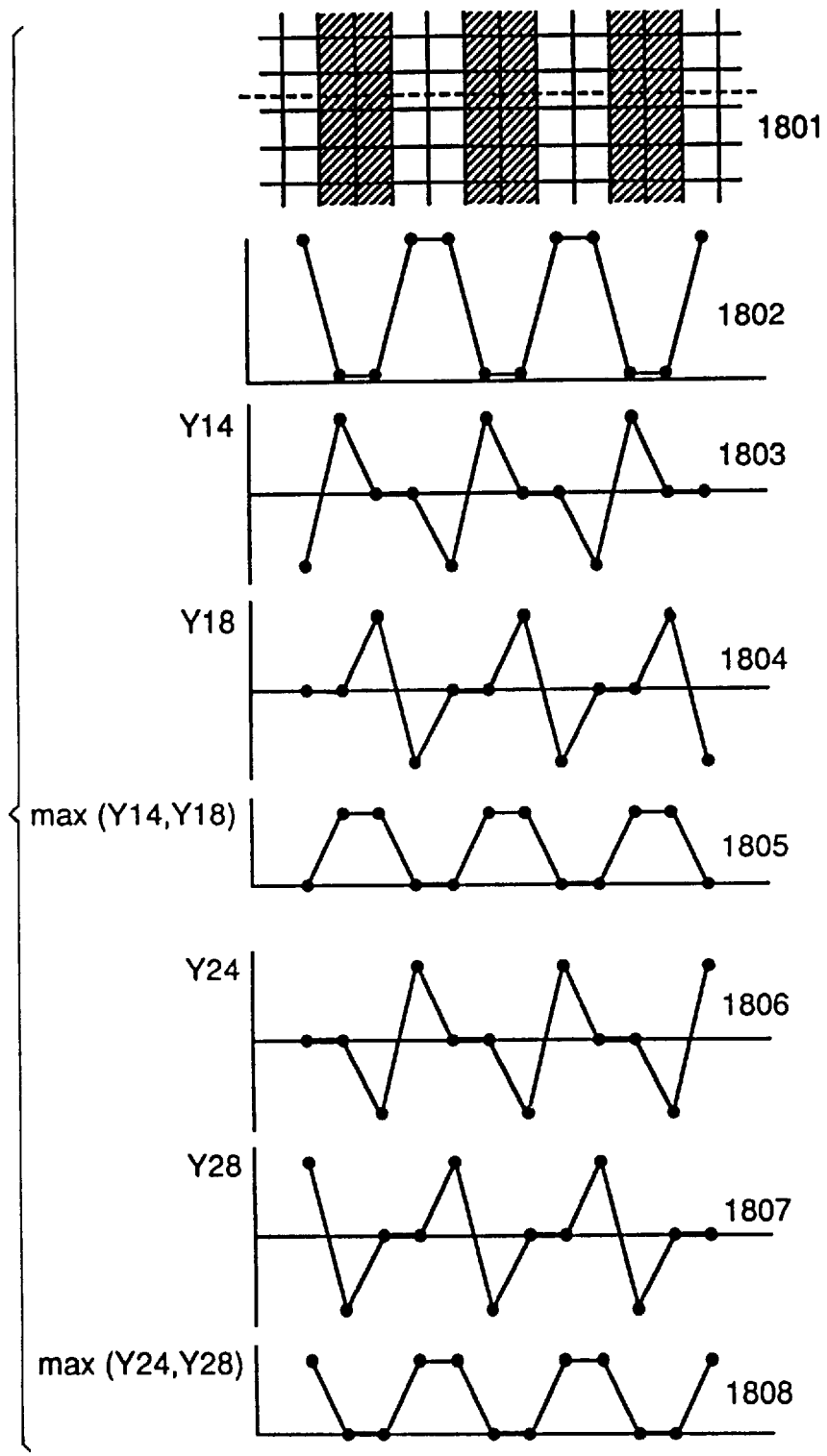
FIG. 24 is an explanatory view of the principle of graphic pattern detection.

FIG. 24 shows the principle of graphic pattern detection using the graphic detector having the above construction. FIG. 24 shows a graphic pattern 1801 with a graph 1802 of an image density signal indicative of the density change of the cross-section along the broken line in the pattern 1801 of FIG. 24. Numeral 1803 denotes the value of the signal Y14 in FIG. 20; 1804, the value of the signal Y18 in FIG. 20; and 1805, a maximum value max (Y14, Y18) between the values of the signals Y14 and Y18. As shown in FIG. 24, the value of the max (Y14, Y18) becomes large at a vertical graphic portion.

Figure 25:
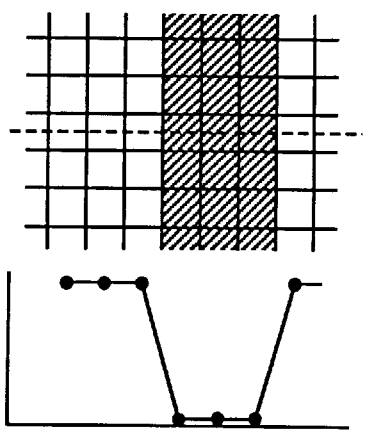
FIG. 25 is a diagram illustrating a graphic pattern where a line has a width of three pixel or more.

On the other hand, significantly the signals Y14 and Y18 do not take a large value at a graphic pattern having the line width of three or more pixels as shown in FIG. 25 or a simple edge portion as shown in FIG. 23. Accordingly, according to the above-described calculations, minute graphic patterns on bank notes and securities of the major countries can be accurately detected. Further, in this vertical graphic pattern, the value of the signals Y12 and Y16 are small (not shown). In addition, graphic patterns in directions other than the vertical direction can be detected by any of the outputs from the other calculators.

In consideration of the above advantages, in the present embodiment, the subtractor 1518 obtains the difference between the maximum value from the maximum value detector 1516 and the minimum value from the minimum value detector 1517, then the comparators 1519 and 1520 compare the difference with the value TS1 and TS2 pre-set by the coefficient setting circuit 101 in FIG. 5, and the flip-flop 1522 outputs the comparison results.

In this construction, the output from the maximum value detector 1516 shown in FIG. 21 is a large value, any of the outputs from the calculators is a small value, and the output from the minimum value detector 1517 is a small value. Thus, the value of the ES signal outputted from the subtractor 1518 that subtracts the minimum value from the maximum value becomes large.

Figure 26:
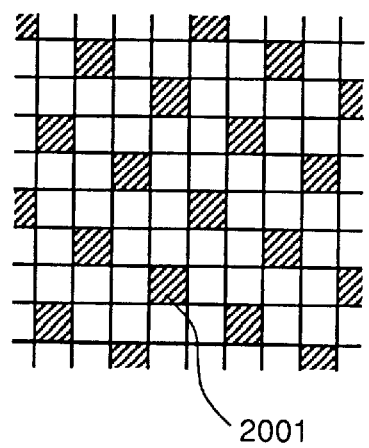
FIG. 26 is a matrix diagram illustrating a dot pattern.

On the other hand, in a dot pattern 2001 in FIG. 26, though the value of the calculator output min(A,C)−B−|A−C| may be large, however, there is no directional feature in the pattern, and the maximum value is greater in any of the four directions (horizontal, vertical, diagonally left-upward and diagonally right-upward directions). For this reason, the difference between the output from the maximum value detector 1518 in FIG. 21 and the output from the minimum value detector 1517 is not so wide. As a result, the value of the ES signal outputted from the subtractor 1518 becomes small.

That is, in case of a graphic pattern, the subtractor 1518 output takes a large value. Specifically, the comparators 1519 and 1520 respectively compare the maximum and minimum values with the values TS1 and TS2 (TS1>TS2) pre-set by the coefficient setting circuit in FIG. 5, and if TS2<ES<TS1 holds, the S value is "1", while ES≦TS2 or TS1≦ES holds, the S value is "0".

On the other hand, to detect only graphic portions in most of bank notes and securities of the major countries, the distribution of the ES signal value in the graphic portions of these specific originals may be examined and appropriate threshold values (TS1 and TS2) may be set so as to judge whether or not the ES signal value stands between these threshold values, thus improving the graphic judgment precision. If the pixel of interest ($X_{i,j}$) belongs to a graphic portion, the signal S value is "1", while if the pixel of interest does not belong to a graphic portion, the signal S value is "0".

In this manner, the output signal S from the flip-flop 1522 serves as a graphic judgment signal.

Next, the density discontinuation detection will be described below.

In the density discontinuation extractor shown in FIG. 21, the subtractor 1524 obtains the difference between the maximum value from the maximum value detector 1522a and the minimum value from the minimum value detector 1523, then the comparator 1525 compares the difference with a value TT pre-set by the coefficient setting circuit 101 in FIG. 5, and outputs the comparison result via the flip-flop 1526.

FIG. 24 shows a density discontinuation pattern 1801, graphs 1806 and 1807 indicating the output results of Y24 and Y28, and a graph 1808 indicating the result of calculating a maximum value of Y24 and Y28: max (Y24, Y28). As it is understood from these graphs, the values of the signals Y24 and Y28 become greater at a vertically density discontinuation portion. In this vertically density discontinuation portion pattern, the values of the Y22 and Y26 are small (not shown).

Further, density discontinuation patterns in directions other than the vertical direction can be detected by any of the outputs from the other calculators. At this time, the value of the maximum value detector 1522 output is large, the values of any of the calculators is small, and the value of the minimum value detector 1523 output is small. Thus, the value of the ET signal outputted from the subtractor 1524 becomes large. Further, the comparator 1525 compares the ET signal value with the value TT pre-set by the coefficient setting circuit 101, and outputs a signal T indicative of determination on whether the pixel of interest ($X_{i,j}$) belongs to a density discontinuation portion or not. If the pixel of interest ($X_{i,j}$) belongs to a density discontinuation portion, the signal T value is "1", while if the pixel of interest does not belong to a density discontinuation portion, the signal T value is "0". Accordingly, the signal T serves as a density discontinuation judgment signal.

<Post-processor 705>

Figure 27:
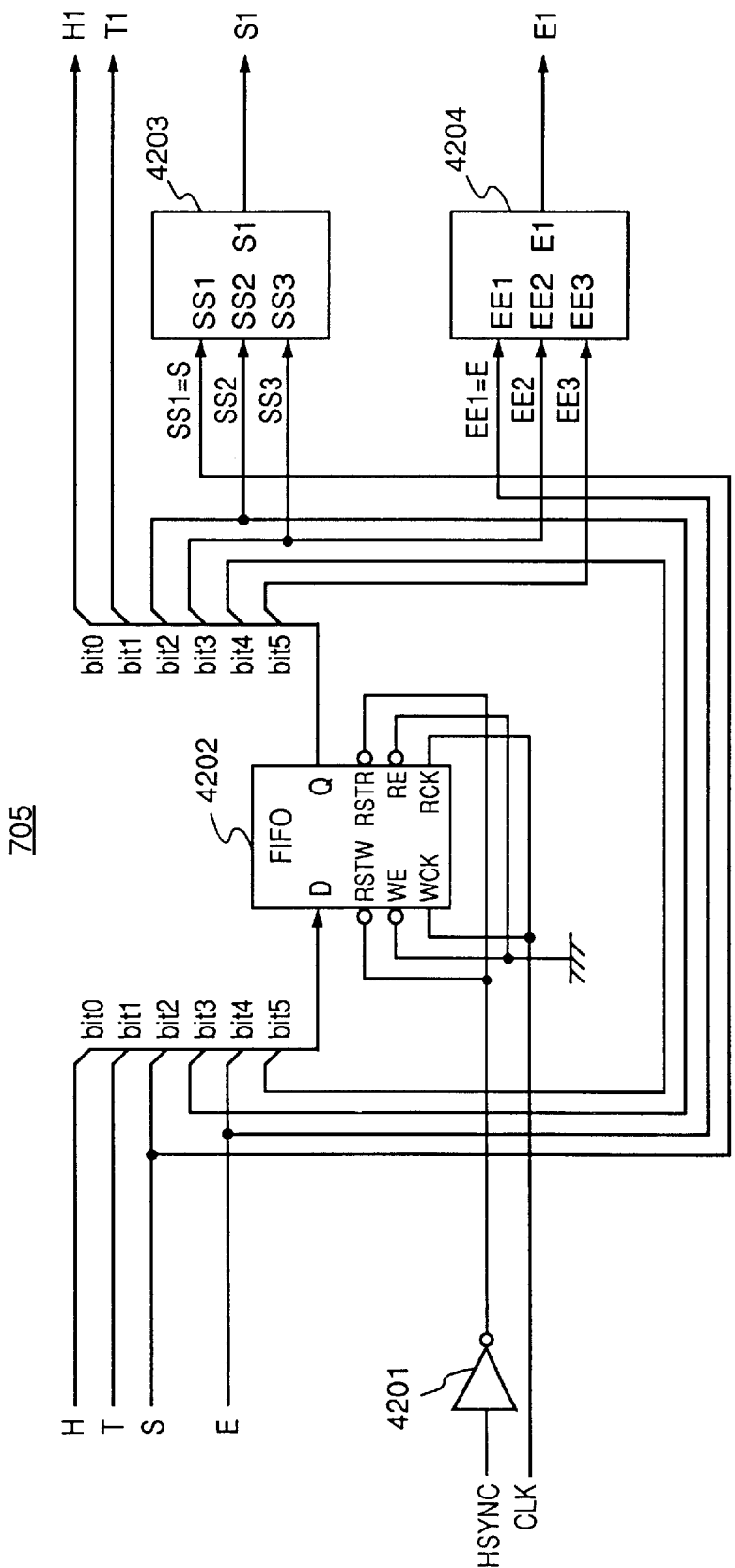
FIG. 27 is a block diagram showing the detailed construction of a post-processor 705 in FIG. 7.

FIG. 27 is a block diagram showing the detailed construction of the post-processor 705 shown in FIG. 7. The post-processor 705 performs post-processing upon the graphic judgment signal S and the edge judgment signal E to eliminate noise included in the signals.

In FIG. 27, numeral 4201 denotes an inverter; and 4202, an FIFO memory similar to the FIFO memory 902 in FIG. 9, for one-line delay. The inverter 4201 logically inverts the HSYNC signal and inputs the signal into the rest terminal (RSTW) of the FIFO memory 4202, thus initializes (resets) the FIFO memory 4202 by one line. On the other hand, the FIFO memory 4202 delays the uniform density judgment signal H and the density discontinuation signal T by one line and outputs the delayed signals as H1 and T1 signals.

Numeral 4203 denotes a graphic judgment signal post-processor; and 4204, an edge judgment signal post-processor.

The graphic judgment signal post-processor 4203 inputs three signals SS1 to SS3. The SS1 signal is the same as the S signal. The SS2 signal is a signal obtained from delaying the SS1 (=S) signal by one line. The SS3 signal is a signal obtained from delaying the SS2 signal by one line. The graphic judgment signal post-processor 4203 obtains an output signal S1 by calculation based on these input signals.

On the other hand, the edge judgment signal post-processor 4204 inputs three signals EE1 to EE3. The EE1 signal is the same as the E signal. The EE2 signal is a signal obtained from delaying the EE1 (=E) signal by one line. The EE3 signal is a signal obtained from delaying the EE2 signal by one line. The edge judgment signal post-processor 4204 obtains an output signal E1 by calculation based on these input signals.

<Graphic Judgment Signal Post-Processor 4203>

FIGS. 28 to 31 are block diagrams showing the detailed construction of the graphic judgment signal post-processor 4203 shown in FIG. 27.

Figure 28:
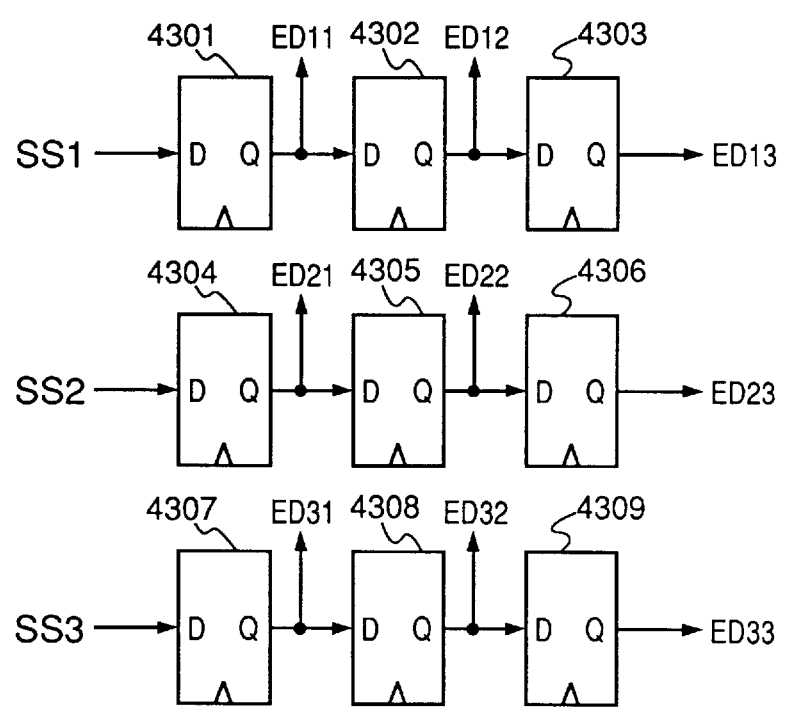
FIGS. 28 to 31 are block diagrams showing the detailed construction of a graphic judgment signal post-processor 4203 in FIG. 27.

In FIG. 28, numerals 4301 to 4309 denote flip-flops for one-pixel delay. The flip-flops 4301 to 4303 delays the SS1 signal by one pixel and output signals ED11 to ED13. The flip-flops 4304 to 4306 delays the SS2 signal by one pixel and output signals ED21 to ED23. The flip-flops 4307 to 4309 delays the SS3 signal by one pixel and output signals E31 to ED33. These nine signals form a 3×3 pixel window as shown in FIG. 11. The window comprises a pixel of interest ($X_{i,j}$) and neighboring pixels ($X_{i-1,j-1}$), ($X_{i-1,j}$), ($X_{i-1,j+1}$), ($X_{i,j-1}$), ($X_{i,j+1}$) ($X_{i+1,j-1}$), ($X_{i+1,j}$) and ($X_{i+1,j+1}$).

Figure 29:
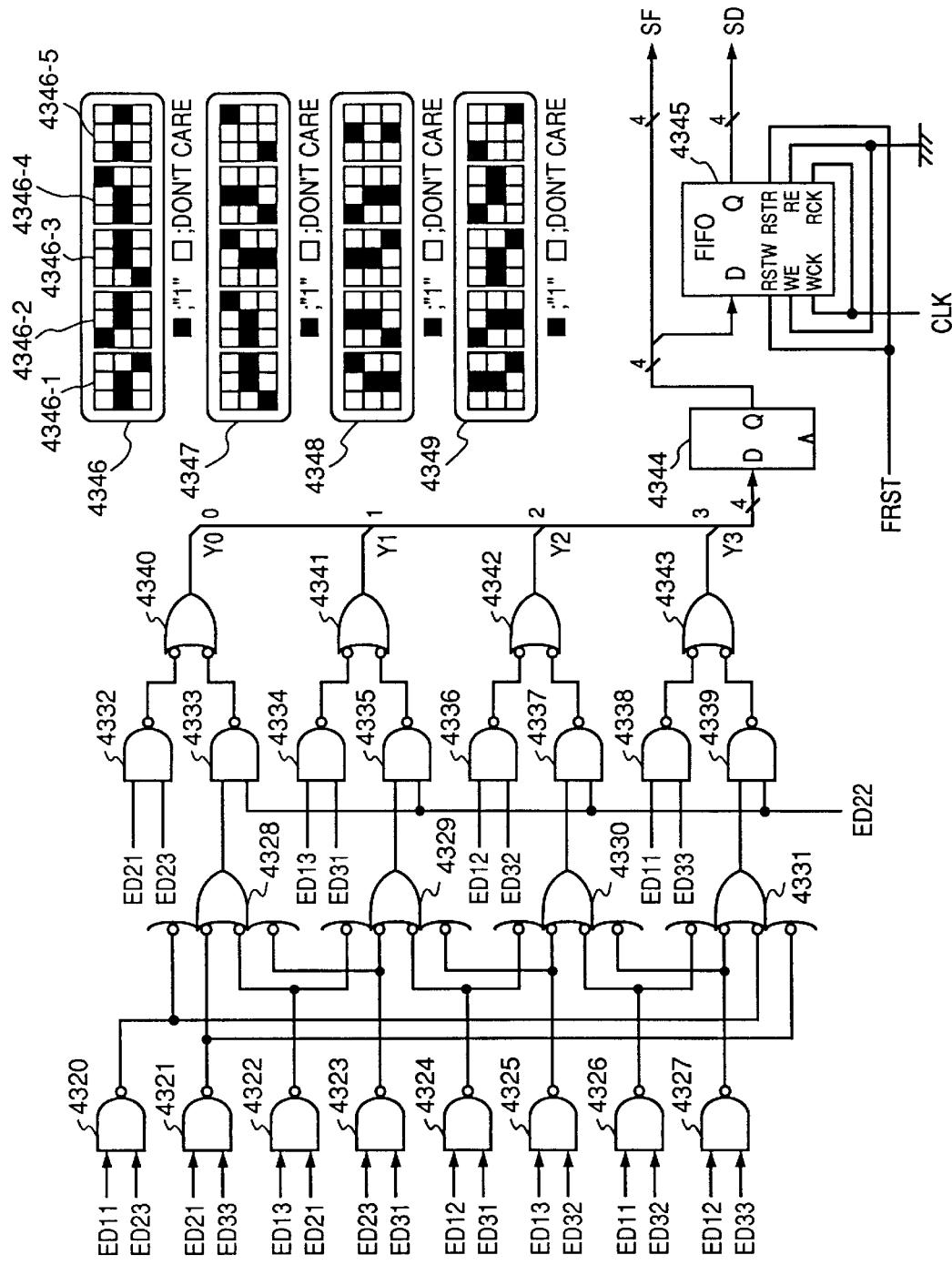

In FIG. 29, numerals 4320 to 4327 denote 2to1 NAND gates in which the nine signals are inputted; 4328 to 4331, 4to1 NAND gates; 4332 to 4339, 2to1 NAND gates; and 4340 to 4343, 2to1 NAND gates.

When any of the outputs of the NAND gates 4320 to 4323 is "1" and the value of the signal ED22 is "1", the output of the NAND gate 4333 is "1". When the 3×3 pixel window shown in FIG. 29 has a pattern such as patterns 4346-1 to 4346-5, the NAND gate 4333 output is "1".

In the patterns 4346 to 4349, the mark "■" represents a value "1", and the mark "□" means "1" or "0". When the 3×3 pixel window has the pattern 4346-5, the NAND gate 4332 output takes value "1". Further, when the 3×3 pixel window has the patterns 4346 (4346-1 to 4346-5), the Y0 (the output of the NAND gate 4340) signal is "1", while the 3×3 pixel window has a pattern other than the pattern 4346, the Y0 signal is "0". That is, the Y0 signal is "1" when the pattern belongs to a horizontal graphic portion. Specifically, in a horizontal straight line formed with three pixels ($X_{i,j-1}$, $X_{i,j}$, $X_{i,j+1}$), continuous lines and a line having a faded pixel of interest can be detected based on the pattern 4346-5, and a line slightly deflected from a horizontal straight line can be detected based on the patterns 4346-1 to 4346-4. In this manner, the Y0 signal serves as a graphic judgment signal for a horizontal direction.

Similarly, the Y1 signal value is "1" when the 3×3 pixel window has any of the five patterns 4347, serving as a graphic judgment signal for a diagonally right-upward direction. The Y2 signal value is "1" when the 3×3 pixel window has any of the five patterns 4348, serving as a graphic judgment signal for a vertical direction. The Y3 signal value is "1" when the 3×3 pixel window has any of the five patterns 4349, serving as a graphic judgment signal for a diagonally left-upward direction.

Further, a flip-flop 4344 outputs the Y0 to Y3 signals as an SF signal in synchronization with the rising edge of the CLK signal. Further, the SF signal is inputted into an FIFO memory (e.g., TMS4C1060 memory by Texas Instruments Incorporated) 4345.

Figure 32:
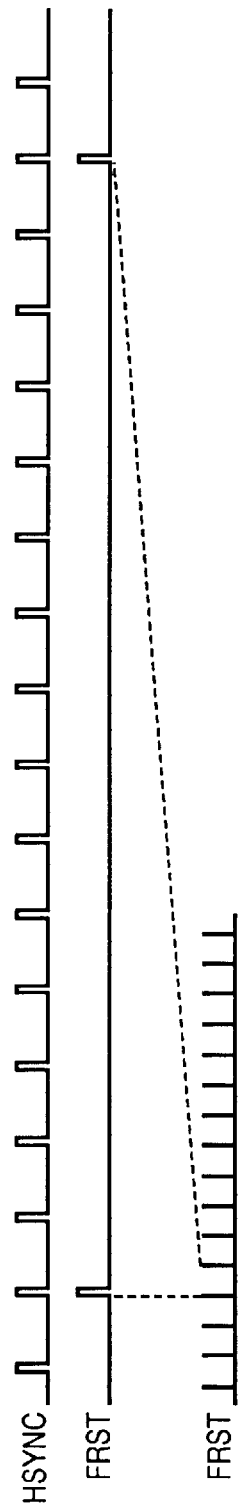
FIG. 32 is a timing chart showing a repetitive periods of an FRST signal.

On the other hand, the FIFO memory 4345 is reset by a FRST signal in FIG. 29. (Note: the reset input of the TMS4C1060 is based on a positive logic.) As shown in FIG. 32, as the FRST signal is a pulse signal repeatedly generated at a (HSYNC period×15) period, the FIFO memory 4345 delays the input signal by fifteen lines. Accordingly, an SD signal outputted from the FIFO memory 4345 is a signal obtained from delaying the SF signal by fifteen lines.

Figure 30:
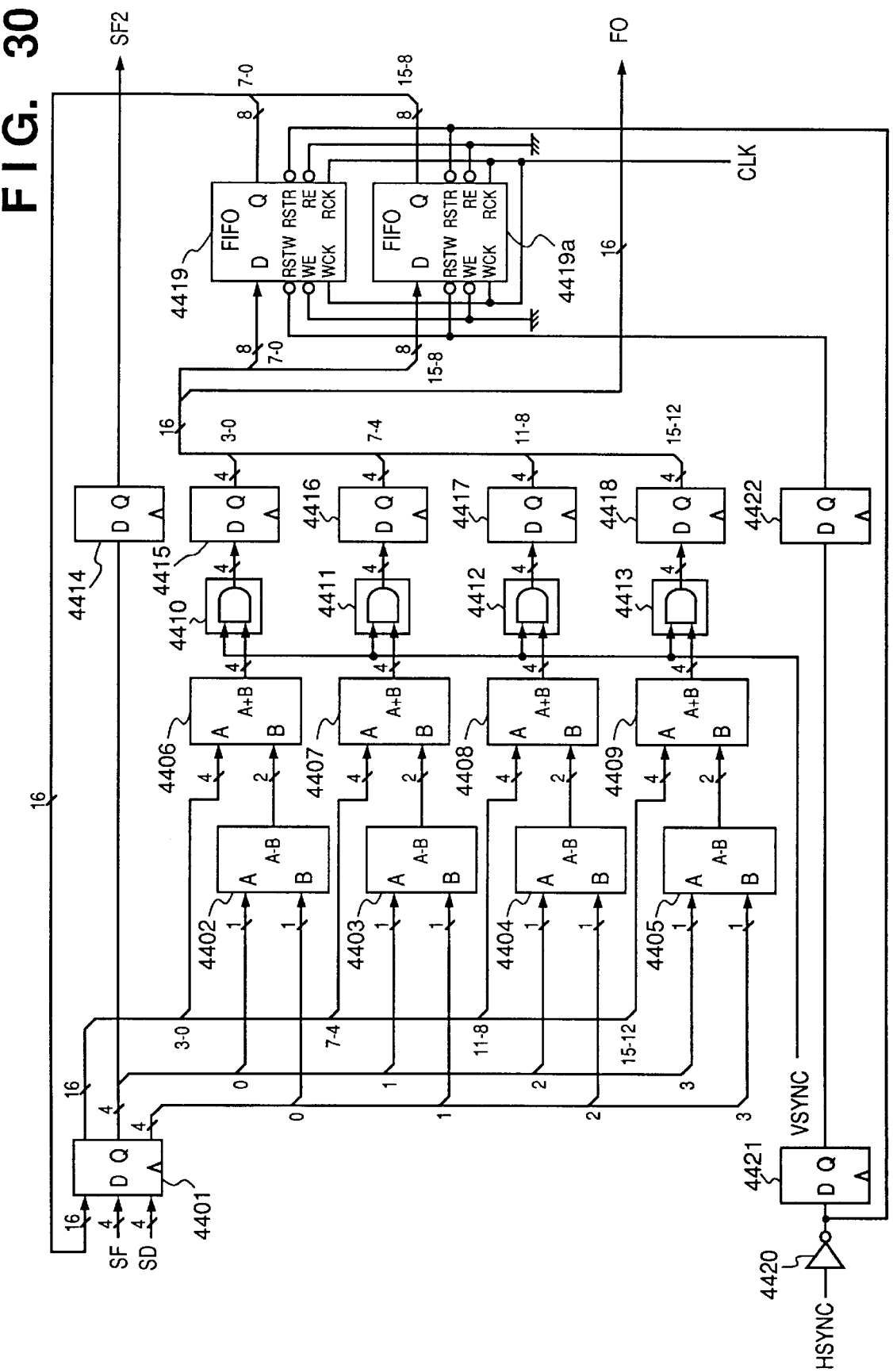
Figure 31:
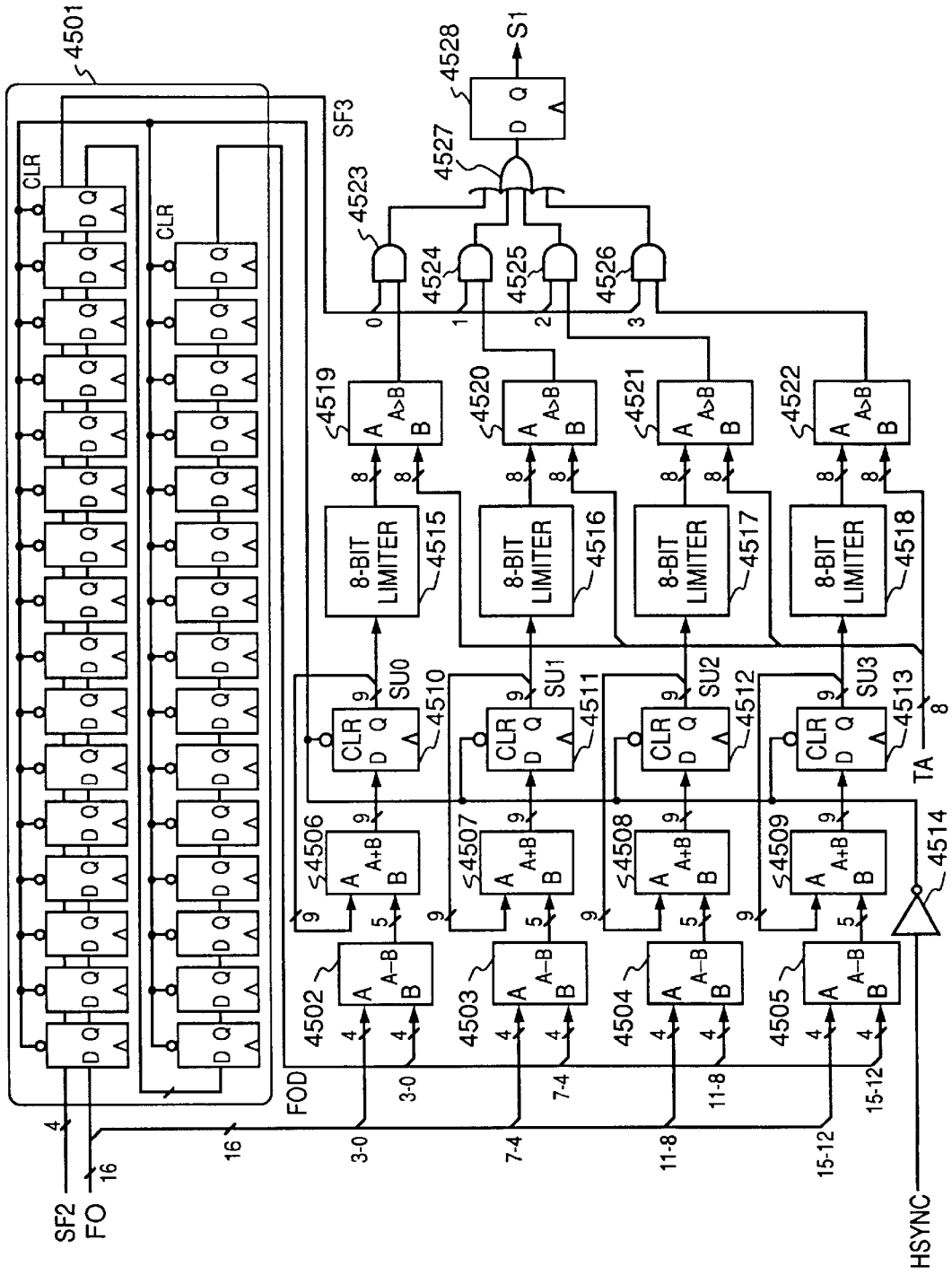

FIGS. 30 and 31 show the construction of circuits for counting "1" pixels by every bit of the SF signal using a 31×15 pixel window. First, the circuit shown in FIG. 30 performs addition in the subscanning direction, and as shown in a window image 4601 in FIG. 33, counts "1" pixels in a 1×15 pixel subscanning line. On the other hand, the circuit shown in FIG. 31 perform addition in the main-scanning direction in a 31×15 pixel window 4602 in FIG. 33, based on the count result by the circuit in FIG. 30.

In FIG. 30, numeral 4401 denotes a flip-flop; 4402 to 4405, subtractors; 4406 to 4409, adders; 4410 to 4413, AND gates; 4414 to 4418, flip-flops; 4419 and 4419a, FIFO memories (e.g., M66251 memory by Mitsubishi Electric Corporation); 4420, an inverter; and 4421 and 4422, flip-flops.

In the circuit having the above construction, the SF signal is a 4-bit signal serving as a graphic judgment for four directions (horizontal, diagonally right-upward, vertical, and diagonally left-upward directions). The SD signal is a signal obtained from delaying the SF signal by fifteen lines.

Generally, in an array $X(i)[i=1,2,3,\ldots]$, if the sum $Y(i)$ of the 1st to N th terms of the array $X(i)$ is defined as follows, $$Y(i)=X(i)+X(i+1)+X(i+2)+\ldots+X(i+N-1) \tag{2}$$

then, $$Y(i+i)=X(i+1)+X(i+2)+\ldots+X(i+N-1)+X(i+N) \tag{3}$$

and $$Y(i+1)=Y(i)+\{X(i+N)-X(i)\} \tag{4}$$

On the other hand, as the initial value of $X(i)$, if $X(1)=X(2)=X(3)=\ldots=X(N)=0$ holds, $$Y(1)=0$$

Accordingly, $Y(i)$ is sequentially calculated:

$$Y(2)=Y(1)+\{X(1+N)-X(1)\} \tag{5}$$

$$Y(3)=Y(2)+\{X(2+N)-X(2)\} \tag{6}$$

$$Y(i+1)=Y(i)+Y(i+N)-Y(i) \tag{7}$$

Similarly, in a two-dimensional array $X(i,j)[i=1,2,3,\ldots : j=1,2,3,\ldots]$, if the sum $Y(i,j)$ of the 1st to Nth terms of the array $X(i,j)$ is defined as follows, $$Y(i,j)=X(i,j)+X(i+1,j)+X(i+2,j)+\ldots+X(i+M-1,j) \tag{8}$$

then, $$Y(i+1,j)=X(i+1,j)+X(i+2,j)+\ldots+X(i+M-1,j)+X(i+M,j) \tag{9}$$

and $$Y(i+1,j)=Y(i,j)+\{X(i+M,j)-X(i,j)\} \tag{10}$$

On the other hand, as the initial value of $X(i,j)$, if $X(1,j)=X(2,j)=X(3,j)=\ldots=X(M,j)=0$ holds, $$Y(1,j)=0$$

Accordingly, $Y(i,j)$ is sequentially calculated:

$$Y(2,j)=Y(1,j)+\{X(1+M,j)-X(1,j)\} \tag{11}$$

$$Y(3,j)=Y(2,j)+\{X(2+M,j)-X(2,j)\} \tag{12}$$

$$Y(i+j)=Y(i,j)+\{Y(i+M,j)-Y(i,j)\} \tag{13}$$

Further, if the following equation holds, $$Z(i,j) = X(i,j) + X(i+1,j) + X(i+2,j) + \ldots + \\ X(i+M,j) + X(i,j+1) + X(i+1,j+1) + X(i+2,j+1) + \ldots + \\ X(i+M,j+1) + X(i,j+2) + X(i+1,j+2) + X(i+2,j+2) + \ldots + \\ X(i+M,j+2) + \ldots + \\ X(i,j+N-1) + X(i+1,j+N-1) + X(i+2,j+N-1) + \ldots + \\ X(i+M,j+N-1) \tag{14}$$

then, $$Z(i,j)=Y(i,j)+Y(i,j+1)+Y(i,j+2)+\ldots+Y(i,j+N-1) \tag{15}$$

$$Z(i,j+1)=Y(i,j+1)+Y(i,j+2)+\ldots+Y(i,j+N-1)+Y(i,j+N) \tag{16}$$

$$Z(i,j+1)=Z(i,j)+\{Y(i,j+N)-Y(i,j)\} \tag{17}$$

On the other hand, as the initial value of $Z(i,j)$, if $Z(i,1)=Z(i,2)=Z(i,3)=\ldots=Z(i,N)=0$ holds, $$Z(i,j)=0$$

Accordingly, $Z(i,j)$ is sequentially calculated:

$$Z(i,2)=Z(i,1)+\{Y(i,1+N)-Y(i,1)\} \tag{18}$$

$$Z(i,3)=Z(i,2)+\{Y(i,2+N)-Y(i,2)\} \tag{19}$$

$$Z(i+1,j)=Z(i,j)+\{Y(i,j+N)-Y(i,j)\} \tag{20}$$

The pixel counting in the 31×15 pixel window is made in accordance with the above calculations. First, as shown in a window image 4601 in FIG. 33, addition for 1×15 pixels in subscanning one-line is made, then the added results are added in the main-scanning direction for thirty-one pixels. Thus, the counting of 31×15 pixel window is made.

Assuming that i is a subscanning position, j is a main-scanning position and M=15, each bit of the SF signal in FIG. 30 corresponds to the above-described X(i+M,j), and each bit of the SD signal corresponds to the above-described X(i,j).

The flip-flop 4401 divides the SF and SD signals into one-bit signals, and the subtractors 4402 to 4405 performs subtraction on each bit signal. The subtraction results from the subtractors are inputted into the B-input terminal of the adders 4406 to 4409. These subtractors and adders perform a calculation corresponding to the equation (13). The A-input of the adders will be described later.

The inverter 4420 logically inverts the HSYNC signal and inputs the reading reset terminal (RSTR) of the FIFO memories 4419 and 4419a, and at the same time, the flip-flops 4421 and 4422 delays the HSYNC signal by two pixels, then inputs the delays signal into the writing reset terminal (RSTW) of the FIFO memories 4419 and 4419a. That is, the FIFO memories 4419 and 4419a are provided with "2 pixels/line" delay.

On the other hand, the flip-flop 4415 (otherwise, 4416, 4417 or 4418) delays the output of the adder 4406 (otherwise, 4407, 4408 or 4409) by one pixel, and the FIFO memory 4419 (or 4419a) delays the output from the flip-flop by 2 pixels/line, further, the flip-flop 4401 delays the output from the FIFO memory by one pixel, and inputs the delayed signal into the A-input terminal of the adder 4406

(otherwise, 4407, 4408 or 4409). Accordingly, thus-delayed A-input corresponds to the same adder output delayed by one line.

Assuming that the A-input of the adder may be Y(i,j) of the equation (13), the output is Y(i+1,j).

On the other hand, as each bit of the SF signal may be X(i+M,j) and each bit of the SD signal may be X(i,j), the adder 4406 (otherwise 4407, 4408 or 4409) performs calculation in accordance with the equation (13).

Further, as the VSYNC signal is "0" before the subscanning, the AND gate 4410 ensures, as the initial value of x(i,j):

$$X(i,j)=X(i+1,j)=X(i+2)= \ldots =X(i+M)=0 (M=15)$$

Figure 33:
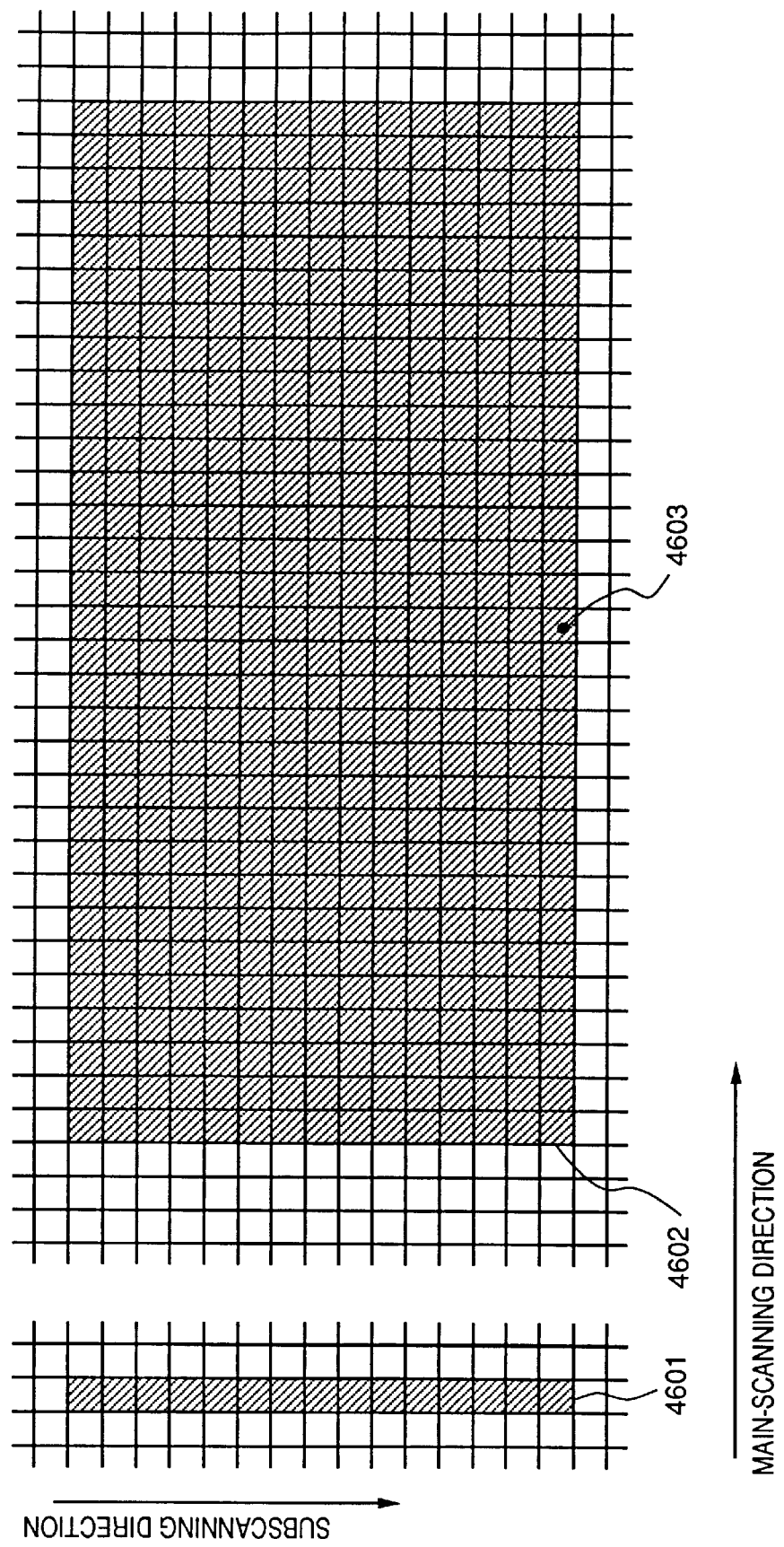
FIG. 33 is a lattice pattern illustrating a 31×15 pixel window.

Accordingly, the sum total within the 1×15 pixel window corresponding to the window image 4601 in FIG. 33 is calculated based on the algorithm represented by the equation (13). An FO output in FIG. 30 is a 16-bit signal, in which bit0 to bit3 indicate the sum within the 1×15 pixel window regarding a bit0 of the SF signal; bit4 to bit7, the sum within the 1×15 pixel window regarding a bit1 of the SF signal; bit8 to bit11, the sum within the 1×15 pixel window regarding a bit2 of the SF signal; and bit12 to bit15, the sum within the 1×15 pixel window regarding a bit3 of the SF signal. The SF2 signal is obtained from delaying the SF signal by two pixels in synchronization with the FO signal.

The circuit shown in FIG. 31 obtains the sum total within the window 4602 in FIG. 33 based on the equations (14) to (20). In FIG. 31, numeral 4501 denotes thirty-one flip-flops; 4502 to 4505, subtractors; 4506 to 4509, adders; and 4510 to 4513, flip-flops.

In FIG. 31, the flip-flops 4501 delay the FO signal by thirty-one pixels and output the signal as an FOD signal. Accordingly, if the FOD signal is the above-described Y(i,j+N), the FOD signal is also Y(i,j), and if the calculation result from the subtractor 4502 (otherwise 4503, 4504 or 4505), i.e., the output to the adder 4506 (otherwise 4507, 4508 or 4509) is Z(i,j+1), the flip-flop 4510 (otherwise 4511, 4512 or 4513) delays the output by one pixel, and inputs the delayed signal: z(i,j) into the A-input terminal of the adder 4506 (otherwise 4507, 4508 or 4509).

Accordingly, the calculation corresponding to the equation (20) is made, and the HSYNC signal logically-inverted by the inverter 4515 initializes the contents of the flip-flops 4501 to "0". Thus, the sum total within the 16×31 pixel window 4602 in FIG. 33 is obtained using the algorithm based on the equation (20).

In FIG. 31, an SU0 signal is obtained from adding the bit0 of the SF signal, i.e., the Y0 signal as the horizontal graphic judgment signal, within the 16×31 pixel window; an SU1 signal, from adding the bit1 of the SF signal, i.e., the Y1 signal as the right-upward directional graphic judgment signal, within the 16×31 pixel window; an SU2 signal, from adding the bit2 of the SF signal, i.e., the Y2 signal as the vertical graphic judgment signal, within the 16×31 pixel window; and an SU3 signal, from adding the bit3 of the SF signal, i.e., the Y3 signal as the left-upward directional graphic judgment signal, within the 16×31 pixel window.

Figure 34:
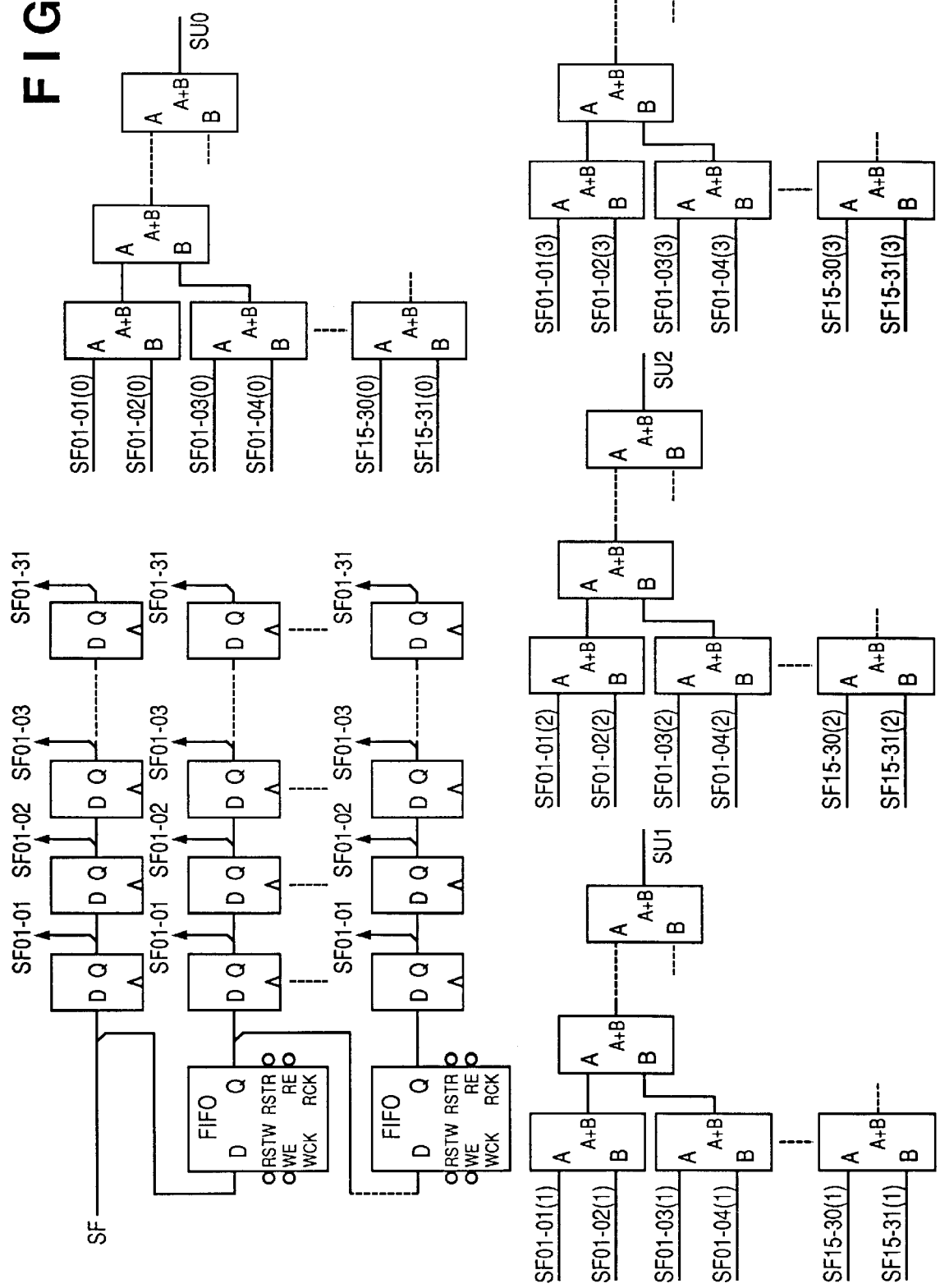
FIG. 34 is a block diagram showing the construction of a conventional circuit for a counting processing.

It should be noted that conventional methods which do not employ the algorithms of the present embodiment usually use a circuit shown in FIG. 34. Although the detailed explanation will be omitted, the number of FIFO memories and adders in this circuit is far greater than that in the circuit of the present embodiment. For example, in the circuit of the present embodiment, the number of adder including subtracters is sixteen, on the other hand, the circuit in FIG. 34 requires four hundred and sixty-four (=31×15−1) adders.

Accordingly, in a case where the circuit of the present embodiment is integrated as an LSI, the number of inputs/outputs between the FIFO memories and the LSI is reduced, as well as down-sizing of the circuit, in comparison with the conventional circuit (present embodiment: 40, conventional circuit: 64), thus the circuit of the present embodiment is very advantageous when forming the circuit as an LSI.

Further, in FIG. 31, numerals 4515 to 4518 denotes 8-bit limiters which output a value "255" when the calculated values of the SU0 to SU3 signals exceed the 8-bit maximum value, i.e., "255", otherwise, output the input values; and 4519 to 4522, comparators. Note that signal TA denotes a value pre-set by the coefficient setting circuit 101. The comparator 4519 compares the value of the SU0 signal outputted via the limiter 4515 with the value TA, and if SU0>TA holds, outputs a value "1", while if SU0≦TA holds, outputs a value "0".

Numeral 4523 denotes an AND gate which obtains a logical product between the output from the comparator 4519 and a bit0 of an SF3 signal obtained from delaying the SF2 signal by sixteen pixels. Specifically, the SF3 signal is obtained from adding calculation delay by the circuit in FIG. 31 to the SF signal, and corresponds to the SF signal in a case where the pixel of interest is a pixel 4603 in FIG. 33. Accordingly, if the number of values "1" within the 31×15 pixel window 4602 is greater than the value TA and the Y0 signal as the horizontal graphic judgment signal at the pixel of interest 4603 is "1", the AND gate 4523 outputs the value "1", otherwise, outputs the value "0". In other words, the AND gate 4523 output is a signal that indicates a value "1" when a pixel of interest belongs to a horizontal graphic portion and a predetermined or more number of pixels in the neighboring pixels belong to the graphic portion in the same direction.

Similarly, if the number of values "1" within the 31×15 pixel window 4602 is greater than the value TA and the Y1 signal as the right-upward directional graphic judgment signal at the pixel of interest 4603 is "1", the AND gate 4524 outputs the value "1", otherwise, outputs the value "0". In other words, the AND gate 4524 output is a signal that indicates a value "1" when a pixel of interest belongs to an left-upward directional graphic portion and a predetermined or more number of pixels in the neighboring pixels belong to the graphic portion in the same direction.

Further, if the number of values "1" within the 31×15 pixel window 4602 is greater than the value TA and the Y2 signal as the vertical graphic judgment signal at the pixel of interest 4603 is "1", the AND gate 4525 outputs the value "1", otherwise, outputs the value "0". In other words, the AND gate 4525 output is a signal that indicates a value "1" when a pixel of interest belongs to a vertical graphic portion and a predetermined or more number of pixels in the neighboring pixels belong to the graphic portion in the same direction.

Finally, if the number of values "1" within the 31×15 pixel window 4602 is greater than the value TA and the Y3 signal as the right-upward directional graphic judgment signal at the pixel of interest 4603 is "1", the AND gate 4526 outputs the value "1", otherwise, outputs the value "0". In other words, the AND gate 4526 output is a signal that indicates a value "1" when a pixel of interest belongs to a right-upward directional graphic portion and a predetermined or more number of pixels in the neighboring pixels belong to the graphic portion in the same direction.

Numeral 4507 denotes an OR circuit which obtains the logical addition among the outputs from the AND gates 4523 to 4526. The OR circuit 4507 outputs the logical addition via the flip-flop 4528 as the S1 signal. Accordingly, the S1 signal value indicates a value "1" when the pixel of interest 4603 in the 31×15 pixel window 4602 in FIG. 33 belongs to a graphic portion in any of the four directions and a predetermined or more number of pixels in the neighboring pixels belong to the graphic portion in the same direction, and otherwise, indicates a value "0".

<Edge Judgment Signal Post-Processor 4204>

Figure 35:
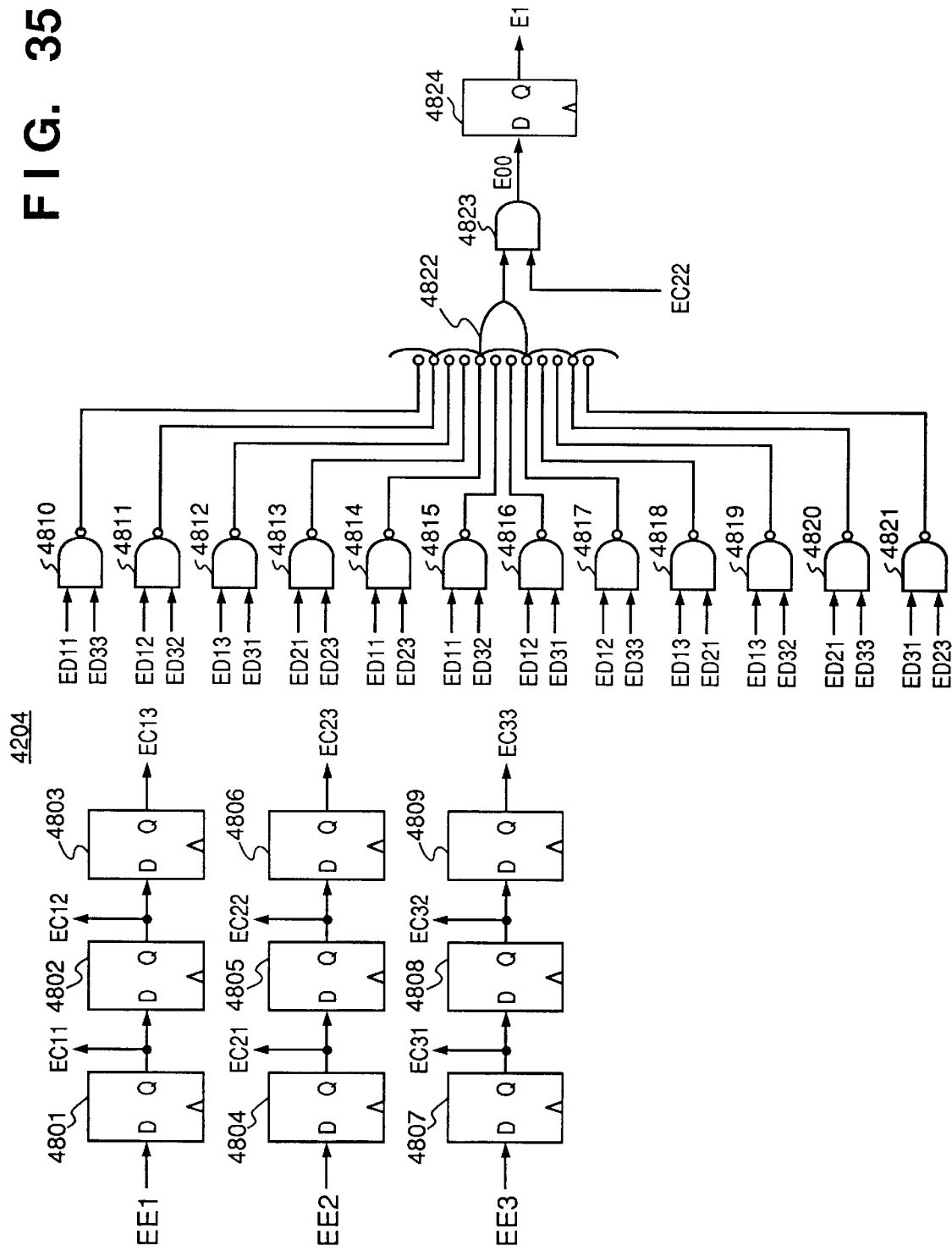
FIG. 35 is a block diagram showing the detailed construction of an edge judgment signal post-processor 4204 in FIG. 27.

FIG. 35 is a block diagram showing the detailed construction of the edge judgment signal post-processor 4204. In FIG. 35, numerals 4801 to 4809 denote flip-flops which respectively output signals EC11 to EC13, EC21 to EC23 and EC31 to EC33, corresponding to the 3×3 pixel window in FIG. 11.

Figure 36:
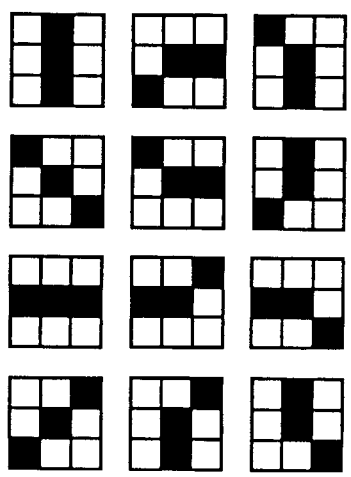
FIG. 36 is twelve patterns represented by an edge judgment signal E in a 3×3 pixel window.

Numerals 4810 to 4821 denote 2to1 NAND gates; 4822, 12to1 NAND gate; and 4823, 2to1 AND gate. Though the detailed explanation will be omitted, the AND gate 4823 outputs an E00 signal which indicates a value "1" when the edge judgment signal E indicates twelve patterns as shown in FIG. 36, i.e., the pixel of interest and the neighboring pixels are included in continuous edge portions, otherwise, indicates a value "0". The E00 signal is outputted as an E1 signal via a flip-flop 4824.

<Selector 706>

Figure 37:
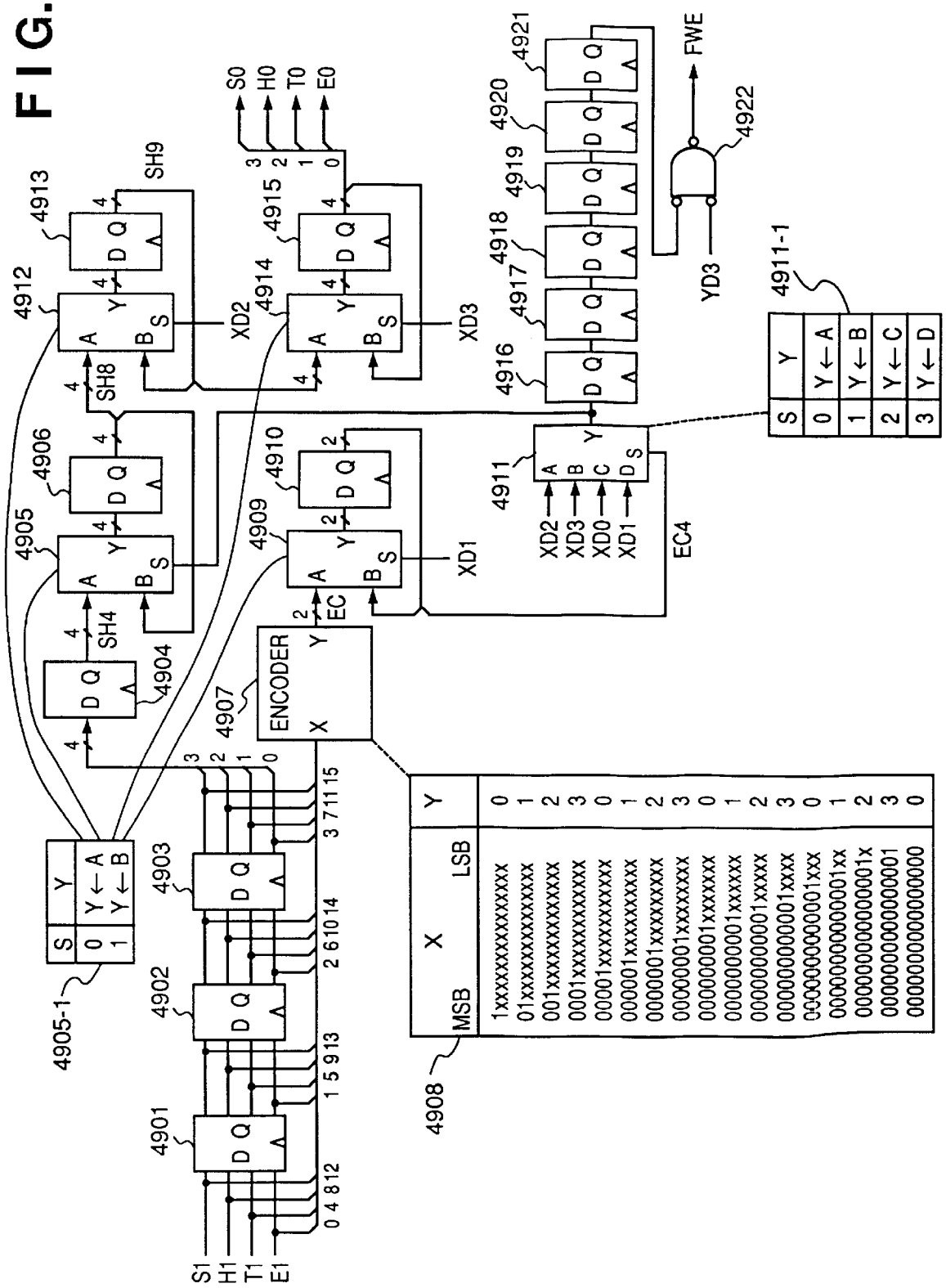
FIGS. 37 to 39 are block diagrams showing the detailed construction of a selector 706 in FIG. 7.
Figure 38:
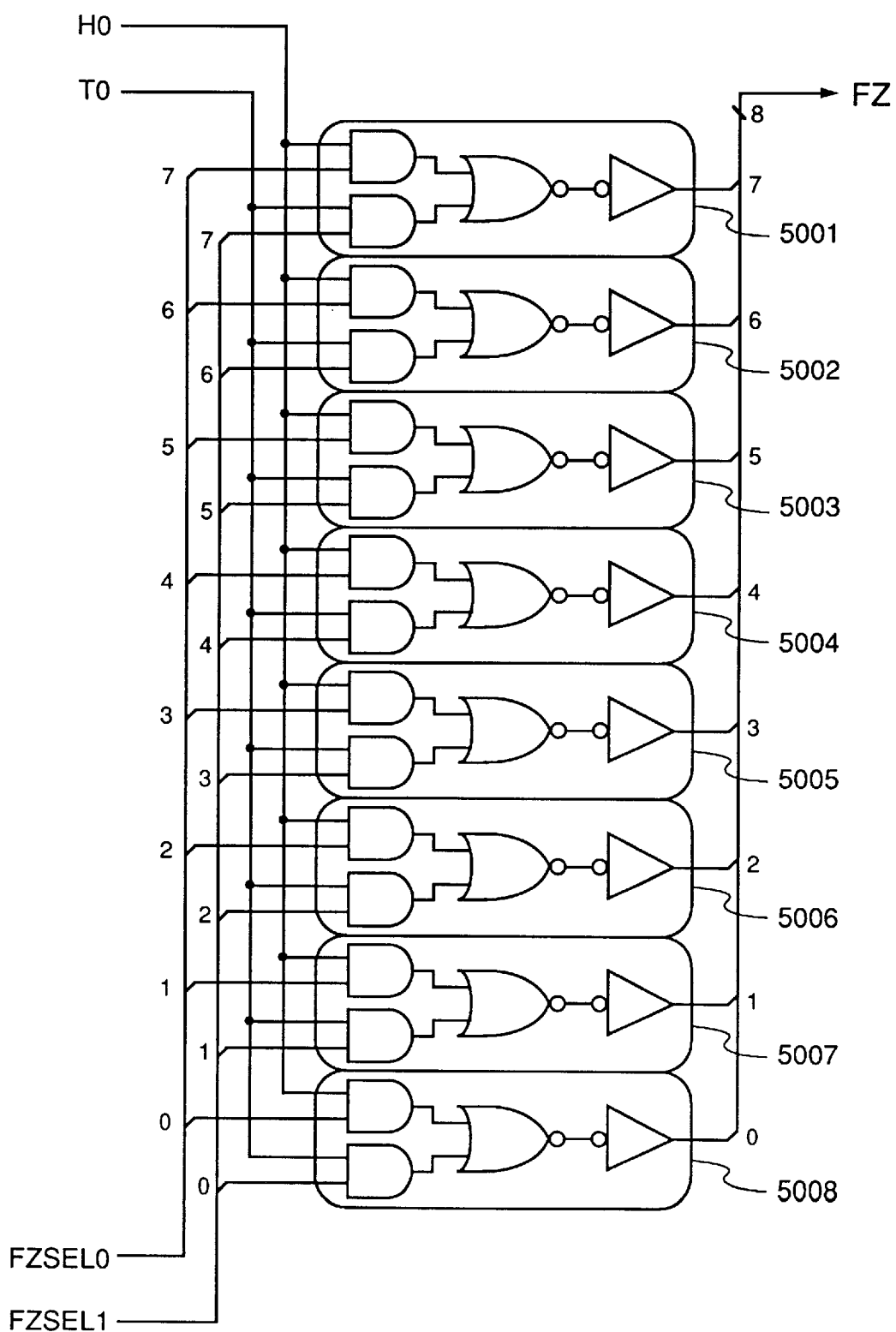
Figure 39:
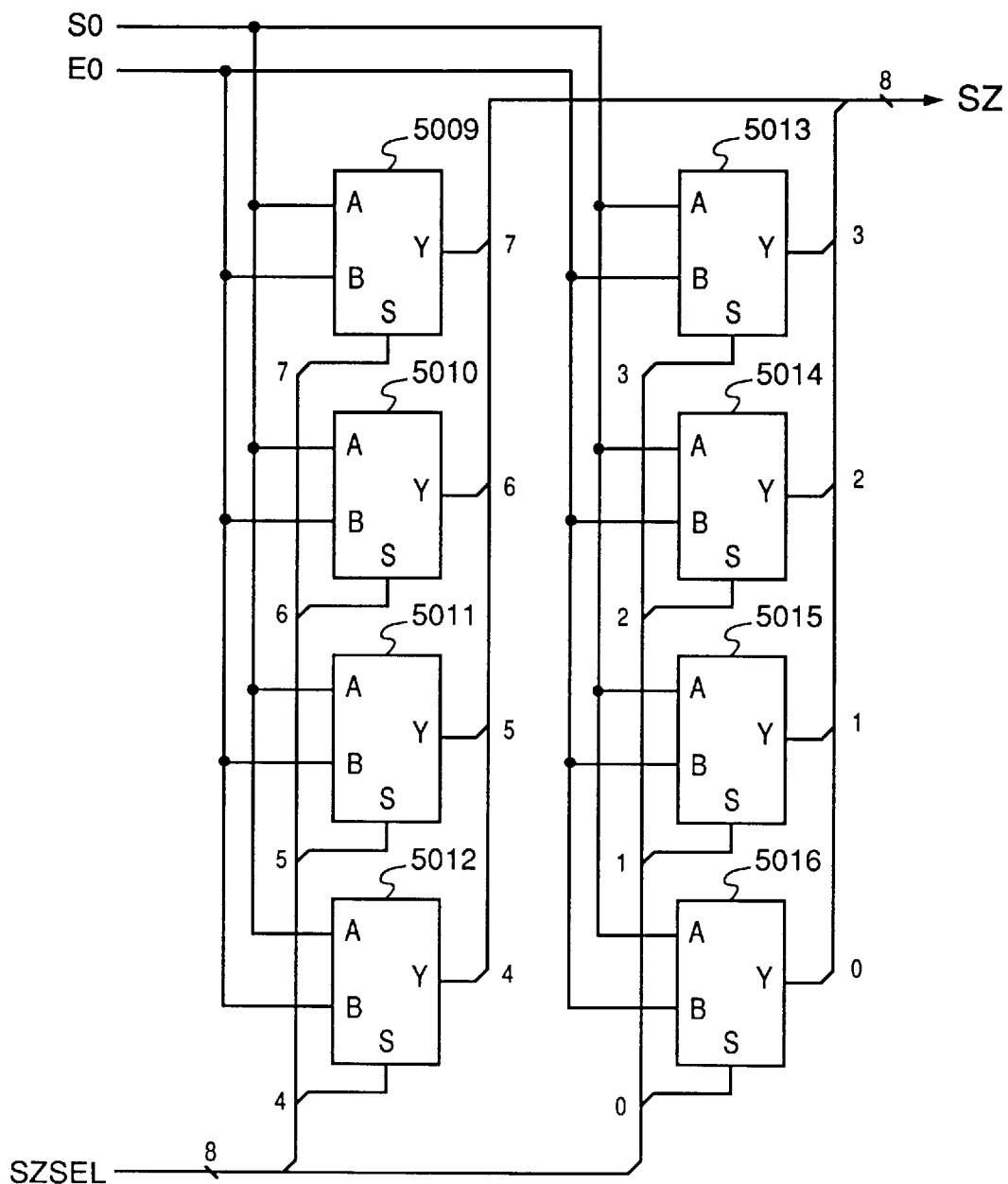
Figure 40:
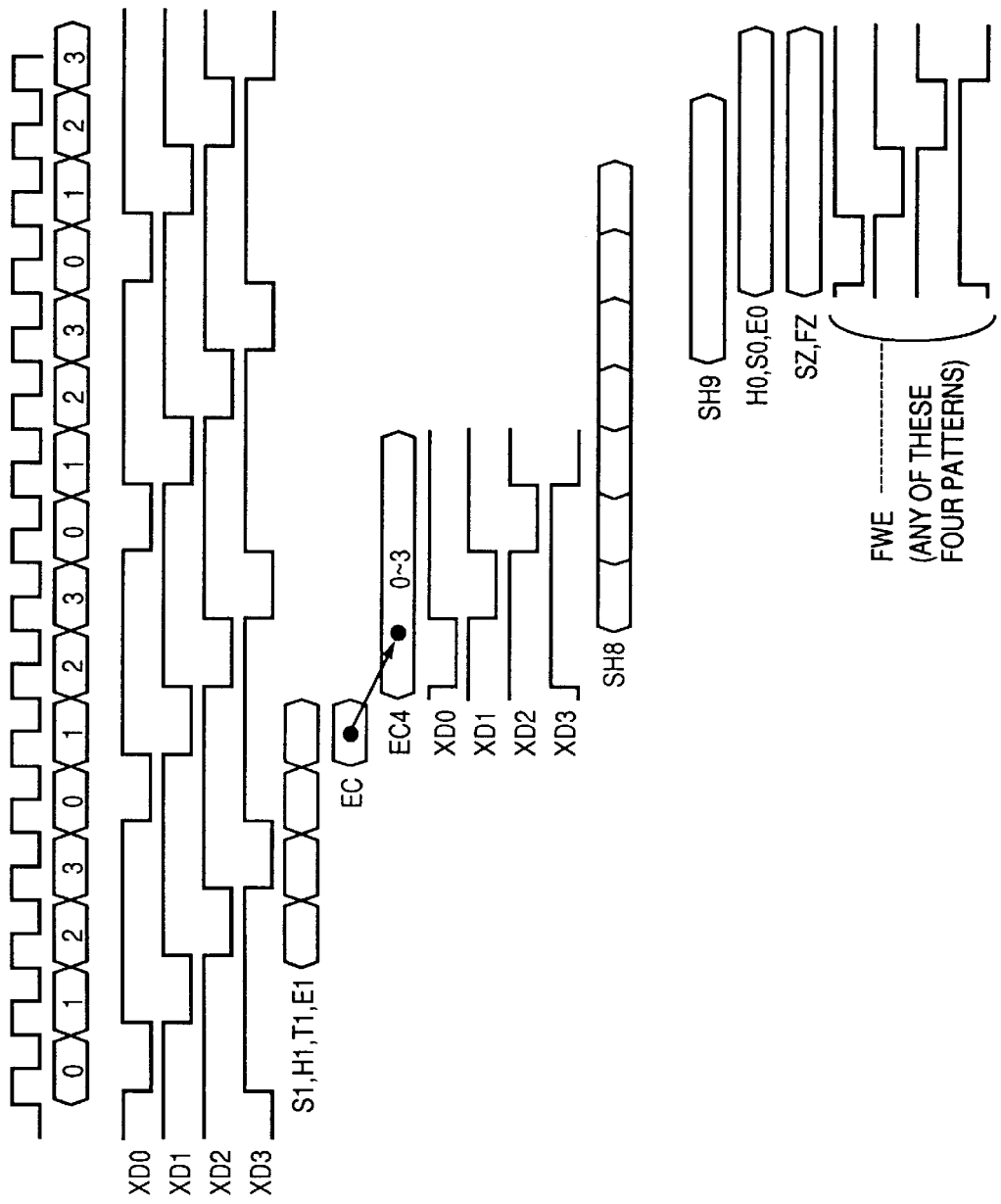
FIG. 40 is a timing chart showing the operation of the selector 706.

FIGS. 37 to 39 are block diagrams showing the detailed construction of the selector 706 in FIG. 7. FIG. 40 is a timing chart showing the operation of the selector 706.

FIG. 37 shows the graphic judgment signal S1, the uniform density judgment signal H1, the density discontinuation judgment signal T1 and the edge judgment signal E1 processed by the post-processor 706. Numerals 4901 to 4904 denote flip-flops; 4905, a 2to1 selector (with calculation logic 4905-1); 4906, a flip-flop; 4907, an encoder (with calculation logic 4908); 4909, a 2 to 1 selector (also with calculation logic 4905-1); and 4910, a flip-flop.

The encoder 4907 inputs the S1, H1, T1 and E1 signals in four continuous pixels arranged as shown in FIG. 37. That is, within the 16-bit X-input, bit15 (MSB) to bit12 indicate the S1 signal for graphic density portions in the four continuous pixels; bit11 to bit8, the H1 signal for uniform density portions in the continuous four pixels; bit7 to bit4, the T1 signal for density discontinuation portions in the four continuous pixels; and bit3 to bit0 (LSB), the E1 signal for edge portions in the four continuous pixels. Then, an encoded EC signal is outputted.

The encoder 4907 performs coding based on calculation logic 4908 in FIG. 37:

(1) first, if the Si signal is indicative of "1" in the four pixels, a coordinate value (0–3) that first becomes "1" is outputted;

(2) if the S1 signal is all indicative of "0" in the four pixels, and the H1 signal is indicative of "1" in the four pixels, a coordinate value (0–3) that first becomes "1" is outputted;

(3) if the S1 and H1 signals are all indicative of "0" in the four pixels, and the T1 signal is indicative "1" in the four pixels, a coordinate value (0–3) that first becomes "1" is outputted;

(4) if the S1, H1 and T1 signals are all indicative of "0" in the four pixels, and the E1 signal is indicative of "1" in the four pixels, a coordinate value (0–3) that first becomes "1" is outputted; and (5) if the S1, H1, T1 and E1 signals are all indicative of "0" in the four pixels, a value "0" is outputted.

The EC signal outputted from the encoder 4907 is inputted into the A-input terminal of the 2to1 selector 4909 which performs selection based on operation logic 4905-1 in FIG. 37. The flip-flop 4910 feeds back the output Y from the selector 4909 as an EC4 signal into the B-input terminal of the selector 4909. Further, the XD1 signal (as shown in FIG. 4, a signal indicative of "0" only when the 4-pixel period XPHS signal is indicative of "1") is inputted into the control-input S terminal of the selector 4909. The flip-flop 4910 latches the EC4 signal during a four-pixels period when the XD1 signal is "0".

Numeral 4911 denotes a 4to1 selector (with calculation logic 4911-1), where the EC4 signal is inputted into the control-input S terminal, and the XD2, XD3, XD0 and XD1 signals are inputted into the respective A, B, C and D-input terminals.

On the other hand, the output from the flip-flop 4904 is inputted into the A-input terminal of the selector 4905. The output from the selector 4911 is inputted into the control-input S terminal of the selector 4905. The flip-flop 4906 feeds back the Y-output from the selector 4905 as an SH8 signal into the B-input terminal of the selector 4905. As a result, the flip-flop 4906 latches a SH4 signal corresponding to the 0 to 3 coordinate value outputted from the encoder 4907 during a four-pixel period.

Numeral 4912 denotes a 2to1 selector (with operation logic 4905-1); 4913, a flip-flop; 4914, a 2to1 selector (with operation logic 4905-1); 4915 to 4921, flip-flops; and 4922, an OR gate.

The selector 706 having the above construction performs sampling on the 400 dpi signals S1, H1, T1 and E1 in four continuous pixels at a ¼ rate (100 dpi), and obtains 100 dpi signals S0, H0, T0 and E0. At this time, the selector 706 does not perform mere sampling, but performs sampling by selecting coordinates where the input signal indicates a value "1".

Further, if the YD3 signal is indicative of "0", an FWE signal indicating sampling positions is outputted in synchronization with the respective S0, H0, T0 and E0 signals.

FIG. 40 shows the operation of the selector 706.

The output signals S0, H0, T0 and E0 are inputted into circuits as shown in FIGS. 38 and 39. In FIG. 38, numerals 5001 to 5008 denote 2to1 selectors comprising an AND gate, a NOR gate and an inverter; and FZSEL0 and FZSEL1, values pre-set by the coefficient setting circuit 101.

In FIG. 39, numerals 5009 to 5016 denote 2to1 selectors; and SZSEL, a value pre-set by the coefficient setting circuit 101.

As will be described later, the present embodiment makes judgment of existence/absence of plural types of specific originals at once, and further, selectively extracts necessary feature information by specific original, i.e., selects the most appropriate feature information in accordance with the type of specific original.

The selection control is made in accordance with the values FZSEL0, FZSEL1 and SZSEL by the circuits in FIGS. 38 and 39. A first feature portion signal FZ and a second feature portion signal SZ are transferred as feature signals used for judgment. In the present embodiment, regarding the FZ signal as the output signal from the selector 706, judgment (1) a uniform density portion, (2) a density discontinuation portion, (3) a uniform or density discontinuation portion may be selected. Regarding the SZ signal, judgment (1) a graphic portion or (2) an edge portion may be selected. The FZ and SZ signals are 8-bit signals where each bit is used for simultaneous judgment based on the eight judging conditions.

<Reduction Circuit 106>

Figure 41:
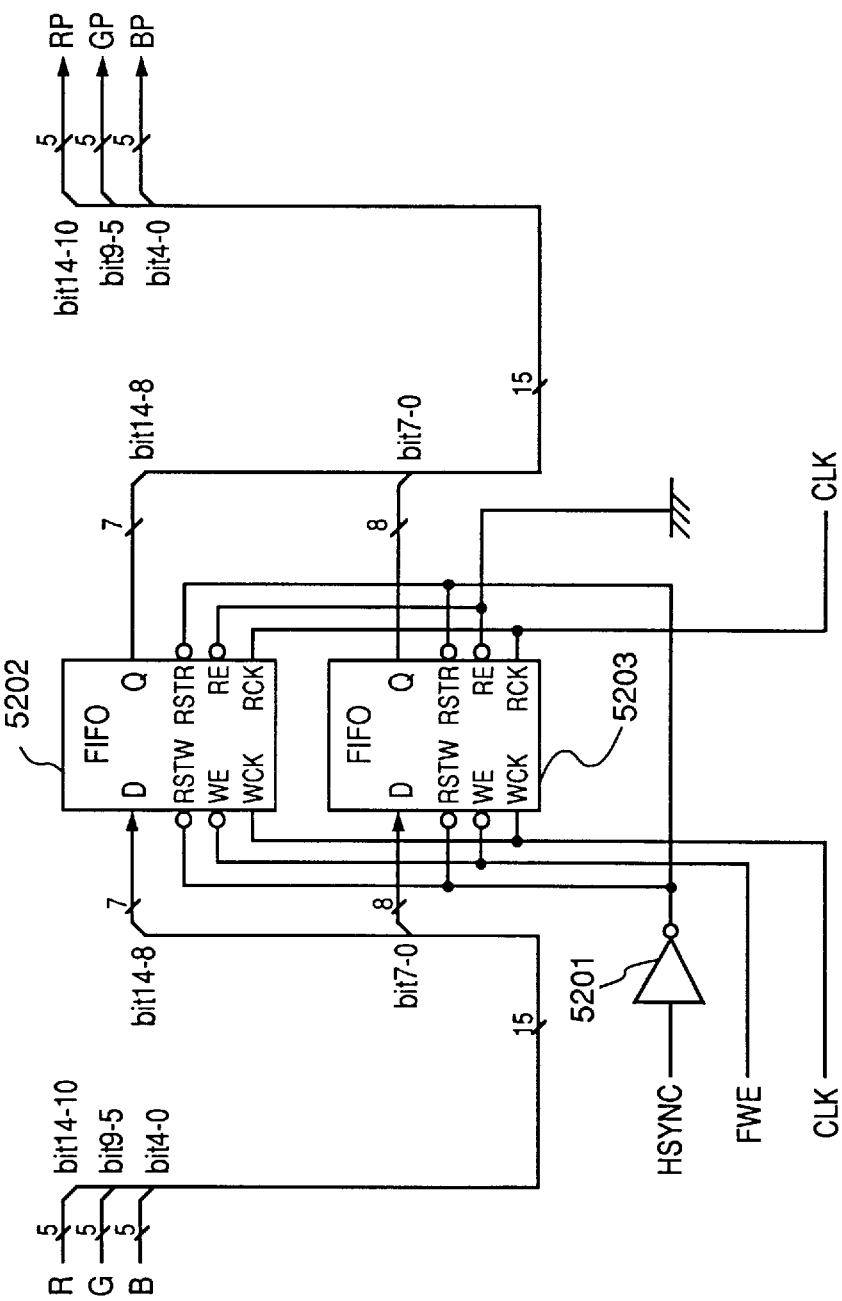
FIG. 41 is a block diagram showing the detailed construction of a reduction circuit 106 in FIG. 5.
Figure 42:
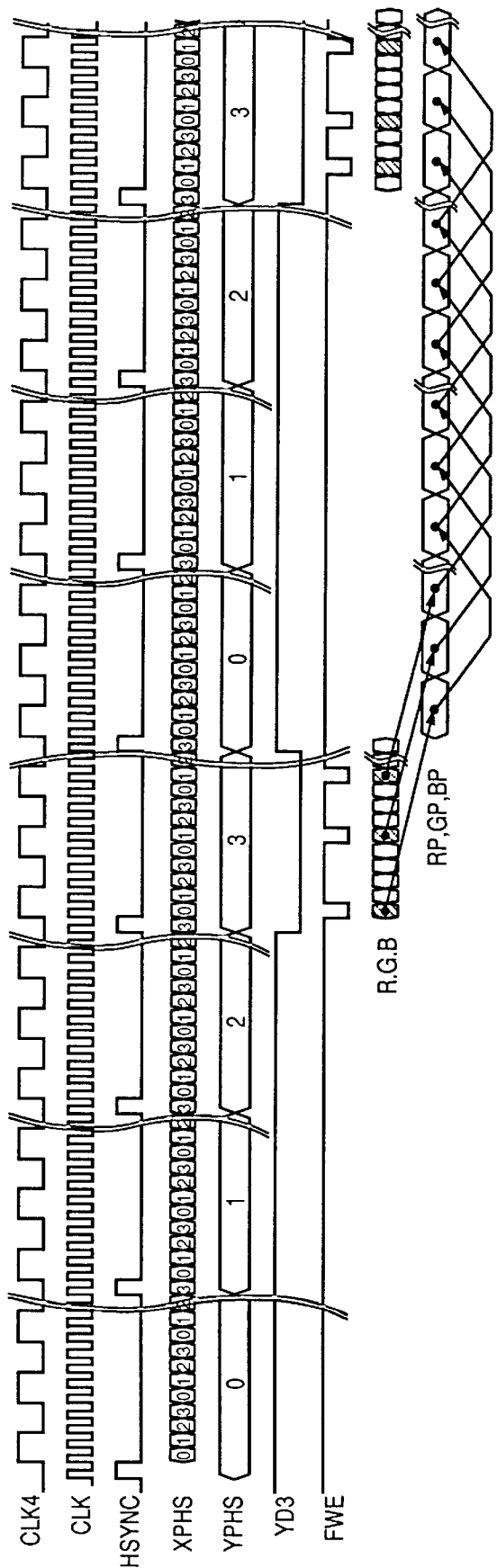
FIG. 42 is a timing chart showing the operation timing of the reduction circuit 106.

FIG. 41 is a block diagram showing the detailed construction of the reduction circuit 106 in FIG. 5. FIG. 42 is a timing chart showing the operation timing of the reduction circuit 106. In FIG. 41, numeral 5201 denotes an inverter; and 5202 and 5203, FIFO memories (e.g., M66251 memory by Mitsubishi Electric Corporation).

The reduction circuit 106 performs sampling on 400 dpi R, G and B signals (respective upper five bits) into 100 dpi signals. As shown in FIG. 42, if the YPHS signal value that repeatedly changes from "0" to "3" by one line in the subscanning direction is "3" (i.e., the YD3 signal value is "0"), the R, G and B signals are written into the FIFO memories 5202 and 5203. That is, the signals are written at every fourth line.

The R, G and B signals are written only when the FWE signal value is "0". As the data to be written is sampled at the 1/4 rate, the signal CLK4 is used as a reading clock signal from the FIFO memories 5202 and 5203.

The reduction circuit 106 having the above construction does not perform mere sampling, but performs sampling with maintaining feature pixels, thus obtains sampled R, G and B (RP, GP and BP) signals.

<Smoothing Circuit 105>

Figure 43:
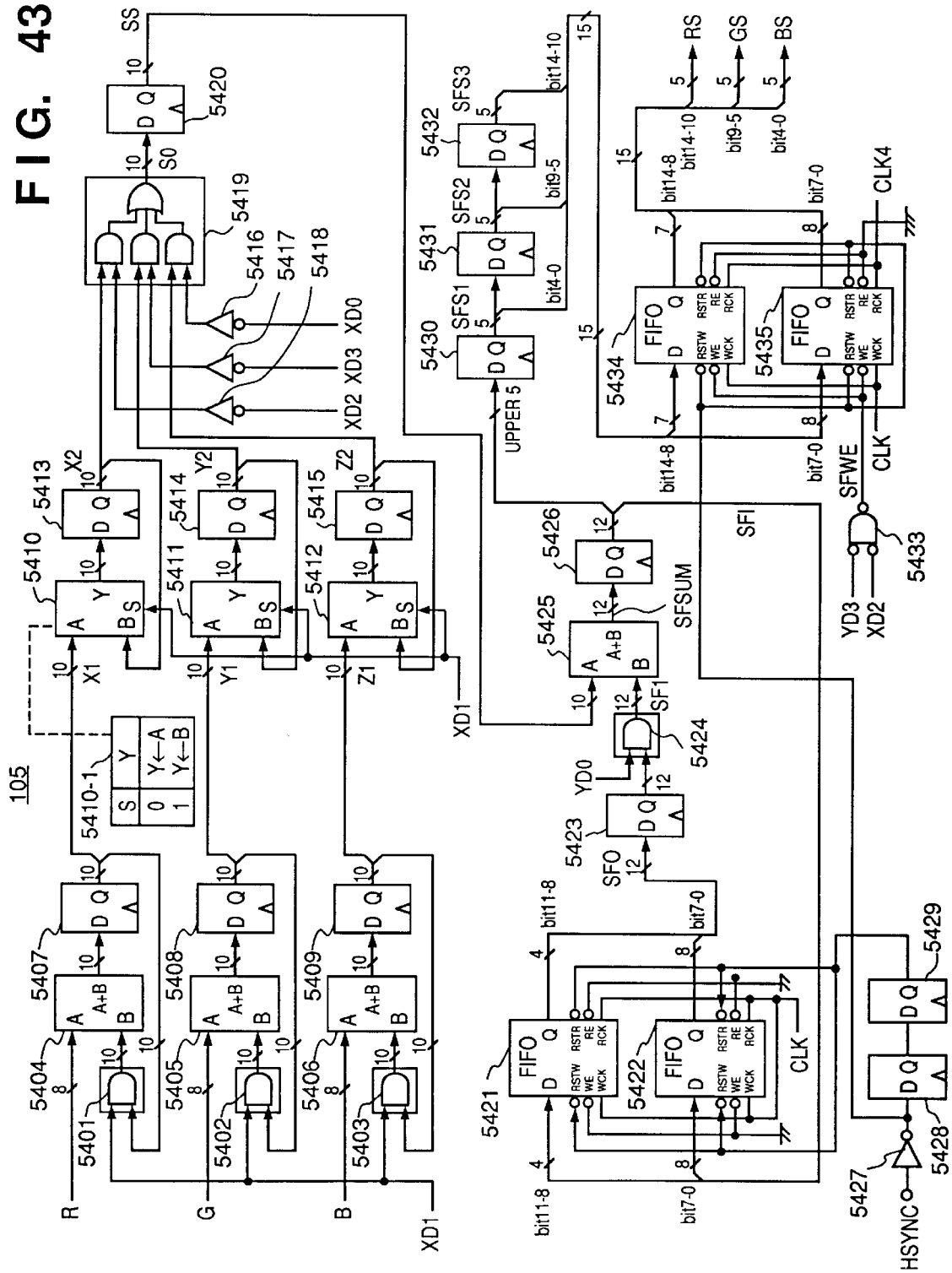
FIG. 43 is a block diagram showing the detailed construction of a smoothing circuit 105 in FIG. 5.
Figure 44:
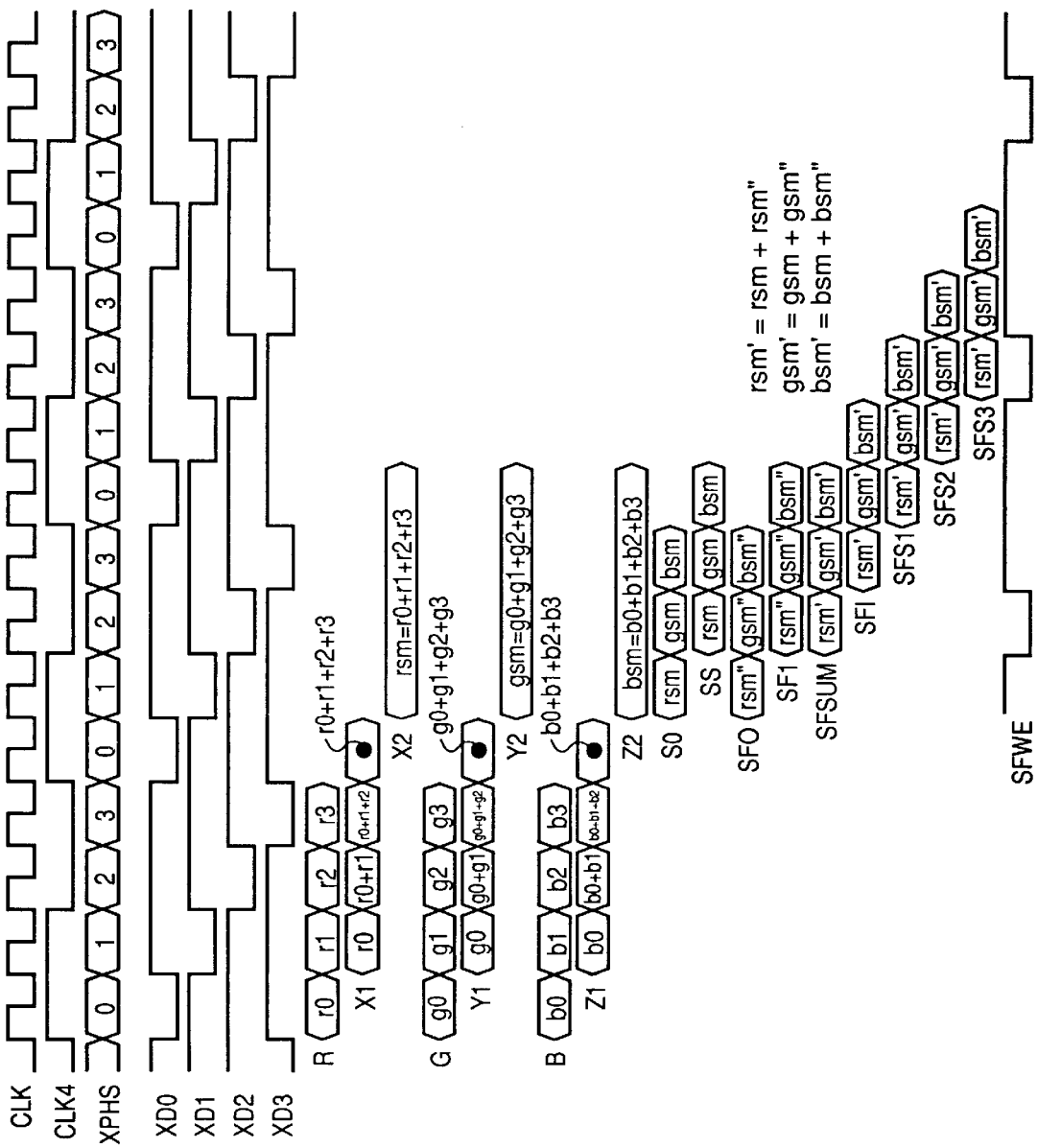
FIGS. 44 and 45 are timing charts showing the operation timing of the smoothing circuit 105.
Figure 45:
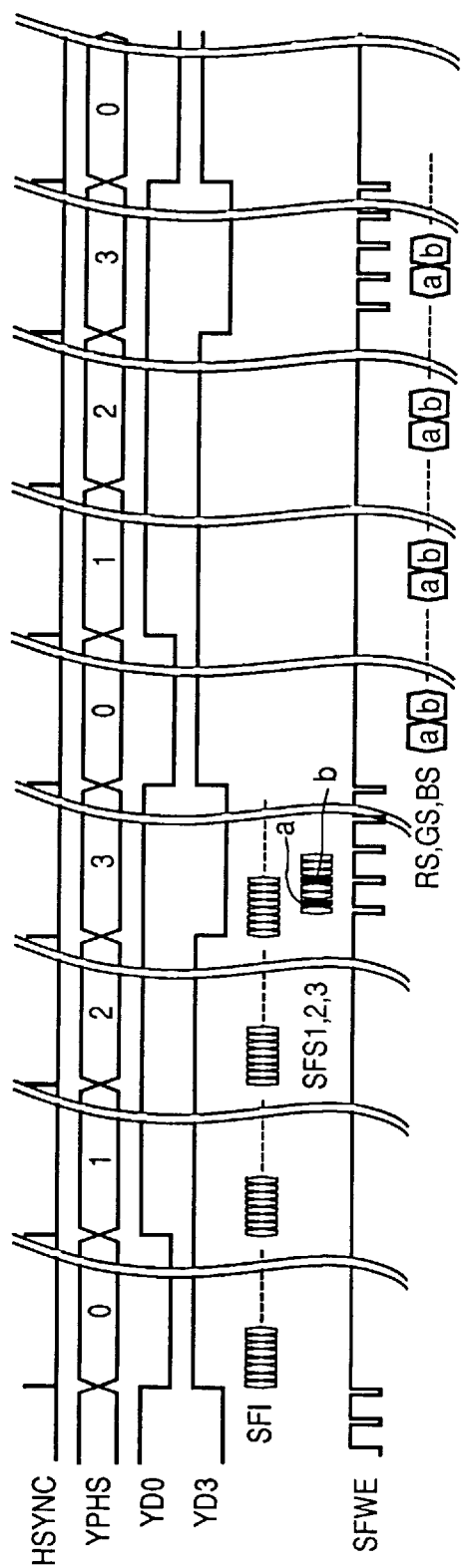

FIG. 43 is a block diagram showing the detailed construction of the smoothing circuit 105 in FIG. 5. FIGS. 44 and 45 are timing charts showing the operation timing of the smoothing circuit 105. The smoothing circuit 105 performs smoothing by obtaining the average value from adding the 400 dpi R, G and B signals at the 4×4 pixel block (501 in FIG. 4) unit.

In FIG. 43, numerals 5401 to 5403 denote AND gates; 5404 to 5406, adders; 5407 to 5409, flip-flops; 5410 to 5412, 2to1 selectors (with operation logic 5410-1); 5413 to 5415, flip-flops; 5416 to 5418, inverters; 5419, a 3to1 multiplexer; and 5420, a flip-flop.

Numerals 5421 and 5422, FIFO memories (e.g., M66251 memory by Mitsubishi Electric Corporation); 5423, a flip-flop; 5424, an AND gate; 5425, an adder; 5426, a flip-flop; 5427, an inverter; 5428 to 5432, flip-flops; 5433, an OR gate; and 5434 and 5435, FIFO memories (e.g., M66251 memory by Mitsubishi Electric Corporation).

As shown in the timing chart of FIG. 44, the value of the output X1 of the flip-flop 5407 is obtained from cumulatively adding input R signals by the adder 5404. As the B-input of the adder 5404 is obtained from cumulative addition by four pixels since the value becomes "0" once per four pixels (when XD1="0", i.e., the XPHS signal value is "1").

That is, assuming that
(1) the input value of the R signal is "r0" when the XPHS signal value is "0";
(2) the input value of the R signal is "r1" when the XPHS signal value is "1";
(3) the input value of the R signal is "r2" when the XPHS signal value is "2"; and
(4) the input value of the R signal is "r3" when the XPHS signal value is "3",
delayed from these signals by one CLK signal,
(5) the X1 signal value is "r0" when the XPHS signal value is "1";
(6) the X1 signal value is "r0+r1" when the XPHS signal value is "2";
(7) the X1 signal value is "r0+r1+r2" when the XPHS signal value is "3"; and
(8) the X1 signal value is "r0+r1+r2+r3" when the XPHS signal value is "0".

The flip-flop 5413 latches this value (rsm=r0+r1+r2+r3 in FIG. 44) for four CLK signals and outputs an X2 signal. The value rsm=r0+r1+r2+r3 corresponds to the sum of R signals for the main-scanning directional four continuous pixels.

Similarly, the flip-flop 5414 latches the sum of G signals (gsm=g0+g1+g2+g3) for the main-scanning directional four continuous pixels for four CLK signals and outputs a Y2 signal; the flip-flop 5415 latches the sum of B signals (bsm=b0+b1+b2+b3) for the main-scanning directional four continuous pixels for four CLK signals and outputs a Z2 signal.

Further, flip-flop 5420 outputs, via the 3 to 1 mutliplexer 5419, the SS signal, time-divisionally having the rsm, gsm and bsm values as shown in FIG. 44.

The SS signal is inputted into the A-input terminal of the adder 5425. The output from the adder 5425 is inputted, via the flip-flop 5426, the FIFO memories 5421 and 5422, the flip-flop 5423 and the AND gate 5424, into the B-input terminal of the adder 5425. As the FIFO memories 5421 and 5422 perform 2 pixels/line delay, after delay by the flip-flops 5423 and 5426, the delay amount corresponds to one line. Thus, the adder 5425 performs cumulative addition on the respective color components included in the SS signal.

When the YD0 signal value becomes "0" at every fourth line (i.e., the YPHS signal value is "0"), the AND gate 5424 output value becomes "0". Accordingly, the adder 5424 obtains a cumulatively-added value every four lines. As described above, as the SS signal is the sum of the input R, G and B signals in the main-scanning four pixels, the sum within the 4×4 pixel block (4 pixels in the main-scanning direction×4 pixels in the subscanning direction) are outputted as an SFSUM signal (the output from the adder 5425) and an SFI signal (the output from the flip-flop 5426).

Further, the flip-flops 5430 to 5432 converts the upper 5 bits of the SFI signal into SFS1 to SFS3 signals in synchronization with the CLK signal. As the SS signal is sequentially and time-divisionally outputted as the sums of the R, G and B signal values, these SFI and SFS1 to SFS3 signals are also sequentially and time-divisionally outputted as the sums of the R, C and B signals values.

As shown in FIG. 44, when the XPHS signal value is "2", the SFS1 signal has the sum of B-input values, bsm'; the SFS2 signal, the sum of G-input values, gsm'; and the SFS3 signal, the sum of R-input values, rsm'.

These values are written into the FIFO memories 5434 and 5435 when the XPHS signal value is "2". That is, when the XD2 signal value is "2" and the YD3 signal value is "0", the SFWE signal value is "0", and writing into the FIFO memories 5434 and 5435 is allowed.

More specifically, as shown in FIG. 45, the YPHS signal value becomes "3" at every fourth line, and the YD3 signal value becomes "0". The XD2 signal value becomes "0" at every fourth pixel. Only when the YD3 and XD2 signal values are "0", the SFWE signal value becomes "0", otherwise, becomes "1". When the SFWE signal value is "0", the SFS1 to SFS3 signals are written into the FIFO memories 5434 and 5435. The reading from the FIFO memories 5434 and 5435 is made in synchronization with the CLK4 having a period quadruple of the CLK period, and during a period for four lines, the same value is repeatedly outputted.

As a result, RS, GS and BS signals from the smoothing circuit 105 are smoothed signals obtained from adding the R, G and B signal values within the 4×4 pixel block to take the average value.

<Total Judgment Circuit 110>

Figure 46:
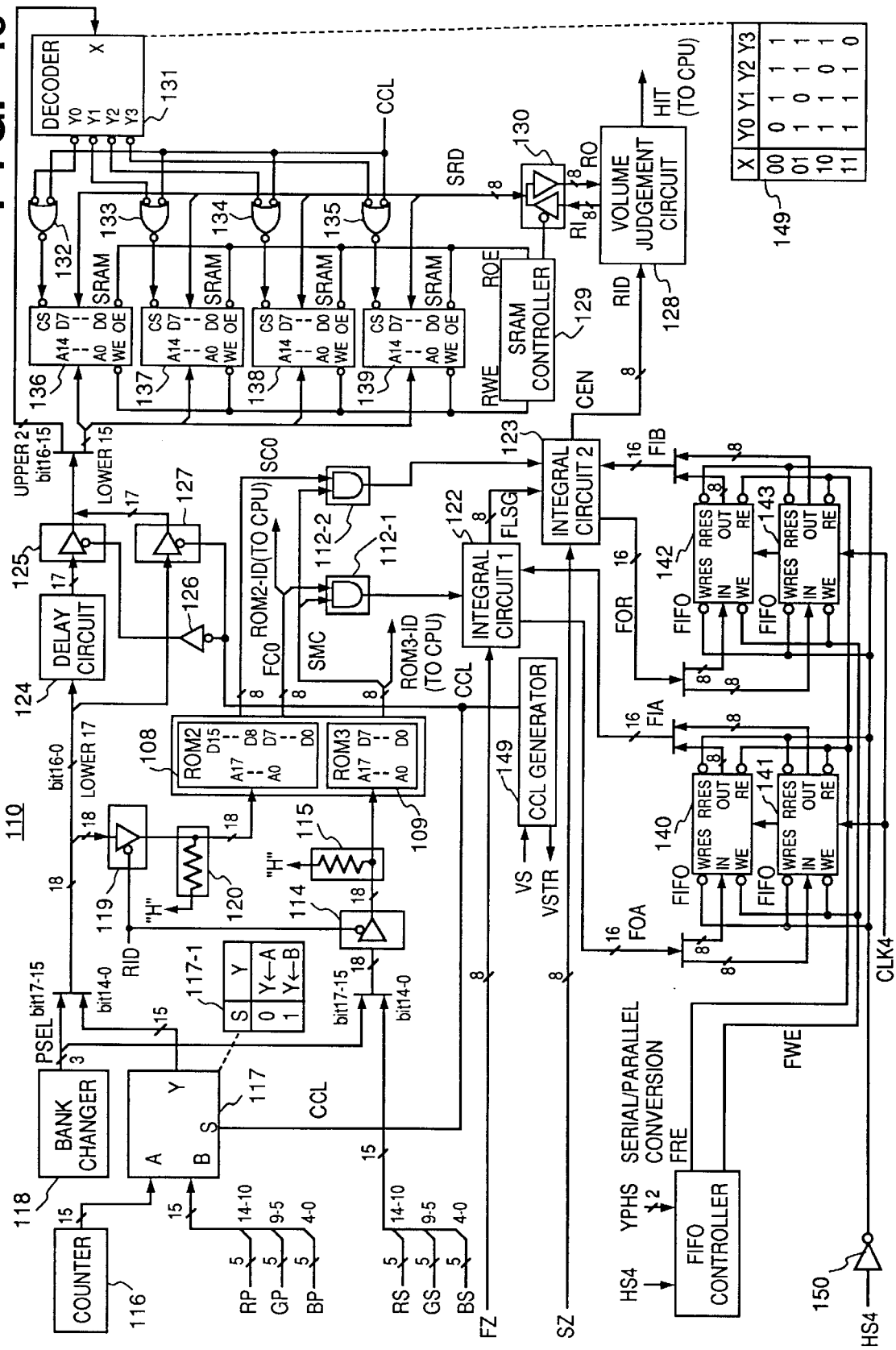
FIG. 46 is a block diagram showing the detailed construction of a general judgment circuit 110 in FIG. 5.

FIG. 46 is a block diagram showing the detailed construction of the total judgment circuit 110 in FIG. 5. In FIG. 46, numeral 108 denotes a tonality matching ROM (hereinafter referred to as "ROM2"), realized by a 256K×16 bits ROM (e.g., M5M27C402K ROM by Mitsubishi Electric Corporation), for judging whether or not the tonality of a read signal is close to that of the specific original; 109, a smoothed tonality matching ROM (hereinafter referred to as "ROM3"), realized by a 256K×8 bits ROM (e.g., M5M27C201K ROM by Mitsubishi Electric Corporation), for judging whether or not the smoothed tonality of the read signal is close to the tonality of the specific original; and 150, an inverter for logically inverting the HS4 signal.

Figure 47:
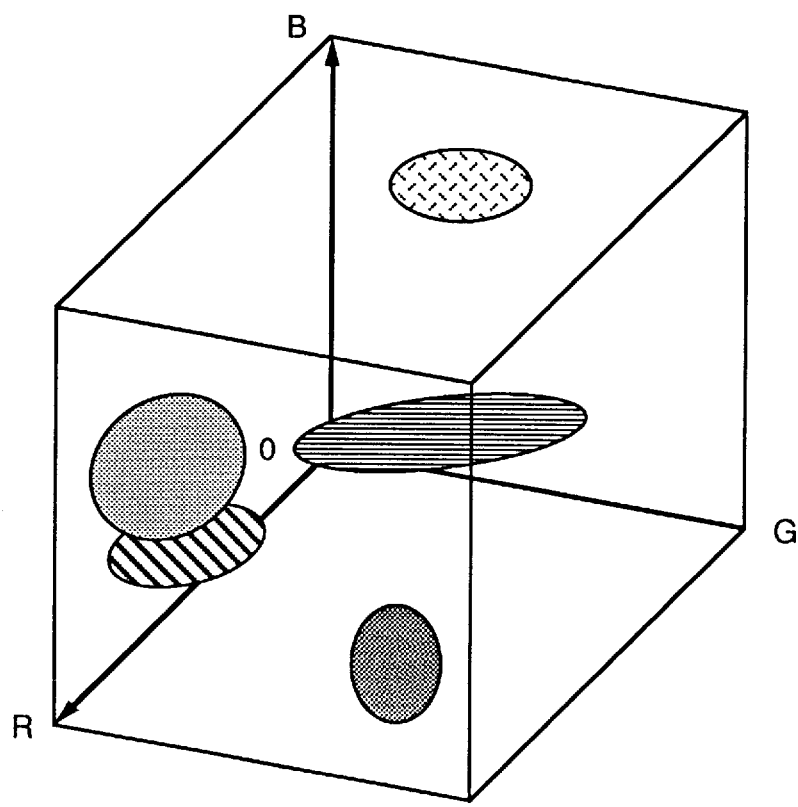
FIG. 47 is an example of tonality distribution showing a graphic portion of a specific original in RGB space.
Figure 48:
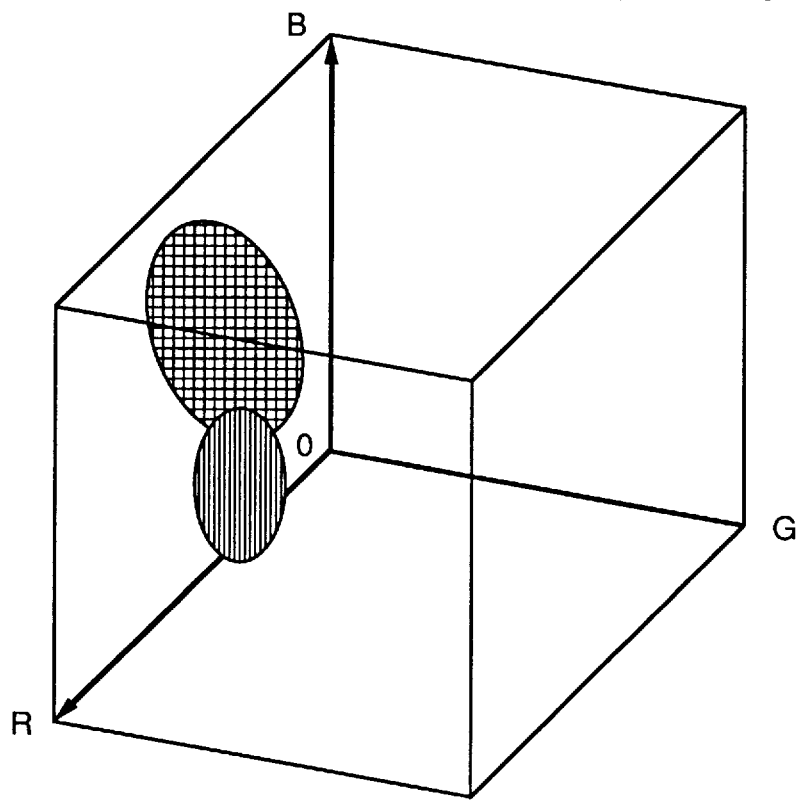
FIG. 48 is an example of tonality distribution showing a uniform density portion of a specific original in the RGB space.

FIG. 47 shows the tonality distribution of a graphic portion of the specific original (first feature portion) in RGB space, and FIG. 48 shows the tonality distribution of a uniform density portion of the specific original (second feature portion) in RGB space. The graphic portion and the uniform density portion respectively show particular distributions. Similarly, an edge portion and a density discontinuation portion of the specific original respectively show particular distributions (not shown). The tonality information on the first and second feature portions based on thirty-two judging conditions are stored in the ROM2 (108) in advance, and whether or not an input image has these tonality features is determined. Similarly, the RGB space distributions of the tonality of the smoothed specific originals are stored in the ROM3 (109) in advance.

Next, the construction and operation of the general judgment circuit 110 will be described below.

The RP, GP and BP signals from the sampling circuit 106 in FIG. 5 are inputted via a selector 117 and a tristate gate 119 into the lower address fifteen bits of the ROM2 (108).

The data output of the ROM2 is 16-bit output, in which the lower eight bits (D0 to D7) are outputted as an judgment signal FC0 indicating whether or not the tonality of the first feature portion coincides with that of a read image signal, and the upper eight bits (D8 to D15) are outputted as an judgment signal SC0 indicating whether or not the tonality of the second feature portion coincides with that of the read image signal.

Further, the RS, GS and BS signals from the smoothing circuit 105 in FIG. 5 are inputted via a tristate gate 114 into the lower address fifteen bits of the ROM3 (109). An SMC signal outputted from the ROM3 (109) is indicative of whether or not the smoothed tonality of the specific original based on some eight judging conditions coincides with the smoothed tonality of the read image signal.

Further, an AND gate 112-1 outputs the logical product between the SMC signal and the FC0 signal as an FC signal. The FC signal value becomes "1" if the tonality of the first feature portion of the specific original based on some eight judging conditions coincides with that of a read image signal, and the smoothed tonality of the specific original coincides with the smoothed tonality of the read image signal.

Further, and AND gate 112-2 outputs the logical product between the SMC signal and the SC0 signal as an SC signal. The SC signal value becomes "1" if the tonality of the second feature portion of the specific original based on some eight judging conditions coincides with that of the read image signal, and the smoothed tonality of the specific original coincides with the smoothed tonality of the read image signal. In this manner, the coincidence of smoothed tonality is added to the judging conditions so as to improve precision in detecting the specific original.

Numeral 117 denotes a 2to1 selector which operates based on operation logic 117-1 in FIG. 46. Upon normal judgment operation, the value of a control signal CCL of the selector 117 is "1". A case where a counter 116 and the CCL signal value are "0" will be described later in connection with RAM clearing control. Further, upon the normal judgment, the value of a control signal RID of the tristate gate 119 is "0". A case where the RID signal value is "0" will be described later in connection with ID reading mode.

Figure 49:
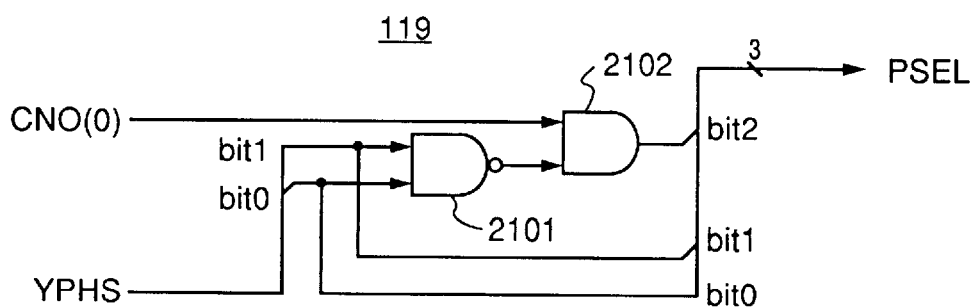
FIG. 49 is a block diagram showing the detailed construction of a bank changer 119.
Figure 50:
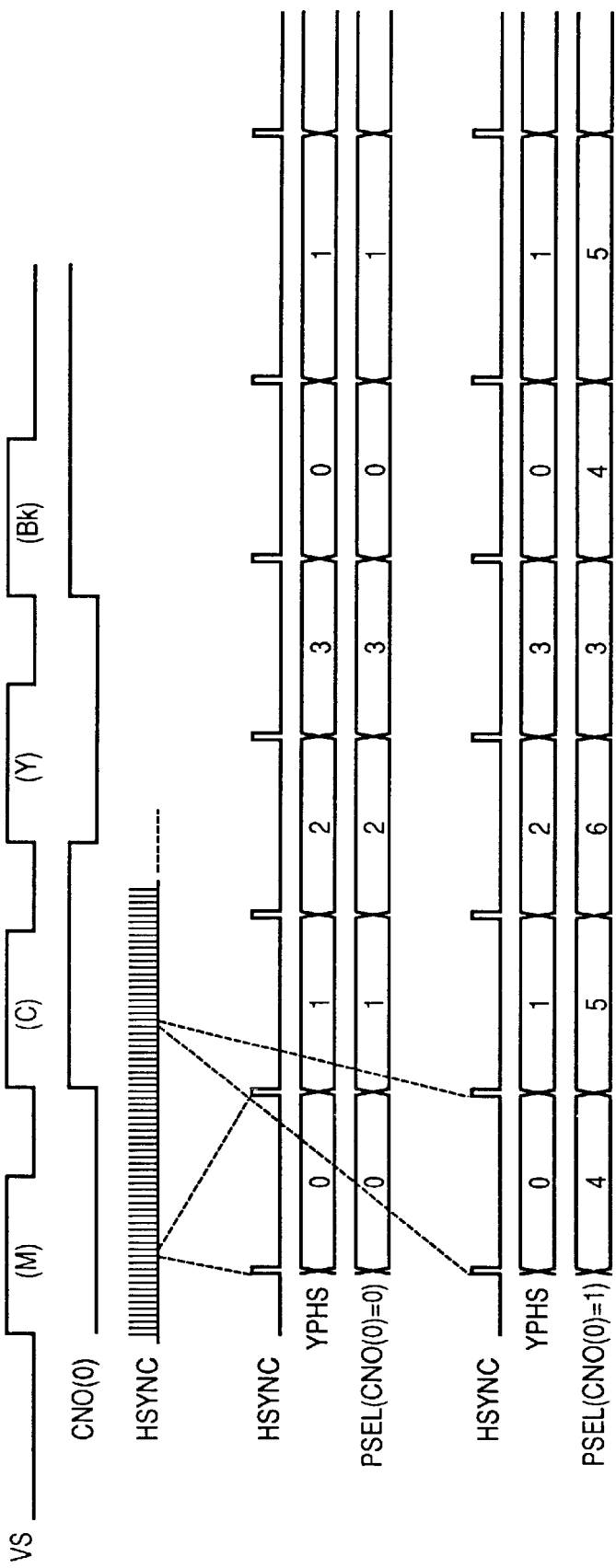
FIG. 50 is a timing chart showing the operation of the bank changer 119.

Numeral 118 denotes a bank changer which supplies a 3-bit PSEL signal as the upper three bit address signals of the ROM2 and ROM3. FIG. 49 shows the detailed construction of the bank changer 118, and FIG. 50 shows the timing chart of the operation of the bank changer.

In FIG. 49, numeral 2101 denotes an NAND gate where the 2-bit YPHS signal is inputted; 2102, an AND gate where the lower one bit (LSB) CNO (0) of the 2-bit frame-sequential signal CNO and the output from the NAND gate 2101 are inputted. The output from the AND gate 2102 is the upper one bit of the PSEL signal. Further, the YPHS signal is outputted as the lower two bit signal of the PSEL signal.

Accordingly, if the CNO (0) signal value is "0", the PSEL signal value repeatedly changes from "0" to "3" in synchronization with the rising edge of the HSYNC signal, while if the CNO (0) signal value is "1", the PSEL signal value repeatedly changes from "4", "5", "6" and "3" in synchronization with the rising edge of the HSYNC signal.

In FIG. 49, initially, the CNO (0) signal value becomes "0", "1", "0" and "1" with respect to M, C, Y and Bk development colors. Accordingly, in a case where the development colors are M and Y, the PSEL signal value repeatedly changes from "0" to "3" in synchronization with the rising edge of the HSYNC signal. In a case where the development colors are C and Bk, the PSEL signal value repeats "4", "5", "6" and "3" in synchronization with the rising edge of the HSYNC signal.

That is, in an image processing mode, addresses from 00000 to 37FFF in the ROM2 are accessed, specifically, the addresses 00000 to 1FFFF are accessed when the development colors are M and Y, and the addresses 18000 to 37FFF are accessed when the development colors are C and Bk.

In a normal image processing mode, judgment is made on the specific original based on eight judging conditions (including the tonality of an original for test, to be described later) at once, and the eight conditions are changed in accordance with the respective PSEL signal values. The judging conditions are sequentially changed in four main-scanning line units, and the judgment on the plurality of specific originals are made based on thirty-two judging conditions.

Further, the PSEL signal values are changed in accordance with the development colors. Though a part of the addresses (18000 to 1FFFF) is overlapped, the judgment on the plurality of specific originals is made based on fifty-six judging conditions. Note that the image processing mode and the ID reading mode in Table 2 will be described later.

In the present embodiment, upon assignment of these fifty-six judging conditions, the arrangement of the conditions are changed in accordance with the degree of significance (i.e., which should be first protected from being copied).

Regarding the eight judging conditions held in the addresses 18000 to 1FFFF, different from the other forty-eight conditions, these conditions are used at every M, C, Y and Bk image formation. Thus, the judgment using these conditions is most precisely made. Accordingly, these eight conditions are assigned to judgment on the most important specific original.

Regarding twenty-four conditions held in the addresses 00000 to 17FFF, judgment is made at M-image formation in the first scanning operation and at Y-image formation in the third scanning operation.

On the other hand, regarding twenty-four conditions held in the addresses 20000 to 37FFF, judgment is made at C-image formation in the second scanning operation and at Bk-image formation in the fourth scanning operation.

In comparison with these twenty-four conditions in the addresses 00000 to 17FFF and twenty-four conditions in the addresses 20000 to 37FFF, the judgment using the latter conditions (in the addresses 20000 to 37FFF) has the following drawback. That is, at Bk-image formation as the fourth image formation, there is a possibility that a part of the specific original has already been copied when the existence of the specific original is detected. On the other hand, in the judgment using the former conditions (in the addresses 00000 to 17FFF), even though the existence of the specific original is detected at M-image and Y-image formations, an output image can be blackened at the fourth Bk-image formation. Thus, the drawback occurred in the latter conditions can be solved.

Accordingly, it is apparent that the judgment using the former conditions (in addresses 00000 to 17FFF) is better to prevent copying the specific original. Therefore, the twenty-four judging conditions to be held in the addresses 00000 to 17FFF are assigned to judgment of the next important specific original. Further, the other twenty-four judging conditions are held in the addresses 20000 to 37FFF.

TABLE 2

| Address | RID | PSEL | Access Conditions | Content |
|---|---|---|---|---|
| 00000-07FFF | 0 | 0 | Image processing mode M,Y-image formation | 8 types of judging data |
| 08000-0FFFF | 0 | 1 | Image processing mode M,Y-image formation | 8 types of judging data |
| 10000-17FFF | 0 | 2 | Image processing mode M,Y-image formation | 8 types of judging data |
| 18000-1FFFF | 0 | 3 | Image processing mode MCYBk-image formation | 8 types of judging data |
| 20000-27FFF | 0 | 4 | Image processing mode C,Bk-image formation | 8 types of judging data |
| 28000-2FFFF | 0 | 5 | Image processing mode C,Bk-image formation | 8 types of judging data |
| 30000-37FFF | 0 | 6 | Image processing mode C,Bk-image formation | 8 types of judging data |
| 38000-3FFFE | — | — | unused | |
| 3FFFF | 1 | — | ID reading mode | ID of ROM |

<Integral Circuit 1>

The FC and FZ signals are transferred to an integral circuit 1 (122) as shown in FIG. 46. The integral circuit 1 (122) removes the noise of the FC signal indicative of the first feature portion of the specific original based on eight judging conditions using a two-dimensional (XY directional) IIR digital filter. The integral circuit 1 (122) inputs, from the ROM 2 (108), the FC signal indicative of whether or not the tonality of the first feature portion coincides with that of a read image signal, and outputs an FOA signal to be connected to the input terminal of the FIFO memories 140 and 141. Further, the integral circuit 1 (122) inputs an FIA signal outputted from the FIFO memories 140 and 141.

Figure 51:
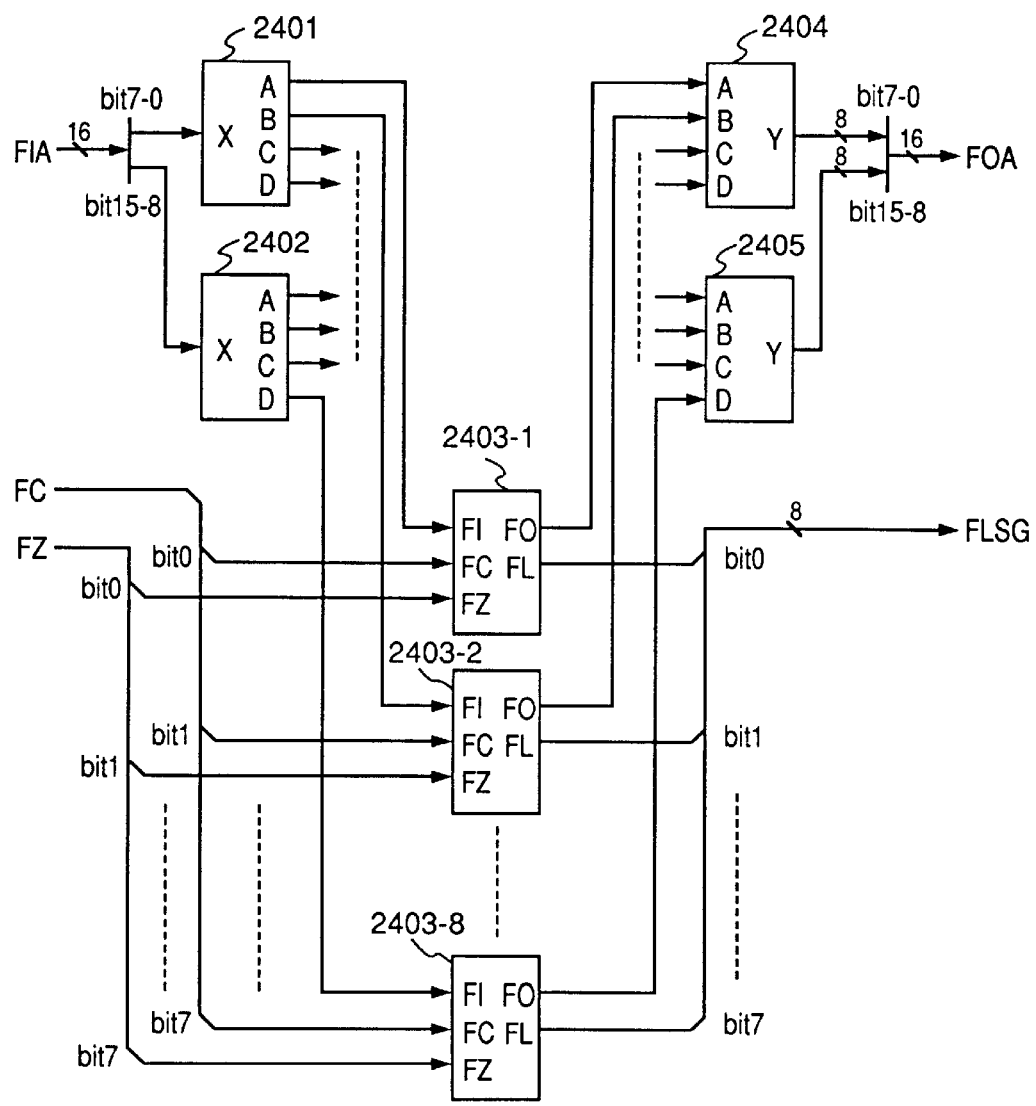
FIG. 51 is a block diagram showing the detailed construction of an integral circuit 1 (122)

FIG. 51 is a block diagram showing the detailed construction of the integral circuit 1 (122).

In FIG. 51, numerals 2401 and 2402 denote serial/parallel converters; 2403-1 to 2403-8, IIR filters as integrators; 2404 and 2405, parallel/serial converters. The serial/parallel converters 2401 and 2402 perform serial/parallel conversion on the FIA signal outputted from the FIFO memories 140 and 141.

Figure 52:
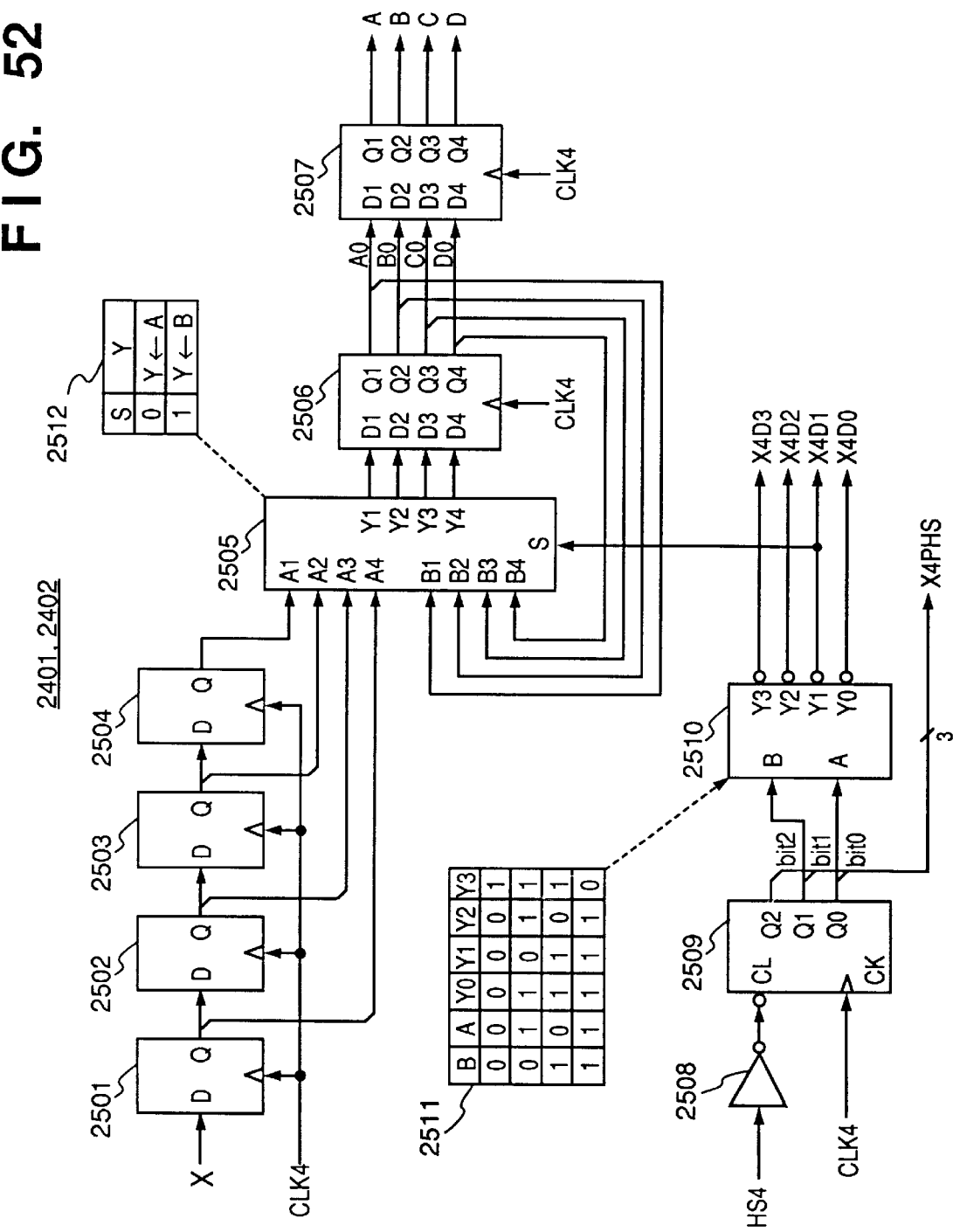
FIG. 52 is a block diagram showing the construction of serial/parallel converters 2401 and 2402.
Figure 53:
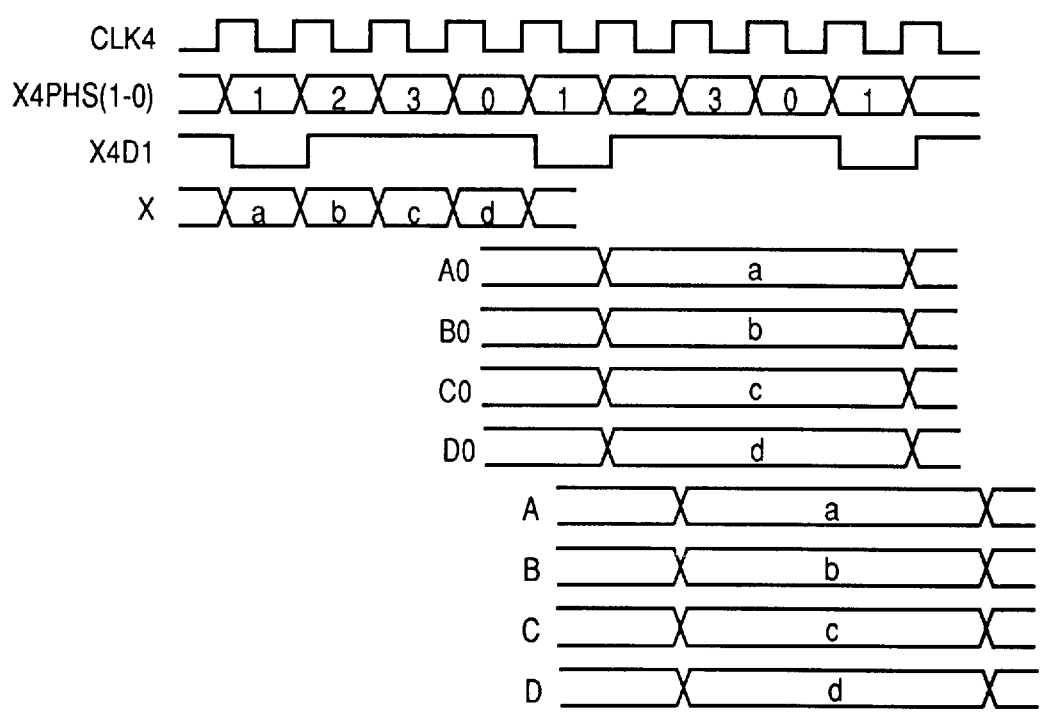
FIG. 53 is a timing chart showing the operation of the serial/parallel converters 2401 and 2402.

FIG. 52 is a block diagram showing the construction of the serial/parallel converters 2401 and 2402. FIG. 53 is a timing chart showing the operation of the converters 2401 and 2402.

In FIG. 52, numerals 2501 to 2504 denote flip-flops which latch an input signal X at the rising edge of the CLK4 signal; 2505, a 2to1 selector with operation logic 2512; and 2506 and 2507, flip-flops which latch the outputs from the selector 2505 at the rising edge of the CLK4 signal. Numeral 2508 denotes an inverter; 2509, a 3-bit counter; and 2510, a 2to4 decoder with operation logic 2511.

The signal X is inputted in synchronization with the rising edge of the CLK4 signal. The input signal X sequentially delayed by the flip-flops 2502 to 2504 is transferred to the selector 2505. On the other hand, the value of a signal X4PHS outputted from a counter 2509 repeatedly changes from "0" to "7" in synchronization with the rising edge of the CLK4 signal, and the lower two bits X4PHS (1-0) value repeatedly changes from "0" to "3". The value of a signal X4D1 outputted from the decoder 2510 becomes "0" only when the X4PHS (1-0) value is "1", and otherwise, the X4D1 signal value is "0".

Accordingly, as shown in FIG. 53, the signal X where values "a" to "d" are sequentially inputted is outputted from the flip-flop 2506 as signals A0 to D0 in parallel, and the flip-flop 2507 delays these signals by one period of the CLK4 signal and outputs the delayed signals.

The IIR filters 2403-1 to 2403-8 have the same construction, and respectively perform processing on one judging condition. Thus, processing on eight judging conditions can be attained by simultaneous processings using the eight IIR filters.

Figure 54:
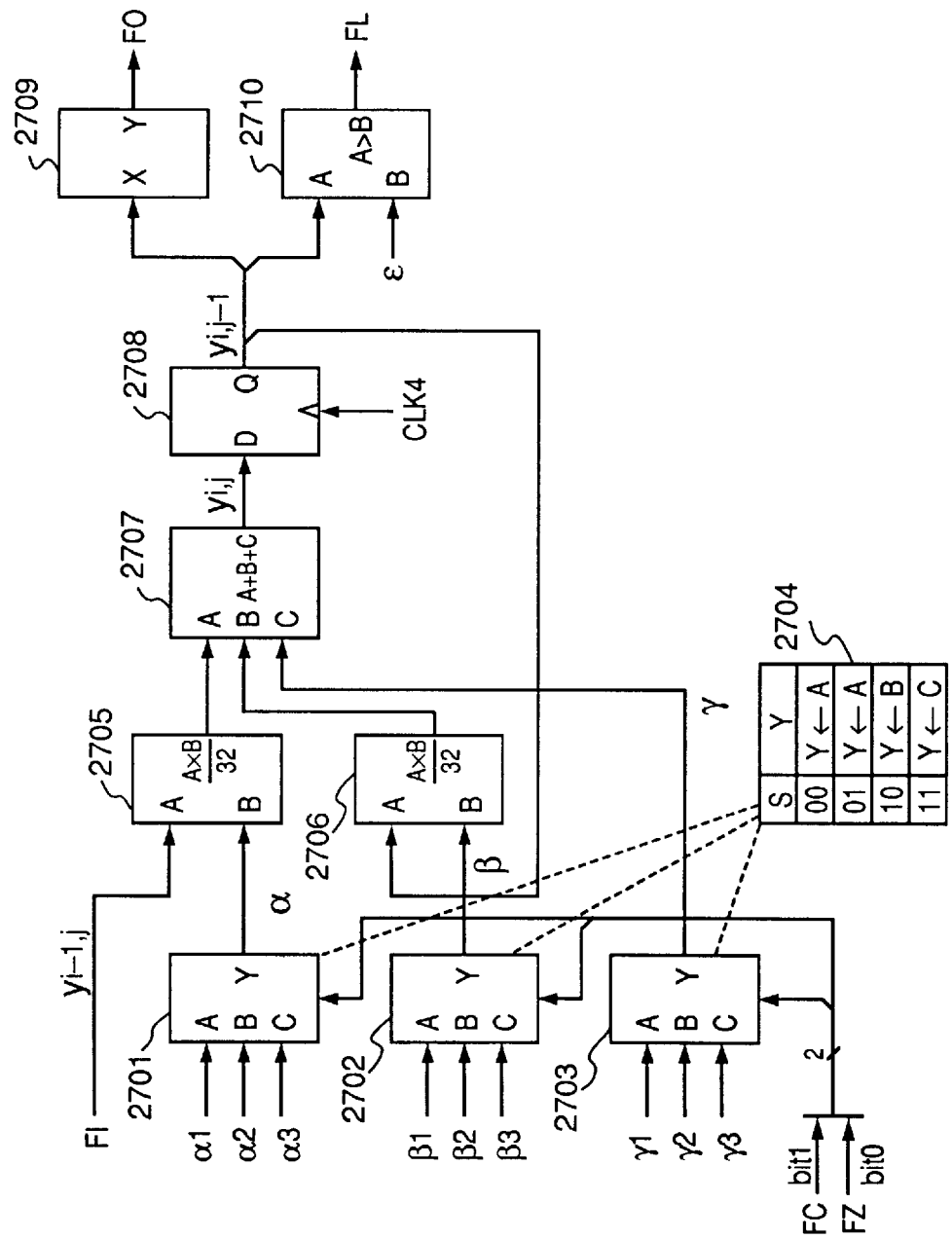
FIG. 54 is a block diagram showing the detailed construction of IIR filters in the integral circuit 1 (122)

FIG. 54 is a block diagram showing the detailed construction of the IIR filter.

In FIG. 54, numerals 2701 to 2703 denote 3to1 selectors with the operation logic 2704; 2705 and 2706, multipliers which output a product $$\left(\frac{A \times B}{32}\right)$$

with respect to the A and B inputs; 2707, an adder which outputs a sum (A+B+C) with respect to the A, B and C inputs; and 2708, a flip-flop which latches an input signal at the rising edge of the CLK4 signal and, when the output signal from the adder 2707 is $y_{i,j}$ (i: subscanning position after reduction, j: main-scanning position after reduction), outputs a signal $y_{i,j-1}$. The FIA signal transferred from the FIFO memories 140 and 141 via the serial/parallel converters 2401 and 2402 is obtained from delaying the $y_{i,j}$ signal with respect to the subscanning line, using the FIFO's and is expressed as $y_{i-1,j}$.

The signal $y_{i,j}$ is expressed by the equation:

$$y_{i,j} = \left(\frac{\alpha}{32}\right) y_{i-1,j} + \left(\frac{\beta}{32}\right) y_{i,1-j} + \gamma \qquad (21)$$

The values α1 to α3, β1 to β3, γ1 to γ3 are values pre-set by the coefficient setting circuit 101. Appropriate setting of these values leads the circuit 122 to a proper integration and noise elimination in the FC signal.

Figure 55:
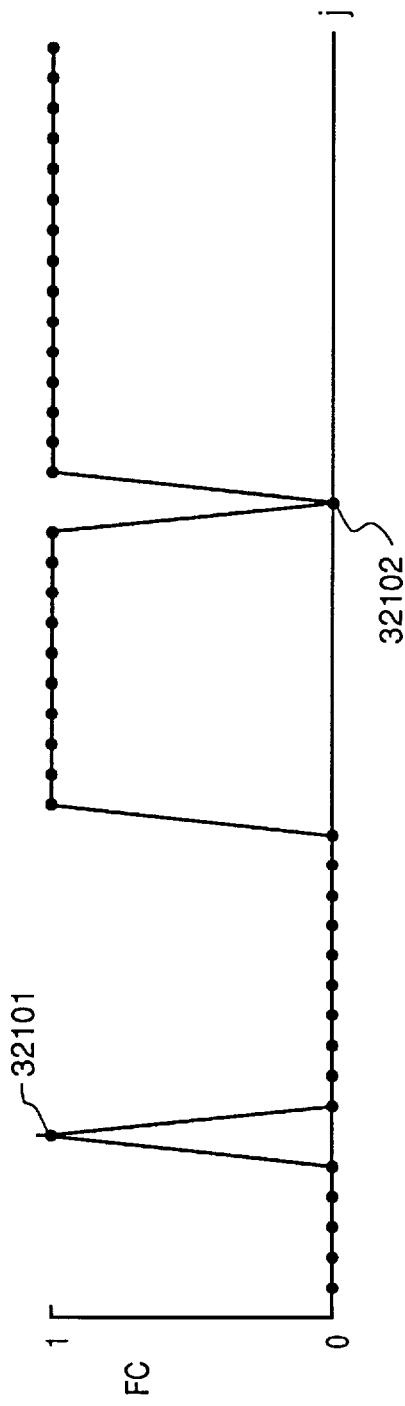
FIGS. 55 to 57 are examples showing the results from the processing by the IIR filters in FIG. 54.
Figure 56:
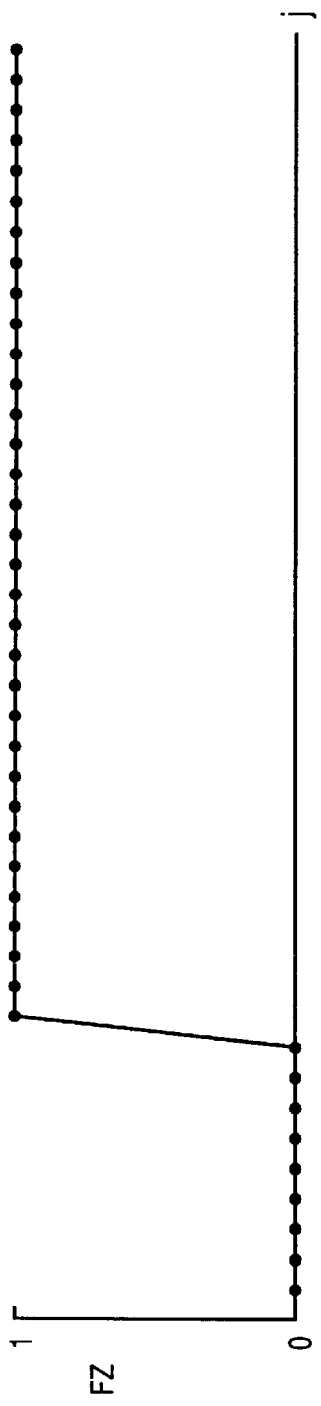
Figure 57:
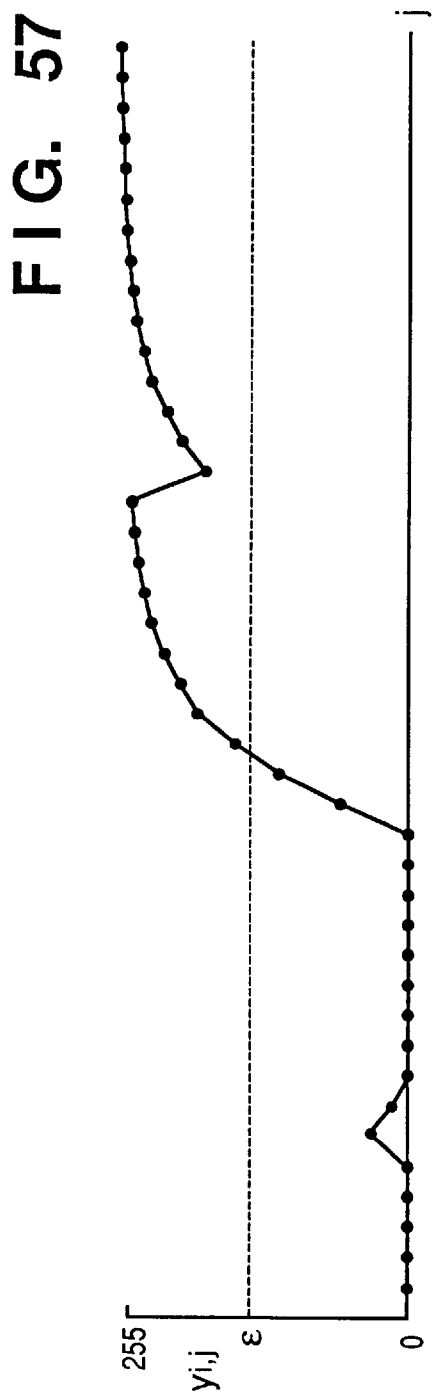

FIGS. 55 to 57 are graphs showing an example of the processing by the IIR filter (j: main-scanning position). FIG. 55 shows the FC signal (judgment signal indicating whether or not the tonality of the first feature portion of the specific original coincides with that of a read signal, by values "1" (coincidence) and "0" (not coincidence)), and FIG. 56 shows the FZ signal (judgment signal indicating whether or not the read signal is the first feature portion of the specific original, by values "1" (first feature portion) and "0" (not first feature portion)).

As shown in FIGS. 55 and 56, by setting the values α1 to α3, β1 to β3 and γ1 to γ3 appropriately, the waveform of the signal $y_{i,j}$ becomes as shown in FIG. 57. That is, in the signal $y_{i,j}$ waveform a noise components 32101 and 32102 as shown in FIG. 55 is smoothed out. The noise components 32101 and 32102 can be eliminated by binarization with a threshold value $\epsilon$.

In FIG. 54, numeral 2710 denotes a comparator which compares the output from the flip-flop 2708 and the threshold value $\epsilon$ in FIG. 57, and outputs the comparison result as an FL signal. The FL signal is a judgment signal indicating whether or not the similarity between the read image signal and the first feature portion of the specific original is high. Numeral 2709 denotes an averaging circuit which takes an average value from four data continuously outputted from the flip-flop 2708.

Figure 58:
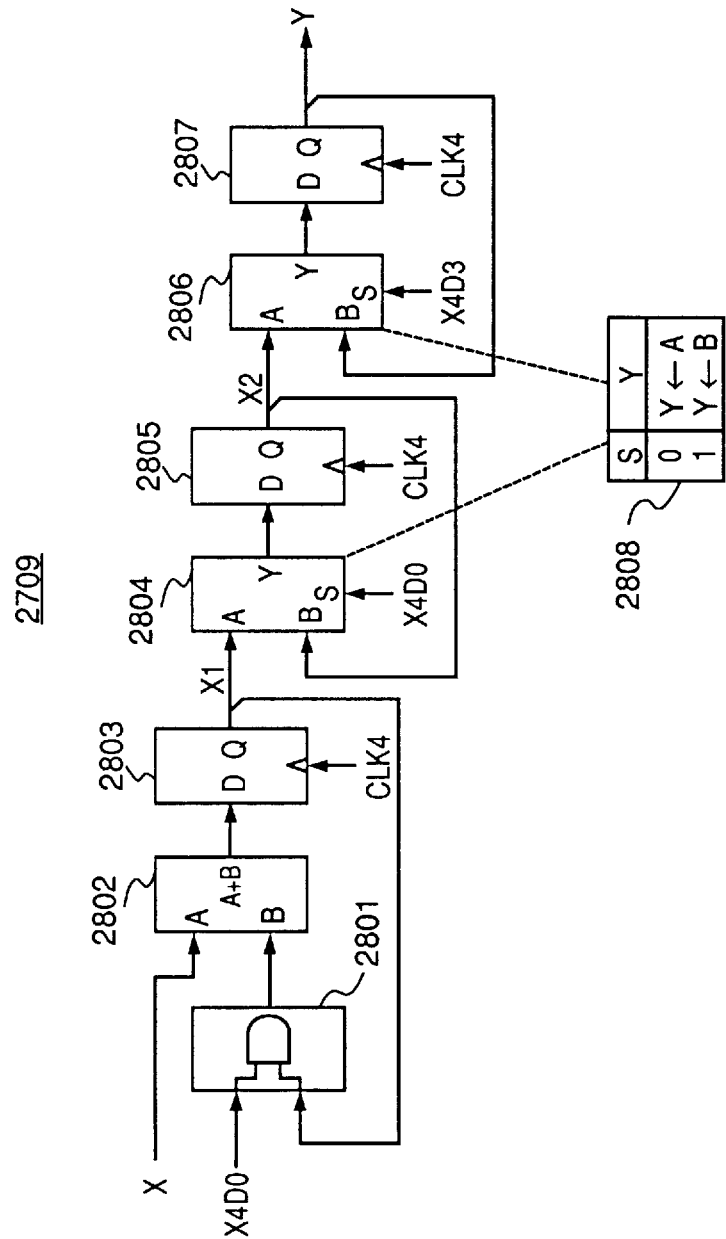
FIG. 58 is a block diagram showing the detailed construction of an averaging circuit 2709.
Figure 59:
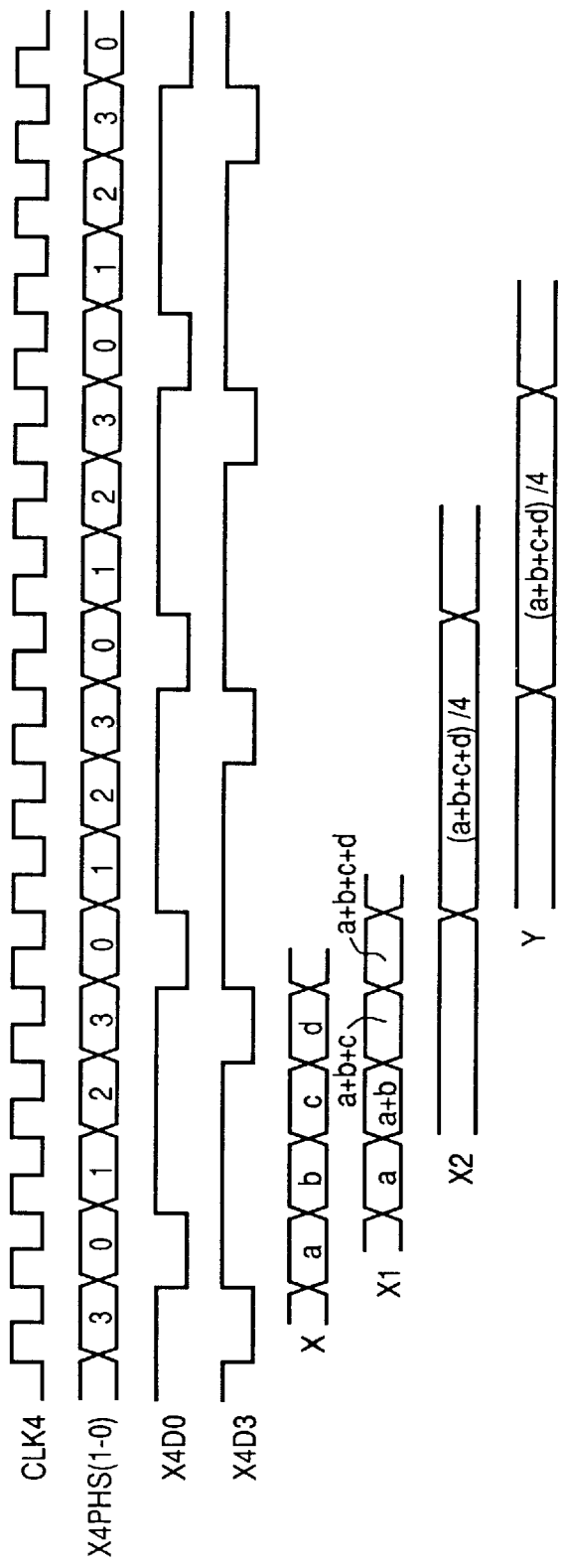
FIG. 59 is a timing chart showing the operation of the averaging circuit 2709.

FIG. 58 is a block diagram showing the detailed construction of the averaging circuit 2709 in FIG. 54. FIG. 59 is a timing chart showing the operation of the averaging circuit 2709.

In FIG. 58, numeral 2801 denotes an AND gate; 2802, an adder; 2803, a flip-flop; 2804, a 2to1 selector with operation logic 2808; 2805, a flip-flip; 2806, a 2to1 selector with operation logic 2808; and 2807, a flip-flop.

In FIG. 58, X4D0 and X4D3 signals are from the decoder 2510 in FIG. 52. The X4D0 signal value is "0" only when the X4PHS (1-0) signal value is "0", otherwise, the X4D0 signal value is "1". The X4D3 signal value is "0" only when the 4PHS (1-0) signal vale is "3", otherwise, the x4D3 signal value is "1". As shown in FIG. 59, the X4PHS (1-0) signal value changes from "0" to "3", while the input signal X value sequentially changes from "a" to "d" in correspondence with the X4PHS (1-0) signal value, then, the averaged value $$\left(\frac{a+b+c+d}{4}\right)$$

of these four values "a" to "d" is output as a Y signal.

The outputs from the integrators 2403-1 to 2403-8 are fed-back via an FIFO memory. In this manner, averaging the continuous four data and holding the averaged value in the FIFO memory results in reducing the FIFO capacity to ¼. As shown in FIG. 57, the outputs from the integrators have no high-frequency component, the outputs can be replaced with the value averaged from continuous four data without influence.

In FIG. 51, the FO signal outputted from the IIR filters 2403-1 to 2403-8 is transferred via the parallel/serial converters 2404 and 2405 as the FOA signal to the FIFO memories 140 and 141, and fed-back via the parallel/serial converters 2401 and 2402 as the FIA signal to the IIR filters 2403-1 to 2403-8.

Figure 60:
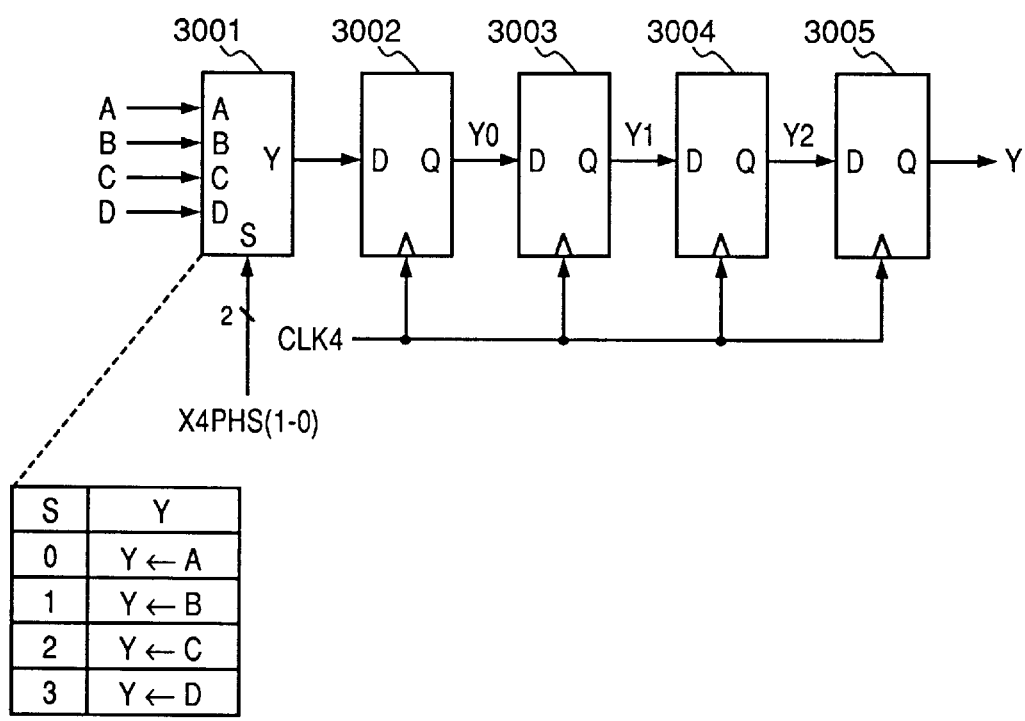
FIG. 60 is a block diagram showing the detailed construction of the parallel/serial converters 2404 and 2405.
Figure 61:
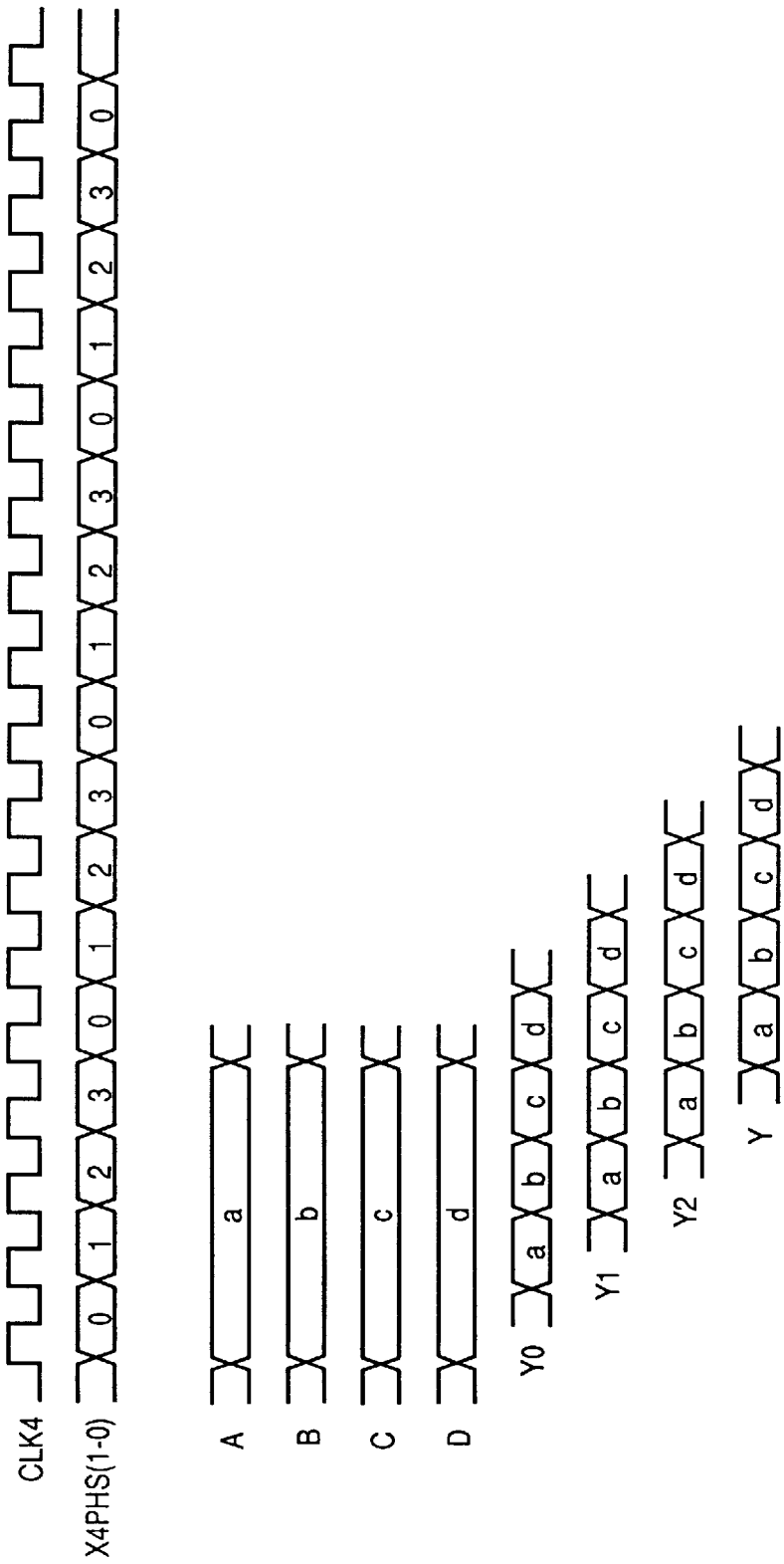
FIG. 61 is a timing chart showing the operation of the parallel/serial converters 2404 and 2405.

FIG. 60 is a block diagram showing the detailed construction of the parallel/serial converters 2404 and 2405 in FIG. 51. FIG. 61 is a timing chart showing the operation of the parallel/serial converters 2404 and 2405.

In FIG. 60, numeral 3001 denotes a 4to1 selector with operation logic 3006; and 3002 to 3005, flip-flops. As shown in FIG. 61, the values "a" to "d" inputted in parallel into the A to D-input terminals are serial-outputted as the Y signal.

In this manner, the parallel/serial converter serial-outputs the parallel input values to the FIFO memory, and, the serial/parallel converter parallel-outouts the signal from the FIFO memory. This results in reducing the number of FIFO memories and the number of input/output pins of an LSI, reducing costs, and improving the reliability of circuits including the LSI.

The FL signal (judgment signal indicating whether or not the similarity between a read image signal and the first feature portion of the specific original is high) outputted from the eight IIR filters (integrators) 2403-1 to 2403-8 is outputted to an integral circuit 2 (123) as an 8-bit FLSG signal.

The FRE and FWE signals for controlling reading/writing from/into the FIFO memories 140 and 141 in FIG. 46 are generated by an FIFO control circuit 111 and controlled in consideration of the delay by the integral circuit 1 (122) such that processing based on the equation (21) can held at the integral circuit 1.

<Integral Circuit 2>

In FIG. 46, the SZ signal is transferred to the integral circuit 2 (123). The integral circuit 2 (123) eliminates noise of the SC signal indicative of the second feature portion of the specific original based on eight judging conditions using a two-dimensional (XY directional) IIR digital filter similar to that in the integral circuit 1 (122). The integral circuit 2 (123) inputs the SC signal indicative of the second feature portion from the ROM2 (108) and the FLSG signal outputted from the integral circuit 1 (122) as well as the SZ signal, and outputs an FOB signal to the FIFO memories 142 and 143. Further, the integral circuit 2 (123) inputs an FIB signal outputted from the FIFO memories 142 and 143.

Figure 62:
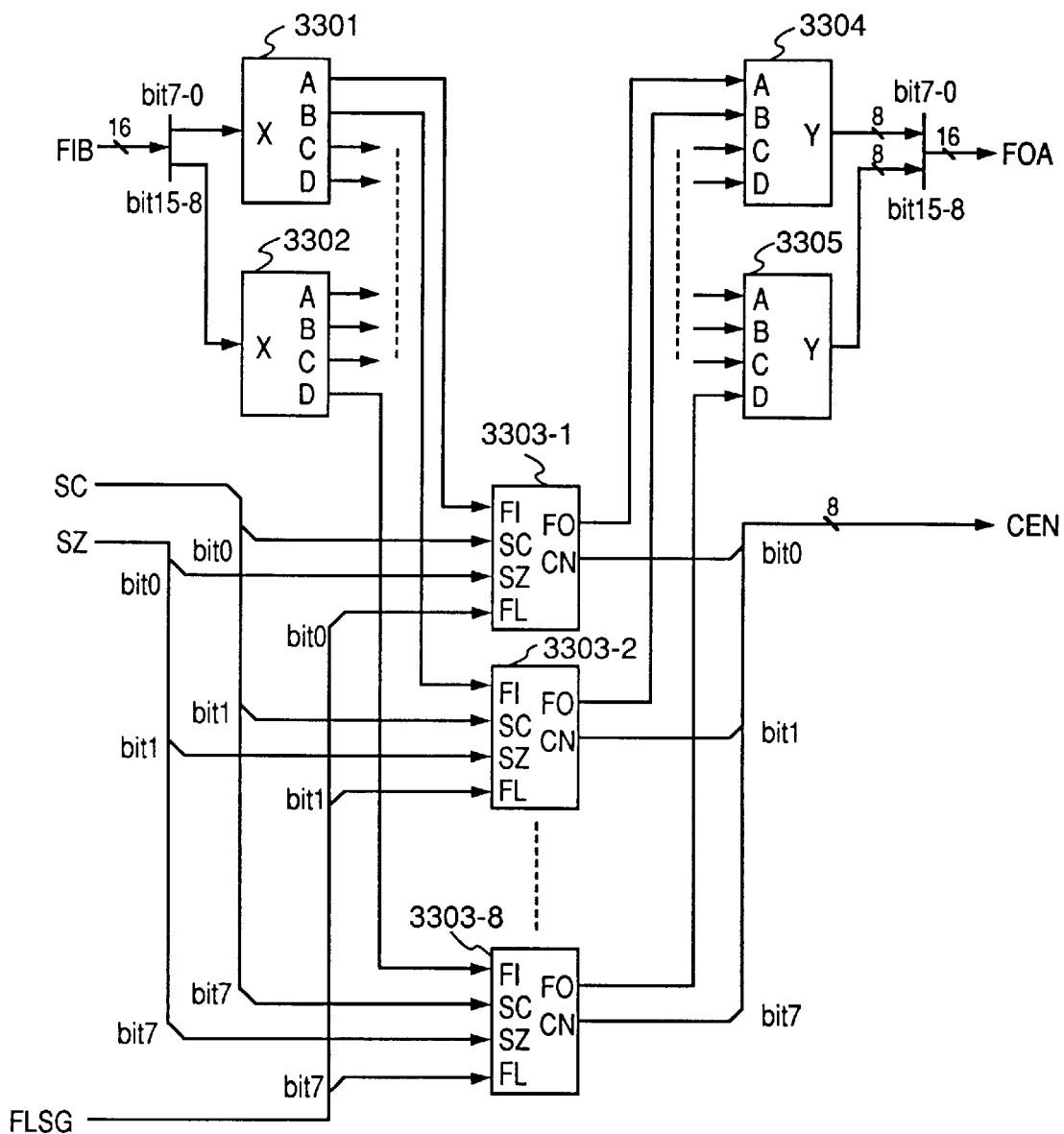
FIG. 62 is a block diagram showing the detailed construction of an integral circuit 2 (123)

FIG. 62 is a block diagram showing the detailed construction of the integral circuit 2 (123).

In FIG. 62, numerals 3301 and 3302 denote serial/parallel converters similar to the serial/parallel converters 2401 and 2402 in FIG. 51; 3303-1 to 3303-8, IIR filters as integrators; and 3304 and 3305, parallel/serial converters similar to the parallel/serial converters 2404 and 2405 in FIG. 51.

Figure 63:
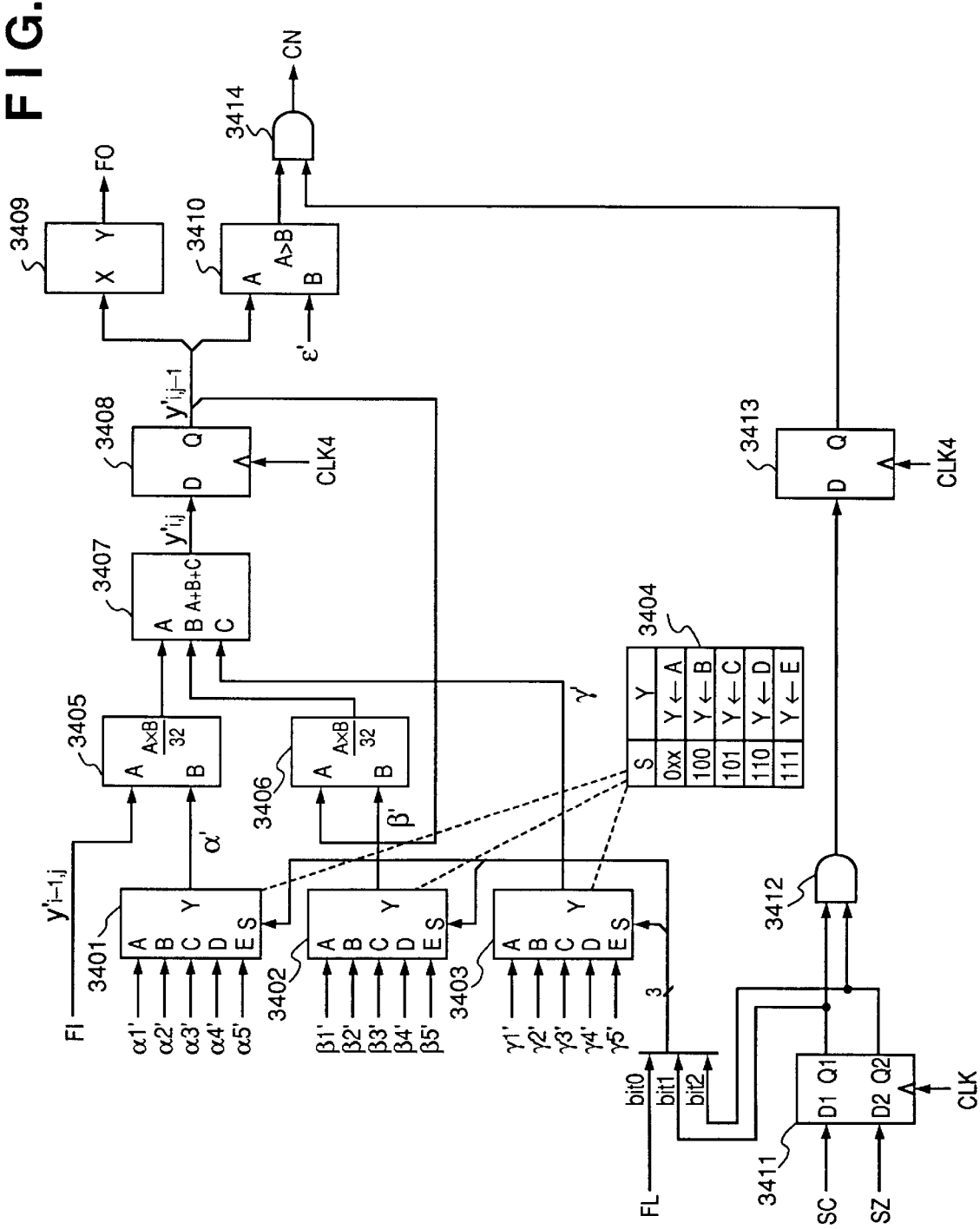
FIG. 63 is a block diagram showing the detailed construction of IIR filters in the integral circuit 2 (123)

FIG. 63 is a block diagram showing the detailed construction of the IIR filters 3303-1 to 3303-8 in the integral circuit 2 (123).

In FIG. 63, numerals 3401 to 3403 denote 5to1 selectors with operation logic 3404; 3405 and 3406, multipliers which output a product $$\left(\frac{A \times B}{32}\right)$$

with respect to the A and B inputs; 3407, an adder which outputs a sum (A+B+C) with respect to the A, B and C inputs; and 3408, a flip-flop which latches an input signal at the rising edge of the CLK4 signal and outputs the latched signal. Assuming that the output from the adder 3407 is $y'_{i,j}$ (i: subscanning position after reduction, j: mainscanning position after reduction) signal, the output from the flip-flop 3408 is $y'_{i,j-1}$, and an FI signal, obtained from delaying the $y'_{i,j}$ signal using the FIFO memory in the subscanning direction, can be expressed as $y'_{i-1,j}$.

The $y'_{i,j}$ signal is expressed in the following equation:

$$y'_{i,j} = \left(\frac{\alpha}{32}\right) y'_{i-1,j} + \left(\frac{\beta'}{32}\right) y'_{i,j-1} + \gamma' \qquad (22)$$

Numerals $\alpha 1'$ to $\alpha 5'$, $\beta 1'$ to $\beta 5'$ and $\gamma 1'$ to $\gamma 5'$ are values pre-set by the coefficient setting circuit 101. Appropriate setting these values leads the circuit 123 to a proper integration and noise elimination on the SC signal.

Figure 64:
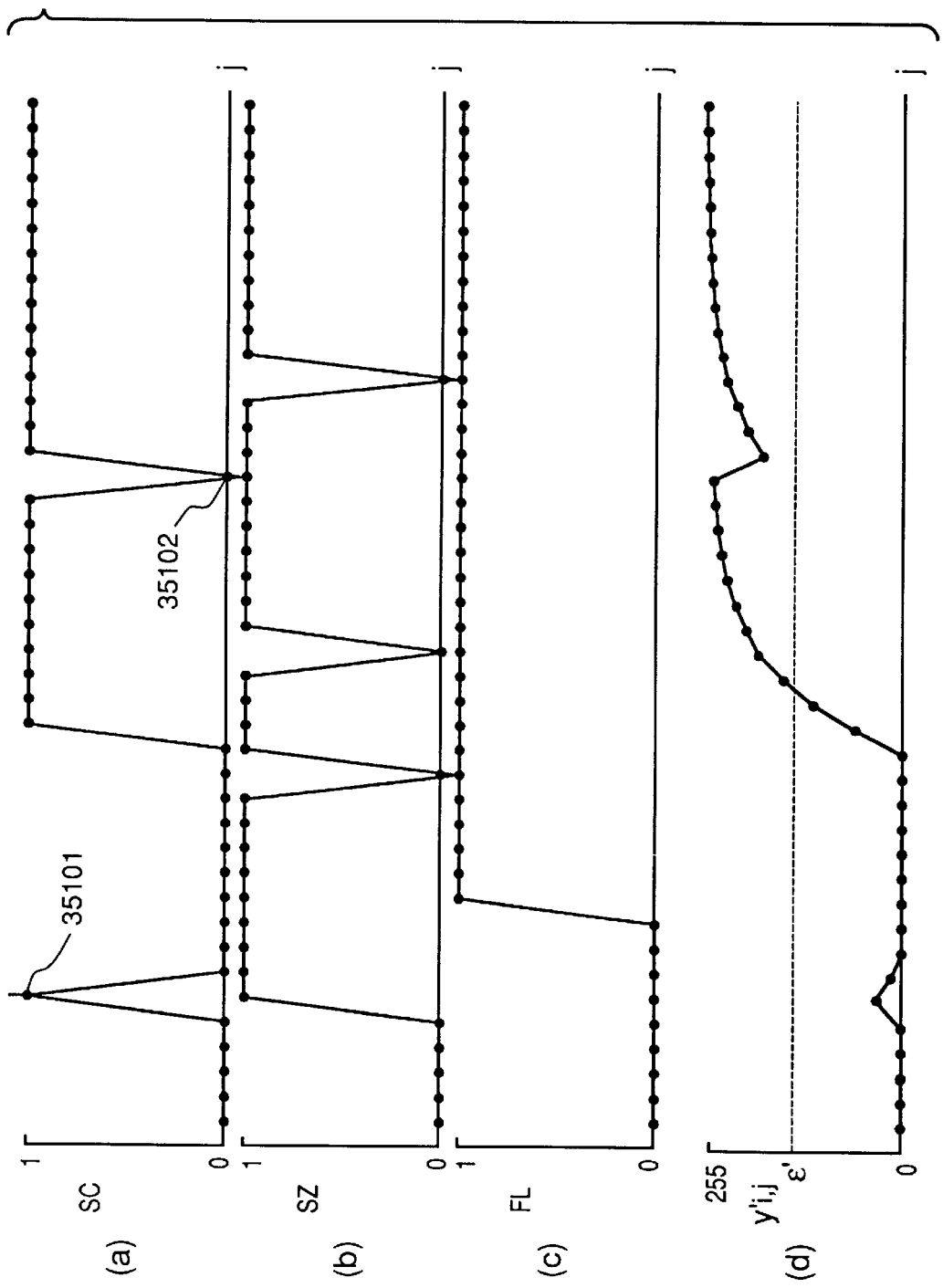
FIG. 64 shows an example showing the results from the processing by the IIR filters in FIG. 63.

FIG. 64 shows the result of the processing (j: mainscanning position). In FIG. 64, a graph (a) shows an example of the SC signal (judgment signal indicating whether or not the tonality of a read signal coincides with that of the second feature portion of the specific original, by values "1" (coincidence) and "0" (not coincidence)); a graph (b), an example of the SZ signal (judgment signal indicating whether or not the read signal is the second feature portion of the specific original, by values "1" (second feature portion) and "0" (not second feature portion)), and a graph (c), an example of the FL signal (judgment signal indicating whether or not the similarity between the read image signal and the first feature portion of the specific original is high, by values "1" (first feature portion) and "0" (not first feature portion)).

At this time, appropriate setting the values $\alpha 1'$ to $\alpha 5'$, $\beta 1'$ to $\beta 5'$ and $\gamma 1'$ to $\gamma 5'$ renders the waveform of the $y'_{i,j}$ signal as shown in a graph (d). That is, in the waveform of the outputted $y'_{i,j}$ signal, noise components such as components 35101 and 35102 in FIG. 64 are smoothed out (integration effect). These noise components 35101 and 35102 can be eliminated by binarization with a threshold value $\epsilon'$.

On the other hand, numeral 3410 denotes a comparator which compares the output from the flip-flop 3408 and the threshold value $\epsilon'$ shown in the graph (d) of FIG. 64, and outputs the comparison result; 3411, a flip-flop; 3412, an AND gate; 3413, a flip-flop; and 3414, an AND gate. The AND gate 3414 obtains the logical product between the output from the comparator 3410, and the logical product of the SC and SZ signals, and outputs the product as a CN signal. The CN signal value becomes "1" if there is a high possibility that the read image signal is a part of the second feature portion of the specific original.

On the other hand, numeral 3409 denotes an averaging circuit, similar to the averaging circuit 2709 in FIG. 54, which obtains the averaged value of four continuous data outputted from the flip-flop 3408 for a similar reason to that of the integral circuit 1 (122).

In FIG. 62, the FO signal outputted from the IIR filters 3303-1 to 3303-8 is transferred via the parallel/serial converters 3304 and 3305 to the FIFO memories 142 and 143 as the FOB signal, and fed-back via the serial/parallel converters 3301 and 3302 as the FIB signal to the IIR filters 3303-1 to 3303-8.

In FIG. 62, the CN signals (judgment signal indicating whether or not a read signal is a part of the second feature portion of the specific original) outputted from the eight IIR filters 3303-1 to 3303-8 are outputted as an 8-bit CEN signal to a volume judgment circuit 128.

Further, the FRE and FWE signals for controlling reading/writing from/into the FIFO memories 142 and 143 are generated by an FIFO controller 111 in FIG. 46, and controlled in consideration of the delay by the integral circuit 2 (123) so that processing based on the equation (21) can be held at the integral circuit 2 (123).

<Volume Judgment and Final Judgment>

In FIG. 46, the CEN signal outputted from the integral circuit 2 (123) is transferred to the volume judgment circuit 128.

The volume judgment circuit 128 performs to (1) obtain as a volume ratio as to how much the volume indicated by a number of pixels where each bit of the CEN signal from the integral circuit 2 (123) is "1" occupies within the tonality distribution range (RGB three-dimensional volume) of the second feature portion of the specific original in FIG. 47, (2) count the number of hit pixels as the total number of the pixels where each bit of the CEN signal is "1" on the condition that the volume ratio is a predetermined value or greater, and (3) make a final judgment on existence/absence of the specific original.

The volume judgment circuit 128 is connected to the data busses of SRAM's 136 to 139 via a bidirectional buffer 130. On the other hand, in a signal inputted into an address of the ROM2 (108), the lower 17-bit signal is delayed by the delay circuit 124 in synchronization with the delay caused by the integral circuit 1 (121) and the integral circuit 2 (122), then, the lower 15-bit (i.e., respective five bits for R, B and B components) SPA signal is inputted into the respective addresses of the SRAM's 136 to 139, and the upper 2-bit (i.e., YPHS signal) of the 17 bit signal is inputted into a decoder 131 (with operation logic 149 in FIG. 46). The decoder 131 outputs the four Y0 to Y3 signals, and AND gates 132 to 135 respectively obtain a logical product between the Y0 to Y3 signals and the CCL signal, and output the logical product into the respective chip select terminal (CS) of the SRAM's 136 to 139.

The SRAM 136 is accessed when the YPHS signal value is "0"; the SRAM 137 is accessed when the YPHS signal value is "1"; the SRAM 138 is accessed when the YPHS signal value is "2"; and the SRAM 139 is accessed when the YPHS signal value is "3".

Further, after the respective SRAM's 136 to 139 are initialized (cleared), 15-bit R, G and B signals, where each component has five bits, from accessing the lower fifteen bits of the ROM2 (108), are transferred to the SRAM's 136 to 139. When the value of any bit of the CEN signal is "1", a value "1" is written into the address corresponding to the bit. Note that the initialization of the SRAM's will be described later.

Further, processing based on different sets of eight conditions on a specific original is performed on each bit of 8-bit data.

Numeral 129 denotes an SRAM controller which generates an RWE signal for controlling the write-enable terminal (WE) of the four SRAM's 136 to 139, an ROE signal for controlling the output-enable terminal (OE) of the SRAM's 138 to 139, and an RID signal for controlling the control terminal of the bidirectional buffer 130.

Further, in FIG. 46, numeral 125 denotes a tristate buffer; 126, an inverter; and 127, a tristate buffer. One of the two tristate buffers 125 and 127 is activated in accordance with the value of the control signal CCL. However, upon normal operation, the CCL signal value is "1", and the tristate buffer 125 is active.

Figure 65:
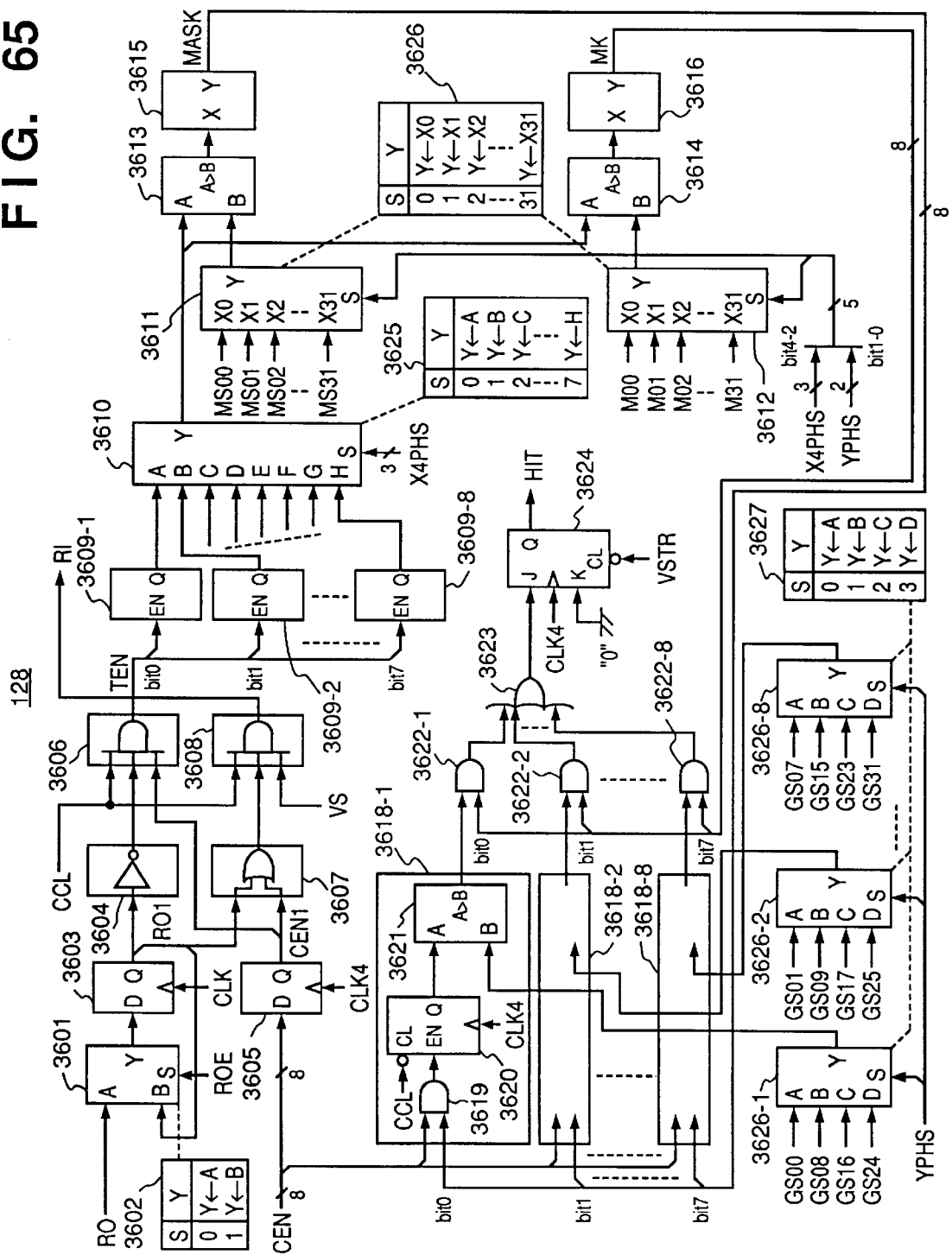
FIG. 65 is a block diagram showing the detailed construction of a volume judgment circuit 128.
Figure 66:
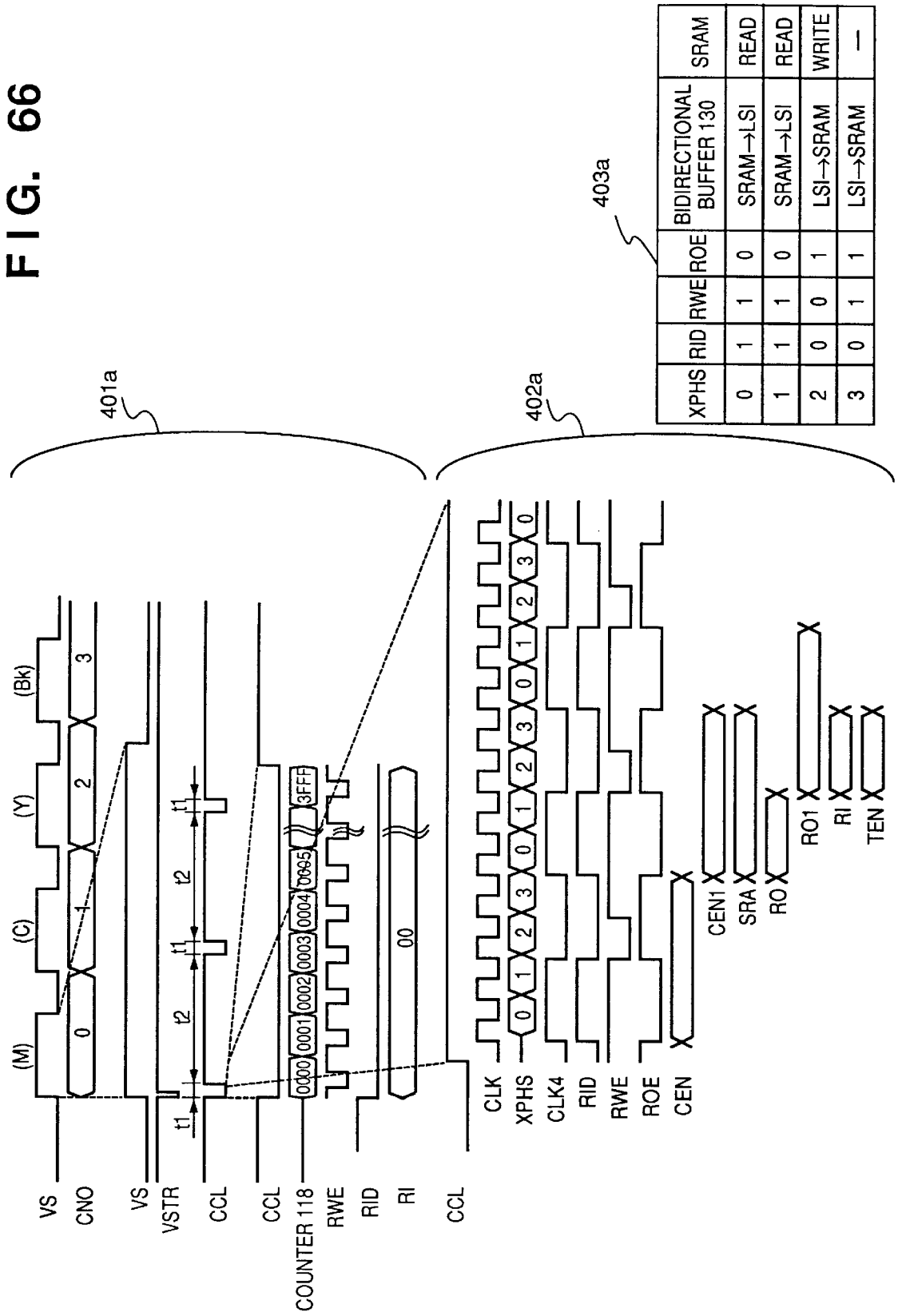
FIG. 66 is a timing chart showing the operation of the volume judgment circuit 128.

FIG. 65 is a block diagram showing the detailed construction of the volume judgment circuit 128. FIG. 66 is a timing chart showing the operation timing of the volume judgment circuit 128. In FIG. 66, the RID signal is used for controlling the data stream direction of the bidirectional buffer 130; the RWE signal, for write-enable control of the four SRAM'S; and the ROE signal, for output-enable control of the SRAM's. The SRAM controller 129 generates these signals.

As shown in a timechart 402a and a table 403a in FIG. 66, when the XPHS signal value is "0" or "1", the RID signal value is "1", then the data stream direction of the bidirectional buffer 130 is "from SRAM to LSI" direction, and at this time, as the RWE signal value is "1" and the ROE signal value is "0", the SRAM is in a reading status. When the XPHS signal value is "2", the RID signal value is "0", then the data stream direction of the bidirectional buffer 130 is "from LSI to SRAM" direction, and at this time, as the RWE signal value is "0" and the ROE signal value is "1", the SRAM is in a writing status.

When the XPHS signal value is "3", the RID signal value is "0", then the data stream direction of the bidirectional buffer 130 is "from LSI to SRAM" direction, and at this time, as the RWE signal value and the ROE signal value are "1", the SRAM is in a status which is neither a reading status nor a writing status. As the value of the SRA signal as an address signal of the SRAM's 136 to 139 changes in synchronization with the rising edge of the CLK4 signal, the SRA signal value does not change for one period of the XPHS signal in which the XPHS signal value changes from "0" to "3". Accordingly, the SRAM performs reading/modifying/writing operation.

Next, in FIG. 65, numeral 3601 denotes a 2to1 selector with operation logic 3602; 3603 and 3605, flip-flops; 3604, an inverter; 3606 and 3608, AND gates; 3607, an OR gate; and 3609-1 to 3609-8, counters.

In FIG. 65, an RO signal, read out of the SRAM, passes through the selector 3601 when the ROE signal value is "0", is latched by the flip-flop 3603 at the rising edge of the CLK signal, and is outputted as an RO1 signal.

On the other hand, the CEN signal, latched by the flip-flop 3605 at the rising edge of the CLK4 signal is outputted as a CEN1 signal. A TEN signal is a 8bit signal each of which is obtained from a logical product of the CCL signal, the RO1 signal and CEN1 signal. As the CCL signal value is normally "1" and thus the RO1 signal value "0", the value of the CEN signal directly reflects the value of TEN signal. In other words, under the above condition, if the value of CEN signal is "1", the value of the TEN signal is "1".

Further, as the VS signal value is "1" upon image reading, an RI signal from the AND gate 3608 via the OR gate 3607 is obtained from calculating the logical sum between the RO1 signal and the CEN signal with respect to each of these eight bits.

Accordingly, after initialization of the SRAM, the logical sum between the CEN signal and the data corresponding to R, G and B signals at the time stored in an address of the SRAM is calculated and written back into the same address. When the value of any of the eight bits of the SRAM data changes from "0" to "1", the value of the corresponding bit of the TEN signal becomes "1". That is, "the aforementioned volume ratio" is obtained by counting how many times a value "1" is outputted with respect to each bit of the TEN signal.

Further, in FIG. 65, numerals 3609-1 to 3609-8 denote counters which count the number of "1", outputs with respect to each bit of the TEN signal.

Figure 67:
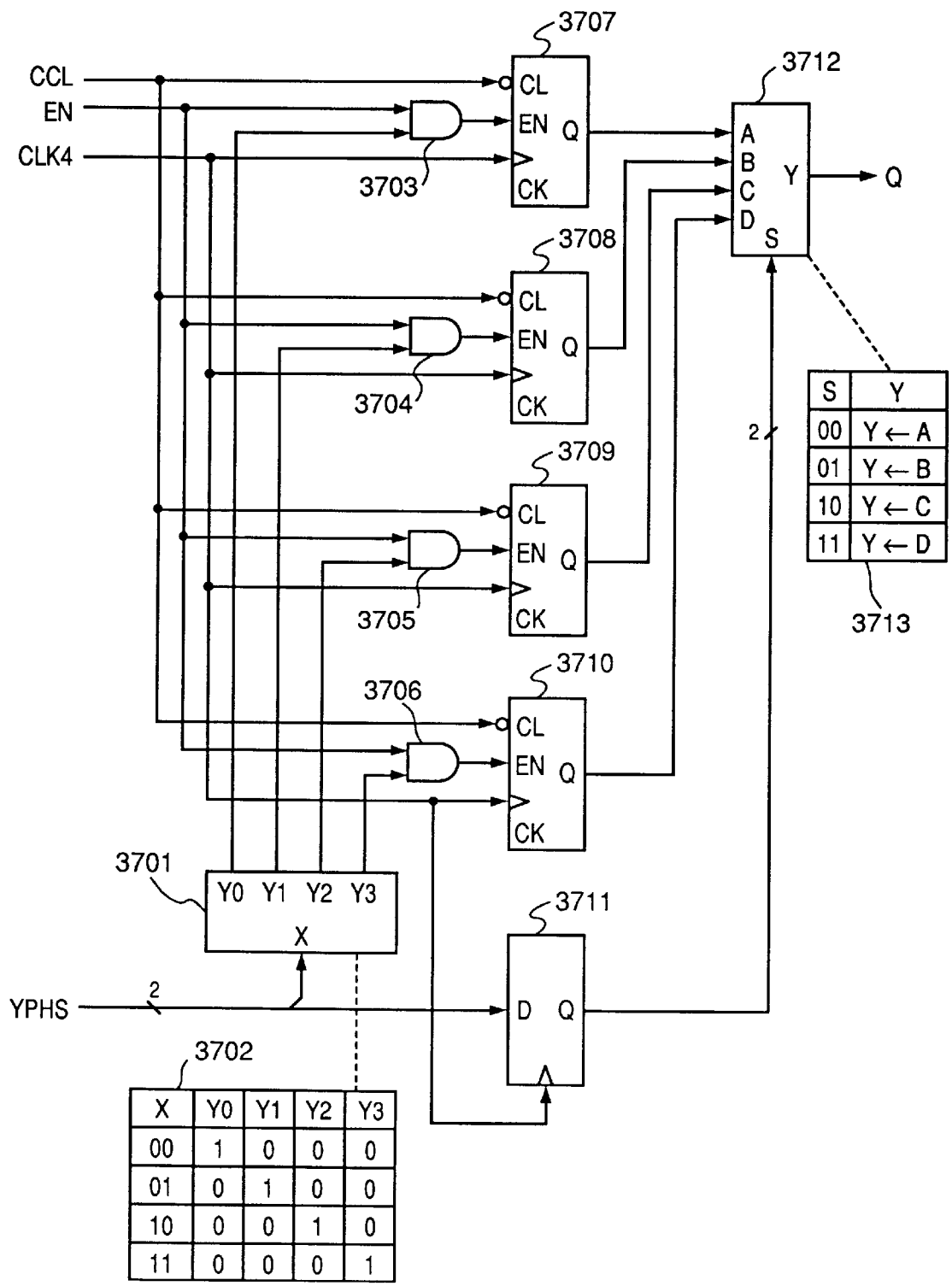
FIG. 67 is a block diagram showing the detailed construction of counters 3601-1 to 3601-8.

FIG. 67 is a block diagram showing the detailed construction of the counters 3609-1 to 3609-8. In FIG. 67, numeral 3701 denotes a 2to4 decoder with operation logic 3702; 3703 to 3706, AND gates; 3707 to 3710, counters; 3712, a 4to1 selector with operation logic 3713; and 3711, a flip-flop.

The counters respectively have four independent counters 3707 to 3710, and if the value of the YPHS signal inputted via the flip-flop 3711 is "0", perform counting by the counter 3707 and output the count value as a Q-output; if the YPHS signal value is "1", perform counting by the counter 3708 and output the count value as the Q-output; if the YPHS signal value is "2", perform counting by the counter 3709 and output the count value as the Q-output; and if the YHS signal value is "3", perform counting by the counter 3710 and output the count value as the Q-output. That is, the counters perform time-divisional processing using the YPHS signal for judgment on different eight specific originals.

In FIG. 65, numeral 3610 denotes a 8to1 selector with operation logic 3625; 3611 and 3612, 16to1 selectors with operation logic 3626; and 3613 and 3614, comparators. Further, MS00 to MS31 and M00 to M31 are pre-set at the coefficient register 148, and each value is unique to each of thirty-two specific originals. The values MS00 to MS31 are set values in an insensitive zone of a hit pixel count value to be described later, and the values M00 to M15 are mask signals as the hit pixel counting result.

The comparators 3613 and 3614 time-divisionally perform processing corresponding to the X4PHS signal which determines the output of the selectors 3610 to 3612, and the results are transferred to the serial/parallel converters 3615 and 3616.

Figure 68:
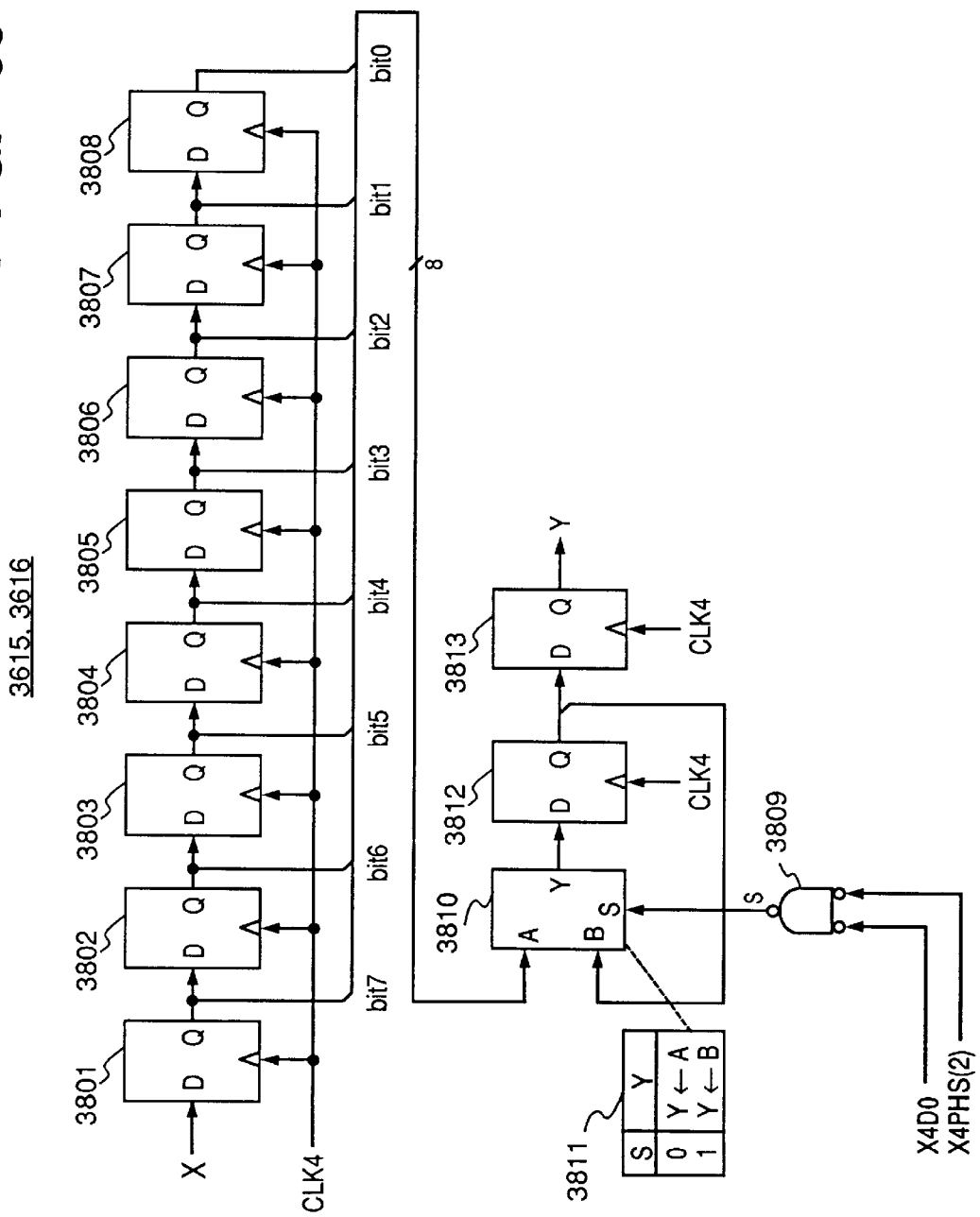
FIG. 68 is a block diagram showing the detailed construction of serial/parallel converters 3615 and 3616.
Figure 69:
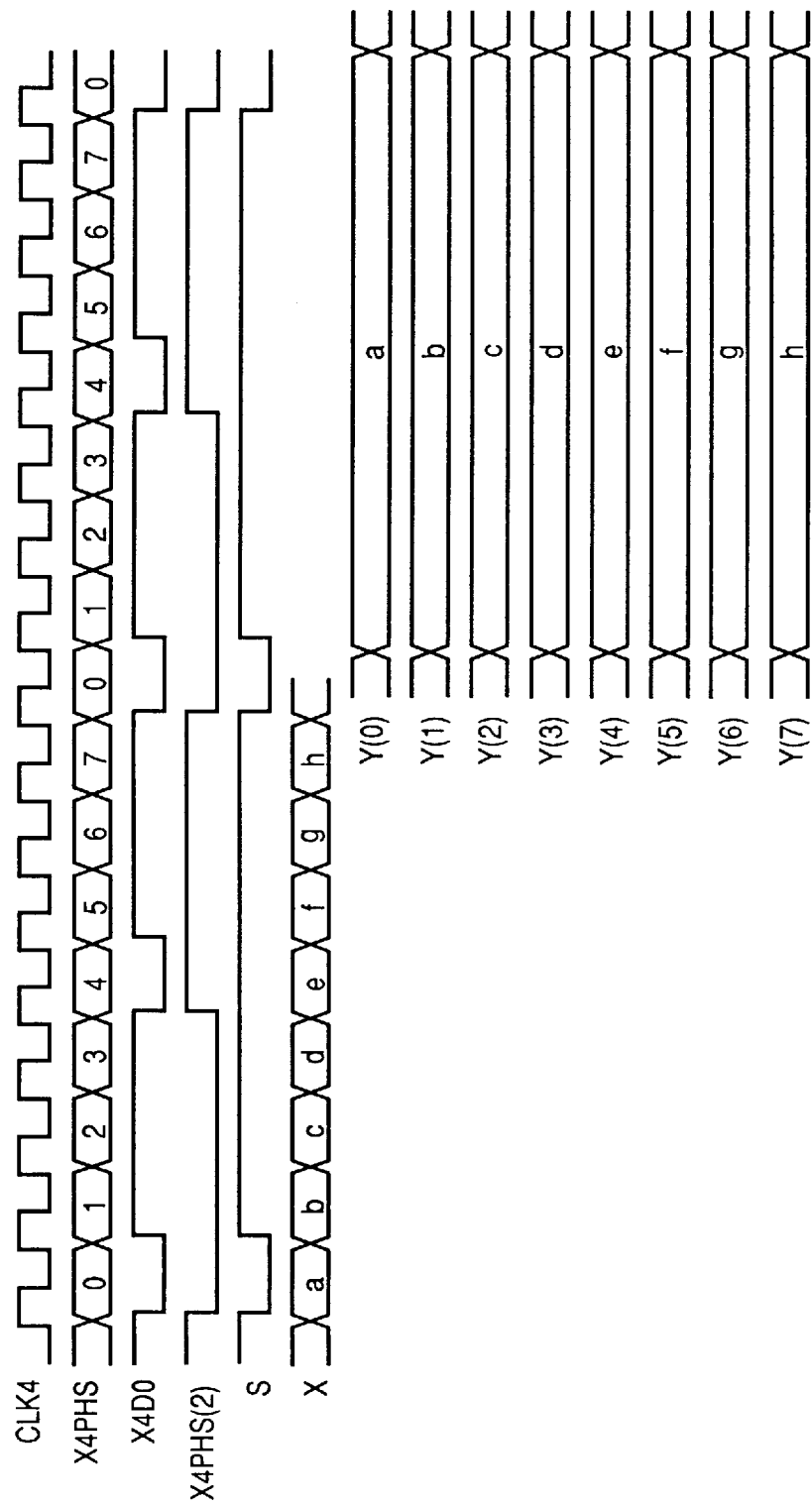
FIG. 69 is a timing chart showing the operation of the serial/parallel converters 3615 and 3616.

FIG. 68 is a block diagram showing the detailed construction of the serial/parallel converters 3615 and 3616. FIG. 69 is a timing chart showing the operation of the serial/parallel converters 3615 and 3616.

In FIG. 68, numerals 3801 to 3808, 3812 and 3813 denote flip-flops; 3809, an OR gate; and 3810, a 2to1 selector with operation logic 3811.

The serial/parallel converters having the above construction simultaneously (in parallel) output the values sequentially (serially) inputted into the X terminal, corresponding to each bit of the eight-bit Y output. Accordingly, in FIG. 65, the results from approximately simultaneous (though with slight delay) processings upon eight specific originals are outputted as MK signal and MASK signal.

Further, in FIG. 65, numerals 3618-1 to 3618-8 denote hit pixel number counters respectively having the same construction; 3619, an AND gate; 3620, a group of counters; and 3621, a comparator. Values GS00 to GS 31 are pre-set at the coefficient register 148. Numerals 3626-1 to 3626-8 denote 4to1 selectors with operation logic 3627.

Figure 70:
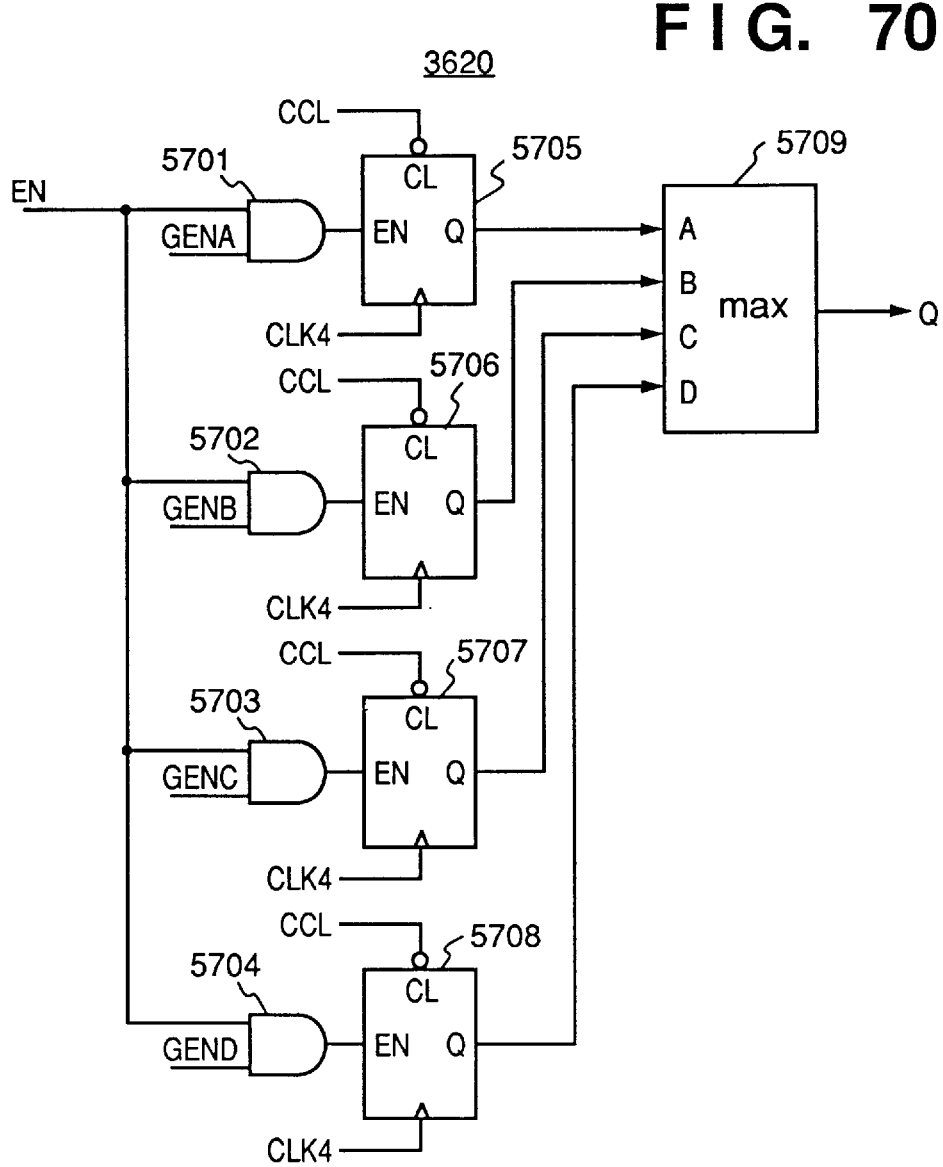
FIG. 70 is a block diagram showing the construction of counters 3620.

The counters 3620 comprise four counters. FIG. 70 is a block diagram showing the detailed construction of the counters 3620.

In FIG. 70, numerals 5701 to 5704 denote AND gates; 5705 to 5708, counters; and 5709, a maximum value circuit. The counter 5705 counts up when a GENA signal value is "1" and an EN signal value is "1". In other words, the counter 5705 performs counting at a period where the GENA signal value is "1", when the EN signal value is "1". Similarly, the counter 5706 performs counting at a period where the value of a GENB signal is "1", when the EN signal value is "1"; the counter 5707, at a period where the value of a GENC signal is "1", when the EN signal value is "1"; and the counter 5708, at a period where the value of a GEND signal is "1", when the EN signal value is "1". Further, the maximum value circuit 5709 outputs the maximum value among count values from the counters 5705 to 5708 as a Q signal.

Figure 71:
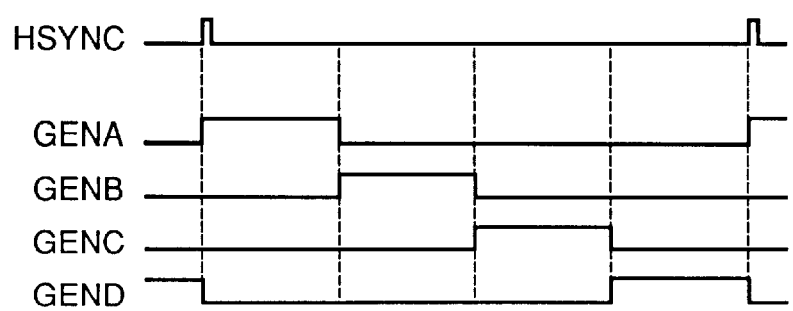
FIG. 71 is a timing chart of control signals GENA, GENB, GENC and GEND.

On the other hand, as shown in FIG. 71, the signals GENA, GENB, GENC and GEND are signals used for dividing the main-scanning period. The principle of the operations of these signals will be described later.

In FIG. 65, the counters 3609-1 to 3609-8 respectively perform counting with respect to each bit of the TEN signal to count how many times the bit value is "1". If the count result exceeds a predetermined value MS00 to MS31 (if the YPHS signal value is "0", MS00 to MS07 are used; if the YPHS signal value is "1", MS08 to MS15 are used; if the YPHS signal value is "2", MS16 to MS23 are used, if the YPHS signal value is "3", MS24 to MS31 are used.), the value of a corresponding bit of the MASK signal becomes "1", then the counter 3620 starts counting the number of "1" value of the corresponding bit of the CEN signal.

Further, if the count result of "1" bits of the CEN signal exceeds a corresponding value GS00 to GS31 (if the YPHS signal value is "0", GS00 to GS07 are used; if the YPHS signal value is "1", GS08 to GS15 are used; if the YPHS signal value is "2", GS16 to GS23 are used; and if the YPHS signal value is "3", GS24 to GS31 are used.) and the count result of "1" bits of the CEN signal (i.e., the volume ratio) exceeds a corresponding value M00 to M31 (if the YPHS signal value is "0", M00 to M07 are used; if the YPHS signal value is "1", M08 to M15 are used; if the YPHS signal value is "2", M16 to M23 are used; if the YPHS signal value is "3", M24 to M31 are used), the outputs from the AND gates 3622-1 to 3622-8 become "1". These outputs from the AND gates 3622-1 to 3622-8 determines whether or not each of the specific originals exists.

Numeral 3623 denotes an OR circuit. If it is determined that at least one of the plurality of specific originals exists, the value of the OR circuit 3623 output becomes "1", then, a JK flip-flop 3624 sets the HIT signal value to "1".

<Judgment & Processing in Case of Specific Original>

In the above processing, if it is determined that one or more of the plurality of specific originals exist, in FIGS. 2, 5 and 46, the HIT signal with a value "1" from the volume judgment circuit 128 is transferred to the CPU 311. When the HIT signal value becomes "1", the CPU 311 in FIG. 2 sets the value of an INHIBIT signal to "1" and uses the OR circuit 310 to render an output image a "solid black image".

<Initialization of SRAM'S & Counters>

To count the volume ratio and the number of hit pixels, the SRAM's 136 to 139 and the counters (3620, 3707 to 3710) must be initialized (cleared). The initialization of these SRAM's and counters is made by the CCL signal from a CCL generator 149 in FIG. 46. The CCL generator 149 also generates a VSTR signal to initialize the HIT signal that is a final judgment result. In FIG. 66, a timing chart 401a shows the operation timing of the CCL generator 149.

In the timing chart 401a, the VS signal value becomes "1" at an image formation period. The VSTR signal value becomes "0" at the rising edge of the VS signal, otherwise, becomes "1" to initialize the HIT signal. The CCL signal value is "0" at a t1 period from the rising edge of the VS signal, and "1" at a t2 period, thus the value repeatedly changes from "0" to "1" in this manner.

At the t1 period where the CCL signal value is "0", the counter 116 in FIG. 46 performs counting from "0000 (HEX)" to "3FFF (HEX)". On the other hand, as the CCL signal value is "0", the count output from the counter 116 is supplied via the selector 117 and the tristate gate 127 to addresses of the SRAM's 136 to 139. Further, as the CCL signal value inputted from the AND gates 132 to 135 is "0", the values at the CS terminals of the SRAM's are all "0", and the four SRAM's 136 to 139 are simultaneously accessed. The CCL signal is also supplied to the AND gate 3608 in FIG. 65, and the values of the RI signals as outputs to the SRAM's are all "0". On the other hand, as the SRAM controller 129 generates the RWE signal as shown in the timing chart 401 in FIG. 66, values "0" are written into the addresses of the SRAM's, thus initialization of the SRAM's is performed.

When the initialization of the SRAM's is completed, the CCL signal value becomes "1", and the normal judgment operation is restored. Then, after the t2 period, the initialization is performed again, and thereafter, the above operation is repeated.

<Dividing Read Signal in Main-Scanning & Subscanning Directions>

The relation between the CCL signal and the operation of counters 3620 in FIG. 65 controlled by the control signals GENA, GENB, GENC and GEND will be described with reference to FIG. 72.

Figure 72:
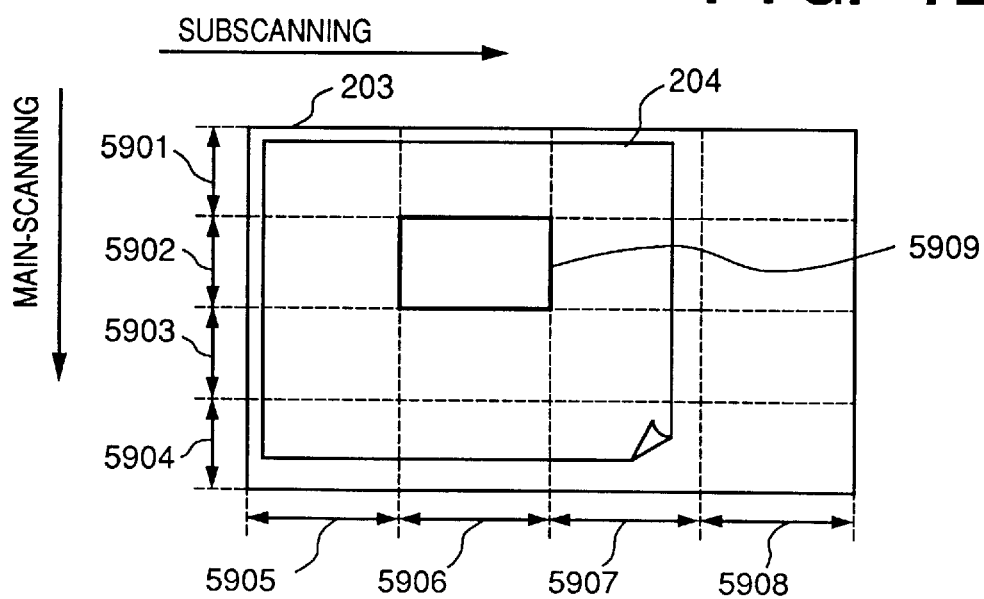
FIG. 72 is an explanatory view showing the relation between the control signals GENA, GENB, GENC and GEND and a CCL signal.

In FIG. 72, the main-scanning period is divided into periods 5901 to 5904, then the counters 3620 independently count the CEN signal at the respective periods, and output the maximum value among the four count value. In FIG. 72, numeral 203 denotes a platen glass; and 204, an original.

Similarly, the subscanning period is divided by the CCL signal into periods 5905 to 5908, then the CEN signal is counted at the respective periods and the maximum value among the four count values is latched. For example, the area indicated by the period 5902 in the main-scanning direction and by the period 5906 in the subscanning direction is an area 5909. In this case, the CEN signal is counted in the area 5909. Thus, dividing the read image signal into areas in the main-scanning and subscanning directions (vertical and horizontal directions) and the performing judgment independently at each area prevents erroneous detection in a normal original having a large area.

<Image Processing Mode & ID Reading Mode>

As described above, the apparatus of the present embodiment has the image processing mode and the ID reading mode. In the image processing mode, the apparatus performs normal image processing, and the ROM1 (101), ROM2 (108) and ROM3 (109) are used as tables for judgment of existence/absence of the specific original. On the other hand, in the ID reading mode, ID's respectively held in the highest addresses of the ROM1 (101), the ROM2 (108) and the ROM3 (109) are read out. In the respective modes, the ROM's are controlled by the RID and PSEL signals.

The contents stored in the respective addresses of the ROM2 (108) and the ROM3 (109) and access conditions are as shown in Table 2.

In the image processing mode, the CPU 311 sets the RID signal value in FIG. 46 to "0". The PSEL signal from the bank changer 118 is inputted into 2-bit upper addresses of the ROM2 (108) and the ROM3 (109). R", G" and B" signals from the serial/parallel converters are inputted into 15-bit lower addresses of the ROM2 (108) and the ROM3 (109).

On the other hand, in the ID reading mode, the CPU 311 sets the RID signal value in FIG. 46 to "1". At this time, the outputs from the tristate gate 119 and the tristate gate 145 in FIG. 5 become high impedance, and all the addresses of the ROM3 (109), the ROM2 (108) and the ROM1 (101) are set to "1" by a pull-up resistor 120 and a pull-up resistor 146 in FIG. 5.

At this time, the contents stored in the uppermost address: 3FFFF of the ROM2 (108) and the ROM3 (109) are outputted. The ID's of these ROM's are pre-stored at the lower eight bits of the uppermost address data, and the ID's are read by the CPU 311 as ROM2-ID and ROM3-ID. Further, the content stored in the uppermost address FF of the ROM1 (101) is outputted. The ID of the ROM1 (101) is pre-stored in eight bits of the uppermost address data, and the ID is read by the CPU 311 as ROM1-ID.

The ID is an 8-bit code except "00 (HEX)" and "FF (HEX)", since if the ROM1 (101), the ROM2 (108) and the ROM3 (109) are deliberately removed from the apparatus, or if any of these ROM's is out of order, otherwise, if any of these ROM's is replaced with an inappropriate ROM, there is a high possibility that "00" (HEX), in which the values of eight bit are all "0" or "FF (HEX)" in which the values of eight bits are all "1" is read.

It is the feature of the present embodiment that in the image processing mode, the addresses "00000" to "37FFF" of the ROM2 (108) and the ROM3 (109) are accessed, and in the ID reading mode, the address "3FFFF" is accessed, thus access control is made without overlapped access.

<ID Reading>

Figure 73:
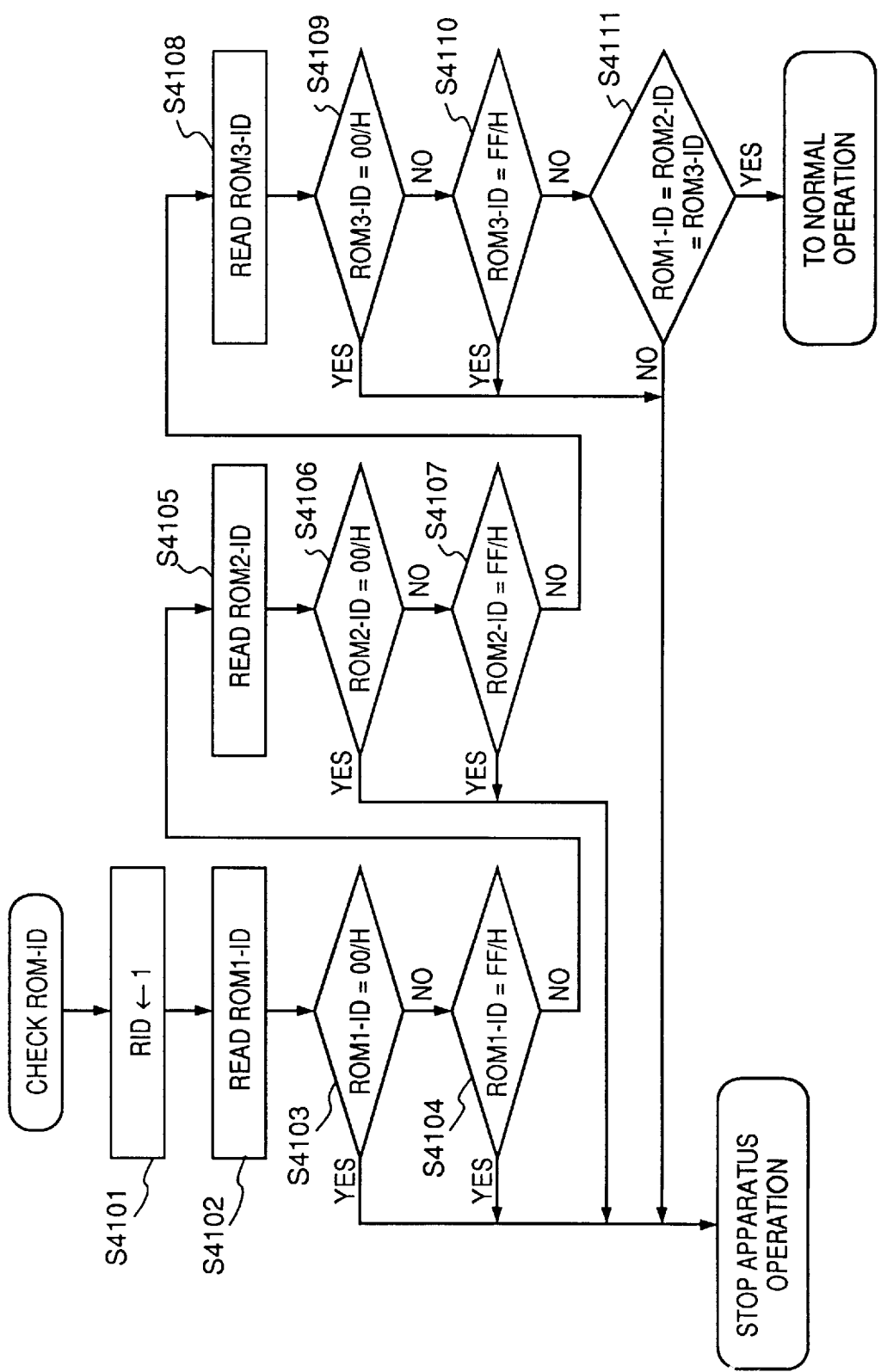
FIG. 73 is a flowchart showing ID reading processing according to the first embodiment.

FIG. 73 is a flowchart showing ID reading processing of the present embodiment. In step S4101, the RID signal value is set to "1". Then, as described above, the address number of the ROM1 (101) and the ROM2 (108) are set as the uppermost address, and the ID's (ROM-ID) stored in these addresses are read out.

In step S4102, the ROM1-ID is read. Then, in step S4103, whether or not the value of the ROM1-ID is "00 (HEX)" is examined. If the ROM1-ID value is "00 (HEX)", it is determined that the ROM1 (101) or its peripheral device is unattached, out of order or evil-mindedly modified, and the operation of the apparatus is stopped. If the ROM1-ID value is not "00 (HEX)", the process proceeds to step S4104, in which whether or not the ROM1-ID value is "FF (HEX)" is examined. If the ROM1-ID value is "FF (HEX)", it is determined that the ROM1 or the peripheral device is unattached, out of order or evil-mindedly modified, and the operation of the apparatus is stopped. If the ROM1-ID value is not "FF (HEX)", the process proceeds to step S4105.

Further, in step S4105, the ROM2-ID is read. In step S4106, whether or not the ROM2-ID value is "00 (HEX)" is examined. If the ROM2-ID value is "00 (HEX)", it is determined that the ROM1 or the peripheral device is unattached, out of order or evil-mindedly modified, and the operation of the apparatus is stopped. If the ROM2-ID value is not "00 (HEX)", the process proceeds to step S4107, in which whether or not the ROM2-ID value is "FF (HEX)" is examined. If the ROM2-ID value is "FF (HEX)", it is determined that the ROM1 or the peripheral device is unattached, out of order or evil-mindedly modified, and the operation of the apparatus is stopped. If the ROM2-ID value is not "FF (HEX)", the process proceeds to step S4108.

Further, in step S4108, the ROM3-ID is read. in step S4109, whether or not the ROM3-ID value is "00(HEX)" is examined. If the ROM3-ID value is "00 (HEX)", it is determined that the ROM1 or the peripheral device is unattached, out of order or evil-mindedly modified, and the operation of the apparatus is stopped. If the ROM3-ID value is not "00(HEX)", the process proceeds to step S4110, in which whether or not the ROM3-ID value is "FF (HEX)" is examined. If the ROM3-ID value is "FF (HEX)", it is determined that the ROM1 or the peripheral device is unattached, out of order or evil-mindedly modified, and the operation of the apparatus is stopped. If the ROM3-ID value is not "FF (HEX)", the process proceeds to step S4111.

In step S4111, whether or not the ROM1-ID, the ROM2-ID and the ROM3-ID are the same is examined. If the three values are not the same, it is determined that the ROM1, ROM2 or ROM3 or the peripheral device is unattached, out of order or evil-mindedly modified, and the operation of the apparatus is stopped. If these values are the same, it is determined that the ID's are normally read, and the process ends.

It should be noted that in the flip-flops, a flip-flop where a clock signal is not specified uses the CLK signal as the clock signal.

As described above, according to the present embodiment, judgment of smoothed image signal obtained from smoothing a read image signal, as well as judgment of tonality at a graphic portion and a uniform density portion of an original, enables judgment of existence/absence of the specific original with high precision.

The precise judgment of existence/absence of the specific original is made for the following reasons.

That is, in normal banknotes, patterns are drawn as graphic patterns on uniform density portions, however, human eye does not have sensitivity high enough to analyze minute portion of the pattern, and the tonality perceived is the mixture of the tonality of graphic portion and that of uniform density portion. Accordingly, to detect the mixed tonality, the read image signal may be smoothed and judgment of the smoothed tonality may be performed. This improves judging precision.

Further, according to the present embodiment, graphic portion detection which requires processing a signal of relatively high resolution may be performed with respect to an image signal before reduction processing, while tonality judgment which allows processing a signal of relatively low resolution may be performed with respect to an image signal after the reduction processing, thus quick judgment with high precision can be attained. Further, a read image signal is divided into a plurality of portions in a main-scanning and subscanning (vertical and horizontal) directions, and judgment is independently performed with respect to the two directions so as to prevent detection error in a normal original having a large area.

Regarding specific originals having various features such as banknotes, feature used for judgment may be changed in accordance with a specific original subjected to the judgment, thus judgment with high precision can be attained. More specifically, an edge portion and a density discontinuation portion, as well as a graphic portion and a uniform density portion, are detected as the additional features of the specific original, and selection of these features may be performed in accordance with the type of specific original subjected to the judgment. This improves the precision in judgment of specific originals having various features such as banknotes.

Further, in order to improve precision of detecting an important graphic portion among the features and to avoid erroneous judgment of dot components, which often appear in a normal original, as a graphic portion, the following pre-processing is made. First, in an original, a direction having a large density gradient is detected, and the image signal is smoothed in a direction orthogonal to the detected density gradient direction, thus the dot components are eliminated. Secondly, a maximum value and a minimum value among a pixel of interest and neighboring pixels are detected, and the value of the pixel of interest is replaced with the detected maximum/minimum value, thus the graphic component is emphasized. Thirdly, the density change around the pixel of interest is detected for the graphic component detection. Thereafter, as post-processing, isolated-dot elimination is performed on a pixel judged as a part of the graphic portion, further, noise elimination is performed by density judgment. These processings enable detection of specific original with very high-precision.

Figure 74:
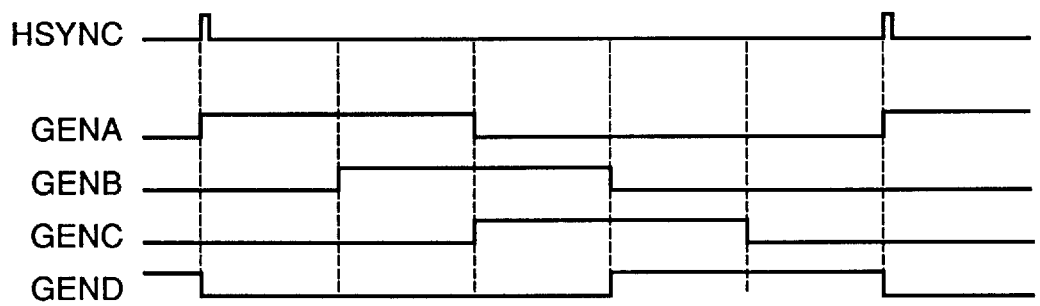
FIG. 74 is a timing chart showing another example of controlling the GENA, GENB, GENC and GEND signals.
Figure 75:
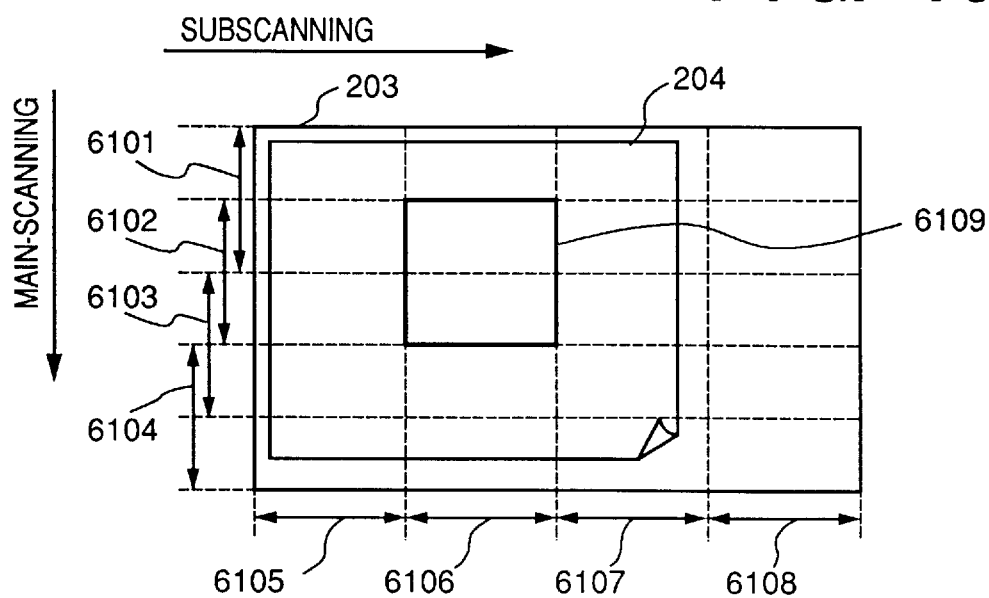
FIG. 75 is an explanatory view showing the relation between the control signals GENA, GENB, GENC and GEND shown in FIG. 74 and the CCL signal.

Note that in the present embodiment, the area on the platen is divided into areas in the main-scanning and subscanning directions and extraction and judgment of specific original is made with respect to each area, as shown in FIG. 72, however, the present invention is not limited to this arrangement. For example, the respective GENA, GENB, GENC and GEND signals in FIG. 74 may be overlapped with each other, the signals in the main-scanning direction are divided into periods 6101 to 6104, as shown in FIG. 75, then the CEN signal may be independently counted and the maximum value among the four count values may be outputted.

On the other hand, with respect to the subscanning direction, the CCL signal is divided into periods 6105 to 6108, then the CEN signal is counted at each period, and the maximum value among the count values at the respective areas is latched.

Specifically, the CEN signal is counted by area overlapped in the main-scanning direction, e.g., at an area 6109, defined by the main-scanning period 6102 and the subscanning period 6106. This can raise recognition precision even in a case where a specific original is placed on the boundary between the main-scanning period and subscanning periods.

Similarly, the recognition precision can be raised if the CEN signal is counted by area overlapped in the subscanning direction. Further, the number of divided periods is not limited to that of the present embodiment. For example, the number of divided periods may be four or more.

As described above, in the present embodiment, the present invention is applied to a single copying machine, however, this does not pose any limitation upon the present invention. For example, the present invention is applicable to a system as shown in FIG. 76, where the respective components are independent units connected to each other.

Figure 76:
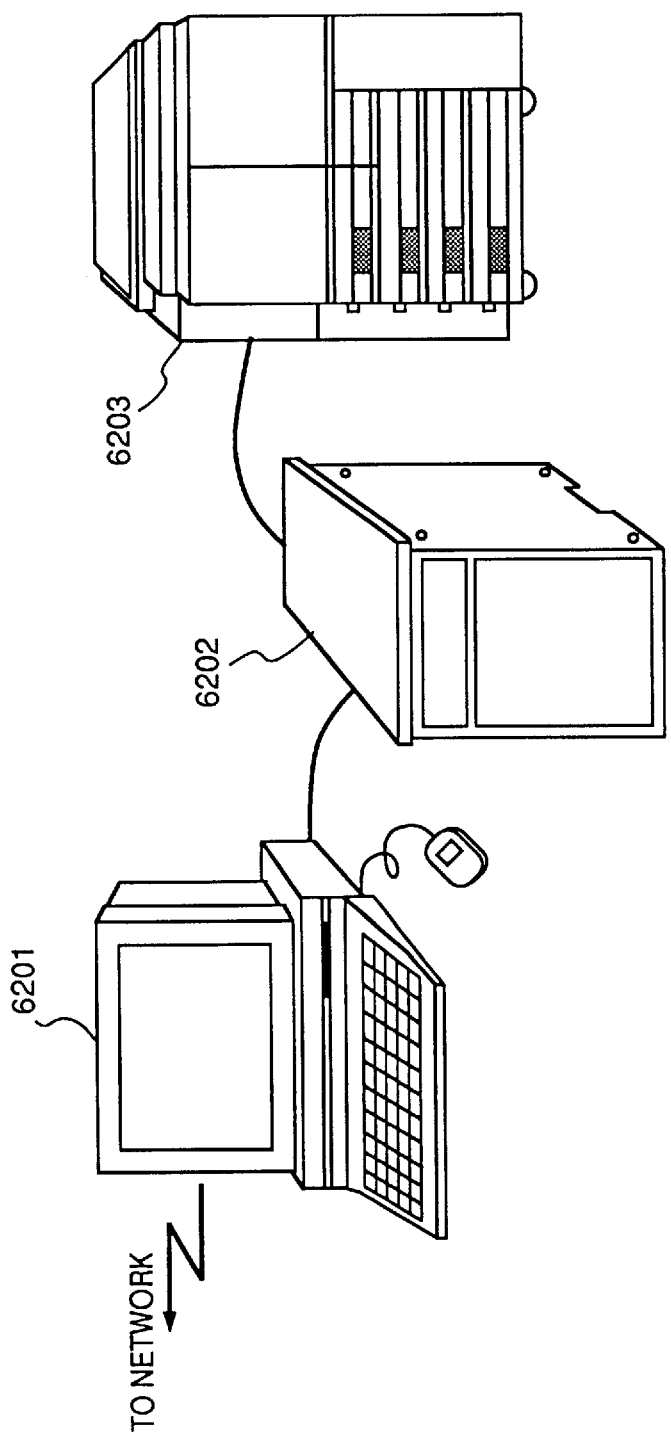
FIG. 76 is an example of a system configuration in an image processing system.

In FIG. 76, numeral 6201 denotes a host computer; 6202, an interface unit; and 6203, a copying machine having an image scanner and a printer. In this system, the host computer 6201 and the copying machine 6203 is connected via the interface unit 6202. The host computer 6201 is connected to an external device via a network.

The copying machine 6203 can output an image using the printer based on image data generated by the host computer 6201 or image data received via the network. Further, image data read by the image scanner of the copying machine 6203 can be transferred to the computer 6201.

Accordingly, the circuit for detecting the specific originals in the above embodiment may be incorporated into the interface unit 6202 so that an image that must not be copied or transferred to the outside of the system can be detected and copying or transfer of the image can be prohibited.

Second Embodiment

In the second embodiment, a copying machine which has a construction similar to that of the copying machine of the first embodiment, and which has a plurality of image processing modes will be described. The copying machine corrects variation of judgment among devices or variation of judgment due to different image reading positions within the apparatus, and performs judgment of the specific originals by combining plural judging conditions for the specific originals in a case where judgment of some specific originals is difficult.

The image processing mode of the copying machine according to the second embodiment includes a normal operation mode and a test mode. The normal operation mode is used for detection and judgment of specific original as described in the first embodiment. On the other hand, the test mode is used for testing the operation of the image scanner and judgment circuit of the apparatus, by reading an experimental original formed imitating a "specific original" in advance and performing judgment operation of the apparatus.

<Experimental Original>

Figure 77:
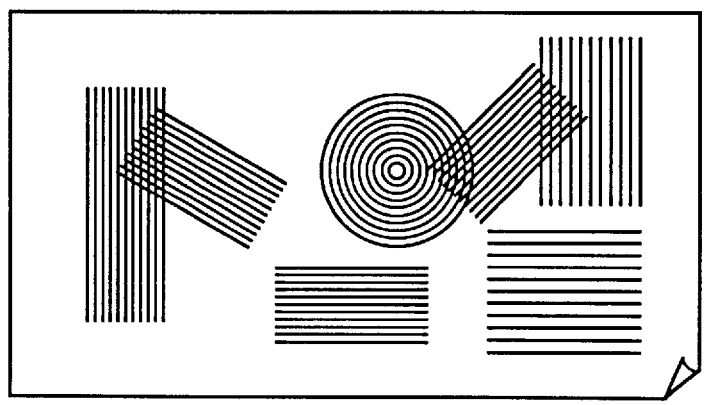
FIG. 77 is an example of an experimental original used in a second embodiment of the present invention.

FIG. 77 shows an example of the experimental original used in the present embodiment. The experimental original is an imitation of a specific original as the object of judgment and the experimental original has features similar to those of the specific original. In this embodiment, banknotes of the major countries (e.g., the United States, Japan, Great Britain, France, Germany etc.) are subjected to this testing. Except some of these banknotes, many of them have common features as follows.

That is, most of the major banknotes have graphic patterns including lines of plural colors at usually 2 to 6 lines/mm pitch. Accordingly, a judgment circuit 309 of the present embodiment is designed in consideration of this feature. Further, the experimental original has a graphic pattern including lines of plural colors at 2 to 6 lines/mm pitch.

<Flowchart of Test Mode>

Figure 78:
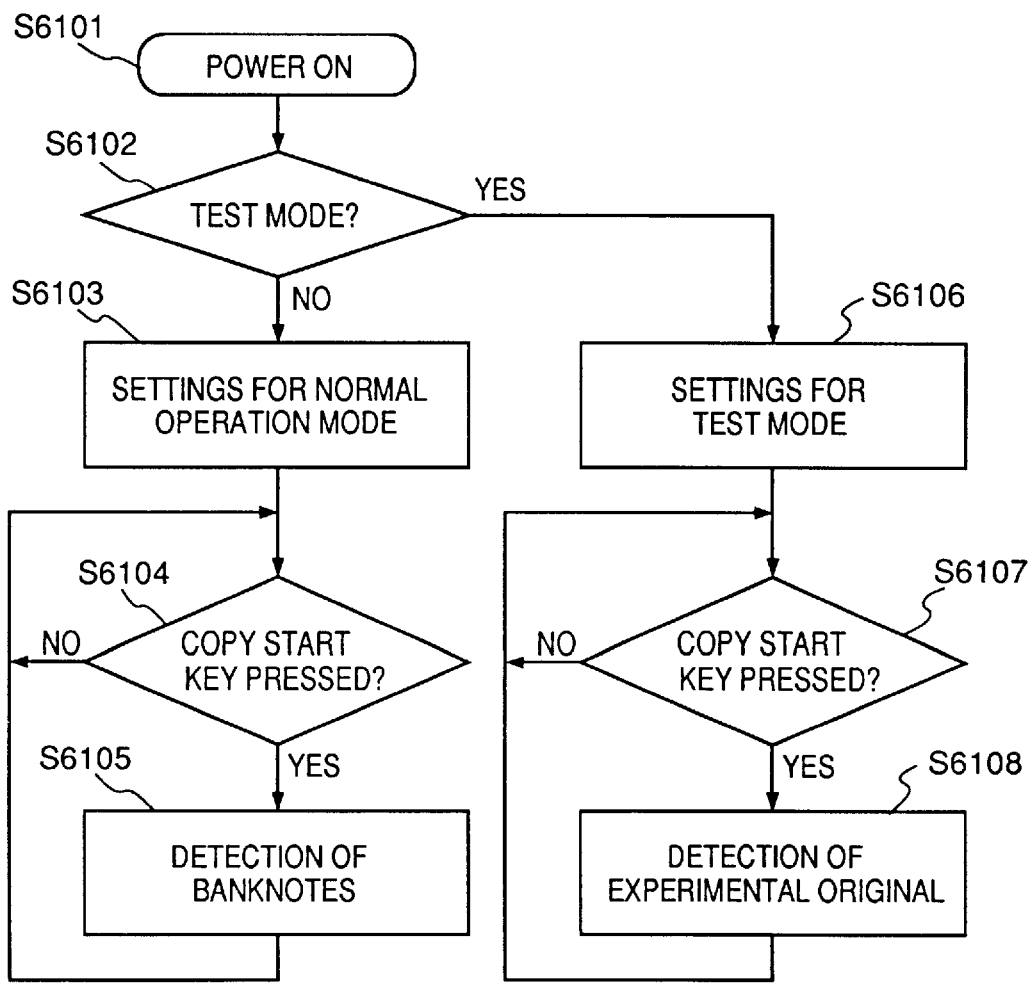
FIG. 78 is a flowchart showing the operation of test mode according to the second embodiment.

FIG. 78 is a flowchart showing the operation of the test mode according to the present embodiment. The processing of the test mode will be described with reference to FIG. 78.

First, in step S6101, as the power of the apparatus is turned on, the processing of the test mode is started. In step S6102, whether the operation mode of the apparatus is the normal operation mode or the test mode is determined. This determination is made by examining whether or not a specific key-input has been made from the operation panel of the apparatus.

Figure 79:
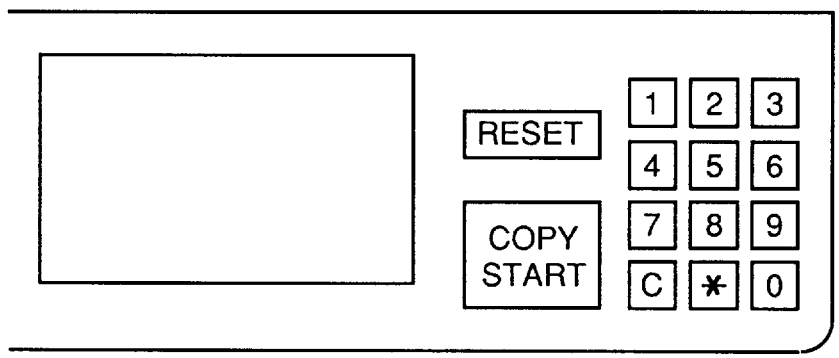
FIG. 79 is a top view of an operation panel of an apparatus according to the second embodiment.

FIG. 79 shows the overview of the operation panel of the apparatus of the present embodiment. At the operation panel, if key-input of, e.g., "*", "1", "2", "3", "3", "2", "1" and "*", is made, it is determined that the current mode is the test mode, and otherwise, it is determined that the current mode is the normal operation mode. If the current mode is determined as the normal operation mode in step S6102, the process proceeds to step S6103 in which settings for the normal operation mode are made (the settings will be described in detail later). Next, in step S6104, whether or not a copy start key has been pressed is determined. If YES, the process proceeds to step S6105 in which banknote detection is performed. When this operation is completed, the process returns to step S6104.

On the other hand, if the current mode is determined as the test mode in step S6102, the process proceeds to step S6106 in which settings for the test mode are made (the settings will be described in detail later). Next, in step S6107, whether or not the copy start key has been pressed is determined. If YES, the process proceeds to step S6108 in which detection of the experimental original is performed. When this operation is completed, the process returns to step S6107.

Figure 80:
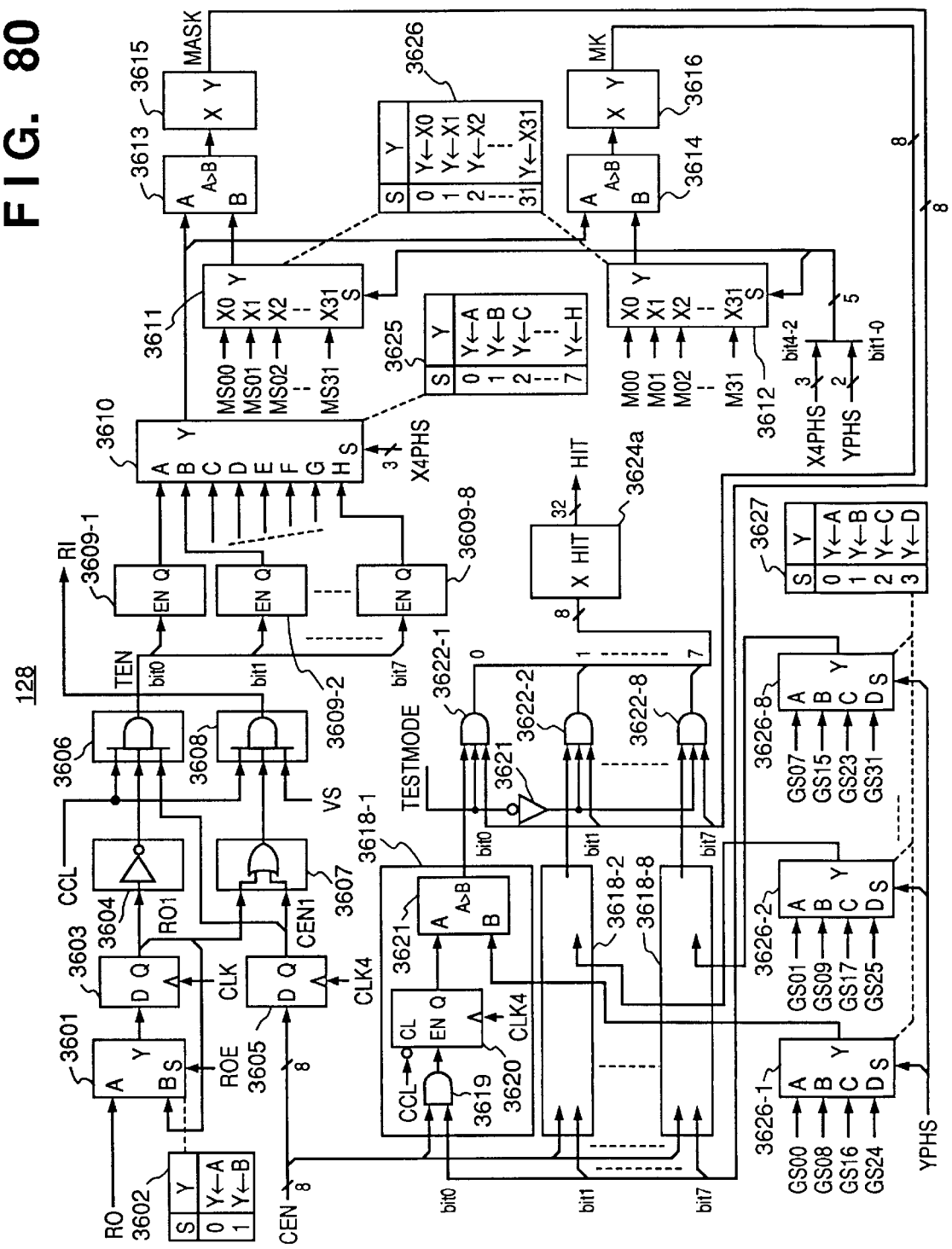
FIG. 80 is a block diagram showing the detailed construction of the volume judgment circuit 128 according to the second embodiment.

FIG. 80 is a block diagram showing the detailed construction of the volume judgment circuit 128 according to the present embodiment. In FIG. 80, the elements corresponding to those in the volume judgment circuit 128 of the first embodiment have the same reference numerals, therefore, the explanation of these elements will be omitted, and only the elements characteristic of the present embodiment will be described.

In FIG. 80, numeral 3621 denotes an inverter. A signal TESTMODE, set by the CPU 311, is for changing of the normal operation mode and the test mode. More specifically, the TESTMODE signal value is "0" in the normal operation mode, while the signal value is "1" in the test mode. As it is apparent from FIG. 80, the TESTMODE signal is inputted into the AND gate 3622-1, and the inverted signal of the TESTMODE signal is inputted into the AND gates 3622-2 to 3622-8.

Regarding the condition for the outputs "1" of the AND gates 3622-1 to 3622-8, the present embodiment employs a further condition in addition to the conditions described in the first embodiment. That is, only if the TESTMODE signal value is "1" (i.e., in the test mode), the AND gate 3622-1 output is "1", while only if the TESTMODE signal value is "0" (i.e., in the normal operation mode), the outputs of the AND gates 3622-2 to 3622-8 are "1". Specifically, among the eight judging conditions used in the simultaneous judgments, one condition is for the experimental original, and the other seven conditions are for the specific originals.

Further, in FIG. 80, numeral 3624a denotes an HIT signal generator which generates a 32-bit HIT signal in accordance with 8-bit signals time-divisionally generated based on the YPHS signal values from the AND gates 3622-1 to 3622-8.

Figure 81:
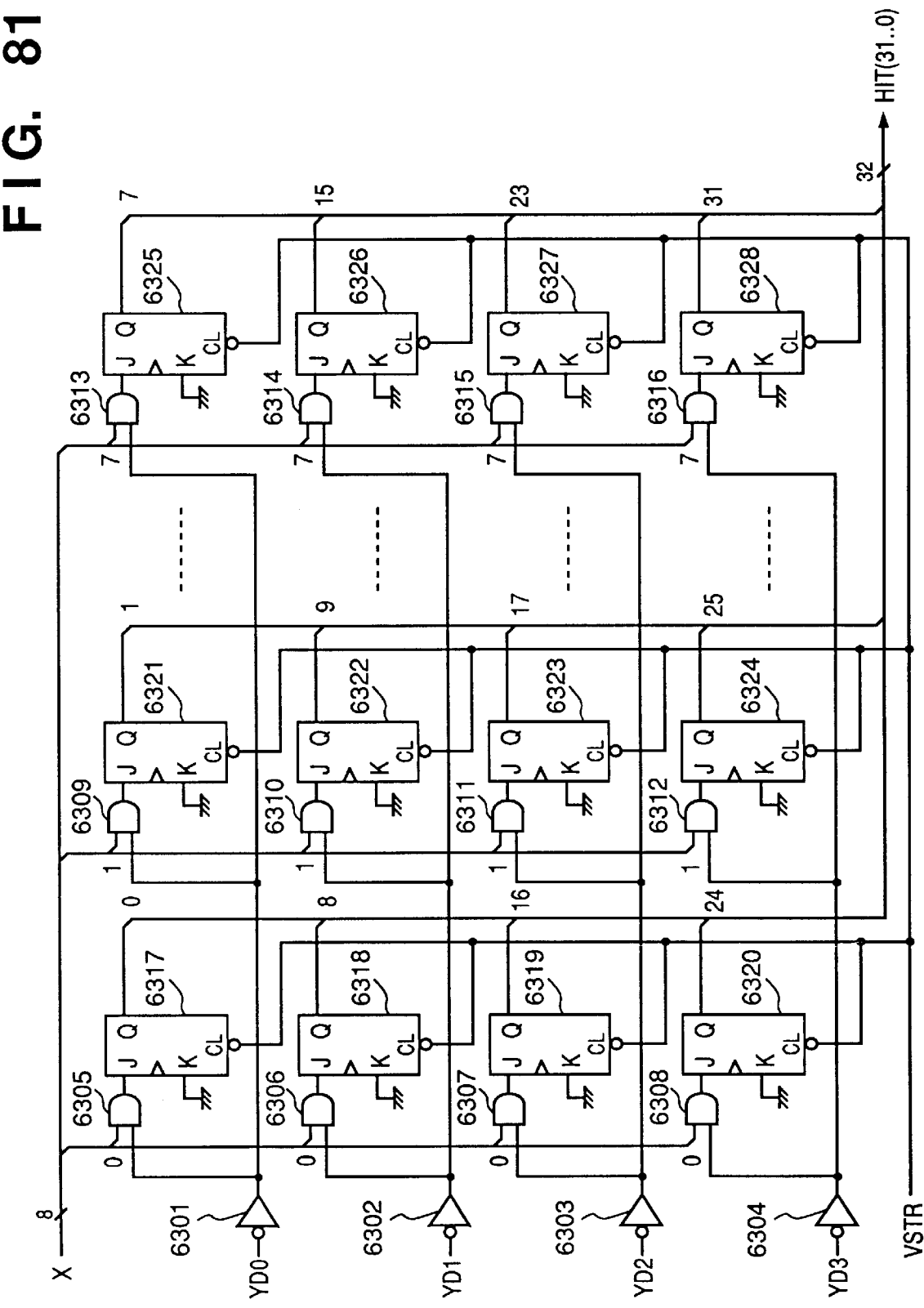
FIG. 81 is a block diagram showing the detailed construction of a HIT signal generator 3623a in FIG. 80.

FIG. 81 is a block diagram showing the detailed construction of the HIT signal generator 3624a. In FIG. 81, numerals 6301 to 6304 denote inverters; 6305 to 6316, AND gates; and 6317 to 6328, JK flip-flops.

In FIG. 81, an 8-bit X signal from the AND gates 3622-1 to 3622-8 indicates the results from judgment on the above-described thirty-two judging conditions as four signals time-divisionally generated in accordance with the YPHS signal value. As shown in the timing chart 402 of FIG. 3, signals YD0 to YD3 are dependent on the YPHS signal.

That is, the YD0 signal value is "0" only when the YPHS signal value is "0", and otherwise, the YD0 signal value is "1"; the YD1 signal value is "0" only when the YPHS signal value is "1", and otherwise, the YD1 signal value is "1"; the YD2 signal value is "0" only when the YPHS signal value is "2", and otherwise, the YD2 signal value is "1"; and the YD3 signal value is "0" only when the YPHS signal value is "3", and otherwise, the YD3 signal value is "1".

The least significant bit (LSB) of the X signal, i.e., bit0 is inputted into one input terminal of the respective AND gates 6305 to 6308. The signal logically-inverted from the YD0 signal is inputted into the other input terminal of the AND gate 6305; the signal logically-inverted from the YD1 signal is inputted into the other input terminal of the AND gate 6306; the signal logically-inverted from the YD2 signal is inputted into the other input terminal of the AND gate 6307; and the signal logically-inverted from the YD3 signal is inputted into the other input terminal of the AND gate 6308.

As a result, an output signal having a value "1" if the YPHS signal value is "0" and the value of the bit0 of the X signal is "1" is maintained in the JK flip-flop 6317. Further, an output signal having a value "1" if the YPHS signal value is "1" and the value of the bit0 of the X signal is "1" is maintained in the JK flip-flop 6318.

An output signal having a value "1" if the YPHS signal value is "2" and the value of the bit0 of the X signal is "1" is maintained in the JK flip-flop 6319. An output signal having a value "1" if the YPHS signal value is "3" and the value of the bit0 of the X signal is "1" is maintained in the JK flip-flop 6320.

Similarly, the bit next to the LSB bit, i.e., bit1 is inputted into one input terminal of the respective AND gates 6309 to 6312. The signal logically-inverted from the YD0 signal is inputted into the other input terminal of the AND gate 6309; the signal logically-inverted from the YD1 signal is inputted into the other input terminal of the AND gate 6310; the signal logically-inverted from the YD2 signal is inputted into the other input terminal of the AND gate 6311; and the signal logically-inverted from the YD3 signal is inputted into the other input terminal of the AND gate 6312.

As a result, an output signal having a value "1" if the YPHS signal value is "0" and the value of the bit1 of the X signal is "1" is maintained in the JK flip-flop 6321. Further, an output signal having a value "1" if the YPHS signal value is "1" and the value of the bit1 of the X signal is "1" is maintained in the JK flip-flop 6322.

An output signal having a value "1" if the YPHS signal value is "2" and the value of the bit1 of the X signal is "1" is maintained in the JK flip-flop 6323. Further, an output signal having a value "1" if the YPHS signal value is "3" and the value of the bit1 of the X signal is "1" is maintained in the JK flip-flop 6324.

Note that in FIG. 81, bit2 to bit6 are omitted, however, the other six bits (bit2 to bit7) are time-divided by the JK flip-flops and the values of these bits are maintained. FIG. 81 only shows the bit0, bit1 and bit7.

The thirty-two JK-flip-flop outputs are outputted as the 32-bit HIT signal.

Though already described as above, the HIT signal indicates the judgment result from judging predetermined specific originals on the thirty-two judging conditions.

Note that the HIT signal is initialized by the VSTR signal described in the first embodiment.

<Judgment and Processing of Specific Original>

As shown in FIGS. 2 and 46, the judgment result on the plurality of judging conditions by the above-described process is outputted to the CPU 311 as the 32-bit HIT signal. The CPU 311 in FIG. 2 determines existence/absence of the specific original based on the HIT signal, in accordance with predetermined rules.

The followings are two examples (Examples 1 and 2) of the rules for determination of existence/absence of the specific original:

EXAMPLE 1

In determination of existence/absence of twenty-two specific originals, assuming that the n-th bit (n=0, 1, 2, . . . , 31) of the 32-bit HIT signal is HIT(n), and the logical product is &, (1) determination of existence/absence of the specific original No. 1 (experimental original) is made by HIT(0);

(2) determination of existence/absence of the specific original No. 2 (experimental original) is made by HIT(8);

(3) determination of existence/absence of the specific original No. 3 (experimental original) is made by HIT(16);

(4) determination of existence/absence of the specific original No. 4 (experimental original) is made by HIT(24);

(5) determination of existence/absence of the specific original No. 5 is made by HIT(1);

(6) determination of existence/absence of the specific original No. 6 is made by HIT(2);

(7) determination of existence/absence of the specific original No. 7 is made by HIT(3);

(8) determination of existence/absence of the specific original No. 8 is made by HIT(4);

(9) determination of existence/absence of the specific original No. 9 is made by HIT(5);

(10) determination of existence/absence of the specific original No. 10 is made by HIT(6);

(11) determination of existence/absence of the specific original No. 11 is made by HIT(7);

(12) determination of existence/absence of the specific original No. 12 is made by HIT(9);

(13) determination of existence/absence of the specific original No. 13 is made by HIT(10);

(14) determination of existence/absence of the specific original No. 14 is made by HIT(11);

(15) determination of existence/absence of the specific original No. 15 is made by HIT(12);

(16) determination of existence/absence of the specific original No. 16 is made by HIT(13);
(17) determination of existence/absence of the specific original No. 17 is made by HIT(14) & HIT(15);
(18) determination of existence/absence of the specific original No. 18 is made by HIT(17) & HIT(18);
(19) determination of existence/absence of the specific original No. 19 is made by HIT(19) & HIT(20) & HIT(21);
(20) determination of existence/absence of the specific original No. 20 is made by HIT(22) & HIT(23) & HIT(25);
(21) determination of existence/absence of the specific original No. 21 is made by HIT(26) & HIT(27) & HIT(28); and
(22) determination of existence/absence of the specific original No. 22 is made by HIT(29) & HIT(30) & HIT(31).

The equation for judgment in the test mode is:

$$J = HIT(0):HIT(8):HIT(16):HIT(24)$$

(: is a symbol representing a logical add.)

On the other hand, the equation for judgment in the normal operation mode is:

$$\begin{aligned}J = &\ HIT(1):HIT(2):HIT(3):HIT(4):HIT(5):HIT(6):HIT(7):\\ &HIT(9):HIT(10):HIT(11):HIT(12):HIT(13):\\ &\{HIT(14)\&HIT(15)\}:\{HIT(17)\&HIT(18)\}:\\ &\{HIT(19)HIT(20)\&HIT(21)\}:\\ &\{HIT(22)\&HIT(23)\&HIT(25)\}:\\ &\{HIT(26)\&HIT(27)\&HIT(28)\}:\\ &\{HIT(29)\&HIT(30)\&HIT(31)\}\end{aligned}$$

In this manner, the existence/absence of the specific original is determined by the value of J.

If J=0 holds, it is determined that the specific original as the object judgment does not exist on the platen, while if J=1 holds, it is determined that at least one or more of the specific originals exist on the platen.

Note that as to the specific originals Nos. 1 to 16, the judgment is made on one judging condition with respect to one specific original. As to the specific originals Nos. 17 and 18, the judgment is made on two judging conditions with respect to one specific original. As to the specific originals Nos. 19 to 22, the judgment is made on three judging conditions with respect to one specific original.

EXAMPLE 2

In determination of existence/absence of nineteen specific originals, assuming that the n-th bit (n=0, 1, 2, ..., 31) of the 32-bit HIT signal is HIT(n), and the logical product is &,
(1) determination of existence/absence of the specific original No. 1 (experimental original) is made by HIT(0);
(2) determination of existence/absence of the specific original No. 2 (experimental original) is made by HIT(8);
(3) determination of existence/absence of the specific original No. 3 (experimental original) is made by HIT(16);
(4) determination of existence/absence of the specific original No. 4 (experimental original) is made by HIT(24);
(5) determination of existence/absence of the specific original No. 5 is made by HIT(1);
(6) determination of existence/absence of the specific original No. 6 is made by HIT(2);
(7) determination of existence/absence of the specific original No. 7 is made by HIT(3);
(8) determination of existence/absence of the specific original No. 8 is made by HIT(4);
(9) determination of existence/absence of the specific original No. 9 is made by HIT(5);
(10) determination of existence/absence of the specific original No. 10 is made by HIT(6) & HIT(7);
(11) determination of existence/absence of the specific original No. 11 is made by HIT(9) & HIT(10);
(12) determination of existence/absence of the specific original No. 12 is made by HIT(11) & HIT(12);
(13) determination of existence/absence of the specific original No. 13 is made by HIT(13) & HIT(14);
(14) determination of existence/absence of the specific original No. 14 is made by HIT(15) & HIT(17);
(15) determination of existence/absence of the specific original No. 15 is made by HIT(18) & HIT(19);
(16) determination of existence/absence of the specific original No. 16 is made by HIT(20) & HIT(21);
(17) determination of existence/absence of the specific original No. 17 is made by HIT(22) & HIT(23) & HIT(25);
(18) determination of existence/absence of the specific original No. 18 is made by HIT(26) & HIT(27) & HIT(28); and
(19) determination of existence/absence of the specific original No. 19 is made by HIT(29) & HIT(30) & HIT(31);

The equation for judgment in the test mode is:

$$J = HIT(0):HIT(8):HIT(16):HIT(24)$$

(: is a symbol representing a logical add.)

On the other hand, the equation for judgment in the normal operation mode is:

$$\begin{aligned}J = &\ HIT(1):HIT(2):HIT(3):HIT(4):HIT(5):\\ &\{HIT(6)\&HIT(7)\}:\{HIT(9)\&HIT(10)\}:\{HIT(11):HIT(12):\\ &HIT(13)\&HIT(14):\{HIT(15)\&HIT(17)\}:\{HIT(18)\&HIT(19)\}\\ &\{HIT(20)\&HIT(21)\}:\{HIT(22)\&HIT(23)\&HIT(25)\}:\\ &\{HIT(26)\&HIT(27)\&HIT(28)\}:\\ &\{HIT(29)\&HIT(30)\&HIT(31)\}\end{aligned}$$

In this manner, the existence/absence of the specific original is determined by the value of J.

If J=0 holds, it is determined that the specific original as the object judgment does not exist on the platen, while if J=1 holds, it is determined that at least one or more of the specific originals exist on the platen.

Note that as to the specific originals Nos. 1 to 9, the judgment is made on one judging condition with respect to one specific original. As to the specific originals Nos. 10 and 16, the judgment is made on two judging conditions with respect to one specific original. As to the specific originals Nos. 17 to 19, the judgment is made on three judging conditions with respect to one specific original.

Note that these two examples do not pose any limitation upon the present invention, and there are arbitrary combinations of rules other than these examples.

On the other hand, when the value J of the judgment equation becomes "1", the CPU 311 sets the INHIBIT signal value to "1" and from that point, and uses the OR circuit 310 to render an output image a "solid black image".

As shown in Table 2 of the first embodiment, the thirty-two judging conditions in M and Y-image formation can be different from those in C and Bk-image formation, otherwise, at each of four scannings (corresponding to the respective M, C, Y and Bk image formations), the combination of conditions may be changed. For example, in the M and Y-image formation, the combination of conditions of the Example 1 may be used, while in the C and Bk-image formation, the combination of conditions of the Example 2 may be used.

As described above, according to the present embodiment, in an image processing apparatus such as a full-color copying machine which can judge existence/ absence of specific original, in a test mode, an original (reference white plate) for calibration is read as the reference of the test at a plurality of positions on the platen glass so that the characteristic variation among the devices can be corrected, and error at the image scanner due to different reading positions on the platen glass is effectively corrected.

Further, according to the present embodiment, upon judgment of specific original, as to n (n: an integer) types of pre-registered specific originals which provide difficulty in discrimination from normal originals, m (m>n) types of judgment results from judgment on m types of judging conditions are generated. Among the n types of specific originals, the determination of existence/absence of at least one specific original may be made by the plurality of judgment results from judgment on the m types of judging conditions. Thus, the specific originals difficult to be discriminated from normal originals can be more reliably discriminated from normal originals.

Third Embodiment

Figure 82:
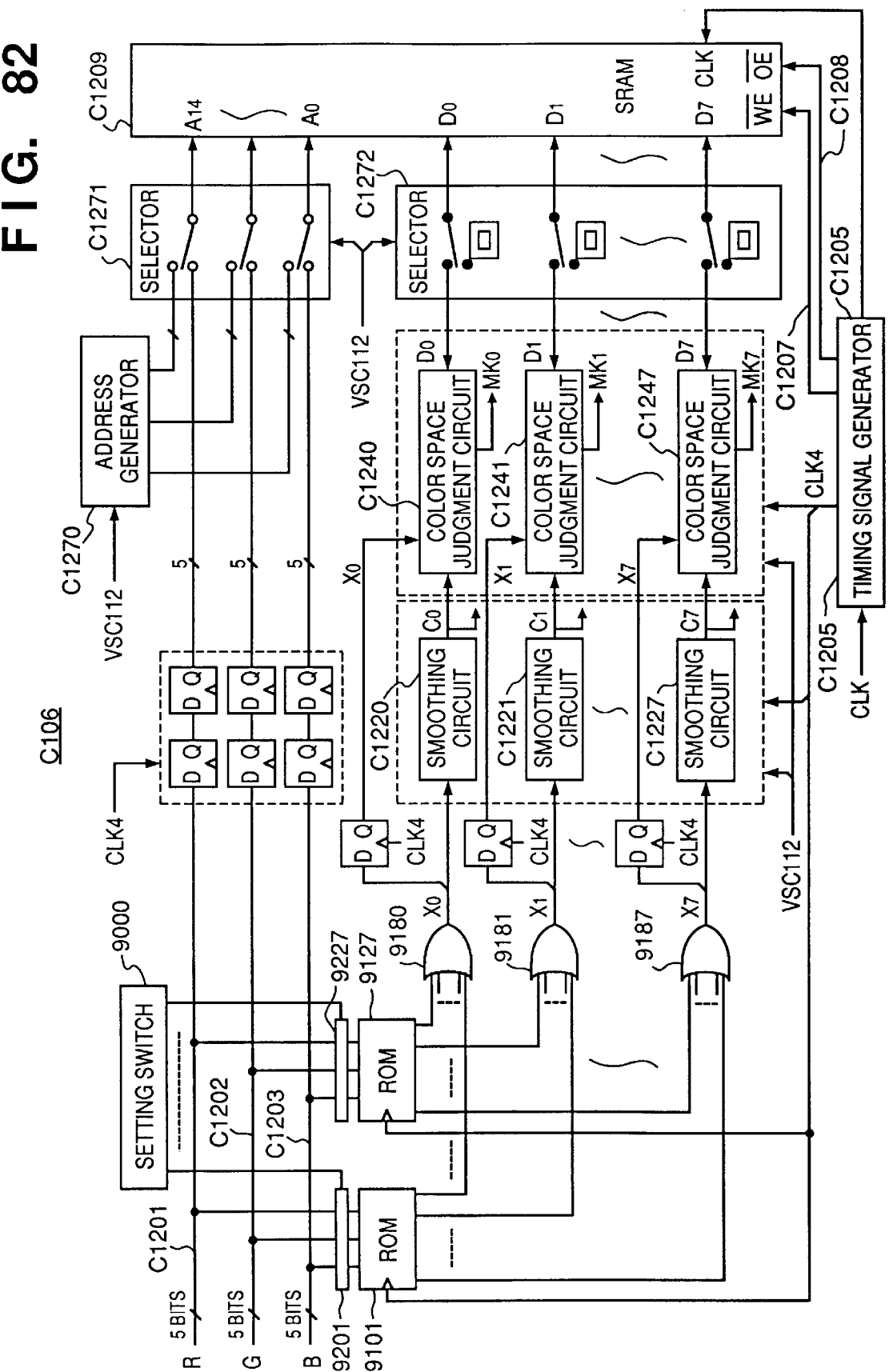
FIG. 82 is a block diagram showing the construction of a color-space matching judgment circuit according to a third embodiment of the present invention.
Figure 87:
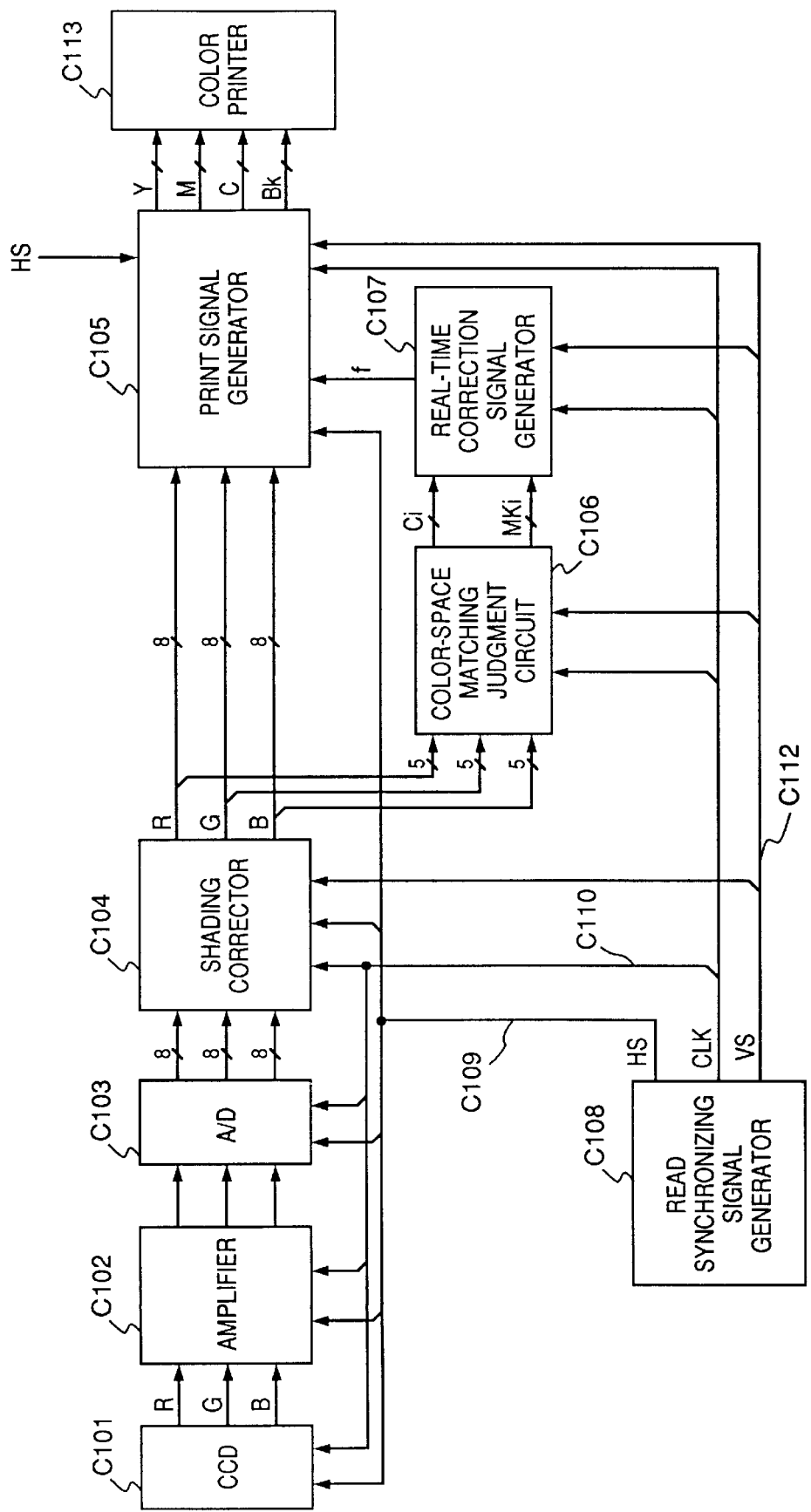
FIG. 87 is a block diagram showing the construction of a well-known color copying machine.
Figure 88:
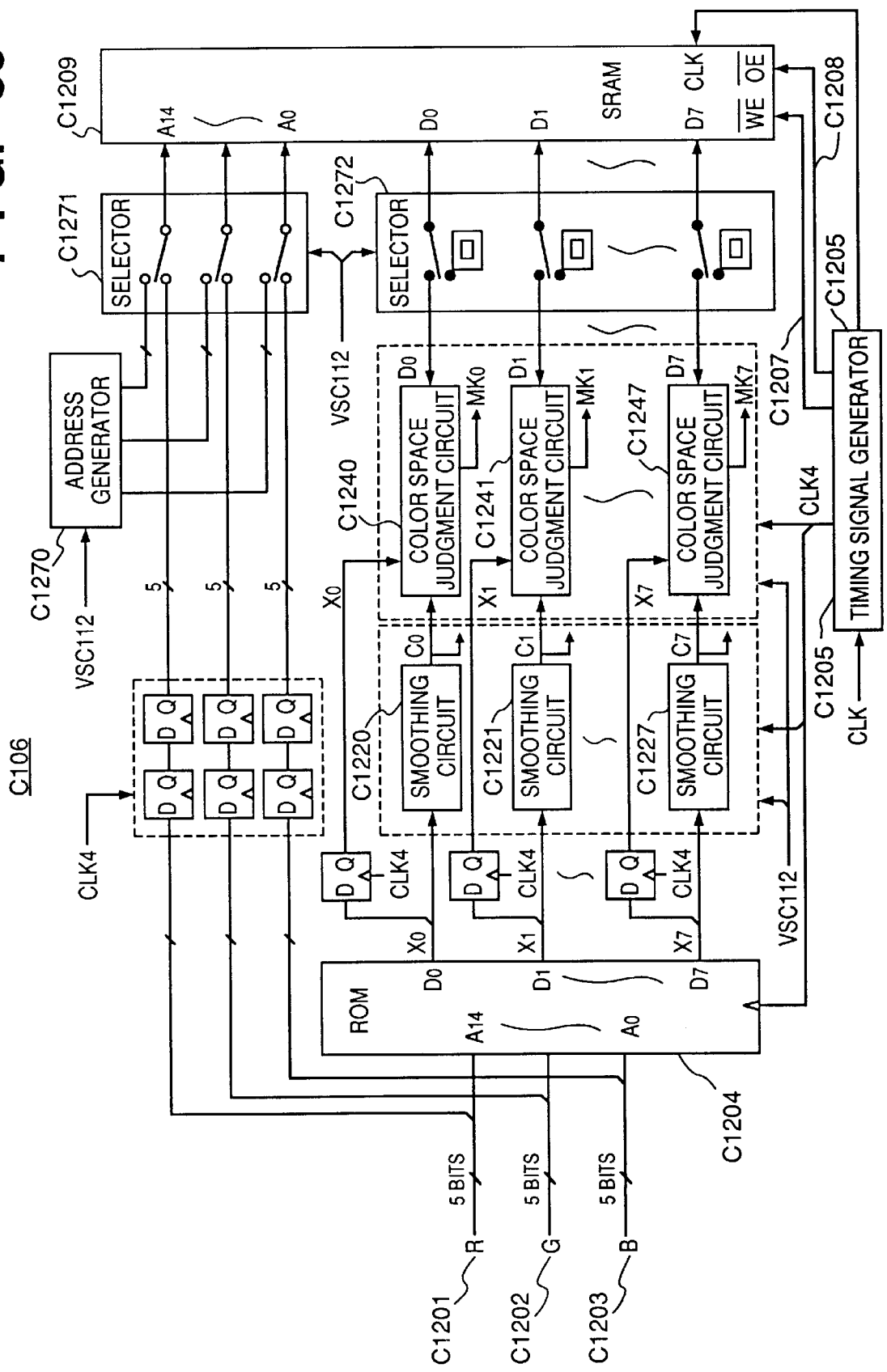
FIG. 88 is a block diagram showing the detailed construction of the color-space matching judgment circuit.
Figure 89:
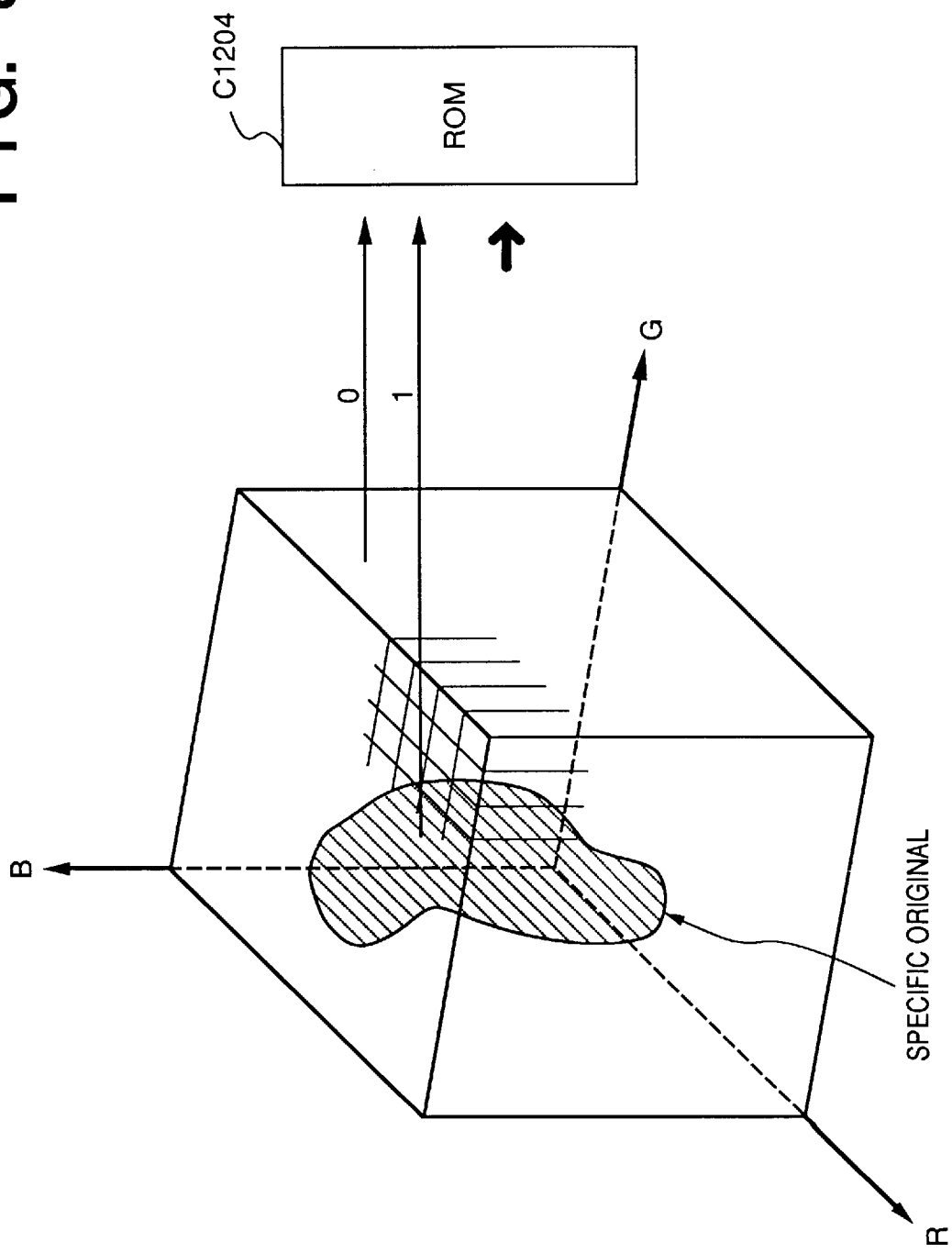
FIG. 89 is a conceptual view of specific original color-tone information stored in a ROM C1204 in FIG. 88.
Figure 90:
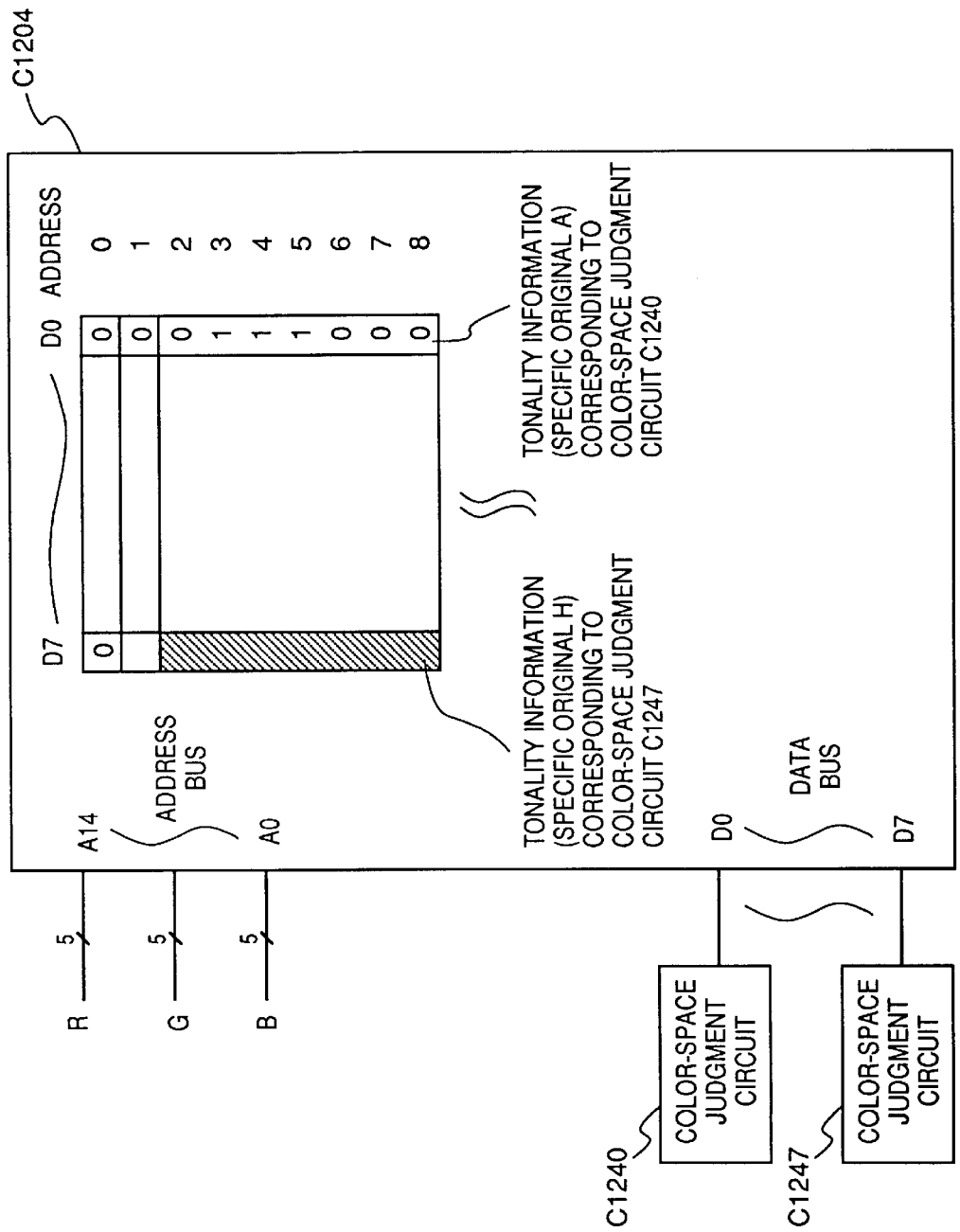
FIG. 90 shows the relation between input data and output data regarding the color tone data of the plurality of specific originals stored in the ROM C1204 in FIG. 88.
Figure 91:
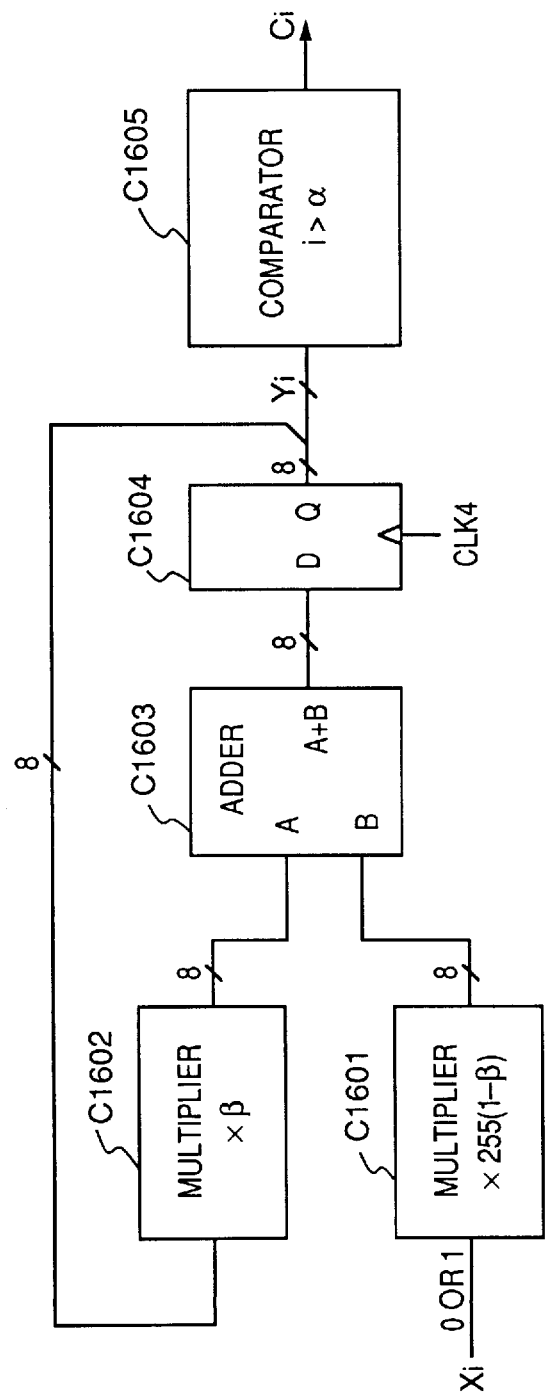
FIG. 91 is a block diagram showing the construction of smoothing circuits C1220 to C1227 in FIG. 88.
Figure 92:
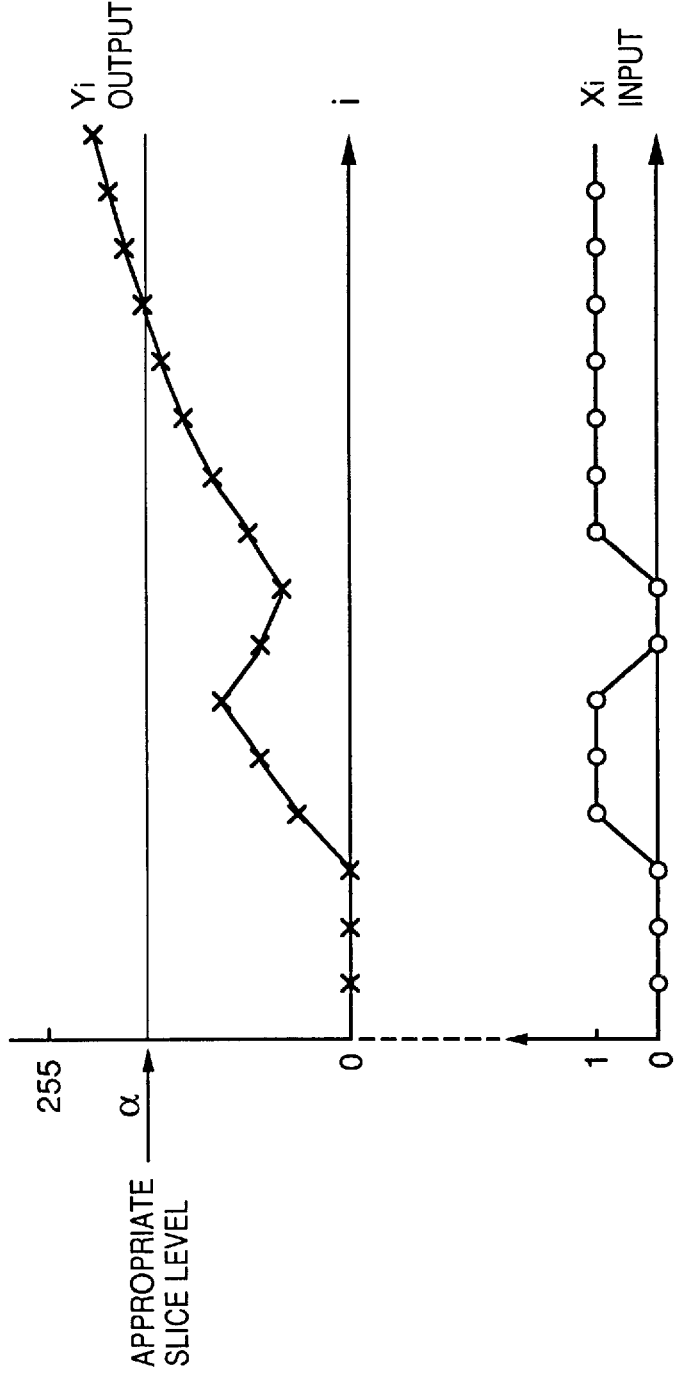
FIG. 92 is an explanatory view showing the relation between an input value (Xi) to the smoothing circuit and a calculated smoothing value (Yi)
Figure 93:
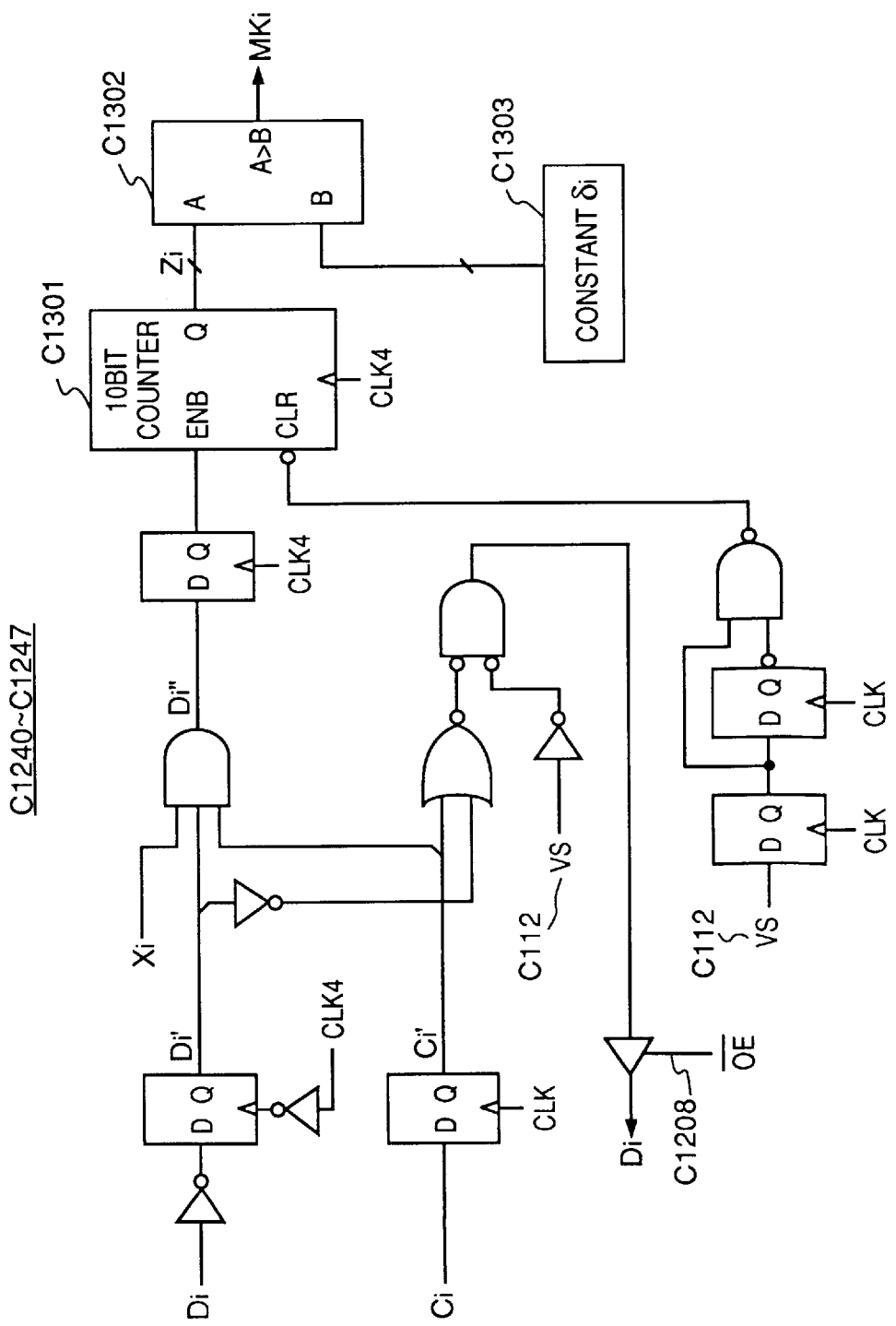
FIG. 93 is a block diagram showing the construction of color-space judgment circuits C1240 to C1247 for calculating color-space similarity judgment signal (NK0 to NK7)
Figure 94:
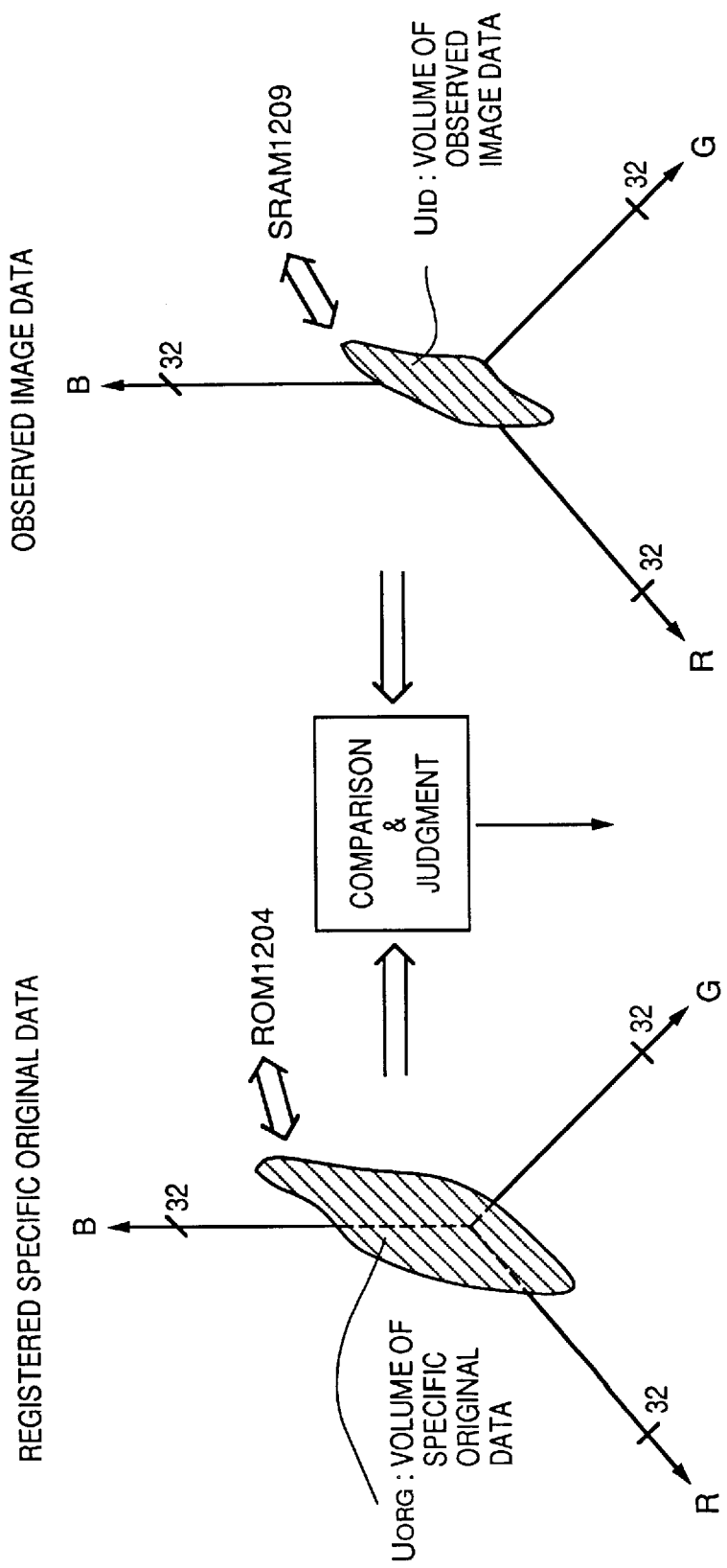
FIG. 94 illustrates the features of a specific original and an input image represented in RGB coordinate space.
Figure 95:
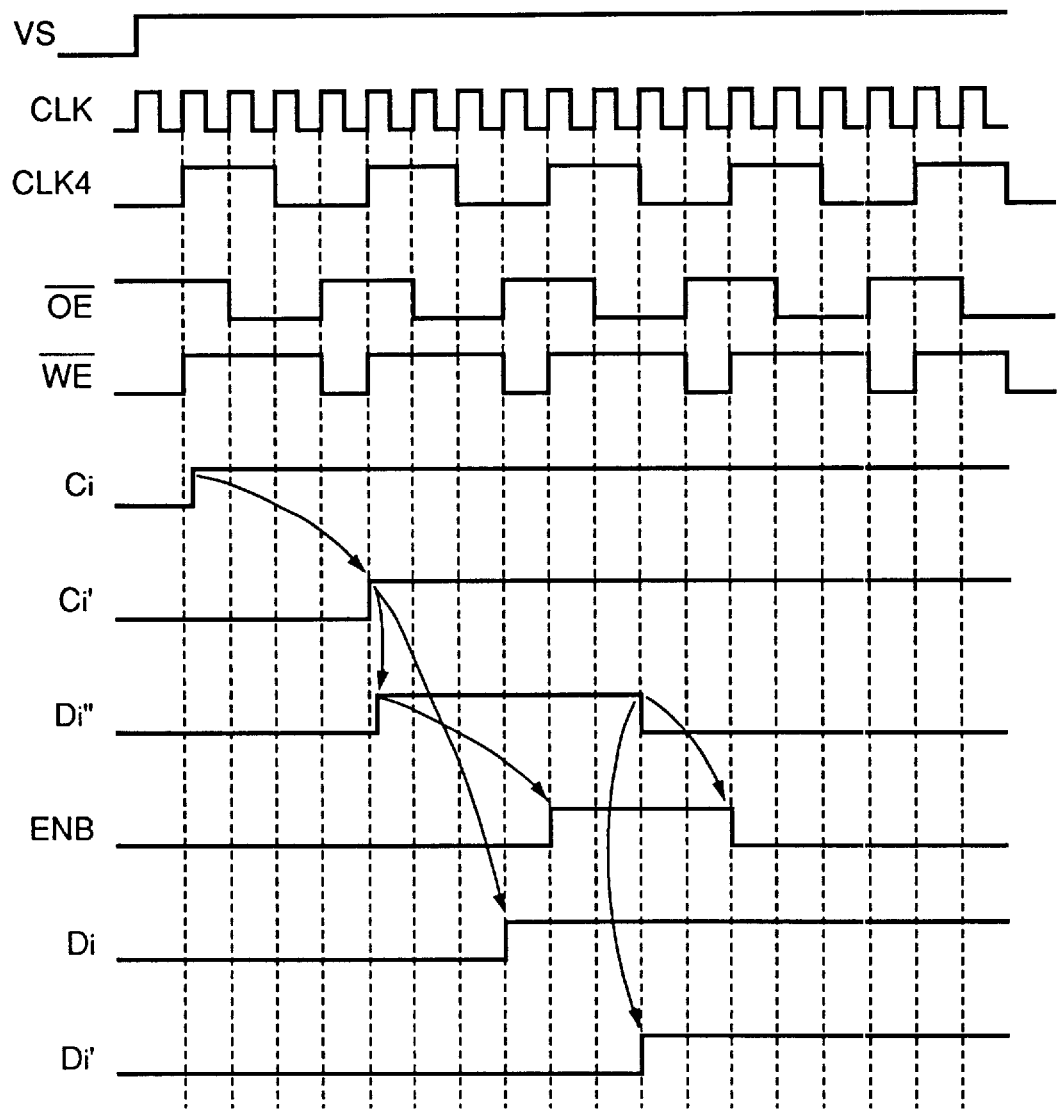
FIG. 95 is a timing chart showing a timing signal generated by a timing signal generator C1205.
Figure 96:
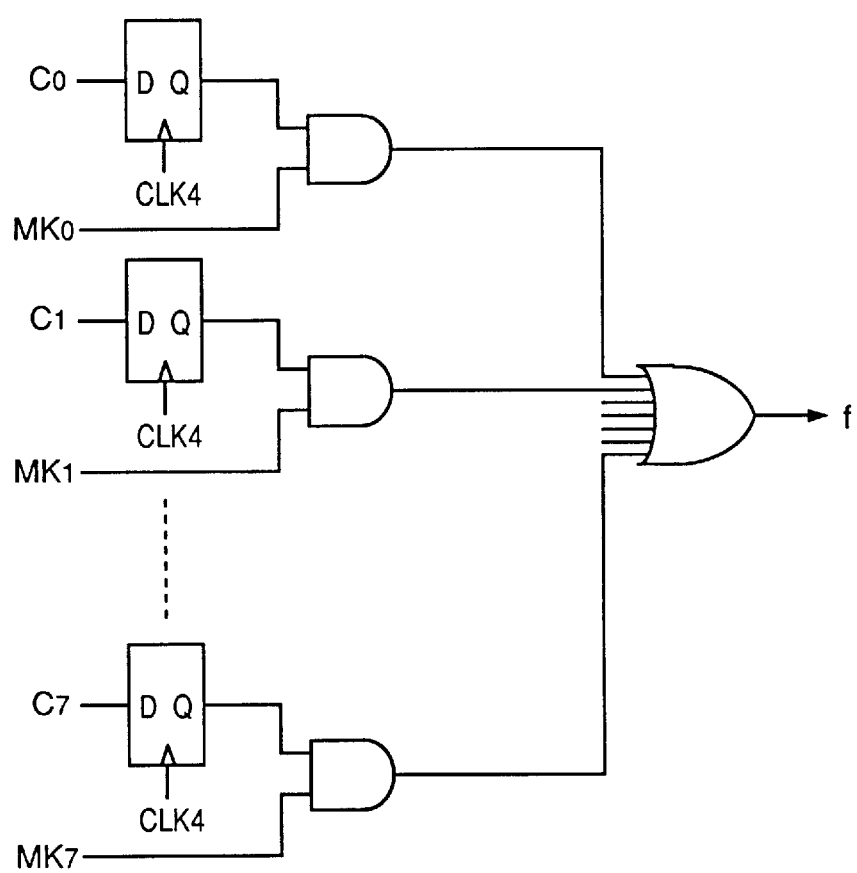
FIG. 96 is a block diagram showing the construction of a real-time correction signal generator C1107.
Figure 97:
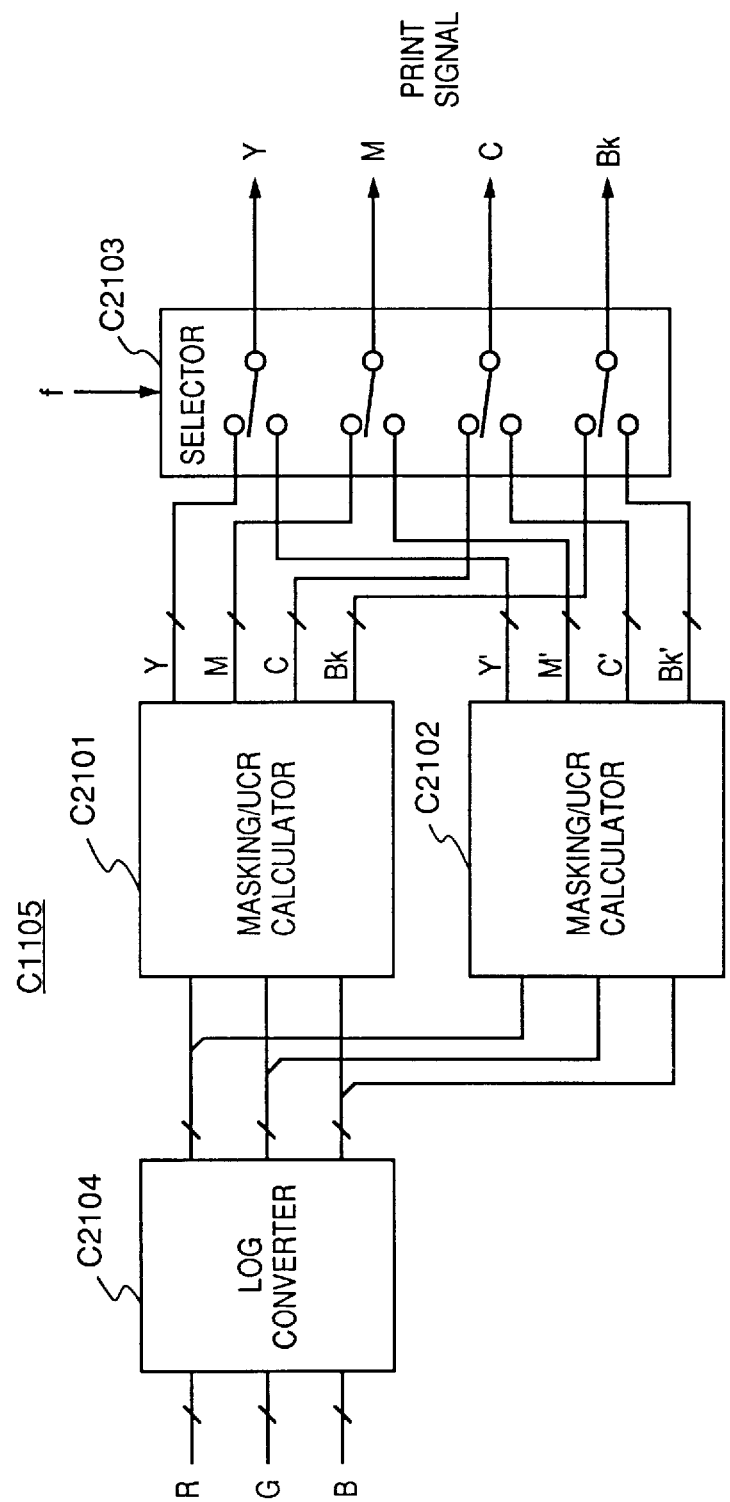
FIG. 97 is a block diagram showing the construction of a print signal generator C1105.

FIG. 82 is a block diagram showing the construction of a color space matching judgment circuit, incorporated into the color copying machine of a third embodiment of the present invention, for detection of a specific image. In FIG. 82, the elements corresponding to the conventional circuits in FIG. 88 have the same reference numerals and the explanation of the elements will be omitted. Only the elements characteristic of the present embodiment will be described. It is assumed that the circuits of the present embodiment are incorporated into the color copying machine having the construction shown in FIG. 87, and the elements in FIG. 87 are referred to in the description of the whole copying machine.

As described above, in FIG. 82, the signal C1201 is an upper 5-bit signal of the 8-bit R signal outputted from the shading corrector C104; C1202, an upper 5-bit signal of the 8-bit G signal outputted from the shading corrector C104; and C1203, an upper 5-bit signal of the 8-bit B signal outputted from the shading corrector C104.

Numerals 9101 to 9127 denote twenty-seven ROM's for storing tonality information to be described later on the specific originals. The R, G and B signals C1201 to C1203 are inputted into each of the ROM's in parallel, and judgment signal data indicating whether or not the tonality of specific original corresponding to the addresses designated by the input R, G and B signals coincide with the tonality of a read image signal are outputted in parallel. For the respective specific originals, the tonality information on up to twenty-seven conditions (to be described later) which may be changed by each specific original can be stored into these ROM's. Note that as the relation between the input addresses and the output data is the same as that described with respect to the conventional art, the explanation of the relation between the input addresses and the output data will be omitted. In this embodiment, the tonality information of eight different specific originals, each having different sets of twenty-seven conditions is stored into the ROM's 9101 to 9127.

Further, numerals 9180 to 9187 denote OR circuits for obtaining logical adds of the judgment signals from the ROM's 9101 to 9127; 9201 to 9227, switches corresponding to the twenty-seven ROM's 9101 to 9127, for ON/OFF-connecting the RGB inputs; and 9000, a setting switch for setting the ON/OFF status of the switches 9201 to 9227.

The circuit of the present embodiment having the above construction compares the input R. G and B signals with one specific original on up to twenty-seven conditions simultaneously, and if at least one of these twenty-seven conditions coincides with the tonality of the specific original, the circuit determines that the input R, G and B signals coincide with the tonality of the specific original. Note that in a case where the number of the judging conditions can be reduced depending upon the operation environment of the apparatus or the characteristic of the specific original, some of the switches 9201 to 9227 set by the setting switch 9000 may be OFF so that inputting of the R, G and B signals into some of the ROM's 9101 to 9127 can be prohibited.

Next, the tonality information stored into the twenty-seven ROM's 9101 to 9127 will be described with reference to FIGS. 83 to 86. The following description will be made with respect to the various type of one specific original which includes not only complete one but also faded one in the same specific original (e.g., a banknote of some value).

Figure 83:
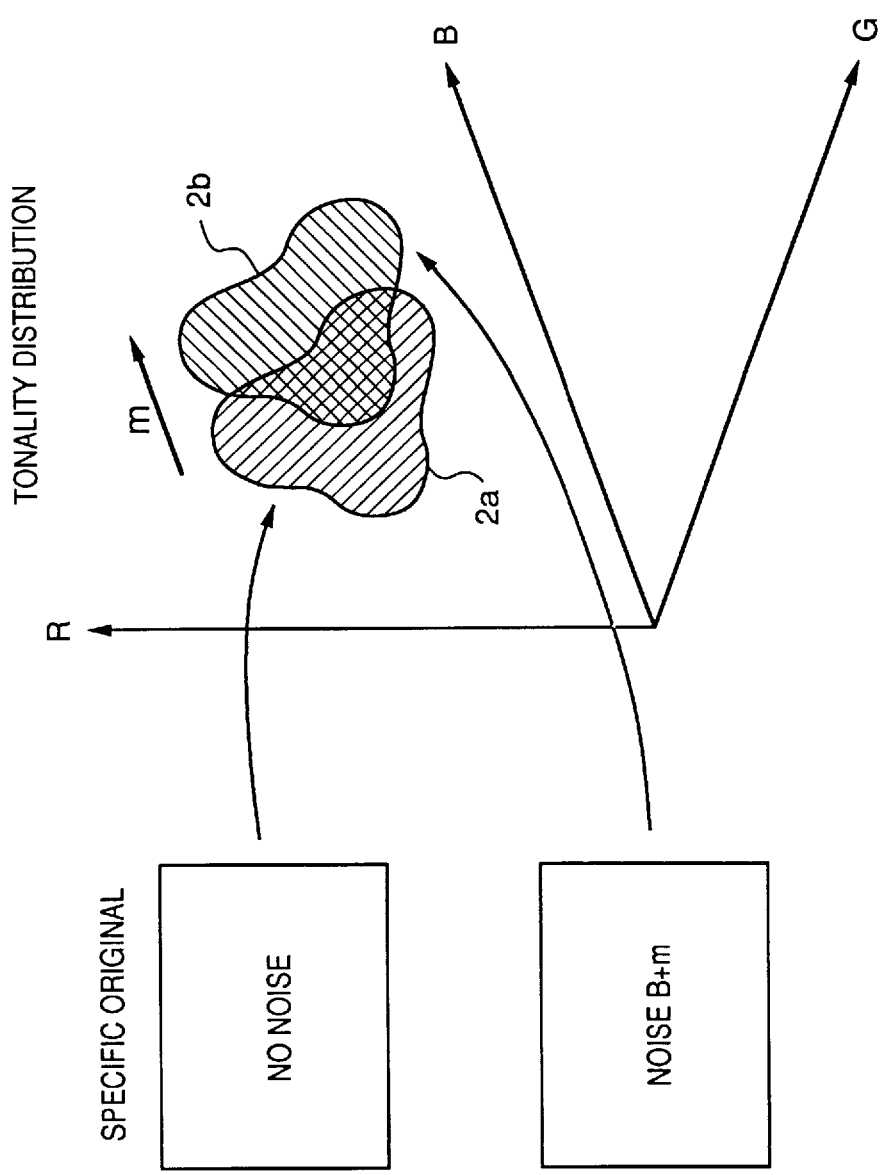
FIG. 83 is an explanatory view of color distribution change when noise (m) is added to B-component signal of input image.

First, in the ROM 9101, tonality information is generated using a reference specific original (e.g., a newly printed banknote of some value) without considering any margins of the information. In FIG. 83, the distribution 2a represents three-dimensional tonality distribution in RGB color space corresponding to the respective pixel data of the input image from reading the reference specific original. Regarding the three-dimensional tonality distribution 2a, if a value "m" is uniformly added to the value indicated by the B signal, the tonality distribution is moved in the B-axis direction by +m, maintaining the shape of the area, as the distribution 2b parallel to the tonality distribution 2a. This tonality information is stored into the ROM 9102. The value of "m", is determined based on the variation of input sensitivity among the scanners and the variation of the tonality of specific originals.

In this manner, the twenty-seven three-dimensional tonality distribution informations, including tonality distribution when value "±m" is added to the respective R, C and B components and tonality distribution when the no noise is added to the R, G and B components, are stored into the ROM's 9101 to 9127.

Figure 84:
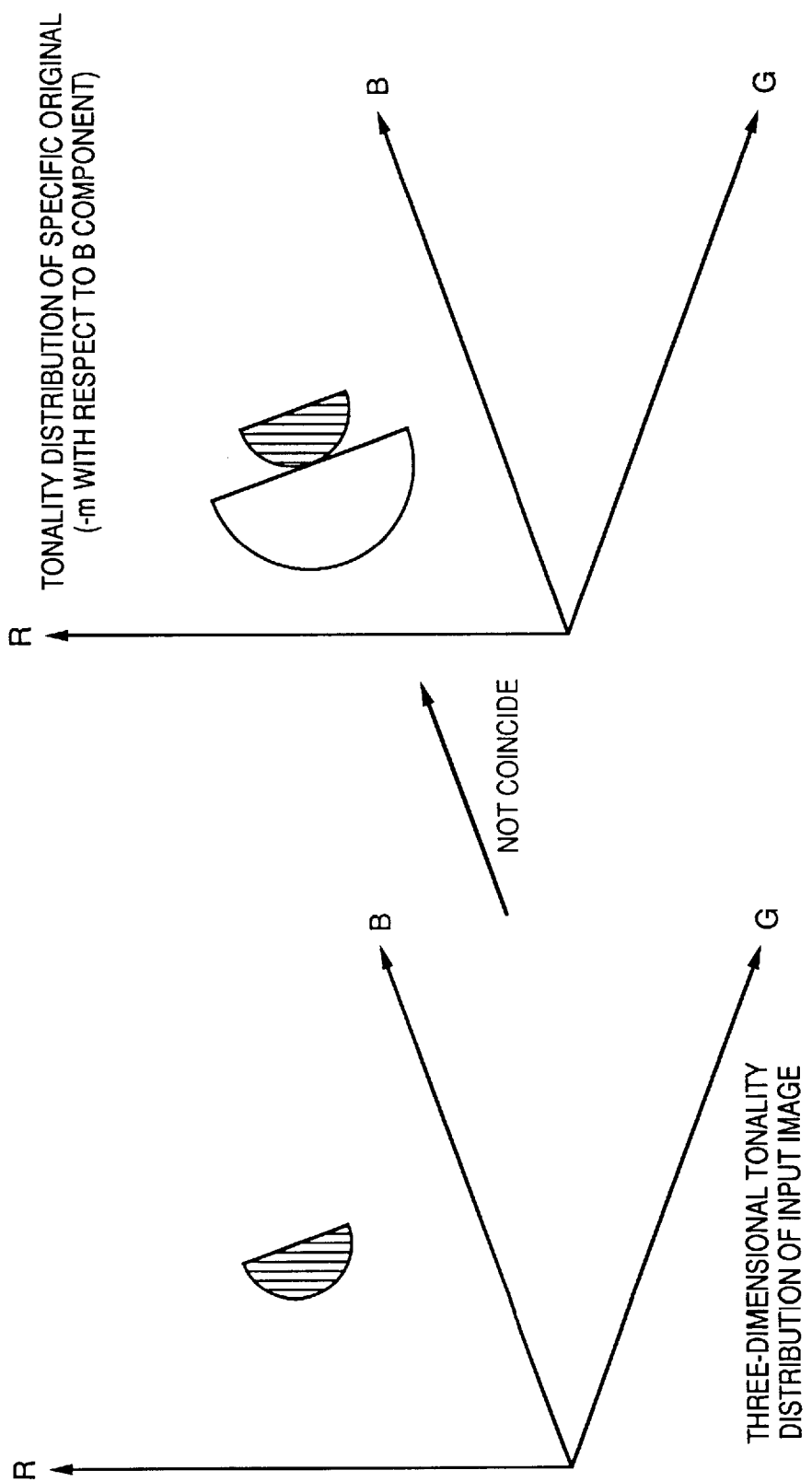

Then, the three-dimensional tonality distribution information and the input image data are compared. Usually, the input image data cannot be obtained in ideal state, but the data has R, G and B components respectively overlapped with noise. Accordingly, as shown in FIGS. 84 and 85, sometimes the tonality of specific original cannot be detected by using one three-dimensional tonality distribution information. However, as the present embodiment compares an input image signal with twenty-seven three-dimensional tonality distribution informations, generated in consideration of noise in the ± direction with respect to each component, the tonality of the specific original can be detected even if the input signal has components overlapped with noise.

Accordingly, the present embodiment enables detection of specific original with high precision and wider detection allowances in consideration of conditions of input signal.

In the present embodiment, plural types of tonality distribution are prepared on the assumption that each component of RGB data representing the tonality of the specific original is overlapped with noise of a predetermined amount, however, this does not pose any limitation upon the present invention.

For example, upon storing the tonality information of a specific original into the plurality of ROM's, a plurality of tonality distribution informations can be obtained from the same specific original. FIG. 86 shows two examples of changing the tonality distribution information by:

(1) placing the specific original under white paper; optically scanning the original by the CCD sensor; generating a first tonality distribution information from the input signal; and storing the information into a first ROM, (2) placing the specific original under black paper; and storing a second tonality distribution information generated from the input signal obtained from scanning the original by the CCD sensor into a second ROM, and (3) scanning the specific original placed without any white/black paper to obtain an input signal; and storing a third tonality distribution information generated from the input signal into a third ROM. Then, these tonality distribution informations are compared with the input R, G and B signals.

In this manner, the tonality distribution information, which may be generated in counterfeiting by, e.g., placing a specific original under white paper, can be stored into the ROM in advance. As shown in FIG. 86, a thin and bright color portion in the obtained tonality distribution information is easily affected by the white/black paper on the specific original, and the distribution around the portion is changed, compared to the three dimensional tonality distribution from the specific original without the white/black paper. However, though the shape of the whole tonality distribution is deformed, the tonality distribution of dark colors is not changed. As a result, the position of the tonality distribution information is not greatly shifted.

In addition, a plurality of tonality distribution informations may be obtained from reading a plurality of specific originals by a plurality of scanners, and a tonality distribution information may be generated based on all the tonality distributions as the logical add of the tonality distributions and stored into the ROM. This enables specific original detection in consideration of the variation among more input characteristics of scanners and the variation of tonality among the same specific original.

Further, the tonality distribution of the case where each of the RGB component is overlapped with a predetermined noise as described above and the tonality distribution of the case where the input condition is changed may be combined to obtain more tonality distribution information.

Note that too much tonality distribution information with respect to the same specific original might broaden the tonality distribution, and therefore, the tendency of the tonality distribution information may be analyzed so as to construct the judgment circuit capable of obtaining the logical product from judgment signal data outputted from specific ROM's. For example, in the above example, not the simple logical add among the first to third tonality distribution informations but at least the logical product from comparisons between two of the tonality distribution informations may be obtained.

Further, before the tonality distribution information is stored into the ROM, the information may be analyzed so as to generate tonality distribution information, which is more essential to the specific original, and which is not affected by the variation among the scanner input characteristics or evil-minded data manipulation by counterfeiting.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting color image information which represents an image;

first discriminating means for discriminating, based on the color image information, whether the image represented by the color image information is a predetermined image;

smoothing means for producing smoothed color image information by smoothing the color image information;

second discriminating means for discriminating, based on the smoothed color image information, whether the image represented by the color image information is the predetermined image, wherein the predetermined image discriminated by the second discriminating means is the same predetermined image discriminated by the first discriminating means; and judging means for judging whether the image represented by the color image information is the predetermined image based on discrimination results from said first and second discriminating means, the predetermined image judged by the judging means being the same predetermined image discriminated by the first and second discriminating means.

2. The apparatus according to claim 1, wherein said first and second discriminating means performs discrimination based on a color distribution of the predetermined image.

3. The apparatus according to claim 1, wherein said smoothing means performs smoothing on a pixel of interest in the color image information using a plurality of pixels adjacent to the pixel of interest.

4. The apparatus according to claim 1, further comprising:

extracting means for extracting an edge portion of the image represented by the color image information; and third discriminating means for discriminating whether the image is the predetermined image based on the edge portion extracted by said extracting means.

5. An image processing method comprising:

an input step of inputting color image information which represents an image;

a first discriminating step of discriminating, based on the color image information, whether the image represented by the color image information is a predetermined image;

a smoothing step for producing smoothed color image information by smoothing the color image information;

a second discriminating step of discriminating, based on the smoothed color image information, whether the image represented by the color image information is the predetermined image, wherein the predetermined image discriminated in the second discriminating step is the same predetermined image discriminated in the first discriminating step; and a judging step of judging whether the image represented by the color image information is the predetermined image based on discrimination results from said first and second discriminating steps, the predetermined image judged in the judging step being the same predetermined image discriminated in the first and second discriminating steps.

6. An image processing apparatus comprising:

input means for inputting color image information which represents an image, the color image information having a first resolution;

first discriminating means for discriminating, based on the color image information having the first resolution, whether the image represented by the color image information is a predetermined image;

converting means for converting the color image information having the first resolution into color image information having a second resolution;

second discriminating means for discriminating, based on the color image information having the second resolution, whether the image represented by the color image information is the predetermined image, wherein the predetermined image discriminated by the second discriminating means is the same predetermined image discriminated by the first discriminating means; and judging means for judging whether the image represented by the color image information is the predetermined image based on discrimination results from said first and second discriminating means, the predetermined image judged by the judging means being the same predetermined image discriminated by the first and second discriminating means.

7. The apparatus according to claim 6, wherein said first and second discriminating means perform discrimination based on a color distribution of the predetermined image.

8. The apparatus according to claim 6, wherein the conversion performed by said converting means comprises smoothing performed by sub-sampling the color image information having the first resolution.

9. The apparatus according to claim 6, further comprising:
extracting means for extracting an edge portion of the image represented by the color image information having the first resolution; and
third discriminating means for discriminating whether the image is the predetermined image based on the edge portion extracted by said extracting means.

10. An image processing method comprising:
an input step of inputting color image information which represents an image, the color image information having a first resolution;
a first discriminating step of discriminating, based on the color image information having the first resolution, whether the image represented by the color image information is a predetermined image;
a converting step of converting the color image information having the first resolution into color image information having a second resolution;
a second discriminating step of discriminating, based on the color image information having the second resolution, whether the image represented by the color image information is the predetermined image, wherein the predetermined image discriminated in the second discriminating step is the same predetermined image discriminated in the first discriminating step; and
a judging step of judging whether the image represented by the color image information is the predetermined image based on discrimination results from said first and second discriminating steps, the predetermined image judged in the judging step being the same predetermined image discriminated in the first and second discriminating steps.

11. An image processing apparatus comprising:
input means for inputting color image information, the color image information representing an image and having a screen component;
removing means for removing the screen component of the color image information; and discriminating means for discriminating whether the image represented by the color image information is a predetermined image based on the color image information in which the screen component has been removed by said removing means.

12. The apparatus according to claim 11, wherein said discriminating means performs discrimination based on a color distribution of the predetermined image.

13. The apparatus according to claim 11, wherein said removing means includes:
detecting means for detecting a two-dimensional density gradient in the image represented by the color image information; and
smoothing means for smoothing the color image information in a direction orthogonal to a direction of the density gradient detected by said detecting means.

14. An image processing method comprising:
an input step of inputting color image information, the color image information representing an image and having a screen component;
a removing step of removing the screen component of the color image information; and
a discriminating step of discriminating whether the image represented by the color image information is a predetermined image based on the color image information in which the screen component has been removed in said removing step.

15. An image processing apparatus comprising:
detecting means for detecting attribute information from a two-dimensional image signal;
addition means for adding the attribute information detected by said detecting means to an area of an image comprising m pixels by n lines;
delayed attribute signal generating means for delaying the attribute information by the n lines to obtain a delayed attribute signal;
first subtraction means for obtaining first difference information by performing subtraction between the attribute information detected by said detecting means and the delayed attribute signal generated by said delayed attribute signal generating means;
delayed difference information generating means for delaying the first difference information obtained by said first subtraction means by the m pixels to obtain delayed difference information;
second subtraction means for obtaining a second difference by performing subtraction between the first difference information obtained by said first subtraction means and the delayed difference information generated by said delayed difference information generating means; and
line memory means for storing data for one line,
wherein said addition means includes updating means for updating a content of said line memory means by adding the second difference information to a content of said line memory means and writing a result of the adding into said line memory means.

16. An image processing apparatus which is capable of adding image information to an image in both a main direction and a sub-scanning direction, comprising:
main-scanning addition means for obtaining first added information for each of a plurality of color components by adding image information of the plurality of color components in the main-scanning direction;
parallel/serial conversion means for parallel/serial converting the first added information obtained by said main-scanning addition means;

line memory means for delaying an output of said parallel/serial conversion means by one line of image information;

serial/parallel conversion means for serial/parallel converting an output from said line memory means; and sub-scanning addition means for obtaining second added information by adding an output of said serial/parallel conversion means to image information in the sub-scanning direction.

17. An image processing apparatus comprising:

storage means for storing first tonality information which represents a tonality of a specific image, the first tonality information comprising a plurality of color components, and second tonality information obtained from adding/subtracting data to/from each of the plurality of color components representing the first tonality information;

input means for inputting image data of an original image;

comparing means for comparing the image data input by said input means with both the first and second tonality information stored in said storage means; and judging means for judging whether the image data input by said input means represents the specific image based on comparison results from said comparing means.

18. The apparatus according to claim 17, wherein said storage means comprises a plurality of ROMs for storing the first and second tonality information.

19. The apparatus according to claim 17, wherein the specific image includes images representing banknotes and securities.

20. The apparatus according to claim 17, wherein said input means is an optical scanner, and wherein the data added/subtracted to/from each of the plurality of color components represents margins obtained from variations of input sensitivity of the optical scanner and/or variations of tonality unique to the specific image.

21. The apparatus according to claim 17, wherein the comparison result from said comparison means is obtained by comparing the image data input by said input means with the first tonality information to produce a first comparison result, comparing the image data input by said input means with the second tonality information to produce a second comparison result, and logically adding the first and second comparison results.

22. The apparatus according to claim 17, wherein the comparison result from said comparison means is obtained by comparing the image data input by said input means with the first tonality information produce a first comparison result, comparing the image data input by said input means with the second tonality information to produce a second comparison result, and logically multiplying the first and second comparison results.

23. An image processing method comprising:

a storage step of storing first tonality information which represents a tonality of a specific image, the first tonality information comprising a plurality of color components, and of storing second tonality information obtained from adding/subtracting data to/from each of the plurality of color components representing the first tonality information;

an input step of inputting image data of an original image;

a comparing step of comparing the image data input in said input step with both the first and second tonality information stored in said storage step; and a judging step of judging whether the image data input in said input step represents the specific image based on comparison results from said comparing step.

* * * * *

UNITED STATES PATENT AND TRADEMARK OFFICE
CERTIFICATE OF CORRECTION

PATENT NO. : 5,832,112

DATED : November 3, 1998

INVENTORS : MASAHIRO FUNADA et al.

It is certified that error appears in the above-identified patent and that said Letters Patent is hereby corrected as shown below:

COLUMN 2

Line 24, "1209." should read --C1209--.

Line 58, "1204" should read --C1204--.

Line 60, "1204" should read --C1204--.

COLUMN 3

Line 17, "1601" should read --C1601--.

Line 18, "1602" should read --C1602-- and "1603" should read --C1603--.

COLUMN 11

Line 61, "0"0 to" should read --"0" to--.

COLUMN 14

Line 34, delete "and is" (second occurrence).

UNITED STATES PATENT AND TRADEMARK OFFICE
CERTIFICATE OF CORRECTION

PATENT NO. : 5,832,112        Page 2 of 3

DATED : November 3, 1998

INVENTORS : MASAHIRO FUNADA et al.

It is certified that error appears in the above-identified patent and that said Letters Patent is hereby corrected as shown below:

COLUMN 17

Line 5, "as n NF3" should read --as an NF3--.

COLUMN 19

Line 46, "EB33 max" should read --EB33-max--.

COLUMN 20

Line 12, "with in the" should read --with the--.

COLUMN 31

Line 54, "and AND" should read --an AND--.

COLUMN 35

Line 43, "flip-flip" should read --flip-flop--.

Line 49, "vale" should read --value--.

UNITED STATES PATENT AND TRADEMARK OFFICE
CERTIFICATE OF CORRECTION

PATENT NO. : 5,832,112

DATED : November 3, 1998

INVENTORS : MASAHIRO FUNADA et al.

It is certified that error appears in the above-identified patent and that said Letters Patent is hereby corrected as shown below:

COLUMN 38

Line 23, "R, B and B" should read --R, G and B--.

Line 24, "SPA" should read --SRA--.

COLUMN 49

Line 26, "(19)HIT" should read --(19)&HIT--.

COLUMN 50

Line 29, "HIT(12):" should read --HIT(12)}:--.

Line 30, "HIT(13)" should read --{HIT(13)--.

Line 31, "{HIT(20)" should read --:{HIT(20)--.

Signed and Sealed this

Tenth Day of August, 1999

Q. TODD DICKINSON

*Attest:*

*Attesting Officer*          Acting Commissioner of Patents and Trademarks